United States Patent
Cheung et al.

(10) Patent No.: US 12,497,435 B2
(45) Date of Patent: Dec. 16, 2025

(54) MULTIMERIZATION OF IL-15/IL-15R-ALPHA-FC COMPLEXES TO ENHANCE IMMUNOTHERAPY

(71) Applicant: Memorial Sloan Kettering Cancer Center, New York, NY (US)

(72) Inventors: Nai-Kong V. Cheung, New York, NY (US); Hong Xu, New York, NY (US)

(73) Assignee: Memorial Sloan Kettering Cancer Center, New York, NY (US)

( * ) Notice: Subject to any disclaimer, the term of this patent is extended or adjusted under 35 U.S.C. 154(b) by 1100 days.

(21) Appl. No.: 17/421,846

(22) PCT Filed: Jan. 10, 2020

(86) PCT No.: PCT/US2020/013232
§ 371 (c)(1),
(2) Date: Jul. 9, 2021

(87) PCT Pub. No.: WO2020/146835
PCT Pub. Date: Jul. 16, 2020

(65) Prior Publication Data
US 2022/0106375 A1    Apr. 7, 2022

Related U.S. Application Data

(60) Provisional application No. 62/791,678, filed on Jan. 11, 2019.

(51) Int. Cl.
*A61K 38/20* (2006.01)
*A61K 38/17* (2006.01)
(Continued)

(52) U.S. Cl.
CPC ...... *C07K 14/5443* (2013.01); *A61K 38/1793* (2013.01); *A61K 38/2086* (2013.01);
(Continued)

(58) Field of Classification Search
None
See application file for complete search history.

(56) References Cited

U.S. PATENT DOCUMENTS 7,612,181 B2 * 11/2009 Wu .................... A61P 25/16
8,871,191 B2 * 10/2014 Pavlakis .............. A61P 43/00
                                                        435/375
(Continued)

FOREIGN PATENT DOCUMENTS

WO    WO-2011/020047 A1    2/2011
WO    WO-2012/040323 A2    3/2012
(Continued)

OTHER PUBLICATIONS

Nanna et al, Harnessing a catalytic lysine residue for the one-step preparation of homogeneous antibody-drug conjugates, Nat. Comm. 8:1112, 9 pages + 24 pages suppl. material [DOI: 10.1038/s41467-017-01257-1], Oct. 24, 2017.*
(Continued)

*Primary Examiner* — Claire Kaufman
(74) *Attorney, Agent, or Firm* — Foley & Lardner LLP

(57) ABSTRACT

The present disclosure relates generally to complexes comprising an interleukin-15 ("EL-15") polypeptide chain non-covalently bonded to an IL-15 receptor α-Fc fusion polypeptide ("IL-15Rα-Fc"), and multimers (e.g., trimers) thereof. The complexes of the present technology are useful in methods for enhancing immune cell function and immunotherapy in a patient in need thereof. Also provided herein are methods for preventing or treating a disease or condition in which enhancing IL-15-mediated function is beneficial (such as cancer, infectious diseases, immunodeficiencies and leukopenia) in a patient in need thereof.

16 Claims, 52 Drawing Sheets

Specification includes a Sequence Listing.

2+2 form

6+6 form

(51) Int. Cl.
  *A61K 39/00*   (2006.01)
  *A61K 39/39*   (2006.01)
  *A61K 40/10*   (2025.01)
  *A61K 40/11*   (2025.01)
  *A61K 40/42*   (2025.01)
  *A61K 40/46*   (2025.01)
  *A61P 35/00*   (2006.01)
  *A61P 37/04*   (2006.01)
  *C07K 14/54*   (2006.01)
  *C07K 14/715*  (2006.01)
  *C07K 16/46*   (2006.01)
  *A61K 38/00*   (2006.01)

(52) U.S. Cl.
  CPC .......... *A61K 39/0011* (2013.01); *A61K 39/39* (2013.01); *A61K 40/10* (2025.01); *A61K 40/11* (2025.01); *A61K 40/42* (2025.01); *A61K 40/46* (2025.01); *A61P 35/00* (2018.01); *A61P 37/04* (2018.01); *C07K 14/7155* (2013.01); *A61K 38/00* (2013.01); *A61K 2039/55527* (2013.01); *C07K 2317/41* (2013.01); *C07K 2319/30* (2013.01)

(56) References Cited

U.S. PATENT DOCUMENTS

| | | | | |
|---|---|---|---|---|
| 9,925,247 | B2* | 3/2018 | Liu | A61P 35/00 |
| 10,358,477 | B2* | 7/2019 | Jacques | A61P 31/10 |
| 11,225,644 | B2* | 1/2022 | Sakai | C07K 14/78 |
| 11,318,201 | B2* | 5/2022 | Wong | C07K 14/7155 |
| 11,717,559 | B2* | 8/2023 | Qu | C07K 14/5443 424/85.2 |
| 2013/0142755 | A1 | 6/2013 | Boyman et al. | |
| 2017/0326205 | A1 | 11/2017 | Conejo-Garcia et al. | |
| 2018/0118805 | A1 | 5/2018 | Bernett et al. | |

FOREIGN PATENT DOCUMENTS

| | | | |
|---|---|---|---|
| WO | WO-2016018920 A1 * | 2/2016 | ......... A61K 38/1793 |
| WO | WO-2017/049139 A2 | 3/2017 | |
| WO | WO-2019/006472 A1 | 1/2019 | |

OTHER PUBLICATIONS

Schanzer et al., A Novel Glycoengineered Bispecific Antibody Format for Targeted Inhibition of Epidermal Growth Factor Receptor (EGFR) and Insulin-like Growth Factor Receptor Type I (IGF-1R) Demonstrating Unique Molecular Properties, J. Biol. Chem. 289(27):18693-18706, Jul. 4, 2014.*

Dubois et al., Natural Splicing of Exon 2 of Human Interleukin-15 Receptor-α Chain mRNA Results in a Shortened Form with a Distinct Pattern of Expression, J. Biol. Chem. 274(38):26978-84, 1999.*

UniProtKB/TrEMBL Database, Accession F6UE29 (version 33), Retrieved online from: <URL:https://rest.uniprot.org/unisave/F6UE29?format=txt&versions=33> [retrieved on Jul. 24, 2025] Sep. 12, 2018.*

Lee et al., IL-15 in T-cell responses and immunopathogenesis, Immune Netw. 24(1):e11, doi.org/10.4110/in.2024.24.e11, Feb. 2024.*

Guo et al. "Immunobiology of the IL-15/IL-15Ra complex as an antitumor and antiviral agent," 1-9, 12 Cytokine & Growth Factor Reviews, Sep. 1, 2017 (Sep. 1, 2017), vol. 38, pp. 10-21.

International Search Report and Written Opinion on PCT PCT/US2020/013232 dated May 11, 2020 (11 pages).

Thaysen-Andersen et al. "Recombinant human heterodimeric IL-15 complex displays extensive and reproducible N- and O-linked glycosylation," Glycoconjugate Journal, Nov. 12, 2015 (Nov. 12, 2015), vol. 33, pp. 417-433.

* cited by examiner

Gel Filtration Markers Kit from Sigma (Cat #: MWGF1000)

s.c. M14 + i.v. PBMC s.c. IMR32 + s.c. PBMC s.c. B78D14 in C57BL6

|  | T1/2 (hr) | Cmax (ug/mL) | AUC (hr·ug/mL) | Cl (mL/h) | Vss (mL) | MRT (h) |
|---|---|---|---|---|---|---|
| WT-FL | 20.8 | 5.1 | 133.1 | 0.3 | 10.9 | 24.6 |
| MUT-FL | 20.8 | 5.3 | 139.6 | 0.3 | 10.5 | 25.2 |
| WT-SU | 10.5 | 11.0 | 90.5 | 0.4 | 5.2 | 10.2 |
| MUT-SU | 10.3 | 12.9 | 95.9 | 0.4 | 4.7 | 9.8 |

Figure 24

FDA tests required for producer cell line

| Tests required by FDA | Acceptance Criteria |
|---|---|
| Mycoplasma | Negative |
| Bulk sterility | Negative |
| Tissue culture safety testing | Safe |
| Minute virus of mice (MVM) | Absent |
| In vitro focus inudction assay for xenotroppic murine leukemia virus | Absent |
| PCR-based reverse transcriptase assay (PBRT) | Absent |
| Isoenzyme and cytogenetic analysis | Authenthicity |
| MAP | Negative |
| HAP | Negative |
| Inapparent viruses by guinea pig innoculation | Negative |
| Inapparent viruses by innoculation into mice | Negative |
| Inapparent viruses by innoculation into chicken eggs (in vivo) | Negative |
| TEM for viral particles | Negative |
| In vitro test for bovine adventitious agents | Negative |
| In vitro test for porcine adventitious agents | Negative |

Figure 25

The absence of mitogenic potential of IL-15/IL-15Rα-Fc on a panel of human solid tumor cell lines

| Cell lines | Tumor | Proliferation with IL15 complex |
|---|---|---|
| SKBR3 | Breast Cancer | not growing |
| MCF7 | Breast Cancer | not growing |
| HTB26 | Breast Cancer | not growing |
| Colo 205 | Colon Cancer | not growing |
| LS174T | Colon Cancer | not growing |
| WB480 | Colon Cancer | not growing |
| HTB37 | Colorectal-adenocarcinoma | not growing |
| JN-DSRCT | DSRCT | not growing |
| SKES1 | Ewing sarcoma | not growing |
| U87 | Glioblastoma | not growing |
| U251 | Glioblastoma | not growing |
| RAJI | Leukemia | not growing |
| THP-1 | Leukemia | not growing |
| MOLT-4 | Leukemia | not growing |
| CEM_NKR | Leukemia | not growing |
| HUT-78 | Leukemia | not growing |
| JURKAT | Leukemia | not growing |
| HTB63 | melanoma | not growing |
| M14-Luc | Melanoma | not growing |
| SKNFI | NB | not growing |
| LAN6 | NB | not growing |
| BE(2)5 | NB | not growing |
| 6GN | NB | not growing |
| NB1691 | NB | not growing |
| LAN1 | NB | not growing |
| SKNJB | NB | not growing |
| SKNHM | NB | not growing |
| BE(1)N | NB | not growing |
| SK(N)C2 | NB | not growing |
| SK(N)C1 | NB | not growing |
| SKNMM | NB | not growing |
| NCI-H522 | N-SCLC | not growing |
| CRL-1427 | Osteosarcoma | not growing |
| SKOV3 | ovarian CA | not growing |
| OVCAR3 | Ovarian cancer | not growing |

Figure 26

Toxicity study of IL15/IL15Rα-Fc in mice

| Toxicity Type | Total # BALB/c mice | Sex | Injection drug | Drug dose | Day of Drug | CBC + clinical chemistry + necropsy | CBC + clinical chemistry + necropsy |
|---|---|---|---|---|---|---|---|
| Acute | 15 | Male | Vehicle | 0.1 mg/kg | day 1 | 10 mice on day 2 | 5 mice on day 14 |
| | 15 | Male | IL15/IL15Ra-Fc | 0.1 mg/kg | day 1 | 10 mice on day 2 | 5 mice on day 14 |
| | 15 | Male | IL15/IL15Ra-Fc | 3.2 mg/kg | day 1 | 10 mice on day 2 | 5 mice on day 14 |
| | 15 | Female | Vehicle | 0.1 mg/kg | day 1 | 10 mice on day 2 | 5 mice on day 14 |
| | 15 | Female | IL15/IL15Ra-Fc | 0.1 mg/kg | day 1 | 10 mice on day 2 | 5 mice on day 14 |
| | 15 | Female | IL15/IL15Ra-Fc | 3.2 mg/kg | day 1 | 10 mice on day 2 | 5 mice on day 14 |
| Chronic | 15 | Male | Vehicle | 0.1 mg/kg | day 1, 8, 15, 22 | 10 mice on day 23 | 5 mice on day 52 |
| | 15 | Male | IL15/IL15Ra-Fc | 0.1 mg/kg | day 1, 8, 15, 22 | 10 mice on day 23 | 5 mice on day 52 |
| | 15 | Male | IL15/IL15Ra-Fc | 3.2 mg/kg | day 1, 8, 15, 22 | 10 mice on day 23 | 5 mice on day 52 |
| | 15 | Female | Vehicle | 0.1 mg/kg | day 1, 8, 15, 22 | 10 mice on day 23 | 5 mice on day 52 |
| | 15 | Female | IL15/IL15Ra-Fc | 0.1 mg/kg | day 1, 8, 15, 22 | 10 mice on day 23 | 5 mice on day 52 |
| | 15 | Female | IL15/IL15Ra-Fc | 3.2 mg/kg | day 1, 8, 15, 22 | 10 mice on day 23 | 5 mice on day 52 |

Amino Acid Sequences

*WT-SU IL-15 sequence*

<u>MGWSCIILFLVATATG</u>NWVNVISDLKKIEDLIQSMHIDATLYTESDVHPSCKVTAMKCFLLELQVISLES GDASIHDTVENLIILANNSLSSNGNVTESGCKECEELEEKNIKEFLQSFVHIVQMFINTS* (SEQ ID NO: 9)

*WT-SU IL-15Ra-Fc sequence*

<u>MGWSCIILFLVATATG</u>ITCPPPMSVEHADIWVKSYSLYSRERYICNSGFKRKAGTSSLTECVLNKATNV AHWTTPSLKCIREPKSCDKTHTCPPCPAPELLGGPSVFLFPPKPKDTLMISRTPEVTCVVVDVSHEDPEV KFNWYVDGVEVHNAKTKPREEQYNSTYRVVSVLTVLHQDWLNGKEYKCKVSNKALPAPIEKTISKAK GQPREPQVYTLPPSRDELTKNQVSLTCLVKGFYPSDIAVEWESNGQPENNYKTTPPVLDSDGSFFLYSK LTVDKSRWQQGNVFSCSVMHEALHNHYTQKSLSLSPGK* (SEQ ID NO: 10)

DNA Sequences

*WT-SU IL-15 sequence*

<u>ATGGGCTGGTCCTGCATCATCCTGTTTCTGGTGGCTACCGCCACCGGC</u>AACTGGGTCAACGTGATC TCCGACCTGAAGAAGATCGAGGACCTGATCCAGTCCATGCACATCGACGCCACCCTGTACACCGA GTCCGACGTGCACCCCTCCTGCAAAGTGACCGCCATGAAGTGCTTTCTGCTGGAACTGCAAGTGAT CTCCCTGGAATCCGGCGACGCCTCCATCCACGACACCGTGGAAAATCTGATCATCCTGGCCAACAA CTCCCTGTCCTCCAACGGCAACGTGACCGAGAGCGGCTGCAAAGAGTGCGAGGAACTGGAAGAGA AGAACATCAAAGAGTTTCTGCAGTCCTTCGTGCACATCGTGCAGATGTTCATCAACACCAGCTAG (SEQ ID NO: 11)

*WT-SU IL-15Ra-Fc sequence*

ATGGGCTGGTCCTGCATCATCCTGTTTCTGGTGGCTACCGCCACCGGCATCACCTGTCCTCCACCCA TGTCTGTGGAACACGCCGACATCTGGGTCAAGTCCTACTCCCTGTACTCCAGAGAGCGGTACATCT GCAACTCCGGCTTCAAGCGGAAGGCCGGCACCTCTAGCCTGACCGAGTGCGTGCTGAACAAGGCC ACCAACGTGGCCCACTGGACCACCCCATCCCTGAAGTGCATCAGAGAGCCCAAGTCCTGCGACAA GACCCACACCTGTCCCCCTTGTCCTGCCCCTGAACTGCTGGGCGGACCTTCCGTGTTCCTGTTCCCC CCAAAGCCCAAGGACACCCTGATGATCTCCCGGACCCCCGAAGTGACCTGCGTGGTGGTGGATGT GTCCCACGAGGACCCAGAAGTGAAGTTCAATTGGTACGTGGACGGCGTGGAAGTGCACAACGCCA AGACCAAGCCCAGAGAGGAACAGTACAACTCCACCTACCGGGTGGTGTCCGTGCTGACCGTGCTG CACCAGGATTGGCTGAACGGCAAAGAGTACAAGTGCAAGGTGTCCAACAAGGCCCTGCCTGCCCC CATCGAAAAGACCATCTCCAAGGCCAAGGGCCAGCCCCGGGAACCCCAGGTGTACACACTGCCCC CTAGCAGGGACGAGCTGACCAAGAACCAGGTGTCCCTGACCTGTCTCGTGAAGGGCTTCTACCCCT CCGATATCGCCGTGGAATGGGAGTCCAACGGCCAGCCTGAGAACAACTACAAGACCACCCCCCCT GTGCTGGACTCCGACGGCTCATTCTTCCTGTACAGCAAGCTGACAGTGGACAAGTCCCGGTGGCAG CAGGGCAACGTGTTCTCCTGCTCCGTGATGCACGAGGCCCTGCACAACCACTACACACAGAAGTCC CTGTCCCTGAGCCCCGGCAAATGA (SEQ ID NO: 12)

Figure 28

IL15-N72D/IL15RαSu-Fc (MUT-SU)

Amino Acid Sequences

*MUT-SU IL-15 sequence*

MGWSCIILFLVATATGNWVNVISDLKKIEDLIQSMHIDATLYTESDVHPSCKVTAMKCFLLELQVISLES
GDASIHDTVENLIILANDSLSSNGNVTESGCKECEELEEKNIKEFLQSFVHIVQMFINTS* (SEQ ID NO: 13)

*MUT-SU IL-15Ra-Fc sequence*

MGWSCIILFLVATATGITCPPPMSVEHADIWVKSYSLYSRERYICNSGFKRKAGTSSLTECVLNKATNV
AHWTTPSLKCIREPKSCDKTHTCPPCPAPELLGGPSVFLFPPKPKDTLMISRTPEVTCVVVDVSHEDPEV
KFNWYVDGVEVHNAKTKPREEQYNSTYRVVSVLTVLHQDWLNGKEYKCKVSNKALPAPIEKTISKAK
GQPREPQVYTLPPSRDELTKNQVSLTCLVKGFYPSDIAVEWESNGQPENNYKTTPPVLDSDGSFFLYSK
LTVDKSRWQQGNVFSCSVMHEALHNHYTQKSLSLSPGK* (SEQ ID NO: 14)

DNA Sequences

*MUT-SU IL-15 sequence*

ATGGGCTGGTCCTGCATCATCCTGTTTCTGGTGGCTACCGCCACCGGCAACTGGGTCAACGTGATC
TCCGACCTGAAGAAGATCGAGGACCTGATCCAGTCCATGCACATCGACGCCACCCTGTACACCGA
GTCCGACGTGCACCCCTCCTGCAAAGTGACCGCCATGAAGTGCTTTCTGCTGGAACTGCAAGTGAT
CTCCCTGGAATCCGGCGACGCCTCCATCCACGACACCGTGGAAAATCTGATCATCCTGGCCAAC**GA
C**TCCCTGTCCTCCAACGGCAACGTGACCGAGAGCGGCTGCAAAGAGTGCGAGGAACTGGAAGAGA
AGAACATCAAAGAGTTTCTGCAGTCCTTCGTGCACATCGTGCAGATGTTCATCAACACCAGCTAG
(SEQ ID NO: 15)

*MUT-SU IL-15Ra-Fc sequence*

ATGGGCTGGTCCTGCATCATCCTGTTTCTGGTGGCTACCGCCACCGGCATCACCTGTCCTCCACCCA
TGTCTGTGGAACACGCCGACATCTGGGTCAAGTCCTACTCCCTGTACTCCAGAGAGCGGTACATCT
GCAACTCCGGCTTCAAGCGGAAGGCCGGCACCTCTAGCCTGACCGAGTGCGTGCTGAACAAGGCC
ACCAACGTGGCCCACTGGACCACCCCATCCCTGAAGTGCATCAGAGAGCCCAAGTCCTGCGACAA
GACCCACACCTGTCCCCCTTGTCCTGCCCCTGAACTGCTGGGCGGACCTTCCGTGTTCCTGTTCCCC
CCAAAGCCCAAGGACACCCTGATGATCTCCCGGACCCCCGAAGTGACCTGCGTGGTGGTGGATGT
GTCCCACGAGGACCCAGAAGTGAAGTTCAATTGGTACGTGGACGGCGTGGAAGTGCACAACGCCA
AGACCAAGCCCAGAGAGGAACAGTACAACTCCACCTACCGGGTGGTGTCCGTGCTGACCGTGCTG
CACCAGGATTGGCTGAACGGCAAAGAGTACAAGTGCAAGGTGTCCAACAAGGCCCTGCCTGCCCC
CATCGAAAAGACCATCTCCAAGGCCAAGGGCCAGCCCCGGGAACCCCAGGTGTACACACTGCCCC
CTAGCAGGGACGAGCTGACCAAGAACCAGGTGTCCCTGACCTGTCTCGTGAAGGGCTTCTACCCCT
CCGATATCGCCGTGGAATGGGAGTCCAACGGCCAGCCTGAGAACAACTACAAGACCACCCCCCT
GTGCTGGACTCCGACGGCTCATTCTTCCTGTACAGCAAGCTGACAGTGGACAAGTCCCGGTGGCAG
CAGGGCAACGTGTTCTCCTGCTCCGTGATGCACGAGGCCCTGCACAACCACTACACACAGAAGTCC
CTGTCCCTGAGCCCCGGCAAATGA (SEQ ID NO: 16)

MULTIMERIZATION OF IL-15/IL-15R-ALPHA-FC COMPLEXES TO ENHANCE IMMUNOTHERAPY

CROSS-REFERENCE TO RELATED APPLICATIONS

This application is a U.S. National Stage Application under 35 U.S.C. 371 of International Patent Application No. PCT/US2020/013232, filed on Jan. 10, 2020, which claims the benefit of and priority to U.S. Provisional Patent Application No. 62/791,678, filed Jan. 11, 2019, the entire contents of each of which are incorporated herein by reference.

SEQUENCE LISTING

The instant application contains a Sequence Listing which has been submitted electronically in ASCII format and is hereby incorporated by reference in its entirety. Said ASCII copy, created on Feb. 7, 2020, is named 115872-9025_SL.txt and is 98,985 bytes in size.

TECHNICAL FIELD

The present disclosure relates generally to complexes comprising an interleukin-15 ("IL-15") polypeptide chain non-covalently bonded to an IL-15 receptor α-Fc fusion polypeptide ("IL-15Rα-Fc"), and multimers (e.g., trimers) thereof. The complexes of the present technology are useful in methods for enhancing immune cell function, potentiating immunotherapy, and preventing or treating a disease or condition in which enhancing IL-15-mediated function is beneficial (such as cancer, infectious diseases, immunodeficiencies and leukopenias) in a patient in need thereof.

BACKGROUND

The following description of the background of the present technology is provided simply as an aid in understanding the present technology and is not admitted to describe or constitute prior art to the present technology.

The emerging role of tumor infiltrating T cells, chimeric antigen modified T cells and T cell engaging bispecific antibodies in controlling or eradicating a wide spectrum of human cancers is irrefutable. But success requires the continual in vivo persistence of effector T cells and their ability to home to tumor sites. Similar requirements of persistence and homing regarding Natural Killer (NK) cells have also become apparent. Yet, other than IL-2, there is no cytokine clinically available that will expand, maintain, and activate effector T cells, NK cells, antigen-presenting cells, and without the associated IL-2 associated toxicities.

SUMMARY OF THE PRESENT TECHNOLOGY

In one aspect, the present disclosure provides an IL-15/IL-15Rα-Fc complex or a multimer thereof, wherein the complex comprises a first polypeptide chain, a second polypeptide chain, a third polypeptide chain and a fourth polypeptide chain, wherein the first and second polypeptide chains are non-covalently bonded to one another, the second and third polypeptide chains are covalently bonded to one another, and the third and fourth polypeptide chain are non-covalently bonded to one another, wherein each of the second and third polypeptide chains comprise the IL-15Rα amino acid sequence of SEQ ID NO: 27, SEQ ID NO: 39, or SEQ ID NO: 50 and an Fc domain amino acid sequence of an immunoglobulin molecule (e.g., IgG1, IgG2, IgG3, IgG4, IgGA, IgGB, IgGC, IgGD), and wherein the Fc domain amino acid sequence is linked to the C-terminus of the IL-15Rα amino acid sequence via a junctional linker comprising the sequence ASTKGP (SEQ ID NO: 24) or ASTTAP (SEQ ID NO: 36). In certain embodiments of the IL-15/IL-15Rα-Fc complex or a multimer thereof, each of the first and fourth polypeptide chains independently comprise the amino acid sequence of any one of SEQ ID NOs: 1, 5, 17, 25, 26, 38, 44, 49, or 52. Additionally or alternatively, in some embodiments, the second and third polypeptide chains independently comprise the amino acid sequence of any one of SEQ ID NOs: 2, 6, 18, 33, 34, 35, 45-48, or 53. Additionally or alternatively, in some embodiments, the second and third polypeptide chains comprise one or more modifications selected from the group consisting of (i) O-glycosylation on Thr2 of the amino acid sequence of SEQ ID NO: 27 or SEQ ID NO: 50; (ii) O-glycosylation on Thr81 of the amino acid sequence of SEQ ID NO: 27 or SEQ ID NO: 50; (iii) O-glycosylation on Thr86 of the amino acid sequence of SEQ ID NO: 27 or SEQ ID NO: 50; (iv) N-glycosylation on Asn107 of the amino acid sequence of SEQ ID NO: 27 or SEQ ID NO: 50; (v) O-glycosylation on Thr156 of the amino acid sequence of SEQ ID NO: 27 or O-glycosylation on Thr155 of the amino acid sequence of SEQ ID NO: 50; (vi) O-glycosylation on Ser158 of the amino acid sequence of SEQ ID NO: 27 or O-glycosylation on Ser157 of the amino acid sequence of SEQ ID NO: 50; and (vii) O-glycosylated on Ser160 of the amino acid sequence of SEQ ID NO: 27 or O-glycosylated on Ser159 of the amino acid sequence of SEQ ID NO: 50.

Additionally or alternatively, in some embodiments, the second and third polypeptide chains comprise one or more modifications selected from the group consisting of (i) O-glycosylation on Thr2 of the amino acid sequence of SEQ ID NO: 39; (ii) O-glycosylation on Thr105 of the amino acid sequence of SEQ ID NO: 39; (iii) O-glycosylation on Thr174 of the amino acid sequence of SEQ ID NO: 39; (iv) O-glycosylation on Ser176 of the amino acid sequence of SEQ ID NO: 39; and (v) O-glycosylated on Ser178 of the amino acid sequence of SEQ ID NO: 39.

In another aspect, the present disclosure provides an IL-15/IL-15Rα-Fc complex or a multimer thereof, wherein the complex comprises a first polypeptide chain, a second polypeptide chain, a third polypeptide chain and a fourth polypeptide chain, wherein the first and second polypeptide chains are non-covalently bonded to one another, the second and third polypeptide chains are covalently bonded to one another, and the third and fourth polypeptide chain are non-covalently bonded to one another, wherein each of the first and fourth polypeptide chains comprise the amino acid sequence of any one of SEQ ID NOs: 1, 5, 17, 44, or 52; and wherein each of the second and third polypeptide chains independently comprise the amino acid sequence of any one of SEQ ID NOs: 2, 6, 18, 33, 34, 35, 45-48, or 53. In some embodiments, the multimer is a dimer, or a trimer.

Additionally or alternatively, in some embodiments, the amino acid sequences of the first and fourth polypeptide chains are identical. In other embodiments, the amino acid sequences of the first and fourth polypeptide chains are not identical. Additionally or alternatively, in some embodiments, the amino acid sequences of the second and third polypeptide chains are identical. In other embodiments, the amino acid sequences of the second and third polypeptide chains are not identical.

Additionally or alternatively, in some embodiments, the first and fourth polypeptide chains comprise the amino acid sequence of SEQ ID NO: 1 and the second and third polypeptide chains comprise the amino acid sequence of SEQ ID NO: 2. Additionally or alternatively, in some embodiments, the first and fourth polypeptide chains comprise the amino acid sequence of SEQ ID NO: 5 and the second and third polypeptide chains comprise the amino acid sequence of SEQ ID NO: 6. Additionally or alternatively, in some embodiments, the first and fourth polypeptide chains comprise the amino acid sequence of SEQ ID NO: 17 and the second and third polypeptide chains comprise the amino acid sequence of SEQ ID NO: 18. Additionally or alternatively, in some embodiments, the first and fourth polypeptide chains comprise the amino acid sequence of any one of SEQ ID NOs: 1, 5, or 17 and the second and third polypeptide chains comprise the amino acid sequence of any one of SEQ ID NOs: 33-35.

Additionally or alternatively, in some embodiments, the first and fourth polypeptide chains comprise the amino acid sequence of SEQ ID NO: 44 and the second and third polypeptide chains comprise the amino acid sequence of SEQ ID NO: 45. Additionally or alternatively, in some embodiments, the first and fourth polypeptide chains comprise the amino acid sequence of SEQ ID NO: 44 and the second and third polypeptide chains comprise the amino acid sequence of SEQ ID NO: 46. Additionally or alternatively, in some embodiments, the first and fourth polypeptide chains comprise the amino acid sequence of SEQ ID NO: 44 and the second and third polypeptide chains comprise the amino acid sequence of SEQ ID NO: 47. Additionally or alternatively, in some embodiments, the first and fourth polypeptide chains comprise the amino acid sequence of SEQ ID NO: 44 and the second and third polypeptide chains comprise the amino acid sequence of SEQ ID NO: 48. Additionally or alternatively, in some embodiments, the first and fourth polypeptide chains comprise the amino acid sequence of SEQ ID NO: 52 and the second and third polypeptide chains comprise the amino acid sequence of SEQ ID NO: 53.

In another aspect, the present disclosure provides the nucleic acid sequences of SEQ ID NOs: 3, 4, 7, 8, 19 or 20, and expression vectors and/or host cells expressing the same.

In one aspect, provided herein are methods for enhancing IL-15-mediated immune function in a subject in need thereof, comprising administering to the subject an effective amount of an IL-15/IL-15Rα-Fc complex of the present technology or a multimer (e.g., a trimer) thereof. Additionally or alternatively, in some embodiments, the enhanced IL-15-mediated immune function comprises one or more of antibody production, proliferation/expansion of lymphocytes, inhibition of apoptosis of lymphocytes, activation of dendritic cells (or antigen presenting cells), and/or antigen presentation. Additionally or alternatively, in certain embodiments, the enhanced IL-15-mediated immune function comprises proliferation/expansion in the number of or activation of $CD4^+$ T cells (e.g., Th1 and Th2 helper T cells), $CD8^+$ T cells (e.g., cytotoxic T lymphocytes, alpha/beta T cells, and gamma/delta T cells), B cells (e.g., plasma cells), memory T cells, memory B cells, dendritic cells (immature or mature), antigen presenting cells, macrophages, mast cells, natural killer T cells (NKT cells), tumor-resident T cells, $CD122^+$ T cells, and/or natural killer cells (NK cells).

In another aspect, the present disclosure provides methods for promoting activation of antibody-dependent cell-mediated cytotoxicity (ADCC) in a subject in need thereof, comprising administering to the subject an effective amount of an IL-15/IL-15Rα-Fc complex of the present technology or a multimer (e.g., a trimer) thereof.

In one aspect, the present disclosure provides methods for promoting T cell cytotoxicity or NK cell cytotoxicity in a subject in need thereof, comprising administering to the subject an effective amount of an IL-15/IL-15Rα-Fc complex of the present technology or a multimer (e.g., a trimer) thereof.

In another aspect, the present disclosure provides methods for potentiating the therapeutic efficacy of antibody-mediated immunotherapy in a subject in need thereof, comprising administering to the subject an effective amount of an IL-15/IL-15Rα-Fc complex of the present technology or a multimer (e.g., a trimer) thereof, and an effective amount of a therapeutic antibody. In some embodiments, the IL-15/IL-15Rα-Fc complex or multimer, and the therapeutic antibody are administered sequentially, separately, or simultaneously. Additionally or alternatively, in some embodiments the therapeutic antibody binds to an antigen of a tumor target or an antigen of a pathogen. Examples of tumor targets include, but are not limited to GPA33, HER2/neu, GD2, MAGE-1, MAGE-3, BAGE, GAGE-1, GAGE-2, MUM-1, CDK4, N-acetylglucosaminyltransferase, p15, gp75, beta-catenin, ErbB2, cancer antigen 125 (CA-125), carcinoembryonic antigen (CEA), RAGE, MART (melanoma antigen), MUC-1, MUC-2, MUC-3, MUC-4, MUC-5ac, MUC-16, MUC-17, tyrosinase, Pmel 17 (gp100), GnT-V intron V sequence (N-acetylglucosaminyltransferase V intron V sequence), Prostate cancer psm, PRAME (melanoma antigen), β-catenin, EBNA (Epstein-Barr Virus nuclear antigen) 1-6, p53, lung resistance protein (LRP) Bcl-2, prostate specific antigen (PSA), Ki-67, CEACAM6, colon-specific antigen-p (CSAp), HLA-DR, CD40, CD74, CD138, EGFR, EGP-1, EGP-2, VEGF, PlGF, insulin-like growth factor (ILGF), tenascin, platelet-derived growth factor, IL-6, CD20, CD19, PSMA, CD33, CD123, MET, DLL4, Ang-2, HER3, IGF-1R, CD30, TAG-72, SPEAP, CD45, L1-CAM, Lewis Y ($Le^y$) antigen, E-cadherin, V-cadherin, and EpCAM.

In yet another aspect, the present disclosure provides methods for potentiating the cytotoxicity of an antibody-drug conjugate in a subject in need thereof, comprising administering to the subject an effective amount of an IL-15/IL-15Rα-Fc complex of the present technology or a multimer (e.g., a trimer) thereof, and an effective amount of an antibody-drug conjugate. In some embodiments, the IL-15/IL-15Rα-Fc complex or multimer, and the antibody-drug conjugate are administered sequentially, separately, or simultaneously. Additionally or alternatively, in some embodiments, the antibody-drug conjugate comprises an antibody conjugated to a DOTA chelating agent, a chemotherapeutic agent, a peptide, a polypeptide, a nucleic acid, an antibiotic, an inorganic or organic molecule, an antiviral agent, or any combination thereof. Additionally or alternatively, in some embodiments the antibody binds to an antigen of a tumor target or an antigen of a pathogen. Examples of tumor targets include, but are not limited to GPA33, HER2/neu, GD2, MAGE-1, MAGE-3, BAGE, GAGE-1, GAGE-2, MUM-1, CDK4, N-acetylglucosaminyltransferase, p15, gp75, beta-catenin, ErbB2, cancer antigen 125 (CA-125), carcinoembryonic antigen (CEA), RAGE, MART (melanoma antigen), MUC-1, MUC-2, MUC-3, MUC-4, MUC-5ac, MUC-16, MUC-17, tyrosinase, Pmel 17 (gp100), GnT-V intron V sequence (N-acetylglucosaminyltransferase V intron V sequence), Prostate cancer psm, PRAME (melanoma antigen), β-catenin, EBNA (Epstein-Barr Virus nuclear antigen) 1-6, p53, lung resistance protein (LRP) Bcl-2, prostate specific antigen (PSA), Ki-67, CEACAM6, colon-specific antigen-p (CSAp), HLA-DR, CD40, CD74, CD138, EGFR, EGP-1, EGP-2, VEGF, PlGF, insulin-like growth factor (ILGF), tenascin, platelet-derived growth factor, IL-6, CD20, CD19, PSMA, CD33, CD123, MET, DLL4, Ang-2, HER3, IGF-1R, CD30, TAG-72, SPEAP, CD45, L1-CAM, Lewis Y (Le$^y$) antigen, E-cadherin, V-cadherin, and EpCAM.

In one aspect, the present disclosure provides a method for preventing or treating cancer in a subject in need thereof, comprising administering to the subject an effective amount of an IL-15/IL-15Rα-Fc complex of the present technology or a multimer (e.g., a trimer) thereof. Examples of cancers include leukemias lymphomas, multiple myelomas, sarcomas, brain tumors, breast cancer, adrenal cancer, thyroid cancer, pancreatic cancer, ocular cancer, pituitary cancer, vaginal cancers, cervical cancers, uterine cancer, ovarian cancer, vulvar cancer, esophageal cancer, gastrointestinal cancer, colon cancer, rectal cancer, liver cancer, gallbladder cancer, prostate cancer, lung cancer, testicular cancer, oral cancer, skin cancer, kidney cancer, bladder cancer, and prostate cancer. Additionally or alternatively, in some embodiments, the method further comprises sequentially, separately or simultaneously administering one or more additional anticancer agents.

In one aspect, the present disclosure provides a method for enhancing the immune function in a patient that has received or is receiving an anti-cancer therapy comprising administering to the patient an effective amount of an IL-15/IL-15Rα-Fc complex of the present technology or a multimer (e.g., a trimer) thereof. In some embodiments, the patient has a compromised immune system due to an anti-cancer therapy. The anti-cancer therapy may be chemotherapy, radiation therapy, or immunotherapy (e.g., an antibody drug conjugate). Additionally or alternatively, in some embodiments, an IL-15/IL-15Rα-Fc complex of the present technology or a multimer (e.g., a trimer) thereof can be administered before, during or after radiation therapy, chemotherapy or immunotherapy. Additionally or alternatively, in some embodiments, the method further comprises sequentially, separately or simultaneously administering one or more additional anticancer agents.

In one aspect, the present disclosure provides a method for preventing or treating an infection in a subject in need thereof, comprising administering to the subject an effective amount of an IL-15/IL-15Rα-Fc complex of the present technology or a multimer (e.g., a trimer) thereof. In certain embodiments, an IL-15/IL-15Rα-Fc complex of the present technology, or a multimer (e.g., a trimer) thereof is administered to a subject receiving or recovering from immunosuppressive therapy. In certain embodiments, an IL-15/IL-15Rα-Fc complex of the present technology, or a multimer (e.g., a trimer) thereof is administered to a subject that has or is at risk for AIDS, a viral infection, a fungal infection, or a bacterial infection. Additionally or alternatively, in some embodiments, the method further comprises sequentially, separately or simultaneously administering one or more additional antifungal, antiviral, or antibacterial agents.

In one aspect, the present disclosure provides a method for enhancing the immune function in a patient that has received or is receiving an anti-viral, anti-fungal, or antibacterial therapy comprising administering to the patient an effective amount of an IL-15/IL-15Rα-Fc complex of the present technology or a multimer (e.g., a trimer) thereof. In certain embodiments, an IL-15/IL-15Rα-Fc complex of the present technology, or a multimer (e.g., a trimer) thereof is administered to a patient receiving or recovering from immunosuppressive therapy. In some embodiments, an IL-15/IL-15Rα-Fc complex of the present technology, or a multimer (e.g., a trimer) thereof is administered to a patient that has or is at risk for AIDS, a viral infection, a fungal infection, or a bacterial infection, or has undergone surgery. In certain embodiments, an IL-15/IL-15Rα-Fc complex of the present technology, or a multimer (e.g., a trimer) thereof is administered to a patient that has cystic fibrosis, pulmonary fibrosis, or a disease which makes the patient susceptible to an infection. In some embodiments, an IL-15/IL-15Rα-Fc complex of the present technology, or a multimer (e.g., a trimer) thereof is administered to a patient that has or will receive a tissue transplant. Additionally or alternatively, in some embodiments, the method further comprises sequentially, separately or simultaneously administering one or more additional antiviral, antifungal, or antibacterial agents.

In one aspect, the present disclosure provides a method for preventing or treating an immunodeficiency or lymphopenia in a subject in need thereof, comprising administering to the subject an effective amount of an IL-15/IL-15Rα-Fc complex of the present technology or a multimer (e.g., a trimer) thereof.

In one aspect, the present disclosure provides a method for enhancing IL-15-mediated immune function in a subject in need thereof, comprising administering to the subject recombinant host cells that express any of the IL-15 polypeptides disclosed herein (e.g., SEQ ID NOs: 1, 5, 17, 44, or 52) and any of the IL-15Rα-Fc polypeptides disclosed herein (e.g., SEQ ID NOs: 2, 6, 18, 33-35, 45-48, or 53). In some embodiments, the recombinant host cells are immune cells, such as an immune cells obtained or derived from the subject. In certain embodiments, the recombinant host cells are lymphocytes (e.g., T lymphocytes), monocytes, dendritic cells, or Natural Killer cells, such as T lymphocytes, monocytes, dendritic cells, or Natural Killer cells obtained or derived from the subject. In some embodiments, the recombinant host cells are peripheral blood mononuclear cells or tumor infiltrating lymphocytes, such as peripheral blood mononuclear cells or tumor infiltrating lymphocytes obtained or derived from the subject. In some embodiments, the recombinant host cells are generated by isolating native immune cells from a peripheral blood sample from the subject, culturing the native immune cells in cell culture medium, and engineering the native immune cells to recombinantly express any of the IL-15 polypeptides disclosed herein (e.g., SEQ ID NOs: 1, 5, 17, 44, or 52) and any of the IL-15Rα-Fc polypeptides disclosed herein (e.g., SEQ ID NOs: 2, 6, 18, 33-35, 45-48, or 53). In some embodiments, the recombinant host cells may be administered to the same subject from which the native immune cells are derived. In other embodiments, the recombinant host cells may be administered to a subject that is different from the subject from which the native immune cells are derived.

In another aspect, the present disclosure provides a method for propagating mammalian immune cells comprising contacting a population of mammalian immune cells with an effective amount of an IL-15/IL-15Rα-Fc complex of the present technology or a multimer (e.g., a trimer) thereof. The mammalian immune cells may be propagated in vivo, ex vivo, or in vitro. In some embodiments, the mammalian immune cells are CD4$^+$ T cells, CD8$^+$ T cells, B cells, memory T cells, memory B cells, dendritic cells, antigen presenting cells, macrophages, mast cells, natural killer T cells (NKT cells), tumor-resident T cells, CD122$^+$ T cells, and/or natural killer cells (NK cells).

Additionally or alternatively, in some embodiments, the method further comprises contacting the population of mammalian immune cells with a cytokine (e.g., IL-1, IL-2, IL-3, IL-4, IL-5, IL-6, IL-7, IL-8, IL-10, IL-11, IL-12, GM-CSF, TNF-α, TNF-β, TGF-β, or interferon-γ). Additionally or alternatively, in certain embodiments, the method further comprises contacting the population of mammalian immune cells with an agent, such as phosphonates. Examples of phosphonates include, but are not limited to, 9-[2-(phosphonomethoxy)ethyl]adenine (PMEA; Adefovir), 9-(R)-[2-(phosphonomethoxy)propyl]adenine [(R)-PMPA; Tenofovir], 9-(S)-[2-(phosphonomethoxy)propyl]adenine; (S)-PMPA), 9-[2-(phosphonomethoxy)ethyl]-2,6-diaminopurine (PMEDAP), 9-(R)[2-(phosphonomethoxy)propyl]-2,6-diaminopurine (PMPDAP), and 9-[2-(phosphonomethoxy)ethyl]guanine (PMEG).

Also disclosed herein are kits comprising at least one IL-15/IL-15Rα-Fc complex of the present technology and instructions for use.

BRIEF DESCRIPTION OF THE DRAWINGS

FIG. 7 shows proliferation of NK cells in the presence of IL-15/IL-15Rα-Fc complexes of the present technology. Co-incubation with moderate doses (20-100 ng/ml) N72D expanded NK cells with slightly higher efficiency than either WT or Baf3/IL-15/Rα, although the maximal proliferation achieved between WT and N72D IL-15/IL-15Rα-Fc complexes were similar.

FIG. 8A: 18-day culture of a PBMC:NK mixture with increasing doses of WT or N72D IL-15/IL-15Rα-Fc complexes preferentially expanded NKT/CIK CD3$^+$CD56$^+$ cells. FIG. 8B: Culture of purified NK cells with Baf3 IL-15/IL-15Rα complexes (membrane bound) or increasing doses of N72D IL-15/IL-15Rα-Fc complexes expanded NKT/CIK cells.

FIG. 11A: FACS analysis of antigen-specific CD8(+) T cells stimulated by the IL-15/IL-15Rα-Fc complexes of the present technology. FIG. 11B: average of 3 separate experiments. WT=wild type IL-15/IL-15Rα-Fc complex.

FIG. 18A: IL-15/IL-15Rα complexes on reduced SDS-PAGE, before and after deglycosylation treatment, using Invitrogen SeeBlue Plus2 Pre-Stained Standard as the protein molecular weight (MW) marker. FIG. 18B: SE-HPLC chromatography using G4000SW column. Major peak of WT-IL-15/IL-15Rα-Fc complex (19.0 minutes) corresponding to molecular weight around 600 kDa, and SU complex (22.3 minutes) corresponding to around 120 kDa, and salt buffer peak (26.5 minutes). FIG. 18C: IL-15/IL-15Rα complexes on SDS-PAGE under reduced and non-reduced conditions using Life Technologies BenchMark Unstained Protein Ladder as the protein MW marker (the size of selected bands were shown), with IL15Rα-Fc and IL15 bands were marked with arrows.

FIG. 18D shows the HPLC results of the 6 standard molecular weight (MW) marker (Sigma-Aldrich, St Louis MO) mixed together. Each MW marker was also run separately to confirm the position, except 150 and 66 KDa markers did not separate in the mixture. The size of 600 KDa of the IL15 complex (19.0 minutes) was calculated based on the fitted curve derived from the standard MW marker that was run separately. FIG. 18E shows the fitted curve for WT-IL-15/IL-15Rα-Fc complex 1\4W calculation. FIG. 18F shows in vitro cell proliferation assays using mouse lymphoblast cell line CTLL-2.

FIG. 19A: Representative immunophenotypic appearance of CD3+CD56− T cells, CD3-CD56+NK cells and CD3+CD56+ NKT cells (left panel). Representative flow cytometric appearance of PBMC and M14 tumor cells mixed together (middle panel). Binding of hu3F8 and hu3F8-BsAb to M14 tumor cells (right two panels).

FIG. 19B: Expression of CD16 (FcγRIII) on T cells, NK cells and NKT cells. FIG. 19C: Binding of hu3F8 IgG1 via FcγRIII to CD16-expressing NK cells and NKT cells. FIG. 19D: Binding of hu3F8-BsAb via CD3 to CD3-expressing T cells and NKT cells. PBMCs were cultured in complete RPMI medium either without (Medium) or with WT-IL-15/IL-15Rα-Fc complex for 72 hrs before FACS analysis. Numbers in right upper corner of each histogram box represent MFI ratios calculated as geo-MFI of antigen-specific staining (line histogram) divided by geo-MFI of isotype-control IgG staining (black filled peak).

FIG. 20A: Antibody-independent cytotoxicity titrated by IL-15 concentrations. E:T ratio at 10:1. FIG. 20B: Antibody-dependent cytotoxicity titrated by hu3F8 (middle panel) or hu3F8-BsAb (right panel). IL-15 complexes concentration at 0.001 nM, and E:T ratio at 10:1. FIG. 20C: Cytotoxicity titrated by E:T ratios. IL-15 complexes concentration at 1 nM, and antibodies concentration at 0.01 μg/mL.

FIG. 21A: Surface expression of FasL. FIG. 21B: Surface expression of TRAIL. FIG. 21C: Surface expression of CD16 and NKp46. FIG. 21D: Surface expression of NKG2D. FIGS. 21E-21F: Intracellular co-expression of Perforin and Granzyme-B. PBMCs from a healthy donor was used in this case. To enable Perforin and Granzyme-B retention, Brefeldin-A was added to cultures for the last 6 hrs of each time point. Representative FACS dot-plots at 72 hr time point were shown in FIG. 21E.

FIGS. 22A-B: iv tumor plus iv effector cells model: Bioluminescence changes of IMR32 neuroblastoma during treatment (FIG. 22A) and representative images at day 25 (FIG. 22B). FIG. 22C: sc tumor plus iv effector cells model: tumor volume changes of M14 melanoma. FIG. 22D: sc tumor plus sc effector cells (1:1 mixing) model: tumor volume changes of IMR32 neuroblastoma. FIG. 22E: C57BL/6 mice grafted with sc GD2(+) murine melanoma B78/D14 cells: tumor volume changes of B78/D14 melanoma.

FIGS. 23A-22B show that the WT-IL-15/IL-15Rα-Fc complex of the present technology promotes in vivo lymphocyte expansion and improves serum half-life in mice. FIG. 23A: Pharmacokinetics of IL-15/IL-15Rα-Fc complexes of the present technology. Quantitation of serum IL-15 complexes was carried out by ELISA, and the data were depicted using GraphPad Prism software. Mean+SD (n=5). Pharmacokinetic analysis was carried out by non-compartmental analysis of the serum concentration-time data using WinNonlin software program.

FIG. 24 shows FDA acceptance criteria for producer cell line.

FIG. 25 shows the absence of mitogenic potential of IL-15/IL-15Rα-Fc complexes of the present technology on a panel of human solid tumor cell lines.

FIG. 26 shows study criteria for evaluating the toxicity of the IL-15/IL-15Rα-Fc complexes of the present technology in mice.

FIG. 27 shows the amino acid sequences (SEQ ID NOs: 9-10) and the nucleic acid sequences (SEQ ID NOs: 11-12) of components of the wild-type IL-15/IL-15Rα-Sushi (WT-SU) complex. Leader sequences are underlined.

FIG. 28 shows the amino acid sequences (SEQ ID NOs: 13-14) and the nucleic acid sequences (SEQ ID NOs: 15-16) of components of the mutant IL-15/IL-15Rα-Sushi (MUT-SU) complex. Leader sequences are underlined. N72D mutation is bold/double-underlined.

DETAILED DESCRIPTION

Figure 1:
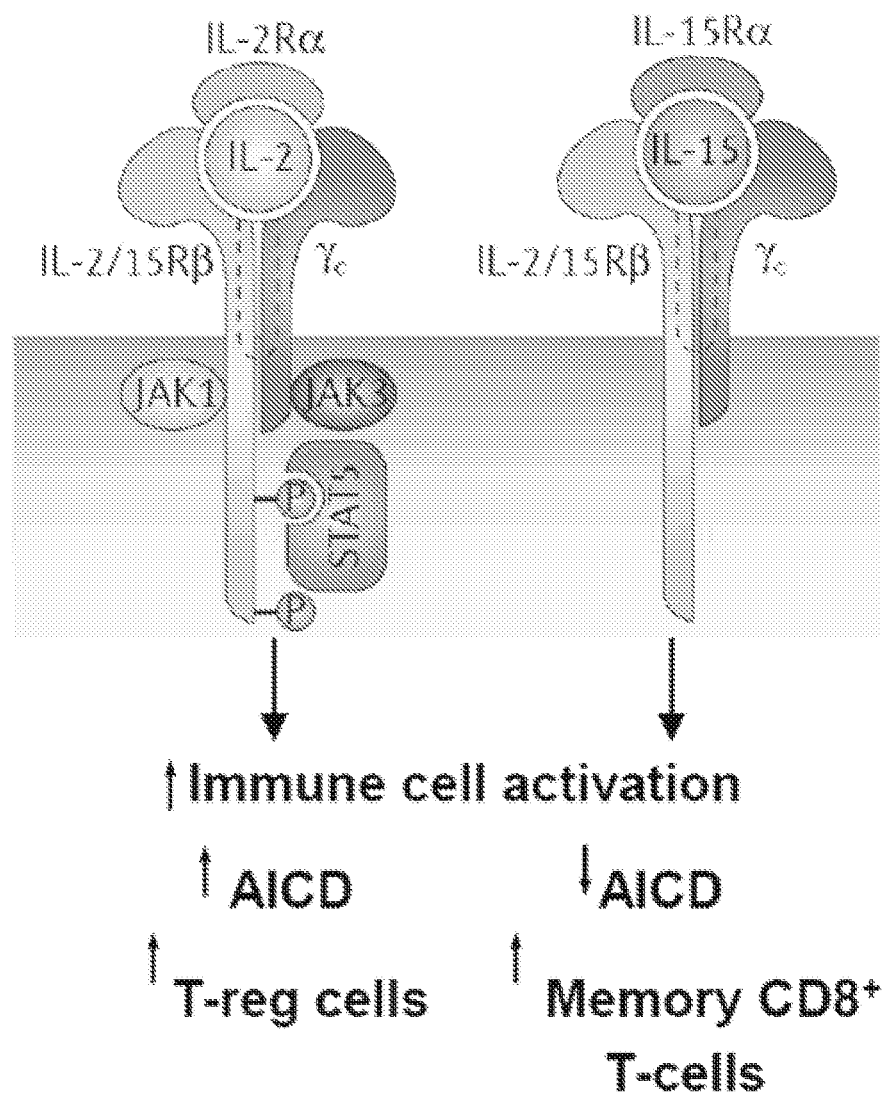
FIG. 1 summarizes the functional differences between IL-15 and IL-2 (adapted from Waldmann et al., *Nat Rev Immunol* 6:595-601 (2006)).

It is to be appreciated that certain aspects, modes, embodiments, variations and features of the present methods are described below in various levels of detail in order to provide a substantial understanding of the present technology.

In practicing the present methods, many conventional techniques in molecular biology, protein biochemistry, cell biology, immunology, microbiology and recombinant DNA are used. See, e.g., Sambrook and Russell eds. (2001) *Molecular Cloning: A Laboratory Manual*, 3rd edition; the series Ausubel et al. eds. (2007) *Current Protocols in Molecular Biology*; the series *Methods in Enzymology* (Academic Press, Inc., N.Y.); MacPherson et al. (1991) *PCR 1: A Practical Approach* (IRL Press at Oxford University Press); MacPherson et al. (1995) *PCR 2: A Practical Approach*; Harlow and Lane eds. (1999) *Antibodies, A Laboratory Manual*; Freshney (2005) *Culture of Animal Cells: A Manual of Basic Technique*, 5th edition; Gait ed. (1984) *Oligonucleotide Synthesis*; U.S. Pat. No. 4,683,195; Hames and Higgins eds. (1984) *Nucleic Acid Hybridization*; Anderson (1999) *Nucleic Acid Hybridization*; Hames and Higgins eds. (1984) *Transcription and Translation; Immobilized Cells and Enzymes* (IRL Press (1986)); Perbal (1984) *A Practical Guide to Molecular Cloning*; Miller and Calos eds. (1987) *Gene Transfer Vectors for Mammalian Cells* (Cold Spring Harbor Laboratory); Makrides ed. (2003) *Gene Transfer and Expression in Mammalian Cells*; Mayer and Walker eds. (1987) *Immunochemical Methods in Cell and Molecular Biology* (Academic Press, London); and Herzenberg et al. eds (1996) *Weir's Handbook of Experimental Immunology*. Methods to detect and measure levels of polypeptide gene expression products (i.e., gene translation level) are well-known in the art and include the use of polypeptide detection methods such as antibody detection and quantification techniques. (See also, Strachan & Read, *Human Molecular Genetics*, Second Edition. (John Wiley and Sons, Inc., NY, 1999)).

As demonstrated in the Examples below, animals receiving the IL-15/IL-15Rα-Fc complexes of the present technology exhibited significant suppression of tumor growth that was greater than that observed with either IL-15/IL-15Rα-Sushi complexes or monomeric recombinant hIL-15 (FIGS. 22A-22E). These results also demonstrate that the efficacy of the wild-type IL-15/IL-15Rα-Fc complexes of the present technology with respect to potentiating antibody-mediated immunotherapy was comparable to that observed in the IL-15/IL-15Rα-Fc counterparts that contained the N72D IL-15 mutation (which has previously been shown to enhance binding to IL-15Rβ). The superior in vivo efficacy of the IL-15/IL-15Rα-Fc complexes of the present technology over the IL-15/IL-15Rα-Sushi platform was unexpected in view of (a) the apparent difference between the IL-15/IL-15Rα-Fc complexes and IL-15/IL-15Rα-Sushi complexes that was observed during in vitro studies (FIG. 18F), and (b) previous studies which reported that constructs including the full length ectodomain IL-15Rα antagonized IL-15 activity, while those containing the truncated Sushi domain of IL-15Rα did not (see Mortier et al., *J Biol Chem* 281:1612-9 (2006)).

Figure 9:
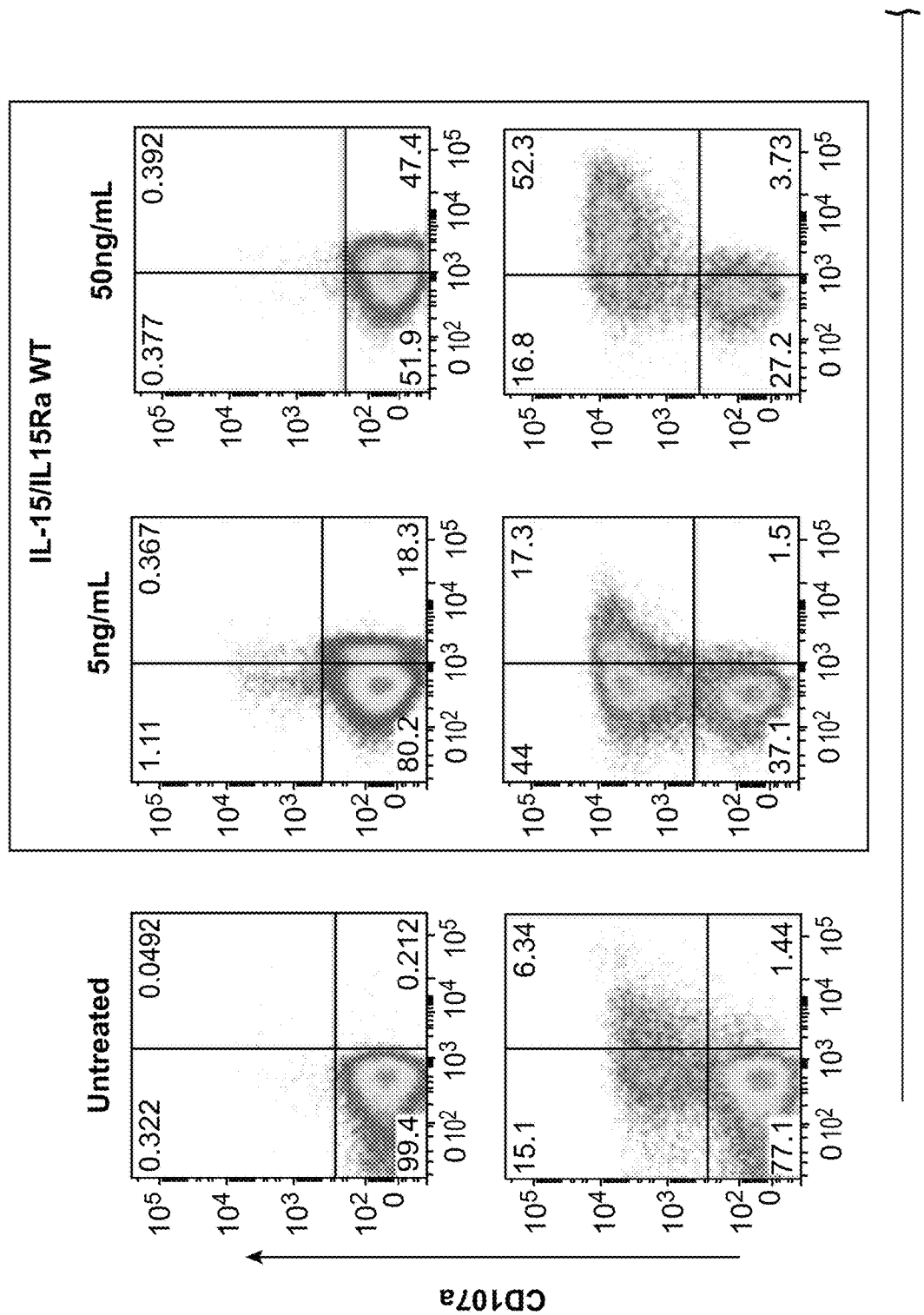
FIG. 9 shows the functional phenotype of NK cells that were expanded using the IL-15/IL-15Rα-Fc complexes of the present technology. NK cells expanded after 18 days with WT IL-15/IL-15Rα-Fc complex had more robust CD107 and IFN-γ response to the target cell K562 compared to resting NK cells or NK cells expanded with membrane bound Baf3/IL-15/IL-15Rα. NK response increased further with higher doses of the WT IL-15/IL-15Rα-Fc complex. NK cells expanded with higher doses of the N72D IL-15/IL-15Rα-Fc complex demonstrated moderately higher CD107 response, but minimal IFN-γ response to the K562 target.
Figure 9:
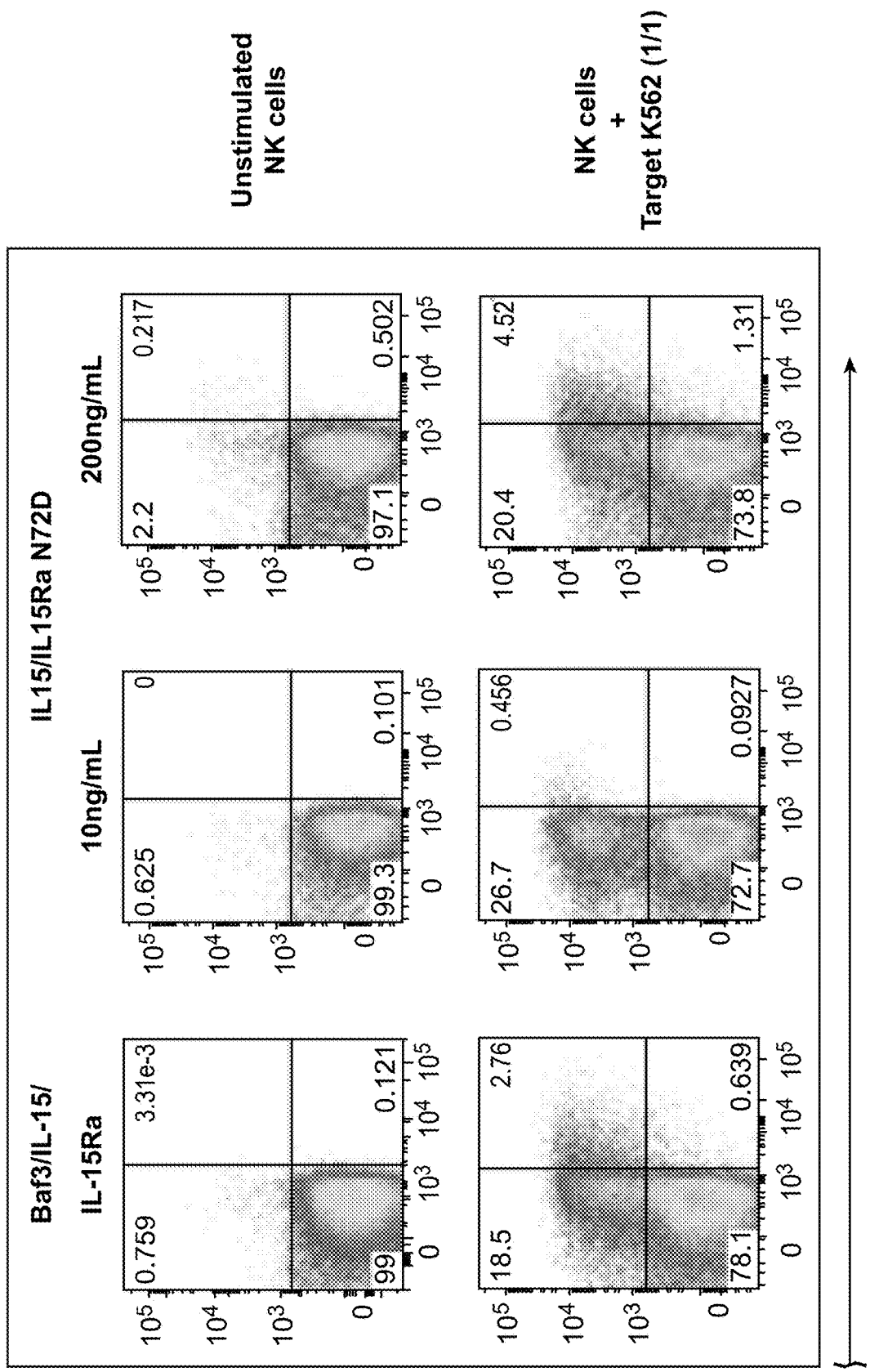
Figure 15A:
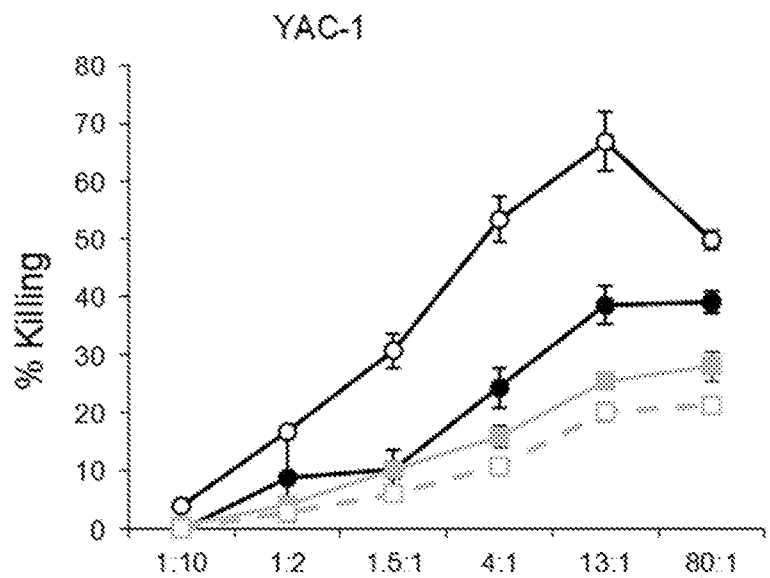
FIGS. 15A-15B show increased NK cytotoxicity in immunocompetent mice after treatment with the IL-15/IL-15Rα-Fc complexes of the present technology (the accompanying legend located at the right of FIG. 15B corresponds to both FIGS. 15A-15B). Increased NK cell cytotoxicity was observed following treatment with high concentrations of the IL-15/IL-15Rα-Fc complexes described herein. Varying numbers of splenic NK cells (effector, E) from mice treated with treated i.v. with 200 μg wild-type (200W), 50 μg wild-type (50W), 200 μg N72D mutant (200M), 50 μg mutant (50M) IL-15/IL-15Rα-Fc complex, or PBS were incubated with Yac-1 or Ba/F3 target cells (targets, T) labeled with $^{51}$Cr. Percentage of killing was calculated based on release of $^{51}$Cr into supernatant by lysed target cells. (n=2 per treatment group). NK cells derived from mice receiving 200 μg or 50 μg wild-type IL-15/IL-15Rα-Fc complex exhibited increased cytotoxicity against both Yac-1 and Ba/F3 targets. NK cells from mice receiving N72D IL-15/IL-15Rα-Fc complex did not show enhanced killing over the PBS control.
Figure 15B:
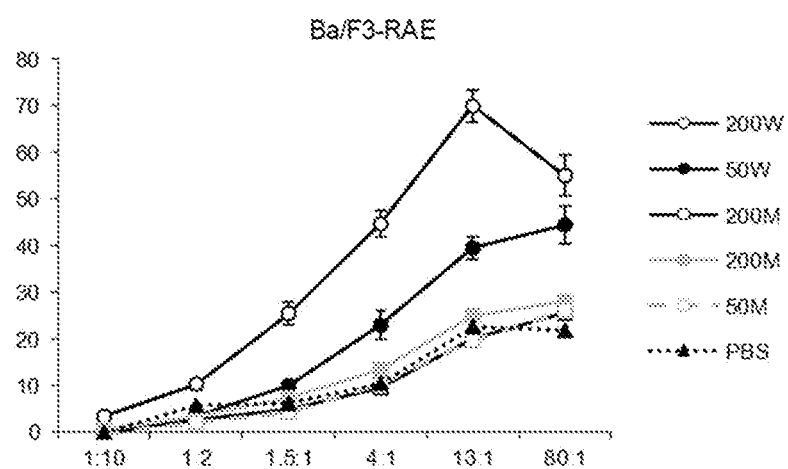

Further, NK cells expanded with WT IL-15/IL-15Rα-Fc complex had more robust CD107 and IFN-γ response to the target myelogenous leukemia cells compared to NK cells expanded with membrane bound Baf3/IL-15/IL-15Rα (FIG. 9). Moreover, as shown in FIGS. 15A-15B, NK cells derived from animals receiving wild-type IL-15/IL-15Rα-Fc complex exhibited increased cytotoxicity against tumor cells, whereas NK cells from animals receiving N72D IL-15/IL-15Rα-Fc complex did not show enhanced killing over the PBS control. Taken together, the IL-15/IL-15Rα-Fc complexes of the present technology were more effective in potentiating the therapeutic efficacy of antibody-mediated immunotherapy in vivo and promoting NK cell cytotoxicity in vivo compared to other conventional IL-15/IL-15Rα complexes, and are expected to show minimal leukemogenic potential, and/or a lower likelihood of inducing neutralizing autoimmune antibodies to IL-15 or IL-15Rα.

The WT IL-15/IL-15Rα-Fc complexes of the present technology form hexamers (6+6) when expressed in CHO-S cells. These complexes are structurally distinct from the IL15/IL15Rα-Sushi-Fc complex (SU complexes), which has the Fc portion but only forms dimer (2+2), or the full length heterodimeric IL15/IL15Rα complex (hetIL15; Chertova et al., *J Biol Chem* 288(25):18093-103 (2013)), which has no Fc and only forms monomer (1+1). Without wishing to be bound by theory, it is believed that both Fc-Fc interaction and IL15Rα-IL15Rα interaction beyond sushi domains are required for the multimerization of the IL-15/IL-15Rα-Fc complexes of the present technology, thus yielding hexamer over tetramer or other multimer forms. One clear advantage of this multimerization is the substantial increase in serum half-life (FIG. 23A), which translated into the unexpected superior therapeutic efficacy. Indeed, the WT-IL-15/IL-15Rα-Fc complexes of the present technology showed significantly longer serum half-life, higher AUC, and longer mean residence time demonstrated consistently more potency than SU complexes (FIGS. 22A-22E and 23A).

Definitions

Unless defined otherwise, all technical and scientific terms used herein generally have the same meaning as commonly understood by one of ordinary skill in the art to which this technology belongs. As used in this specification and the appended claims, the singular forms "a", "an" and "the" include plural referents unless the content clearly dictates otherwise. For example, reference to "a cell" includes a combination of two or more cells, and the like. Generally, the nomenclature used herein and the laboratory procedures in cell culture, molecular genetics, organic chemistry, analytical chemistry and nucleic acid chemistry and hybridization described below are those well-known and commonly employed in the art.

As used herein, the term "about" in reference to a number is generally taken to include numbers that fall within a range of 1%, 5%, or 10% in either direction (greater than or less than) of the number unless otherwise stated or otherwise evident from the context (except where such number would be less than 0% or exceed 100% of a possible value).

As used herein, the "administration" of an agent or drug to a subject includes any route of introducing or delivering to a subject a compound to perform its intended function. Administration can be carried out by any suitable route, including but not limited to, orally, intranasally, parenterally (intravenously, intramuscularly, intraperitoneally, or subcutaneously), rectally, intrathecally, intratumorally or topically. Administration includes self-administration and the administration by another.

As used herein, the term "antibody" collectively refers to immunoglobulins or immunoglobulin-like molecules including by way of example and without limitation, IgA, IgD, IgE, IgG and IgM, combinations thereof, and similar molecules produced during an immune response in any vertebrate, for example, in mammals such as humans, goats, rabbits and mice, as well as non-mammalian species, such as shark immunoglobulins. As used herein, "antibodies" (includes intact immunoglobulins) and "antigen binding fragments" specifically bind to a molecule of interest (or a group of highly similar molecules of interest) to the substantial exclusion of binding to other molecules (for example, antibodies and antibody fragments that have a binding constant for the molecule of interest that is at least $10^3$ greater, at least $10^4 M^{-1}$ greater or at least $10^5 M^{-1}$ greater than a binding constant for other molecules in a biological sample). The term "antibody" also includes genetically engineered forms such as chimeric antibodies (for example, humanized murine antibodies), heteroconjugate antibodies (such as, bispecific antibodies). See also, Pierce Catalog and Handbook, 1994-1995 (Pierce Chemical Co., Rockford, Ill.); Kuby, J., *Immunology*, 3$^{rd}$ Ed., W.H. Freeman & Co., New York, 1997.

More particularly, antibody refers to a polypeptide ligand comprising at least a light chain immunoglobulin variable region or heavy chain immunoglobulin variable region which specifically recognizes and binds an epitope of an antigen. Antibodies are composed of a heavy and a light chain, each of which has a variable region, termed the variable heavy ($V_H$) region and the variable light ($V_L$) region. Together, the $V_H$ region and the $V_L$ region are responsible for binding the antigen recognized by the antibody. Typically, an immunoglobulin has heavy (H) chains and light (L) chains interconnected by disulfide bonds. There are two types of light chain, lambda (λ) and kappa (κ). There are five main heavy chain classes (or isotypes) which determine the functional activity of an antibody molecule: IgM, IgD, IgG, IgA and IgE. Each heavy and light chain contains a constant region and a variable region, (the regions are also known as "domains"). In combination, the heavy and the light chain variable regions specifically bind the antigen. Light and heavy chain variable regions contain a "framework" region interrupted by three hypervariable regions, also called "complementarity-determining regions" or "CDRs". The extent of the framework region and CDRs have been defined (see, Kabat et al., *Sequences of Proteins of Immunological Interest*, U.S. Department of Health and Human Services, 1991, which is hereby incorporated by reference). The Kabat database is now maintained online. The sequences of the framework regions of different light or heavy chains are relatively conserved within a species. The framework region of an antibody, that is the combined framework regions of the constituent light and heavy chains, largely adopt a β-sheet conformation and the CDRs form loops which connect, and in some cases form part of, the β-sheet structure. Thus, framework regions act to form a scaffold that provides for positioning the CDRs in correct orientation by inter-chain, non-covalent interactions.

The CDRs are primarily responsible for binding to an epitope of an antigen. The CDRs of each chain are typically referred to as CDR1, CDR2, and CDR3, numbered sequentially starting from the N-terminus, and are also typically identified by the chain in which the particular CDR is located. Thus, a $V_H$ CDR3 is located in the variable domain of the heavy chain of the antibody in which it is found, whereas a $V_L$ CDR1 is the CDR1 from the variable domain of the light chain of the antibody in which it is found. An antibody that binds a target will have a specific $V_H$ region and the $V_L$ region sequence, and thus specific CDR sequences. Antibodies with different specificities (i.e. different combining sites for different antigens) have different CDRs. Although it is the CDRs that vary from antibody to antibody, only a limited number of amino acid positions within the CDRs are directly involved in antigen binding. These positions within the CDRs are called specificity determining residues (SDRs). "Immunoglobulin-related compositions" as used herein, refers to antibodies (including monoclonal antibodies, polyclonal antibodies, humanized antibodies, chimeric antibodies, recombinant antibodies, multispecific antibodies, bispecific antibodies, etc.) as well as antibody fragments. An antibody or antigen binding fragment thereof specifically binds to an antigen.

As used herein, the term "conjugated" refers to the association of two molecules by any method known to those in the art. Suitable types of associations include chemical bonds and physical bonds. Chemical bonds include, for example, covalent bonds and coordinate bonds. Physical bonds include, for instance, hydrogen bonds, dipolar interactions, van der Waal forces, electrostatic interactions, hydrophobic interactions and aromatic stacking.

As used herein, the terms "single-chain antibodies" or "single-chain Fv (scFv)" refer to an antibody fusion molecule of the two domains of the Fv fragment, $V_L$ and $V_H$. Single-chain antibody molecules may comprise a polymer with a number of individual molecules, for example, dimer, trimer or other polymers. Furthermore, although the two domains of the $F_v$ fragment, $V_L$ and $V_H$, are coded for by separate genes, they can be joined, using recombinant methods, by a synthetic linker that enables them to be made as a single protein chain in which the $V_L$ and $V_H$ regions pair to form monovalent molecules (known as single-chain $F_v$ (scFv)). Bird et al. (1988) *Science* 242:423-426 and Huston et al. (1988) *Proc. Natl. Acad Sci*. USA 85:5879-5883. Such single-chain antibodies can be prepared by recombinant techniques or enzymatic or chemical cleavage of intact antibodies.

Any of the above-noted antibody fragments are obtained using conventional techniques known to those of skill in the art, and the fragments are screened for binding specificity and neutralization activity in the same manner as are intact antibodies.

As used herein, an "antigen" refers to a molecule to which an antibody (or antigen binding fragment thereof) can selectively bind. The target antigen may be a protein, carbohydrate, nucleic acid, lipid, hapten, or other naturally occurring or synthetic compound. An antigen may also be administered to an animal to generate an immune response in the animal.

The term "antigen binding fragment" refers to a fragment of the whole immunoglobulin structure which possesses a part of a polypeptide responsible for binding to antigen. Examples of the antigen binding fragment useful in the present technology include scFv, (scFv)$_2$, scFvFc, Fab, Fab' and F(ab')$_2$, but are not limited thereto. Antigen binding fragments, including single-chain antibodies, that can comprise the variable region(s) alone, or in combination, with all or part of the following polypeptide elements: hinge region, CH$_1$, CH$_2$, and CH$_3$ domains of an antibody molecule. Antigen binding fragments also include any combinations of variable region(s) and hinge region, CH$_1$, CH$_2$, and CH$_3$ domains e.g., but are not limited to, Fab, Fab' and F(ab')$_2$, Fd, single-chain Fvs (scFv), single-chain antibodies, disulfide-linked Fvs (sdFv) and fragments comprising either a $V_L$ or $V_H$ domain. Examples include: (i) a Fab fragment, a monovalent fragment consisting of the $V_L$, $V_H$, $C_L$ and CH$_1$ domains; (ii) a F(ab')$_2$ fragment, a bivalent fragment comprising two Fab fragments linked by a disulfide bridge at the hinge region; (iii) a Fd fragment consisting of the $V_H$ and CH$_1$ domains; (iv) a Fv fragment consisting of the $V_L$ and $V_H$ domains of a single arm of an antibody, (v) a dAb fragment (Ward et al., *Nature* 341: 544-546, 1989), which consists of a $V_H$ domain; and (vi) an isolated complementarity determining region (CDR). As such "antibody fragments" or "antigen binding fragments" can comprise a portion of a full length antibody, generally the antigen binding or variable region thereof. Examples of antibody fragments or antigen binding fragments include Fab, Fab', F(ab')$_2$, and Fv fragments; diabodies; linear antibodies; single-chain antibody molecules; and multispecific antibodies formed from antibody fragments.

By "binding affinity" is meant the strength of the total noncovalent interactions between a single binding site of a molecule (e.g., a receptor) and its binding partner (e.g., a ligand). The affinity of a molecule X for its partner Y can generally be represented by the dissociation constant ($K_D$). Affinity can be measured by standard methods known in the art, including those described herein. A low-affinity complex contains a receptor that generally tends to dissociate readily from a ligand, whereas a high-affinity complex contains a receptor that generally tends to remain bound to the ligand for a longer duration.

As used herein, a "control" is an alternative sample used in an experiment for comparison purpose. A control can be "positive" or "negative." For example, where the purpose of the experiment is to determine a correlation of the efficacy of a therapeutic agent for the treatment for a particular type of disease, a positive control (a compound or composition known to exhibit the desired therapeutic effect) and a negative control (a subject or a sample that does not receive the therapy or receives a placebo) are typically employed.

As used herein, the term "effective amount" refers to a quantity sufficient to achieve a desired therapeutic and/or prophylactic effect, e.g., an amount which results in the prevention of, or a decrease in a disease or condition described herein or one or more signs or symptoms associated with a disease or condition described herein. In the context of therapeutic or prophylactic applications, the amount of a composition administered to the subject will vary depending on the composition, the degree, type, and severity of the disease and on the characteristics of the individual, such as general health, age, sex, body weight and tolerance to drugs. The skilled artisan will be able to determine appropriate dosages depending on these and other factors. The compositions can also be administered in combination with one or more additional therapeutic compounds. In the methods described herein, the therapeutic compositions may be administered to a subject having one or more signs or symptoms of a disease or condition described herein. As used herein, a "therapeutically effective amount" of a composition refers to composition levels in which the physiological effects of a disease or condition are ameliorated or eliminated. A therapeutically effective amount can be given in one or more administrations.

As used herein, the term "effector cell" means an immune cell which is involved in the effector phase of an immune response, as opposed to the cognitive and activation phases of an immune response. Exemplary immune cells include a cell of a myeloid or lymphoid origin, e.g., lymphocytes (e.g., B cells and T cells including cytolytic T cells (CTLs)), killer cells, natural killer (NK) cells, macrophages, monocytes, eosinophils, neutrophils, polymorphonuclear cells, granulocytes, mast cells, and basophils. Effector cells express specific Fc receptors and carry out specific immune functions. An effector cell can induce antibody-dependent cell-mediated cytotoxicity (ADCC), e.g., a neutrophil capable of inducing ADCC. For example, monocytes, macrophages, neutrophils, eosinophils, and lymphocytes which express FcαR are involved in specific killing of target cells and presenting antigens to other components of the immune system, or binding to cells that present antigens.

As used herein, the term "epitope" means an antigenic determinant capable of specific binding to an antibody. Epitopes usually consist of chemically active surface groupings of molecules such as amino acids or sugar side chains and usually have specific three dimensional structural characteristics, as well as specific charge characteristics. Conformational and non-conformational epitopes are distinguished in that the binding to the former but not the latter is lost in the presence of denaturing solvents.

As used herein, "expression" includes one or more of the following: transcription of the gene into precursor mRNA; splicing and other processing of the precursor mRNA to produce mature mRNA; mRNA stability; translation of the mature mRNA into protein (including codon usage and tRNA availability); and glycosylation and/or other modifications of the translation product, if required for proper expression and function.

As used herein "Fc domain" refers to the crystallizable, non-antigen binding fragment of an immunoglobulin molecule that contains the hinge, $CH_2$, and $CH_3$ regions of both heavy chains and possesses binding sites for Fc receptors and the C1q component of complement.

As used herein, the term "gene" means a segment of DNA that contains all the information for the regulated biosynthesis of an RNA product, including promoters, exons, introns, and other untranslated regions that control expression.

As used herein, the term "host cell" refers to any type of cell, e.g., a primary cell or a cell from a cell line. In some embodiments, the term "host cell" refers a cell transfected with a nucleic acid molecule and the progeny or potential progeny of such a cell. Progeny of such a cell may not be identical to the parent cell transfected with the nucleic acid molecule due to mutations or environmental influences that may occur in succeeding generations or integration of the nucleic acid molecule into the host cell genome.

As used herein, the term "hypervariable region" refers to the amino acid residues of an antibody which are responsible for antigen binding. The hypervariable region generally comprises amino acid residues from a "complementarity determining region" or "CDR" (e.g., around about residues 24-34 (L1), 50-56 (L2) and 89-97 (L3) in the $V_L$, and around about 31-35B (H1), 50-65 (H2) and 95-102 (H3) in the $V_H$ (Kabat et al., *Sequences of Proteins of Immunological Interest*, 5th Ed. Public Health Service, National Institutes of Health, Bethesda, MD (1991)) and/or those residues from a "hypervariable loop" (e.g., residues 26-32 (L1), 50-52 (L2) and 91-96 (L3) in the $V_L$, and 26-32 (H1), 52A-55 (H2) and 96-101 (H3) in the $V_H$ (Chothia and Lesk *J. Mol. Biol.* 196:901-917 (1987)).

As used herein, the term "IL-15/IL-15Rα complex" refers to a complex comprising IL-15 and IL-15Rα noncovalently bound to each other. In some embodiments, the IL-15Rα has a relatively high affinity for IL-15, e.g., $K_d$ of 10 to 50 pM as measured by a technique known in the art, e.g., KinEx A assay, plasma surface resonance (e.g., BIAcore assay). In other embodiments, the IL-15/IL-15Rα complex induces IL-15-mediated signal transduction, as measured by assays well-known in the art, e.g., electromobility shift assays, ELISAs and other immunoassays. In some embodiments, the IL-15/IL-15Rα complex is isolated from a cell.

As used herein, an "IL-15/IL-15Rα-Fc complex" refers to a Y-shaped monomer that comprises two IL-15 polypeptide chains and two IL-15Rα-Fc fusion polypeptide chains, wherein (i) each IL-15 polypeptide chain is non-covalently linked to an IL-15Rα-Fc fusion polypeptide chain, (ii) an IL-15Rα-Fc fusion polypeptide chain is covalently linked to the other IL-15Rα-Fc fusion polypeptide chain (e.g., via a disulfide bond), and (iii) each IL-15Rα-Fc fusion polypeptide chain comprises an IL-15Rα extracellular domain amino acid sequence that is covalently linked to an Fc domain amino acid sequence of an immunoglobulin molecule (e.g., IgG1, IgG2, IgG3, IgG4). In some embodiments of the IL15-Rα-Fc fusion polypeptide chains, the Fc domain amino acid sequence of the immunoglobulin molecule (e.g., IgG1) is linked to the C-terminus of the IL-15Rα extracellular domain amino acid sequence.

As used herein, the terms "individual", "patient", or "subject" can be an individual organism, a vertebrate, a mammal, or a human. In some embodiments, the individual, patient or subject is a human.

As used herein, the term "pharmaceutically-acceptable carrier" is intended to include any and all solvents, dispersion media, coatings, antibacterial and antifungal compounds, isotonic and absorption delaying compounds, and the like, compatible with pharmaceutical administration. Pharmaceutically-acceptable carriers and their formulations are known to one skilled in the art and are described, for example, in Remington's Pharmaceutical Sciences ($20^{th}$ edition, ed. A. Gennaro, 2000, Lippincott, Williams & Wilkins, Philadelphia, Pa.).

As used herein, the term "polynucleotide" or "nucleic acid" means any RNA or DNA, which may be unmodified or modified RNA or DNA. Polynucleotides include, without limitation, single- and double-stranded DNA, DNA that is a mixture of single- and double-stranded regions, single- and double-stranded RNA, RNA that is mixture of single- and double-stranded regions, and hybrid molecules comprising DNA and RNA that may be single-stranded or, more typically, double-stranded or a mixture of single- and double-stranded regions. In addition, polynucleotide refers to triple-stranded regions comprising RNA or DNA or both RNA and DNA. The term polynucleotide also includes DNAs or RNAs containing one or more modified bases and DNAs or RNAs with backbones modified for stability or for other reasons.

As used herein, the terms "polypeptide", "peptide" and "protein" are used interchangeably herein to mean a polymer comprising two or more amino acids joined to each other by peptide bonds or modified peptide bonds, i.e., peptide isosteres. Polypeptide refers to both short chains, commonly referred to as peptides, glycopeptides or oligomers, and to longer chains, generally referred to as proteins. Polypeptides may contain amino acids other than the 20 gene-encoded amino acids. Polypeptides include amino acid sequences modified either by natural processes, such as post-translational processing, or by chemical modification techniques that are well known in the art. Such modifications are well described in basic texts and in more detailed monographs, as well as in a voluminous research literature.

As used herein, the term "recombinant" when used with reference, e.g., to a cell, or nucleic acid, protein, or vector, indicates that the cell, nucleic acid, protein or vector, has been modified by the introduction of a heterologous nucleic acid or protein or the alteration of a native nucleic acid or protein, or that the material is derived from a cell so modified. Thus, for example, recombinant cells express genes that are not found within the native (non-recombinant) form of the cell or express native genes that are otherwise abnormally expressed, under expressed or not expressed at all.

As used herein, the term "separate" therapeutic use refers to an administration of at least two active ingredients at the same time or at substantially the same time by different routes.

As used herein, the term "sequential" therapeutic use refers to administration of at least two active ingredients at different times, the administration route being identical or different. More particularly, sequential use refers to the whole administration of one of the active ingredients before administration of the other or others commences. It is thus possible to administer one of the active ingredients over several minutes, hours, or days before administering the other active ingredient or ingredients. There is no simultaneous treatment in this case.

As used herein, the term "simultaneous" therapeutic use refers to the administration of at least two active ingredients by the same route and at the same time or at substantially the same time.

As used herein, the terms "specifically binds," "specifically recognizes" and analogous terms in the context of a receptor (e.g., IL-15Rα or IL-15 receptor βγ) and a ligand (e.g., IL-15) interaction refer to the specific binding or association between the ligand and receptor, where the ligand has higher affinity for the receptor than for other molecules. In some embodiments, the ligand is IL-15 and the receptor is IL-15Rα. In another specific embodiment, the ligand is the IL-15/IL-15Rα complex and the receptor is the IL-15 βγ receptor complex. In certain embodiments, the IL-15/IL-15Rα complex binds to the IL-15 βγ receptor complex and activates IL-15 mediated signal transduction. Ligands that specifically bind a receptor can be identified, for example, by immunoassays, BIAcore, or other techniques known to those of skill in the art.

As used herein, the term "therapeutic agent" is intended to mean a compound that, when present in an effective amount, produces a desired therapeutic effect on a subject in need thereof.

"Treating" or "treatment" as used herein covers the treatment of a disease or disorder described herein, in a subject, such as a human, and includes: (i) inhibiting a disease or disorder, i.e., arresting its development; (ii) relieving a disease or disorder, i.e., causing regression of the disorder; (iii) slowing progression of the disorder; and/or (iv) inhibiting, relieving, or slowing progression of one or more symptoms of the disease or disorder. In some embodiments, treatment means that the symptoms associated with the disease are, e.g., alleviated, reduced, cured, or placed in a state of remission.

It is also to be appreciated that the various modes of treatment of disorders as described herein are intended to mean "substantial," which includes total but also less than total treatment, and wherein some biologically or medically relevant result is achieved. The treatment may be a continuous prolonged treatment for a chronic disease or a single, or few time administrations for the treatment of an acute condition.

IL-15 and IL-15Rα

Other than IL-2, there is no cytokine clinically available that will expand, maintain and activate effector NK or T cells, as well as antigen presenting cells, without the severe IL-2 associated toxicities (e.g., 23% patients experiencing capillary leak) (Yu et al., *N Engl J Med* 363:1324-34 (2010)). IL-15 is a 14-15 kDa glycoprotein (Burton et al., *Proc Natl Acad Sci* 91:4935-9 (1994); Grabstein et al., *Science* 264:965-8 (1994)) that binds to a heterotrimeric receptor that shares the IL-2R/IL-15Rβ (CD122) and the common gamma (γc) chain (CD132) with the IL-2 receptor (Steel et al., *Trends Pharmacol Sci* 33:35-41 (2012) as well as a unique a subunit (IL-15Rα) that confers receptor specificity.

However, unlike IL-2 (FIG. 1), IL-15 (1) is not required for the maintenance of T regulatory cells (Tregs), (2) does not induce activation-induced cell death (AICD) of CD8(+) effector T cells, (3) is required for the differentiation of NK, effector CD8(+) and memory phenotype CD8(+) T cells, and (4) does not cause vascular capillary leak. See Berger et al., *Blood* 114:2417-26 (2009); Marks-Konczalik et al., *Proc Natl Acad Sci* 97:11445-50 (2000); Munger et al., *Cell Immunol* 165:289-93 (1995)).

Figure 2A:
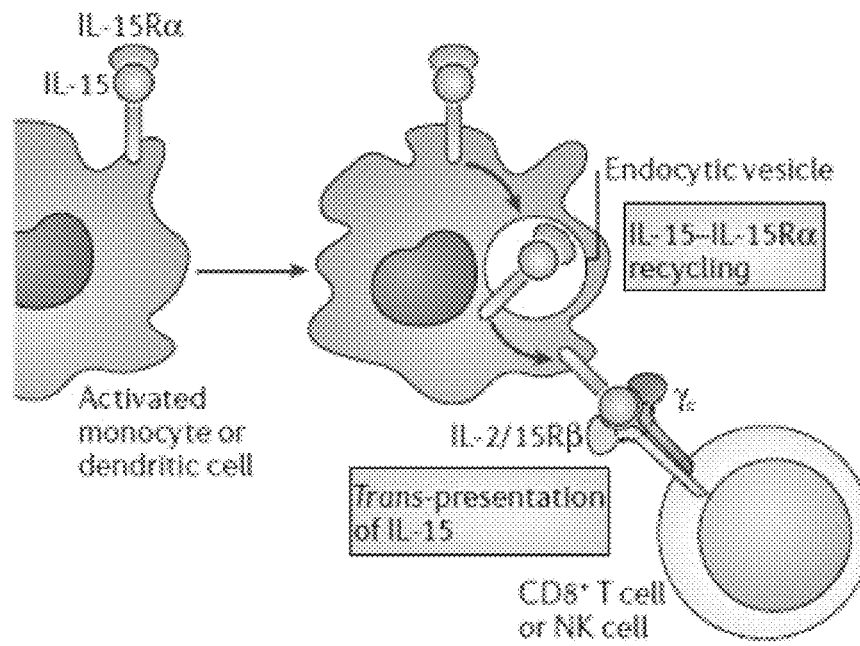
FIGS. 2A-2B show the trans-presentation of IL-15 to IL-2R/IL-15Rβ-γc on neighboring NK and T cells through immunological synapses (adapted from Waldmann et al., *Nat Rev Immunol* 6:595-601 (2006)).
Figure 2B:
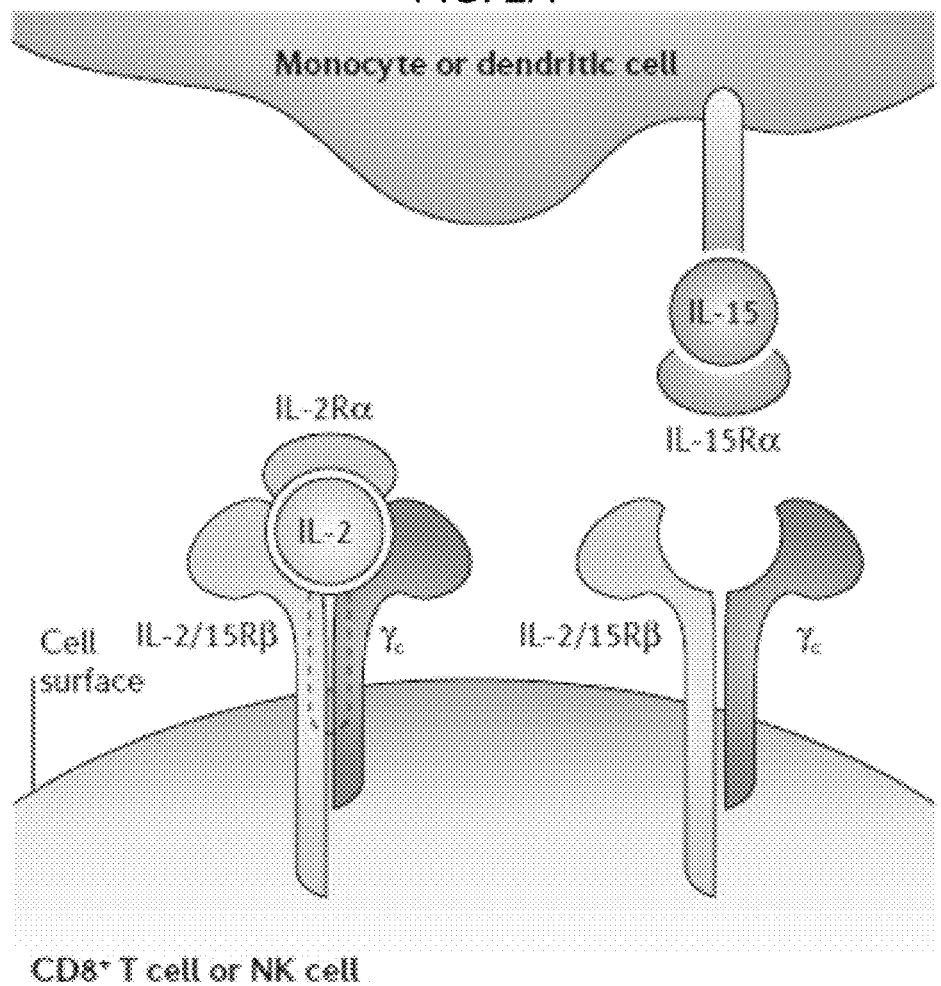

IL-15Rα has a 173 amino acid extracellular domain, a single 21 amino acid transmembrane domain, and a 37 amino acid cytoplasmic domain. IL-15Rα is widely expressed in humans and mice (independently of IL-2R/IL-15β-γc) and binds to IL-15 with high affinity (Kd<$10^{-11}$ M) and retains IL-15 on the cell surface. IL-15Rα trans-presents IL-15 to IL-2R/IL-15β-γc (FIGS. 2A-2B) on neighboring NK and T cells through immunological synapses (Dubois et al., *Immunity* 17:537-47 (2002); Kobayashi et al., *Blood* 105:721-7 (2005)). In lymphocytes, the docking of membrane-bound IL-15 with IL-2R/IL-15Rβ-γc activates the JAK1/JAK3 and STAT3/STAT5 pathways, Syk kinase, phospholipase C (PLC)γ, Lck kinase, and Shc resulting in the activation of PI3K/Akt and Ras/Raf/MAPK signaling cascades. Budagian et al., *Cytokine Growth Factor Rev* 17:259-80 (2006). IL-15 persists as membrane-bound by recycling with IL-15Rα through endosomal vesicles for days (Dubois et al., *Immunity* 17:537-47 (2002)).

Figure 3:
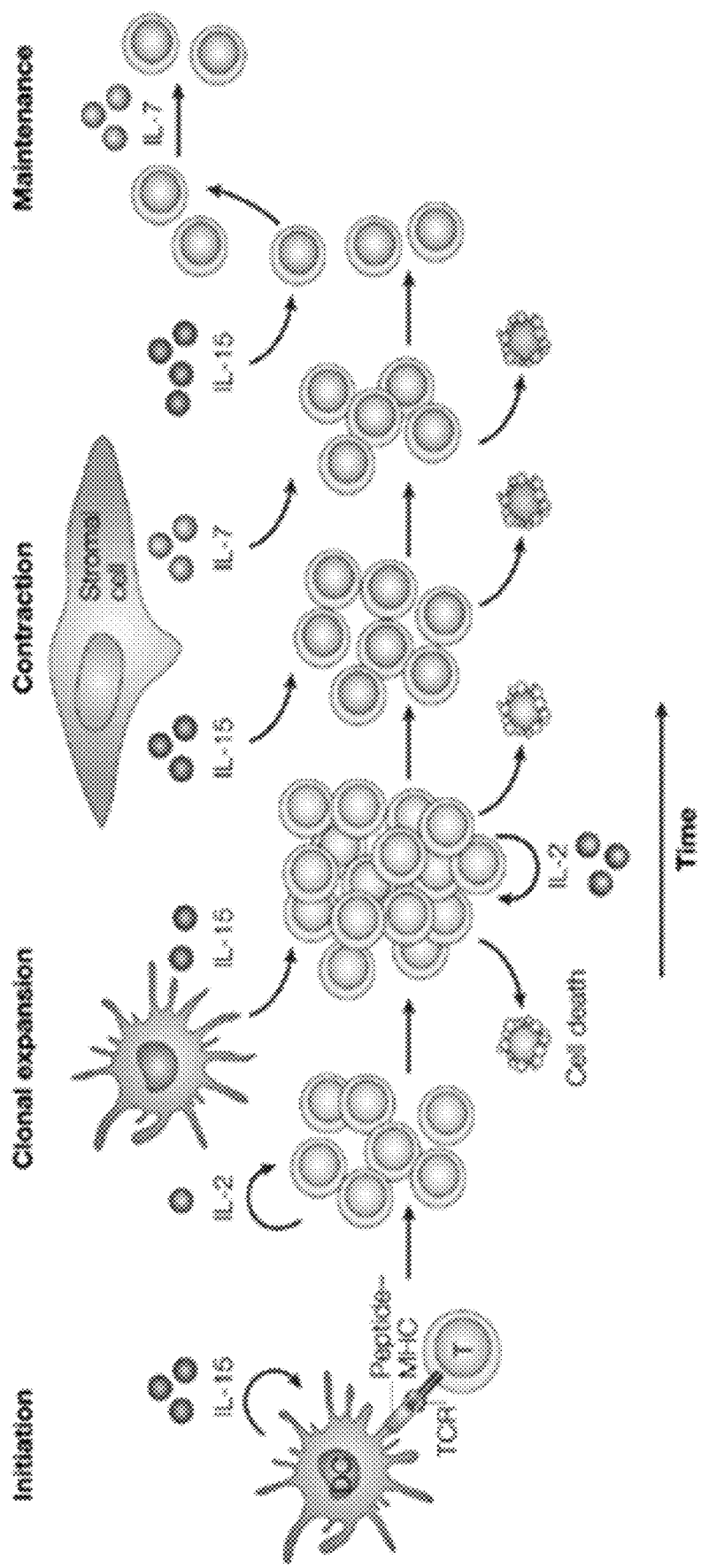
FIG. 3 shows the role of IL-15 in immune homeostasis (adapted from Schluns & Lefrancois *Nat Rev Immunol* 3:269-279 (2003)).
Figure 4:
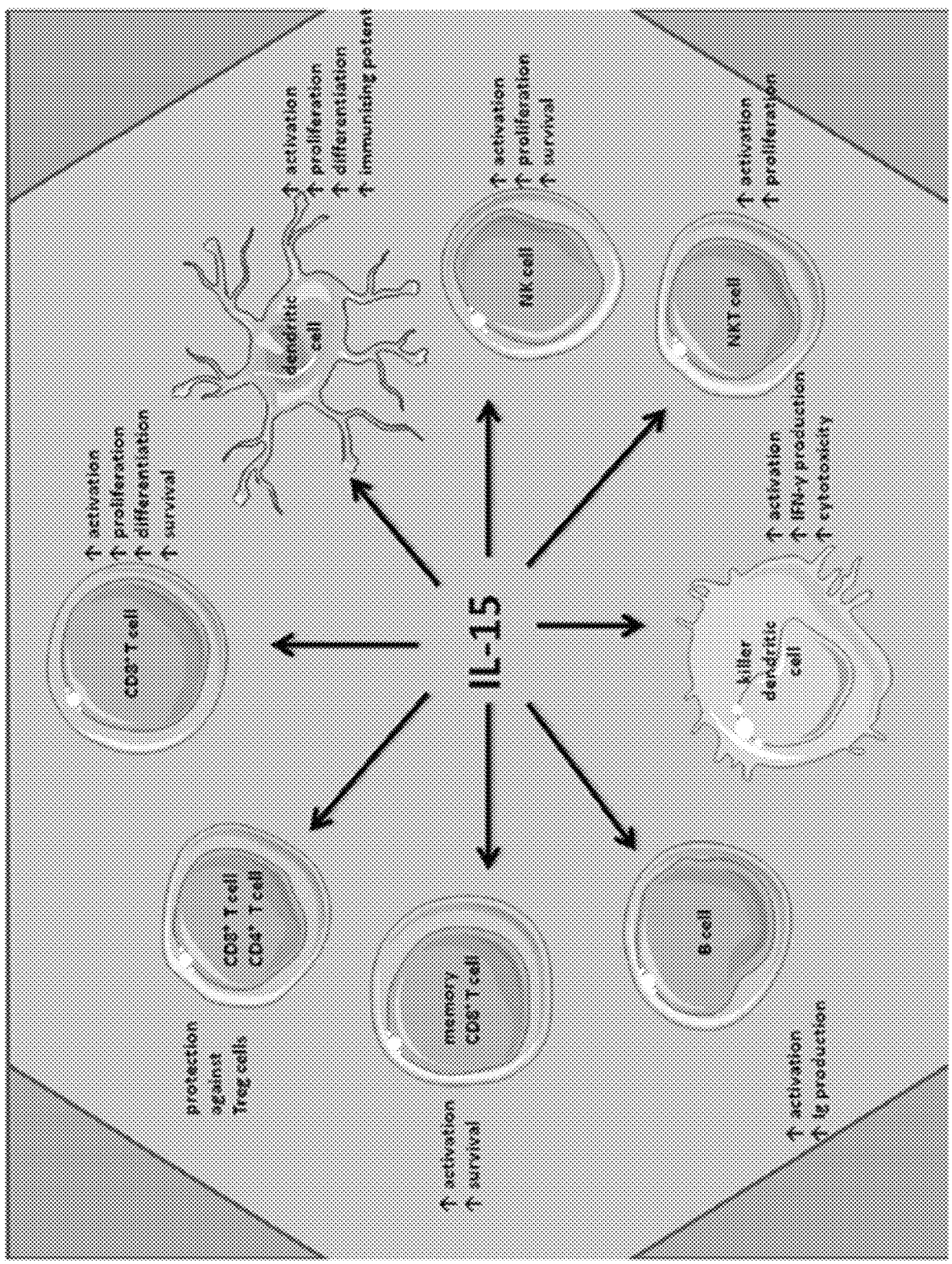
FIG. 4 shows the role of IL-15 in cancer (adapted from Jakobisiak et al., *Cytokine & Growth Factor Reviews* 22:99-108 (2011)).
Figure 4:
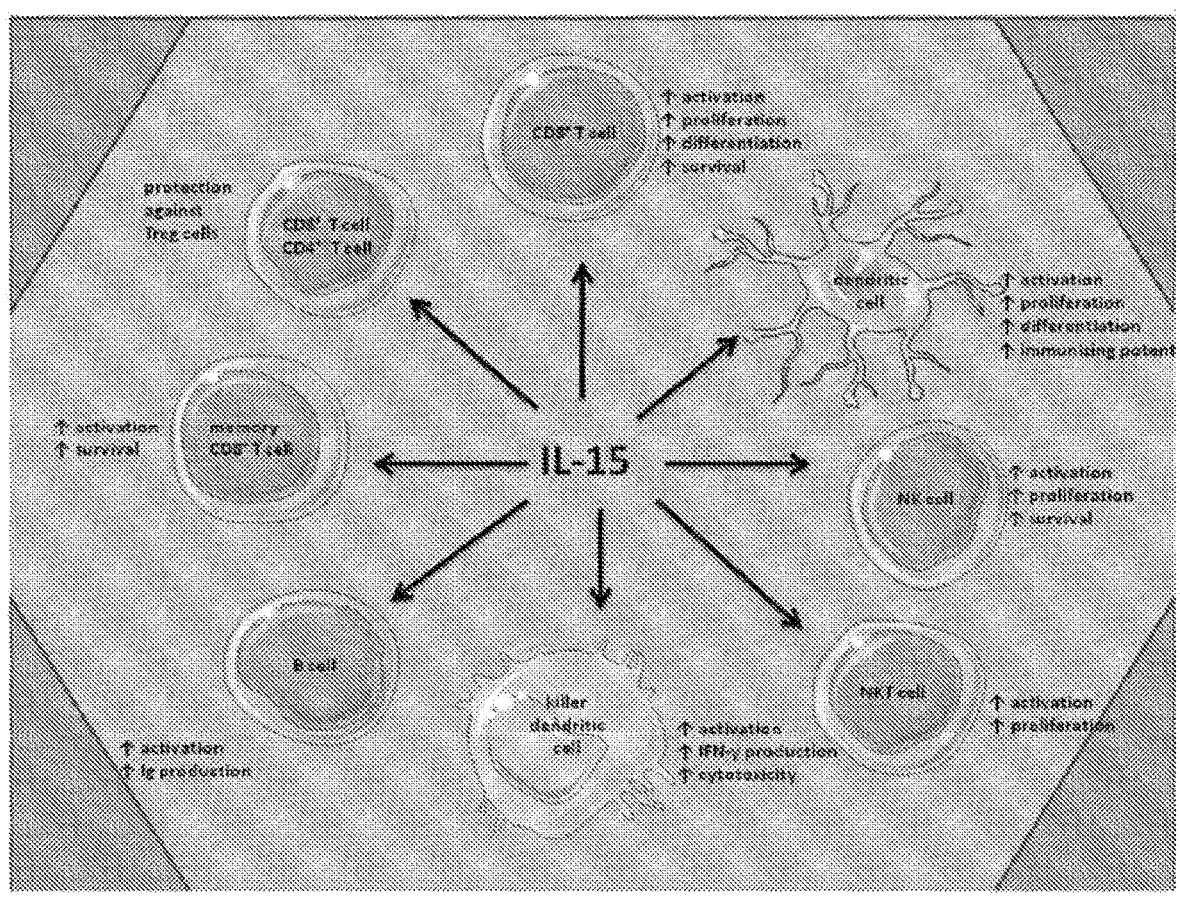

IL-15 has diverse immunologic effects: (1) It stimulates the proliferation of activated CD4(−)CD8(−), CD4(+)CD8 (+), CD4+, CD8+ T cells, induces cytotoxic T-lymphocytes (CTL), and stimulates the generation, proliferation and activation of natural killer (NK) cells. Though not essential for the generation of memory CD8(+) T cells, IL-15 is required for their homeostatic proliferation over long periods of time. (2) IL-15 protects neutrophils from apoptosis, modulates phagocytosis, and stimulates the secretion of IL-8 and IL-1R antagonist, by activating JAK2, p38, ERK1/2 MAPK, Syk kinase and the NF-κB transcription factor. (3) IL-15 stimulates mast cell growth by activating JAK2/STAT5 without γc binding. (4) IL-15 induces B cell proliferation and differentiation, and increases their immunoglobulin secretion. IL-15 also prevents Fas-mediated apoptosis and allows induction of antibody responses partially independent of CD4. (5) IL-15 stimulates macrophage phagocytosis, their expression of IL-8, IL-12 and monocyte chemotactic protein-1 (MCP-1), as well as secretion of IL-6, IL-8 and TNFα. (6) IL-15 matures dendritic cell to express CD83, CD86, CD40, and MHC class II expression, to resist apoptosis, and to secrete IFN-γ. See FIG. 3 and FIG. 4.

IL-15 in Cancer

IL-15 transgenic mice develop spontaneous CD8(+) T cell leukemia (Fehniger et al., *J Exp Med* 193:219-31 (2001); Sato et al., *Blood* 117:4032-40 (2011)), characterized by rapid proliferations of NK and T cells, followed by transformation to lethal leukemia, resembling the aggressive behavior of human NK and T cell large granular lymphocyte leukemia. Murine T cell lymphoma LBC is stimulated by IL-15 (Gravisaco et al., *Int J Mol Med* 12:627-32 (2003)). In human leukemia, IL-15 stimulates primary NK and B cell chronic lymphocytic leukemia cell lines (Yamasaki et al., *Leuk Res* 28:1023-31 (2004); Trentin et al., *Blood* 87:3327-35 (1996)). IL-15 is expressed in the peripheral blood mononuclear cells of patients with Sezary syndrome and the epidermal keratinocytes of patients with mycosis fungoides (Leroy et al., *Br J Dermatol* 144:1016-23 (2001)). IL-15/IL-15Rα is an autocrine for human T cell lymphotrophic virus (HTLV-1)-associated adult T cell leukemia/lymphoma, as well as multiple myeloma. See Azimi et al., *Proc Natl Acad Sci* 95:2452-7 (1998); Kukita et al., *Br J Haematol* 119:467-74 (2002); Tinhofer et al., *Blood* 95:610-8 (2000). In acute lymphocytic leukemia (ALL), IL-15 expression is associated with mediastinal and lymph-node involvement, and IL-15 expression in precursor B cell ALL predicts an inferior five-year relapse-free survival (Wu et al., *Cancer* 116:387-92 (2010)). In childhood ALL, IL-15 expression has been associated with the subsequent development of CNS relapse. Cario et al., *J Clin Oncol* 25:4813-20 (2007).

IL-15/IL-15Rα-Fc Complexes of the Present Technology

Provided herein are IL-15/IL-15Rα-Fc complexes that bind to the βγ subunits of the IL-15 receptor, induce IL-15 signal transduction (e.g., Jak/Stat signal transduction) and enhance IL-15-mediated immune function. An IL-15/IL-15Rα-Fc complex of the present technology is a Y-shaped monomer that comprises two IL-15 polypeptide chains and two IL-15Rα-Fc fusion polypeptide chains, wherein (i) each IL-15 polypeptide chain is non-covalently linked to an IL-15Rα-Fc fusion polypeptide chain, (ii) an IL-15Rα-Fc fusion polypeptide chain is covalently linked to the other IL-15Rα-Fc fusion polypeptide chain (e.g., via a disulfide bond), and (iii) each IL-15Rα-Fc fusion polypeptide chain comprises an IL-15Rα extracellular domain amino acid sequence that is covalently linked to an Fc domain amino acid sequence of an immunoglobulin molecule (e.g., IgG1, IgG2, IgG3, IgG4). In some embodiments of the IL-15Rα-Fc fusion polypeptide chains, the Fc domain amino acid sequence of the immunoglobulin molecule (e.g., IgG1, IgG2, IgG3, IgG4) is linked to the C-terminus of the IL-15Rα extracellular domain amino acid sequence. Additionally or alternatively, in some embodiments of the IL-15Rα-Fc fusion polypeptide chains, the Fc domain amino acid sequence of the immunoglobulin molecule (e.g., IgG1, IgG2, IgG3, IgG4) is linked to the C-terminus of the IL-15Rα extracellular domain amino acid sequence via a junctional linker sequence. In certain embodiments, the junctional linker sequence is ASTKGP (SEQ ID NO: 24) or ASTTAP (SEQ ID NO: 36). In some embodiments, at least one IL-15 polypeptide chain and/or IL-15Rα-Fc fusion polypeptide chain comprises the leader sequence MGWSCI-ILFLVATATG (SEQ ID NO: 28) or

```
                                          (SEQ ID NO: 37)
MGWSCIILFLVATATGVHS.
```

The sequence of soluble wild-type human IL-15 is provided below:

```
                                          (SEQ ID NO: 25)
NWVNVISDLKKIEDLIQSMHIDATLYTESDVHPSCKVTAMKCFLLELQVI

SLESGDASIHDTVENLIILANNSLSSNGNVTESGCKECEELEEKNIKEFL

QSFVHIVQMFINTS
```

The sequence of soluble N72D mutant human IL-15 is provided below:

```
                                          (SEQ ID NO: 26)
NWVNVISDLKKIEDLIQSMHIDATLYTESDVHPSCKVTAMKCFLLELQVI

SLESGDASIHDTVENLIILANDSLSSNGNVTESGCKECEELEEKNIKEFL

QSFVHIVQMFINTS
```

The sequence of soluble wild-type human IL-15Rα is provided below:

```
                                          (SEQ ID NO: 27)
ITCPPPMSVEHADIWVKSYSLYSRERYICNSGFKRKAGTSSLTECVLNKA

TNVAHWTTPSLKCIRDPALVHQRPAPPSTVTTAGVTPQPESLSPSGKEPA

ASSPSSNNTAATTAAIVPGSQLMPSKSPSTGTTEISSHESSHGTPSQTTA

KNWELTASASHQPPGVYPQGHSDTT
```

The Hinge+CH$_2$+CH$_3$ sequence of Fc domain of human IgG1 is provided below:

```
                                          (SEQ ID NO: 29)
DKTHTCPPCPAPELLGGPSVFLFPPKPKDTLMISRTPEVTCVVVDVSHED

PEVKFNWYVDGVEVHNAKTKPREEQYNSTYRVVSVLTVLHQDWLNGKEYK

CKVSNKALPAPIEKTISKAKGQPREPQVYTLPPSRDELTKNQVSLTCLVK

GFYPSDIAVEWESNGQPENNYKTTPPVLDSDGSFFLYSKLTVDKSRWQQG

NVFSCSVMHEALHNHYTQKSLSLSPGK
```

The Hinge+CH$_2$+CH$_3$ sequence of Fc domain of human IgG2 is provided below:

```
                                          (SEQ ID NO: 30)
ERKCCVECPPCPAPPVAGPSVFLFPPKPKDTLMISRTPEVTCVVVDVSHE

DPEVQFNWYVDGVEVHNAKTKPREEQFNSTFRVVSVLTVVHQDWLNGKEY

KCKVSNKGLPAPIEKTISKTKGQPREPQVYTLPPSREEMTKNQVSLTCLV

KGFYPSDISVEWESNGQPENNYKTTPPMLDSDGSFFLYSKLTVDKSRWQQ

GNVFSCSVMHEALHNHYTQKSLSLSPGK
```

The Hinge+CH$_2$+CH$_3$ sequence of Fc domain of human IgG3 is provided below:

```
                                          (SEQ ID NO: 31)
ELKTPLGDTTHTCPRCPEPKSCDTPPPCPRCPEPKSCDTPPPCPRCPEPK

SCDTPPPCPRCPAPELLGGPSVFLEPPKPKDTLMISRTPEVTCVVVDVSH

EDPEVQFKWYVDGVEVHNAKTKPREEQYNSTERVVSVLTVLHQDWLNGKE

YKCKVSNKALPAPIEKTISKTKGQPREPQVYTLPPSREEMTKNQVSLTCL

VKGEYPSDIAVEWESSGQPENNYNTTPPMLDSDGSFFLYSKLTVDKSRWQ

QGNIFSCSVMHEALHNRFTQKSLSLSPGK
```

The Hinge+CH$_2$+CH$_3$ sequence of Fc domain of human IgG4 is provided below:

```
                                          (SEQ ID NO: 32)
ESKYGPPCPSCPAPEFLGGPSVFLFPPKPKDTLMISRTPEVTCVVVDVSQ

EDPEVQFNWYVDGVEVHNAKTKPREEQFNSTYRVVSVLTVLHQDWLNGKE

YKCKVSNKGLPSSIEKTISKAKGQPREPQVYTLPPSQEEMTKNQVSLTCL

VKGFYPSDIAVEWESNGQPENNYKTTPPVLDSDGSFFLYSRLTVDKSRWQ

EGNVFSCSVMHEALHNHYTQKSLSLSLGK
```

The sequence of soluble wild-type canine IL-15 is provided below:

(SEQ ID NO: 38)
NWQDVILDLEKIDNLIQSIHMDTTLYTESDVHPSCKVTAMKCFLLELGVI

SLESGSHPIKEAVENLIILANSDLSSKGNITETGCKECEELEEKSIKEFL

QSFVHIVQMFINSS

The sequence of soluble wild-type canine IL-15Rα is provided below:

(SEQ ID NO: 39)
ITCPPPTSVKHADIQVKSYSVSSKERYTCNSGFKRKAGTSSLTECVLNKT

TNTAHWTIPSLKCIIMKHSSFHPQAHKCHVVILSPGDPSLTHLRPSSSDV

PAGVTPEPESTSLSGKEPTFTSKSDTKVATKPTIVPGSRPMPSKPPATGT

TGLISNEPSSQAPSQTTAKALEHTPSASQETPGTYSYNSGAVT

The Hinge+CH$_2$+CH$_3$ sequence of Fc domain of canine IgGB is provided below:

(SEQ ID NO: 40)
PKRENGRVPRPPDCPKCPAPEMLGGPSVFIFPPKPKDTLLIARTPEVTCV

VVDLDPEDPEVQISWFVDGKQMQTAKTQPREEQFNGTYRVVSVLPIGHQD

WLKGKQFTCKVNNKALPSPIERTISKARGQAHQPSVYVLPPSREELSKNT

VSLTCLIKDFFPPDIDVEWQSNGQQEPESKYRTTPPQLDEDGSYFLYSKL

SVDKSRWQRGDTFICAVMHEALHNHYTQESLSHSPGK

The Hinge+CH$_2$+CH$_3$ sequence of Fc domain of canine IgGA is provided below:

(SEQ ID NO: 41)
FNECRCTDTPPCPVPEPLGGPSVLIFPPKPKDILRITRTPEVTCVVLDLG

REDPEVQISWFVDGKEVHTAKTQSREQQFNGTYRVVSVLPIEHQDWLTGK

EFKCRVNHIDLPSPIERTISKARGRAHKPSVYVLPPSPKELSSSDTVSIT

CLIKDFYPPDIDVEWQSNGQQEPERKHRIVITPPQLDEDGSYFLYSKLSV

DKSRWQQGDPFTCAVMHETLQNHYTDLSLSHSPGK

The Hinge+CH$_2$+CH$_3$ sequence of Fc domain of canine IgGC is provided below:

(SEQ ID NO: 42)
AKECECKCNCNNCPCPGCGLLGGPSVFIFPPKPKDILVTARTPTVTCVVV

DLDPENPEVQISWFVDSKQVQTANTQPREEQSNGTYRVVSVLPIGHQDWL

SGKQFKCKVNNKALPSPIEEIISKTPGQAHQPNVYVLPPSRDEMSKNTVT

LTCLVKDFFPPEIDVEWQSNGQQEPESKYRMTPPQLDEDGSYFLYSKLSV

DKSRWQRGDTFICAVMHEALHNHYTQISLSHSPGK

The Hinge+CH$_2$+CH$_3$ sequence of Fc domain of canine IgGD is provided below:

(SEQ ID NO: 43)
PKESTCKCISPCPVPESLGGPSVFIFPPKPKDILRITRTPEITCVVLDLG

REDPEVQISWFVDGKEVHTAKTQPREQQFNSTYRVVSVLPIEHQDWLTGK

EFKCRVNHIGLPSPIERTISKARGQAHQPSVYVLPPSPKELSSSDTVTLT

CLIKDFFPPEIDVEWQSNGQPEPESKYHTTAPQLDEDGSYFLYSKLSVDK

SRWQQGDTFTCAVMHEALQNHYTDLSLSHSPGK

The sequence of soluble wild-type rhesus IL-15 is provided below:

(SEQ ID NO: 49)
NWVNVISDLKKIEDLIQSMHIDATLYTESDVHPSCKVTAMKCFLLELQVI

SHESGDTDIHDTVENLIILANNILSSNGNITESGCKECEELEEKNIKEFL

QSFVHIVQMFINTS

The sequence of soluble wild-type rhesus IL-15Rα is provided below:

(SEQ ID NO: 50)
ITCPPPVSVEHADIRVKSYSLYSRERYICNSGFKRKAGTSSLTECVLNKA

TNIAHWTTPSLKCIRDPLLARQRPALPFTVTTAGVTPQPESLSPSGKEPA

ASSPSSNTTAATTAAIVPSSRLMPSTSSSTGTTEIGSHESSHGPSQTTAK

TWELTASASHQPPGVYPQGHSDTT

The Hinge+CH$_2$+CH$_3$ sequence of Fc domain of rhesus IgG1 is provided below:

(SEQ ID NO: 51)
EIKTCGGGSKPPTCPPCPAPELLGGPSVFLFPPKPKDTLMISRTPEVTCV

VVDVSQEDPDVKFNWYVNGAEVHHAQTKPRETQYNSTYRVVSVLTVTHQD

WLNGKEYTCKVSNKALPAPIQKTISKDKGQPREPQVYTLPPSREELTKNQ

VSLTCLVKGFYPSDIVVEWESSGQPENTYKTTPPVLDSDGSYFLYSKLTV

DKSRWQQGNVFSCSVMHEALHNHYTQKSLSLSPGK

The above IgG Fc domain amino acid sequences have variable levels of affinity for FcR receptors, and are thus expected to activate immune cell responses. See Hogarth & Pietersz, *Nat. Rev. Drug Discovery* 11:311-331 (2012). In some embodiments, mutations in the Fc domain of an IgG may enhance affinity towards FcR receptors, and thus activation of immune cell responses. Xu et al., *Cancer Immunol Res.* 4(7):631-8 (2016). Multimers of the Y-shaped "IL-15/IL-15Rα-Fc complexes" of the present technology, such as dimers, trimers, etc., are also useful in methods for enhancing IL-15-mediated immune function.

Exemplary human amino acid and nucleic acid sequences of the IL-15/IL-15Rα-Fc complexes of the present technology are disclosed below:

WT IL-15 amino acid sequence
(SEQ ID NO: 1)
MGWSCIILFLVATATGNWVNVISDLKKIEDLIQSMHIDATLYTESDVHPS

CKVTAMKCFLLELQVISLESGDASIHDTVENLIILANNSLSSNGNVTESG

CKECEELEEKNIKEFLQSFVHIVQMFINTS

WT IL-15RαFL-hIgG1 Fc amino acid sequence
(SEQ ID NO: 2)
MGWSCIILFLVATATGITCPPPMSVEHADIWVKSYSLYSRERYICNSGFK

RKAGTSSLTECVLNKATNVAHWTTPSLKCIRDPALVHQRPAPPSTVTTAG

VTPQPESLSPSGKEPAASSPSSNNTAATTAAIVPGSQLMPSKSPSTGTTE
ISSHESSHGTPSQTTAKNWELTASASHQPPGVYPQGHSDTTASTKGPDKT
HTCPPCPAPELLGGPSVFLFPPKPKDTLMISRTPEVTCVVVDVSHEDPEV
KFNWYVDGVEVHNAKTKPREEQYNSTYRVVSVLTVLHQDWLNGKEYKCKV
SNKALPAPIEKTISKAKGQPREPQVYTLPPSRDELTKNQVSLTCLVKGFY
PSDIAVEWESNGQPENNYKTTPPVLDSDGSFFLYSKLTVDKSRWQQGNVF
SCSVMHEALHNHYTQKSLSLSPGK

WT IL-15 DNA sequence
(SEQ ID NO: 3)
ATGGGCTGGTCCTGCATCATCCTGTTTCTGGTGGCTACCGCCACCGGCAA
CTGGGTCAACGTGATCTCCGACCTGAAGAAGATCGAGGACCTGATCCAGT
CCATGCACATCGACGCCACCCTGTACACCGAGTCCGACGTGCACCCCTCC
TGCAAAGTGACCGCCATGAAGTGCTTTCTGCTGGAACTGCAAGTGATCTC
CCTGGAATCCGGCGACGCCTCCATCCACGACACCGTGGAAAATCTGATCA
TCCTGGCCAACAACTCCCTGTCCTCCAACGGCAACGTGACCGAGAGCGGC
TGCAAAGAGTGCGAGGAACTGGAAGAGAAGAACATCAAAGAGTTTCTGCA
GTCCTTCGTGCACATCGTGCAGATGTTCATCAACACCAGCTAG WT IL-15Rα-Fc DNA sequence
(SEQ ID NO: 4)
ATGGGCTGGTCCTGCATCATCCTGTTTCTGGTGGCCACAGCCACCGGCAT
CACCTGTCCTCCACCCATGTCTGTGGAACACGCCGACATCTGGGTCAAGT
CCTACTCCCTGTACTCCAGAGAGCGGTACATCTGCAACTCCGGCTTCAAG
CGGAAGGCCGGCACCTCTAGCCTGACCGAGTGCGTGCTGAACAAGGCCAC
CAACGTGGCCCACTGGACCACCCCATCCCTGAAGTGCATCAGGGACCCTG
CCCTGGTGCATCAGAGGCCTGCTCCTCCATCCACCGTGACCACAGCTGGC
GTGACCCCTCAGCCTGAGTCCCTGAGCCCTTCCGGCAAAGAGCCAGCCGC
CTCCTCCCCTTCCTCTAACAATACCGCCGCTACCACCGCCGCCATCGTGC
CTGGATCTCAGCTGATGCCCTCCAAGTCCCCTTCCACCGGAACCACCGAG
ATCTCCAGCCACGAGTCCTCTCACGGCACCCCTTCTCAGACCACCGCCAA
GAACTGGGAGCTGACCGCCTCTGCCTCTCACCAGCCTCCAGGCGTGTACC
CTCAGGGCCACTCTGACACCACCGCCTCTACAAAGGGCCCAGACAAAACT
CACACATGCCCACCGTGCCCAGCACCTGAACTCCTGGGGGGACCGTCAGT
CTTCCTCTTCCCCCCAAAACCCAAGGACACCCTCATGATCTCCCGGACCC
CTGAGGTCACATGCGTGGTGGTGGACGTGAGCCACGAAGACCCTGAGGTC
AAGTTCAACTGGTACGTGGACGGCGTGGAGGTGCATAATGCCAAGACAAA
GCCGCGGGAGGAGCAGTACAACAGCACGTACCGTGTGGTCAGCGTCCTCA
CCGTCCTGCACCAGGACTGGCTGAATGGCAAGGAGTACAAGTGCAAGGTC
TCCAACAAAGCCCTCCCAGCCCCCATCGAGAAAACCATCTCCAAAGCCAA
AGGGCAGCCCCGAGAACCACAGGTGTACACCCTGCCCCCATCCCGGGATG
AGCTGACCAAGAACCAGGTCAGCCTGACCTGCCTGGTCAAAGGCTTCTAT
CCCAGCGACATCGCCGTGGAGTGGGAGAGCAATGGGCAGCCGGAGAACAA
CTACAAGACCACGCCTCCCGTGCTGGACTCCGACGGCTCCTTCTTCCTCT
ACAGCAAGCTCACCGTGGACAAGAGCAGGTGGCAGCAGGGGAACGTCTTC

TCATGCTCCGTGATGCATGAGGCTCTGCACAACCACTACACGCAGAAGAG
CCTCTCCCTGTCTCCGGGTAAATGA

IL15-N72D amino acid sequence
(SEQ ID NO: 5)
MGWSCIILFLVATATGNWVNVISDLKKIEDLIQSMHIDATLYTESDVHPS
CKVTAMKCFLLELQVISLESGDASIHDTVENLIILANDSLSSNGNVTESG
CKECEELEEKNIKEFLQSFVHIVQMFINTS IL-15Rα-Fc amino acid sequence
(complexed with IL15-N72D)
(SEQ ID NO: 6)
MGWSCIILFLVATATGITCPPPMSVEHADIWVKSYSLYSRERYICNSGFK
RKAGTSSLTECVLNKATNVAHWTTPSLKCIRDPALVHQRPAPPSTVTTAG
VTPQPESLSPSGKEPAASSPSSNNTAATTAAIVPGSQLMPSKSPSTGTTE
ISSHESSHGTPSQTTAKNWELTASASHQPPGVYPQGHSDTTASTKGPDKT
HTCPPCPAPELLGGPSVFLFPPKPKDTLMISRTPEVTCVVVDVSHEDPEV
KFNWYVDGVEVHNAKTKPREEQYNSTYRVVSVLTVLHQDWLNGKEYKCKV
SNKALPAPIEKTISKAKGQPREPQVYTLPPSRDELTKNQVSLTCLVKGFY
PSDIAVEWESNGQPENNYKTTPPVLDSDGSFFLYSKLTVDKSRWQQGNVF
SCSVMHEALHNHYTQKSLSLSPGK IL15-N72D DNA sequence
(SEQ ID NO: 7)
ATGGGCTGGTCCTGCATCATCCTGTTTCTGGTGGCCACCGCCACCGGCAA
CTGGGTCAACGTGATCTCCGACCTGAAGAAGATCGAGGACCTGATCCAGT
CCATGCACATCGACGCCACCCTGTACACCGAGTCCGACGTGCACCCCTCC
TGCAAAGTGACCGCCATGAAGTGCTTTCTGCTGGAACTGCAAGTGATCTC
CCTGGAATCCGGCGACGCCTCCATCCACGACACCGTGGAAAATCTGATCA
TCCTGGCCAACGACTCCCTGTCCTCCAACGGCAACGTGACCGAGAGCGGC
TGCAAAGAGTGCGAGGAACTGGAAGAGAAGAACATCAAAGAGTTTCTGCA
GTCCTTCGTGCACATCGTGCAGATGTTCATCAACACCAGCTAG IL-15Rα-Fc DNA sequence
(complexed with IL15-N72D)
(SEQ ID NO: 8)
ATGGGCTGGTCCTGCATCATCCTGTTTCTGGTGGCTACCGCCACCGGCAT
CACCTGTCCTCCACCCATGTCTGTGGAACACGCCGACATCTGGGTCAAGT
CCTACTCCCTGTACTCCAGAGAGCGGTACATCTGCAACTCCGGCTTCAAG
CGGAAGGCCGGCACCTCTAGCCTGACCGAGTGCGTGCTGAACAAGGCCAC
CAACGTGGCCCACTGGACCACCCCATCCCTGAAGTGCATCAGGGACCCTG
CCCTGGTGCATCAGAGGCCTGCTCCTCCATCCACCGTGACCACAGCTGGC
GTGACCCCTCAGCCTGAGTCCCTGAGCCCTTCCGGCAAAGAGCCAGCCGC
CTCCTCCCCTTCCTCTAACAATACCGCCGCTACCACCGCCGCCATCGTGC
CTGGATCTCAGCTGATGCCCTCCAAGTCCCCTTCCACCGGAACCACCGAG
ATCTCCAGCCACGAGTCCTCTCACGGCACCCCTTCTCAGACCACCGCCAA
GAACTGGGAGCTGACCGCCTCTGCCTCTCACCAGCCTCCAGGCGTGTACC
CTCAGGGCCACTCTGACACCACCGCCTCTACAAAGGGCCCAGACAAAACT
CACACATGCCCACCGTGCCCAGCACCTGAACTCCTGGGGGGACCGTCAGT

*CTTCCTCTTCCCCCCAAAACCCAAGGACACCCTCATGATCTCCCGGACCC*
*CTGAGGTCACATGCGTGGTGGTGGACGTGAGCCACGAAGACCCTGAGGTC*
*AAGTTCAACTGGTACGTGGACGGCGTGGAGGTGCATAATGCCAAGACAAA*
*GCCGCGGGAGGAGCAGTACAACAGCACGTACCGTGTGGTCAGCGTCCTCA*
*CCGTCCTGCACCAGGACTGGCTGAATGGCAAGGAGTACAAGTGCAAGGTC*
*TCCAACAAAGCCCTCCCAGCCCCCATCGAGAAAACCATCTCCAAAGCCAA*
*AGGGCAGCCCCGAGAACCACAGGTGTACACCCTGCCCCCATCCCGGGATG*
*AGCTGACCAAGAACCAGGTCAGCCTGACCTGCCTGGTCAAAGGCTTCTAT*
*CCCAGCGACATCGCCGTGGAGTGGGAGAGCAATGGGCAGCCGGAGAACAA*
*CTACAAGACCACGCCTCCCGTGCTGGACTCCGACGGCTCCTTCTTCCTCT*
*ACAGCAAGCTCACCGTGGACAAGAGCAGGTGGCAGCAGGGGAACGTCTTC*
*TCATGCTCCGTGATGCATGAGGCTCTGCACAACCACTACACGCAGAAGAG*
*CCTCTCCCTGTCTCCGGGTAAATGA*

N72D-DM IL-15 amino acid sequence
(SEQ ID NO: 17)
<u>MGWSCIILFLVATATG</u>NWVNVISDLKKIEDLIQSMHIDATLYTESDVHPS
CKVTAMKCFLLELQVISLESGDASIHDTVENLIILAN<u>D</u>SLSSNGNVTESG
CKECEELEEKNIKEFLQSFVHIVQMFINTS N72D-DM IL-15Rα-Fc amino acid sequence
(SEQ ID NO: 18)
<u>MGWSCIILFLVATATG</u>ITCPPPMSVEHADIWVKSYSLYSRERYICNSGFK
RKAGTSSLTECVLNKATNVAHWTTPSLKCIRDPALVHQRPAPPSTVTTAG
VTPQPESLSPSGKEPAASSPSSNNTAATTAAIVPGSQLMPSKSPSTGTTE
ISSHESSHGTPSQTTAKNWELTASASHQPPGVYPQGHSDTTASTKGPDKT
HTCPPCPAPELLGGP<u>D</u>VFLFPPKPKDTLMISRTPEVTCVVVDVSHEDPEV
KFNWYVDGVEVHNAKTKPREEQYNSTYRVVSVLTVLHQDWLNGKEYKCKV
SNKALP<u>LPE</u>EKTISKAKGQPREPQVYTLPPSRDELTKNQVSLTCLVKGF
YPSDIAVEWESNGQPENNYKTTPPVLDSDGSFFLYSKLTVDKSRWQQGNV
FSCSVMHEALHNHYTQKSLSLSPGK N72D-DM IL-15 DNA sequence
(SEQ ID NO: 19)
<u>ATGGGCTGGTCCTGCATCATCCTGTTTCTGGTGGCCACCGCCACCGGCAA</u>
CTGGGTCAACGTGATCTCCGACCTGAAGAAGATCGAGGACCTGATCCAGT
CCATGCACATCGACGCCACCCTGTACACCGAGTCCGACGTGCACCCCTCC
TGCAAAGTGACCGCCATGAAGTGCTTTCTGCTGGAACTGCAAGTGATCTC
CCTGGAATCCGGCGACGCCTCCATCCACGACACCGTGGAAAATCTGATCA
TCCTGGCCAAC<u>GAC</u>TCCCTGTCCTCCAACGGCAACGTGACCGAGAGCGGC
TGCAAAGAGTGCGAGGAACTGGAAGAGAAGAACATCAAAGAGTTTCTGCA
GTCCTTCGTGCACATCGTGCAGATGTTCATCAACACCAGCTAG N72D-DM IL-15Rα-Fc DNA sequence
(SEQ ID NO: 20)
<u>ATGGGCTGGTCCTGCATCATCCTGTTTCTGGTGGCTACCGCCACCGGCAT</u>
CACCTGTCCTCCACCCATGTCTGTGGAACACGCCGACATCTGGGTCAAGT
CCTACTCCCTGTACTCCAGAGAGCGGTACATCTGCAACTCCGGCTTCAAG
CGGAAGGCCGGCACCTCTAGCCTGACCGAGTGCGTGCTGAACAAGGCCAC CAACGTGGCCCACTGGACCACCCCATCCCTGAAGTGCATCAGGGACCCTG
CCCTGGTGCATCAGAGGCCTGCTCCTCCATCCACCGTGACCACAGCTGGC
GTGACCCCTCAGCCTGAGTCCCTGAGCCCTTCCGGCAAAGAGCCAGCCGC
CTCCTCCCCTTCCTCTAACATACCGCCGCTACCACCGCCGCCATCGTGCC
CTGGATCTCAGCTGATGCCCTCCAAGTCCCCTTCCACCGGAACCACCGAG
ATCTCCAGCCACGAGTCCTCTCACGGCACCCCTTCTCAGACCACCGCCAA
GAACTGGGAGCTGACCGCCTCTGCCTCTCACCAGCCTCCAGGCGTGTACC
CTCAGGGCCACTCTGACACCACCGCCTCTACAAAGGGCCCAGACAAAACT
CACACATGCCCACCGTGCCCAGCACCTGAACTCCTGGGGGGACCG<u>GAC</u>G
TCTTCCTCTTCCCCCCAAAACCCAAGGACACCCTCATGATCTCCCGGACC
CCTGAGGTCACATGCGTGGTGGTGGACGTGAGCCACGAAGACCCTGAGGT
CAAGTTCAACTGGTACGTGGACGGCGTGGAGGTGCATAATGCCAAGACAA
AGCCGCGGGAGGAGCAGTACAACAGCACGTACCGTGTGGTCAGCGTCCTC
ACCGTCCTGCACCAGGACTGGCTGAATGGCAAGGAGTACAAGTGCAAGGT
CTCCAACAAAGCCCTCCCA<u>CTC</u>CCC<u>GAG</u>GAGAAAACCATCTCCAAAGCC
AAAGGGCAGCCCCGAGAACCACAGGTGTACACCCTGCCCCCATCCCGGGA
TGAGCTGACCAAGAACCAGGTCAGCCTGACCTGCCTGGTCAAAGGCTTCT
ATCCCAGCGACATCGCCGTGGAGTGGGAGAGCAATGGGCAGCCGGAGAAC
AACTACAAGACCACGCCTCCCGTGCTGGACTCCGACGGCTCCTTCTTCCT
CTACAGCAAGCTCACCGTGGACAAGAGCAGGTGGCAGCAGGGGAACGTCT
TCTCATGCTCCGTGATGCATGAGGCTCTGCACAACCACTACACGCAGAAG
AGCCTCTCCCTGTCTCCGGGTAAATGAGTGCGACGGCCGGCAAGGGATCC WT-IL-15RαFL-hIgG2-Fc amino acid sequence
(SEQ ID NO: 33)
<u>MGWSCIILFLVATATG</u>ITCPPPMSVEHADIWVKSYSLYSRERYICNSGFK
RKAGTSSLTECVLNKATNVAHWTTPSLKCIRDPALVHQRPAPPSTVTTAG
VTPQPESLSPSGKEPAASSPSSNNTAATTAAIVPGSQLMPSKSPSTGTTE
ISSHESSHGTPSQTTAKNWELTASASHQPPGVYPQGHSDTTASTKGPERK
CCVECPPCPAPPVAGPSVFLFPPKPKDTLMISRTPEVTCVVVDVSHEDPE
VQFNWYVDGVEVHNAKTKPREEQFNSTFRVVSVLTVVHQDWLNGKEYKCK
VSNKGLPAPIEKTISKTKGQPREPQVYTLPPSREEMTKNQVSLTCLVKGF
YPSDISVEWESNGQPENNYKTTPPMLDSDGSFFLYSKLTVDKSRWQQGNV
FSCSVMHEALHNHYTQKSLSLSPGK WT-IL-15RαFL-hIgG3-Fc
(SEQ ID NO: 34)
<u>MGWSCIILFLVATATG</u>ITCPPPMSVEHADIWVKSYSLYSRERYICNSGFK
RKAGTSSLTECVLNKATNVAHWTTPSLKCIRDPALVHQRPAPPSTVTTAG
VTPQPESLSPSGKEPAASSPSSNNTAATTAAIVPGSQLMPSKSPSTGTTE
ISSHESSHGTPSQTTAKNWELTASASHQPPGVYPQGHSDTTASTKGPELK
TPLGDTTHTCPRCPEPKSCDTPPPCPRCPEPKSCDTPPPCPRCPEPKSCD
TPPPCPRCPAPELLGGPSVFLFPPKPKDTLMISRTPEVTCVVVDVSHEDP
EVQFKWYVDGVEVHNAKTKPREEQYNSTFRVVSVLTVLHQDWLNGKEYKC

KVSNKALPAPIEKTISKTKGQPREPQVYTLPPSREEMTKNQVSLTCLVKG

FYPSDIAVEWESSGQPENNYNTTPPMLDSDGSFFLYSKLTVDKSRWQQGN

IFSCSVMHEALHNRFTQKSLSLSPGK

WT-IL-15RαFL-hIgG4-Fc
(SEQ ID NO: 35)
MGWSCIILFLVATATGITCPPPMSVEHADIWVKSYSLYSRERYICNSGFK

RKAGTSSLTECVLNKATNVAHWTTPSLKCIRDPALVHQRPAPPSTVTTAG

VTPQPESLSPSGKEPAASSPSSNNTAATTAAIVPGSQLMPSKSPSTGTTE

ISSHESSHGTPSQTTAKNWELTASASHQPPGVYPQGHSDTTASTKGPESK

YGPPCPSCPAPEFLGGPSVFLFPPKPKDTLMISRTPEVTCVVVDVSQEDP

EVQFNWYVDGVEVHNAKTKPREEQFNSTYRVVSVLTVLHQDWLNGKEYKC

KVSNKGLPSSIEKTISKAKGQPREPQVYTLPPSQEEMTKNQVSLTCLVKG

FYPSDIAVEWESNGQPENNYKTTPPVLDSDGSFFLYSRLTVDKSRWQEGN

VFSCSVMHEALHNHYTQKSLSLSLGK

INT IL-15 amino acid sequence
(SEQ ID NO: 44)
MGWSCIILFLVATATGVHSNWQDVILDLEKIDNLIQSIHMDTTLYTESDV

HPSCKVTAMKCFLLELGVISLESGSHPIKEAVENLIILANSDLSSKGNIT

ETGCKECEELEEKSIKEFLQSFVHIVQMFINSS

INT IL-15RαFL-IgGB-Fc (functional hIgG1 analog)
amino acid sequence
(SEQ ID NO: 45)
MGWSCIILFLVATATGVHSITCPPPTSVKHADIQVKSYSVSSKERYTCNS

GFKRKAGTSSLTECVLNKTTNTAHWTIPSLKCIIMKHSSFHPQAHKCHVV

ILSPGDPSLTHLRPSSSDVPAGVTPEPESTSLSGKEPTFTSKSDTKVATK

PTIVPGSRPMPSKPPATGTTGLISNEPSSQAPSQTTAKALEHTPSASQET

PGTYSYNSGAVTASTTAPPKRENGRVPRPPDCPK*CPAPEMLGGPSVFIFP*

*PKPKDTLLIARTPEVTCWVDLDPEDPEVQISWFVDGKQMQTAKTQPREEQ*

*FNGTYRVVSVLPIGHQDWLKGKQFTCKVNNKALPSPIERTISKARGQAHQ*

*PSVYVLPPSREELSKNTVSLTCLIKDFFPPDIDVEWQSNGQQEPESKYRT*

*TPPQLDEDGSYFLYSKLSVDKSRWQRGDTFICAVMHEALHNHYTQESLSH*

*SPGK*

WT IL-15RαFL-IgA-Fc (functional hIgG2 analog)
amino acid sequence
(SEQ ID NO: 46)
MGWSCIILFLVATATGVHSITCPPPTSVKHADIQVKSYSVSSKERYTCNS

GFKRKAGTSSLTECVLNKTTNTAHWTIPSLKCIIMKHSSFHPQAHKCHVV

ILSPGDPSLTHLRPSSSDVPAGVTPEPESTSLSGKEPTFTSKSDTKVATK

PTIVPGSRPMPSKPPATGTTGLISNEPSSQAPSQTTAKALEHTPSASQET

PGTYSYNSGAVTASTTAPFNECRCTDTPPCPVPEP*LGGPSVLIFPPKPKD*

*ILRITRTPEVTCVVLDLGREDPEVQISWFVDGKEVHTAKTQSREQQFNGT*

*YRVVSVLPIEHQDWLTGKEFKCRVNHIDLPSPIERTISKARGRAHKPSVY*

*VLPPSPKELSSSDTVSITCLIKDFYPPDIDVEWQSNGQQEPERKHRMTPP*

*QLDEDGSYFLYSKLSVDKSRWQQGDPFTCAVMHETLQNHYTDLSLSHSPG*

*K*

WT IL-15RαFL-IgGC-Fc (functional hIgG3 analog)
amino acid sequence
(SEQ ID NO: 47)
MGWSCIILFLVATATGVHSITCPPPTSVKHADIQVKSYSVSSKERYTCNS

GFKRKAGTSSLTECVLNKTTNTAHWTIPSLKCIIMKHSSFHPQAHKCHVV

ILSPGDPSLTHLRPSSSDVPAGVTPEPESTSLSGKEPTFTSKSDTKVATK

PTIVPGSRPMPSKPPATGTTGLISNEPSSQAPSQTTAKALEHTPSASQET

PGTYSYNSGAVTASTTAPAKECECKCNCNNCPCPGCGLL*GGPSVFIFPPK*

*PKDILVTARTPTVTCVVVDLDPENPEVQISWFVDSKQVQTANTQPREEQS*

*NGTYRVVSVLPIGHQDWLSGKQFKCKVNNKALPSPIEEIISKTPGQAHQP*

*NVYVLPPSRDEMSKNTVTLTCLVKDFFPPEIDVEWQSNGQQEPESKYRMT*

*PPQLDEDGSYFLYSKLSVDKSRWQRGDTFICAVMHEALHNHYTQISLSHS*

*PGK*

WT IL15RαFL-IgGD-Fc (functional hIgG4 analog)
amino acid sequence
(SEQ ID NO: 48)
MGWSCIILFLVATATGVHSITCPPPTSVKHADIQVKSYSVSSKERYTCNS

GFKRKAGTSSLTECVLNKTTNTAHWTIPSLKCIIMKHSSFHPQAHKCHVV

ILSPGDPSLTHLRPSSSDVPAGVTPEPESTSLSGKEPTFTSKSDTKVATK

PTIVPGSRPMPSKPPATGTTGLISNEPSSQAPSQTTAKALEHTPSASQET

PGTYSYNSGAVTASTTAPPKESTCKCISPCPVPES*LGGPSVFIFPPKPKD*

*ILRITRTPEITCVVLDLGREDPEVQISWFVDGKEVHTAKTQPREQQFNST*

*YRVVSVLPIEHQDWLTGKEFKCRVNHIGLPSPIERTISKARGQAHQPSVY*

*VLPPSPKELSSSDTVTLTCLIKDFFPPEIDVEWQSNGQPEPESKYHTTAP*

*QLDEDGSYFLYSKLSVDKSRWQQGDTFTCAVMHEALQNHYTDLSLSHSPG*

*K*

Leader sequences are double-underlined; Fc domain sequences (the Hinge+CH$_2$+CH$_3$ regions) are italicized; junctional linkers are bolded; and mutations are bolded and double-underlined.

Exemplary canine amino acid sequences of the IL-15/IL-15Rα-Fc complexes of the present technology are disclosed below:

Leader sequences are double underlined; IgG hinge sequences are underlined; CH2-CH3 Fc domain sequences are italicized; junctional linkers are bolded; and mutations are bolded and double-underlined.

Exemplary rhesus amino acid sequences of the IL-15/IL-15Rα-Fc complexes of the present technology are disclosed below:

WT IL-15 amino acid sequence
(SEQ ID NO: 52)
MGWSCIILFLVATATGVHSNWVNVISDLKKIEDLIQSMHIDATLYTESDV

HPSCKVTAMKCFLLELQVISHESGDTDIHDTVENLIILANNILSSNGNIT

ESGCKECEELEEKNIKEFLQSFVHIVQMFINTS

WT IL15RαFL-IgG1-Fc amino acid sequence
(SEQ ID NO: 53)
MGWSCIILFLVATATGVHSITCPPPVSVEHADIRVKSYSLYSRERYICNS

GFKRKAGTSSLTECVLNKATNIAHWTTPSLKCIRDPLLARQRPALPFTVT

TAGVTPQPESLSPSGKEPAASSPSSNTTAATTAAIVPSSRLMPSTSSSTG

-continued

TTEIGSHESSHGPSQTTAKTWELTASASHQPPGVYPQGHSDTTASTKGPE

IKTCGGGSKPPTCPPCPAPELLGGPSVFLFPPKPKDTLMISRTPEVTCVV

VDVSQEDPDVKFNWYVNGAEVHHAQTKPRETQYNSTYRVVSVLTVTHQDW

LNGKEYTCKVSNKALPAPIQKTISKDKGQPREPQVYTLPPSREELTKNQV

SLTCLVKGFYPSDIVVEWESSGQPENTYKTTPPVLDSDGSYFLYSKLTVD

KSRWQQGNVFSCSVMHEALHNHYTQKSLSLSPGK

Leader sequences are double underlined; IgG hinge sequences are underlined; CH2-CH3 Fc domain sequences are italicized; junctional linkers are bolded; and mutations are bolded and double-underlined.

In one aspect, the present disclosure provides an IL-15/IL-15Rα-Fc complex or a multimer thereof, wherein the complex comprises a first polypeptide chain, a second polypeptide chain, a third polypeptide chain and a fourth polypeptide chain, wherein the first and second polypeptide chains are non-covalently bonded to one another, the second and third polypeptide chains are covalently bonded to one another, and the third and fourth polypeptide chain are non-covalently bonded to one another, wherein each of the second and third polypeptide chains comprise the IL-15Rα amino acid sequence of SEQ ID NO: 27, SEQ ID NO: 39, or SEQ ID NO: 50 and an Fc domain amino acid sequence of an immunoglobulin molecule (e.g., IgG1, IgG2, IgG3, IgG4, IgGA, IgGB, IgGC, IgGD), wherein the Fc domain amino acid sequence is linked to the C-terminus of the IL-15Rα amino acid sequence via a junctional linker comprising the sequence ASTKGP (SEQ ID NO: 24) or ASTTAP (SEQ ID NO: 36). Additionally or alternatively, in some embodiments, the Fc domain amino acid sequence comprises the sequence of any one of SEQ ID NOs: 29-32, 40-43, or 51. In certain embodiments of the IL-15/IL-15Rα-Fc complex or a multimer thereof, each of the first and fourth polypeptide chains independently comprise the amino acid sequence of any one of SEQ ID NOs: 1, 5, 17, 25, 26, 38, 44, 49 or 52. In some embodiments, the first polypeptide chain or the fourth polypeptide chain comprises the leader sequence MGWSCIILFLVATATG (SEQ ID NO: 28) or MGWSCIILFLVATATGVHS (SEQ ID NO: 37). Additionally or alternatively, in some embodiments, the second polypeptide chain or the third polypeptide chain comprises the leader sequence MGWSCIILFLVATATG (SEQ ID NO: 28) or MGWSCIILFLVATATGVHS (SEQ ID NO: 37). Additionally or alternatively, in some embodiments, the second and third polypeptide chains independently comprise the amino acid sequence of any one of SEQ ID NOs: 2, 6, 18, 33, 34, 35, 45-48, or 53. Additionally or alternatively, in some embodiments, the second and third polypeptide chains comprise one or more modifications selected from the group consisting of (i) O-glycosylation on Thr2 of the amino acid sequence of SEQ ID NO: 27 or SEQ ID NO: 50; (ii) O-glycosylation on Thr81 of the amino acid sequence of SEQ ID NO: 27 or SEQ ID NO: 50; (iii) O-glycosylation on Thr86 of the amino acid sequence of SEQ ID NO: 27 or SEQ ID NO: 50; (iv) N-glycosylation on Asn107 of the amino acid sequence of SEQ ID NO: 27 or SEQ ID NO: 50; (v) O-glycosylation on Thr156 of the amino acid sequence of SEQ ID NO: 27 or O-glycosylation on Thr155 of the amino acid sequence of SEQ ID NO: 50; (vi) O-glycosylation on Ser158 of the amino acid sequence of SEQ ID NO: 27 or O-glycosylation on Ser157 of the amino acid sequence of SEQ ID NO: 50; and (vii) O-glycosylated on Ser160 of the amino acid sequence of SEQ ID NO: 27 or O-glycosylated on Ser159 of the amino acid sequence of SEQ ID NO: 50.

Additionally or alternatively, in some embodiments, the second and third polypeptide chains comprise one or more modifications selected from the group consisting of (i) O-glycosylation on Thr2 of the amino acid sequence of SEQ ID NO: 39; (ii) O-glycosylation on Thr105 of the amino acid sequence of SEQ ID NO: 39; (iii) O-glycosylation on Thr174 of the amino acid sequence of SEQ ID NO: 39; (iv) O-glycosylation on Ser176 of the amino acid sequence of SEQ ID NO: 39; and (v) O-glycosylated on Ser178 of the amino acid sequence of SEQ ID NO: 39.

In one aspect, the present disclosure provides an IL-15/IL-15Rα-Fc complex or a multimer thereof, wherein the complex comprises a first polypeptide chain, a second polypeptide chain, a third polypeptide chain and a fourth polypeptide chain, wherein the first and second polypeptide chains are non-covalently bonded to one another, the second and third polypeptide chains are covalently bonded to one another, and the third and fourth polypeptide chain are non-covalently bonded to one another, wherein each of the first and fourth polypeptide chains comprise the amino acid sequence of any one of SEQ ID NOs: 1, 5, 17, 44, or 52; and wherein each of the second and third polypeptide chains independently comprise the amino acid sequence of any one of SEQ ID NOs: 2, 6, 18, 33, 34, 35, 45-48, or 53. In some embodiments, the multimer is a dimer, or a trimer.

Additionally or alternatively, in some embodiments, the amino acid sequences of the first and fourth polypeptide chains are identical. In other embodiments, the amino acid sequences of the first and fourth polypeptide chains are not identical. Additionally or alternatively, in some embodiments, the amino acid sequences of the second and third polypeptide chains are identical. In other embodiments, the amino acid sequences of the second and third polypeptide chains are not identical.

Additionally or alternatively, in some embodiments, the first and fourth polypeptide chains comprise the amino acid sequence of SEQ ID NO: 1 and the second and third polypeptide chains comprise the amino acid sequence of SEQ ID NO: 2. Additionally or alternatively, in some embodiments, the first and fourth polypeptide chains comprise the amino acid sequence of SEQ ID NO: 5 and the second and third polypeptide chains comprise the amino acid sequence of SEQ ID NO: 6. Additionally or alternatively, in some embodiments, the first and fourth polypeptide chains comprise the amino acid sequence of SEQ ID NO: 17 and the second and third polypeptide chains comprise the amino acid sequence of SEQ ID NO: 18. Additionally or alternatively, in some embodiments, the first and fourth polypeptide chains comprise the amino acid sequence of any one of SEQ ID NOs: 1, 5, or 17 and the second and third polypeptide chains comprise the amino acid sequence of any one of SEQ ID NOs: 33-35.

Additionally or alternatively, in some embodiments, the first and fourth polypeptide chains comprise the amino acid sequence of SEQ ID NO: 44 and the second and third polypeptide chains comprise the amino acid sequence of SEQ ID NO: 45. Additionally or alternatively, in some embodiments, the first and fourth polypeptide chains comprise the amino acid sequence of SEQ ID NO: 44 and the second and third polypeptide chains comprise the amino acid sequence of SEQ ID NO: 46. Additionally or alternatively, in some embodiments, the first and fourth polypeptide chains comprise the amino acid sequence of SEQ ID NO: 44 and the second and third polypeptide chains comprise the amino acid sequence of SEQ ID NO: 47. Additionally or alternatively, in some embodiments, the first and fourth polypeptide chains comprise the amino acid sequence of SEQ ID NO: 44 and the second and third polypeptide chains comprise the amino acid sequence of SEQ ID NO: 48.

Additionally or alternatively, in certain embodiments, the IL-15/IL-15Rα-Fc complex comprises glycosylated IL-15Rα-Fc, wherein the glycosylation of the IL-15Rα-Fc accounts for at least 20%, at least 25%, at least 30%, at least 35%, at least 40%, at least 45%, or at least 50% of the mass (molecular weight) of the IL-15Rα-Fc as assessed by techniques known to one of skill in the art. The percentage of the mass (molecular weight) of IL-15Rα-Fc (e.g., purified IL-15Rα-Fc) that glycosylation of IL-15Rα-Fc accounts for can be determined using, for example and without limitation, gel electrophoresis and quantitative densitometry of the gels, and comparison of the average mass (molecular weight) of a glycosylated form of IL-15Rα-Fc (e.g., a purified glycosylated form of IL-15Rα-Fc) to the non-glycosylated form of IL-15Rα-Fc (e.g., a purified non-glycosylated form of IL-15Rα-Fc). In some embodiments, the average mass (molecular weight) of IL-15Rα-Fc (e.g., purified IL-15Rα-Fc) can be determined using MALDI-TOF MS spectrum on Voyager De-Pro equipped with CovalX HM-1 high mass detector using sinapic acid as matrix, and the mass of a glycosylated form of IL-15Rα-Fc (e.g., purified glycosylated form of IL-15Rα-Fc) can be compared to the mass of the non-glycosylated form of IL-15Rα-Fc (e.g., purified non-glycosylated form of IL-15Rα-Fc) to determine the percentage of the mass that glycosylation accounts for the overall mass (molecular weight) of the IL-15Rα-Fc.

Nucleic acids, Vectors and Host Cells.

In one aspect, the present disclosure provides nucleic acid sequences of any of the IL-15 and IL-15Rα-Fc polypeptides disclosed herein and expression vectors and/or host cells including the same. In another aspect, the present disclosure provides the nucleic acid sequences of SEQ ID NOs: 3, 4, 7, 8, 19 or 20, and expression vectors and/or host cells expressing the same.

The IL-15 and IL-15Rα-Fc nucleic acids described herein can be inserted into expression vectors to achieve expression in mammalian cells, bacteria, yeast, and viruses. IL-15 and IL-15Rα-Fc can be recombinantly expressed from the same expression vector (e.g., using a bicistronic expression vector) or from different expression vectors (e.g., using monocistronic expression vectors). In one embodiment, IL-15 and IL-15Rα-Fc can be recombinantly expressed from a single expression vector comprising two individual open reading frames (ORF) of IL-15 and IL-15Rα-Fc.

The expression vectors may comprise one or more transcriptional regulatory element(s) operably linked to the coding sequence of IL-15 and/or IL-15Rα-Fc. The transcriptional regulatory elements are typically 5' to the coding sequence and direct the transcription of the nucleic acids encoding IL-15 and/or IL-15Rα-Fc. In some embodiments, one or more of the transcriptional regulatory elements that are found in nature to regulate the transcription of the native IL-15 and/or native IL-15Rα gene are used to control transcription. In other embodiments, one or more transcriptional regulatory elements that are heterologous to the native IL-15 and/or native IL-15Rα gene are used to control transcription. Any transcriptional regulatory element(s) known to one of skill in the art may be used. Non-limiting examples of the types of transcriptional regulatory element (s) include a constitutive promoter, a tissue-specific promoter, and an inducible promoter. In certain embodiments, transcription is controlled, at least in part, by a mammalian transcriptional regulatory element.

Specific examples of promoters which may be used to control transcription include, but are not limited to, the SV40 early promoter region (Bernoist & Chambon, 1981, Nature 290:304-310), the promoter contained in the 3' long terminal repeat of Rous sarcoma virus (Yamamoto et al., 1980, Cell 22:787-797), the herpes thymidine kinase promoter (Wagner et al., 1981, Proc. Natl. Acad. Sci. U.S.A. 78:1441-1445), the regulatory sequences of the metallothionein gene (Brinster et al., 1982, Nature 296:39-42); adenovirus (ADV) promoter, cytomegalovirus (CMV) promoter, bovine papilloma virus (BPV) promoter, parvovirus B19p6 promoter, prokaryotic expression vectors such as the beta-lactamase promoter (Villa-Kamaroff et al., 1978, Proc. Natl. Acad. Sci. 75:3727-3731), or the tac promoter (DeBoer et al., 1983, Proc. Natl. Acad. Sci. 80:21-25); see also "Useful proteins from recombinant bacteria" in Scientific American, 1980, 242:74-94; plant expression vectors comprising the nopaline synthetase promoter region (Herrera-Estrella et al., Nature 303:209-213) or the cauliflower mosaic virus 35S RNA promoter (Gardner, et al., 1981, Nucl. Acids Res. 9:2871), and the promoter of the photosynthetic enzyme ribulose biphosphate carboxylase (Herrera-Estrella et al., 1984, Nature 310:115-120); promoter elements from yeast or other fungi such as the Gal4 promoter, the ADC (alcohol dehydrogenase) promoter, PGK (phosphoglycerol kinase) promoter, alkaline phosphatase promoter, and the following animal transcriptional control regions, which exhibit tissue specificity and have been utilized in transgenic animals: elastase I gene control region which is active in pancreatic acinar cells (Swift et al., 1984, Cell 38:639-646; Ornitz et al., 1986, Cold Spring Harbor Symp. Quant. Biol. 50:399-409; MacDonald, 1987, Hepatology 7:425-515); insulin gene control region which is active in pancreatic beta cells (Hanahan, 1985, Nature 315:115-122), immunoglobulin gene control region which is active in lymphoid cells (Grosschedl et al., 1984, Cell 38:647-658; Adames et al., 1985, Nature 318:533-538; Alexander et al., 1987, Mol. Cell. Biol. 7:1436-1444), mouse mammary tumor virus control region which is active in testicular, breast, lymphoid and mast cells (Leder et al., 1986, Cell 45:485-495), albumin gene control region which is active in liver (Pinkert et al., 1987, Genes and Devel. 1:268-276), alpha-fetoprotein gene control region which is active in liver (Krumlauf et al., 1985, Mol. Cell. Biol. 5:1639-1648; Hammer et al., 1987, Science 235:53-58; alpha 1-antitrypsin gene control region which is active in the liver (Kelsey et al., 1987, Genes and Devel. 1:161-171), beta-globin gene control region which is active in myeloid cells (Mogram et al., 1985, Nature 315:338-340; Kollias et al., 1986, Cell 46:89-94; myelin basic protein gene control region which is active in oligodendrocyte cells in the brain (Readhead et al., 1987, Cell 48:703-712); myosin light chain-2 gene control region which is active in skeletal muscle (Sani, 1985, Nature 314:283-286), and gonadotropic releasing hormone gene control region which is active in the hypothalamus (Mason et al., 1986, Science 234:1372-1378). In other embodiments, an inducible promoter can be used.

The expression vectors also may comprise one or more post-transcriptional regulatory element(s) operably linked to the coding sequence of IL-15 and/or IL-15Rα-Fc. The post-transcriptional regulatory elements can be 5' and/or 3' to the coding sequence and direct the post-transcriptional regulation of the translation of RNA transcripts encoding IL-15 and/or IL-15Rα-Fc.

The expression vector chosen will depend upon a variety of factors, including, without limitation, the strength of the transcriptional regulatory elements and the host cell to be used to express IL-15 and/or IL-15Rα-Fc. The expression vectors can be a plasmid, phagemid, cosmid, viral vector, phage, artificial chromosome, and the like. In one aspect, the vectors can be episomal or non-homologously integrating vectors, which can be introduced into the appropriate host cells by any suitable means (transformation, transfection, conjugation, protoplast fusion, electroporation, calcium phosphate-precipitation, direct microinjection, infection with viruses, including but not limited to adenoviruses, lentiviruses, and retroviruses etc.) to transform them.

The expression vectors can be a plasmid or a stable integration vector for transient or stable expression of IL-15 and/or IL-15Rα-Fc in host cells. For stable expression, the vector can mediate chromosomal integration at a target site or a random chromosomal site. Non-limiting examples of host cell-vector systems that may be used to express IL-15 and/or IL-15Rα-Fc include mammalian cell systems infected with virus (e.g., vaccinia virus, adenovirus, retroviruses, lentiviruses, etc.); insect cell systems infected with virus (e.g., baculovirus); microorganisms such as yeast containing yeast vectors, or bacteria transformed with bacteriophage, DNA, plasmid DNA, or cosmid DNA; and stable cell lines generated by transformation using a selectable marker. In some embodiments, the expression vectors include a selectable marker gene including, but not limited to, neo, gpt, dhfr, ada, pac, hyg, CAD and hisD.

The expression vectors can be monocistronic or multicistronic. A multicistronic expression vector may encode 2, 3, 4, 5, 6, 7, 8, 9, 10 or more, or in the range of 2-5, 5-10 or 10-20 genes/nucleotide sequences. For example, a bicistronic expression vector may comprise in the following order a promoter, a first gene sequence (e.g., IL-15), and a second gene sequence (e.g., IL-15Rα-Fc). In such an expression vector, the transcription of both genes is driven by the same promoter, whereas the translation of the mRNA from the first gene sequence is by a cap-dependent scanning mechanism and the translation of the mRNA from the second gene sequence is by a cap-independent mechanism, e.g., by an IRES.

The expression vector(s) comprising nucleic acids encoding IL-15 and/or IL-15Rα-Fc can be administered in vivo to a mammal or transfected into primary or immortalized cells in culture. The expression vectors comprising nucleic acids encoding IL-15 and/or IL-15Rα-Fc can be used to generate cells that express IL-15 and/or IL-15Rα-Fc. In some embodiments, the cells are primary cells (e.g., tumor cells isolated from a patient). In other embodiments, the cells are mammalian cell lines.

The host cells chosen for expression of nucleic acids will depend upon the intended use of the cells. Factors such as whether a cell glycosylates similar to cells that endogenously express, e.g., IL-15 and/or IL-15Rα-Fc, may be considered in selecting the host cells.

Non-limiting examples of hosts cells that can be used to express the protein(s) encoded by the expression vectors herein include mammalian cells, bacterial cells, yeast cells, primary cells, immortalized cells, plant cells and insect cells. In a specific embodiment, the host cells are a mammalian cell line. Examples of mammalian cell lines include, but are not limited to, COS, CHO, HeLa, NIH3T3, HepG2, MCF7, HEK 293, HEK 293T, RD, PC12, hybridomas, pre-B cells, 293, 293H, K562, SkBr3, BT474, A204, MO7Sb, TFβ1, Raji, Jurkat, MOLT-4, CTLL-2, MC-IXC, SK-N-MC, SK-N-MC, SK-N-DZ, SH-SY5Y, C127, NO, and BE(2)-C cells. Other mammalian cell lines available as hosts for expression are known in the art and include many immortalized cell lines available from the American Type Culture Collection (ATCC). In another embodiment, the host cells are immortalized cell lines derived from a subject. In another embodiment, the host cells are primary or secondary cells from a subject. In a particular embodiment, the host cells are cancer cells. In another embodiment, the host cells are irradiated cells. In a particular embodiment, the host cells are irradiated mammalian cell lines or primary cells from a subject. In another embodiment, the host cells are epithelial cells or endothelial cells. In another embodiment, the host cells are fetal/embryonic cells. In some embodiments, the host cells are progenitor cells. In some embodiments, the host cells are lymphocytes (e.g., T cells and B cells). In another embodiment, the host cells are stem cells.

For long-term, high-yield production of the recombinant IL-15 and IL-15Rα-Fc polypeptides disclosed herein, stable cell lines can be generated. For example, cell lines can be transformed using the expression vectors described herein which may contain a selectable marker gene on the same or on a separate expression vector. The selectable marker gene can be introduced into the same cell by co-transfection. Following the introduction of the vector, cells are allowed to grow for 1-2 days in an enriched media before they are switched to selective media to allow growth and recovery of cells that successfully express the introduced nucleic acids. Resistant clones of stably transformed cells may be proliferated using tissue culture techniques well known in the art that are appropriate to the cell type. In some embodiments, the cell line has been adapted to grow in serum-free medium. In certain embodiments, the cell line has been adapted to grow in serum-free medium in shaker flasks. In other embodiments, the cell line has been adapted to grow in stir or rotating flasks. In certain embodiments, the cell line is cultured in suspension. In some embodiments, the cell line is not adherent or has been adapted to grow as nonadherent cells. In certain embodiments, the cell line has been adapted to grow in low calcium conditions. In some embodiments, the cell line is cultured or adapted to grow in low serum medium. Other methods of high-yield production of recombinant polypeptides include the use of dihydro folate reductase (DHFR) amplification in DHFR-deficient CHO cells, by the use of successively increasing levels of methotrexate as described in U.S. Pat. No. 4,889,803, which is incorporated by reference herein in its entirety. The polypeptide obtained from such cells may be in a glycosylated form.

In some embodiments, a host cell recombinantly expresses an IL-15Rα-Fc polypeptide that is glycosylated (N- or O-glycosylated) at certain amino acid residues.

In one embodiment, cell lines are engineered to express both the IL-15 and IL-15Rα-Fc polypeptides of the present technology, and the purified stable complexes of the IL-15 and IL-15Rα-Fc, which can be used in vitro or in vivo, e.g., can be administered to a human. In one embodiment, the stability of IL-15 is increased when produced from cell lines recombinantly expressing both the IL-15 and IL-15Rα-Fc polypeptides of the present technology. The nucleic acids encoding IL-15 and/or IL-15Rα-Fc can be used to generate mammalian cells that recombinantly express IL-15 and IL-15Rα-Fc in high amounts for the isolation and purification of IL-15 and IL-15Rα-Fc, where preferably the IL-15 and the IL-15Rα-Fc are associated as complexes. In one embodiment, high amounts of IL-15/IL-15Rα-Fe complexes refer to amounts of IL-15/IL-15Rα-Fc complexes expressed by cells that are at least 1 fold, 2 fold, 3 fold, 4 fold, 5 fold, 6 fold, 7 fold, 8 fold, 9 fold, 10 fold, 20 fold, or more than 20 fold higher than amounts of IL-15/IL-15Rα-Fc complexes expressed endogenously by control cells (e.g., cells comprising an empty vector). In some embodiments, a host cell described herein expresses approximately 0.1 pg to 25 pg, 0.1 pg to 20 pg, 0.1 pg to 15 pg, 0.1 pg to 10 pg, 0.1 pg to 5 pg, 0.1 pg to 2 pg, 2 pg to 10 pg, or 5 to 20 pg of IL-15 as measured by a technique known to one of skill in the art (e.g., an ELISA). In certain embodiments, a host cell described herein expresses approximately 0.1 to 0.25 pg per day, 0.25 to 0.5 pg per day, 0.5 to 1 pg per day, 1 to 2 pg per day, 2 to 5 pg per day, or 5 to 10 pg per day of IL-15 as measured by a technique known to one of skill in the art (e.g., an ELISA). In certain embodiments, a population of host cells that recombinantly expresses IL-15 and IL-15Rα-Fc, expresses between 200 ng/million cells per day to 20,000 ng/million cells per day, 200 ng/million cells per day to 15,000 ng/million cells per day, 200 ng/million cells per day to 10,000 ng/million cells per day, 200 ng/million cells per day to 5,000 ng/million cells per day, 200 ng/million cells per day to 2,000 ng/million cells per day, 200 ng/million cells per day to 1,000 ng/million cells per day, 200 ng/million cells per day to 600 ng/million cells per day, 200 ng/million cells per day to 500 ng/million cells per day, 300 ng/million cells per day to 600 ng/million cells per day of IL-15. In some embodiments, a population of host cells that recombinantly expresses IL-15 and IL-15Rα-Fc, expresses about 200 ng/million cells per day, about 300 ng/million cells per day, about 400 ng/million cells per day, about 500 ng/million cells per day, about 600 ng/million cells per day, about 700 ng/million cells per day, about 800 ng/million cells per day, about 900 ng/million cells per day, about 1,000 ng/million cells per day, about 1,500 ng/million cells per day, about 2,000 ng/million cells per day, about 5,000 ng/million cells per day, about 10,000 ng/million cells per day, about 15,000 ng/million cells per day, or about 20,000 ng/million cells per day of IL-15.

Recombinant IL-15 and IL-15Rα-Fc can be purified using methods of recombinant protein production and purification are well known in the art, e.g., see International Publication No. WO 07/070488, which is incorporated by reference herein in its entirety. Briefly, the polypeptide can be produced intracellularly, in the periplasmic space, or directly secreted into the medium. Cell lysate or supernatant comprising the polypeptide can be purified using, for example, hydroxylapatite chromatography, gel electrophoresis, dialysis, and affinity chromatography. Other techniques for protein purification such as fractionation on an ion-exchange column, ethanol precipitation, Reverse Phase HPLC, chromatography on silica, chromatography on heparin SEPHAROSE™ (gel filtration substance; Pharmacia Inc., Piscataway, N.J.) chromatography on an anion or cation exchange resin (such as a polyaspartic acid column), chromatofocusing, SDS-PAGE, and ammonium sulfate precipitation are also available.

In some embodiments, IL-15 and IL-15Rα-Fc are synthesized or recombinantly expressed by different cells and subsequently isolated and combined to form an IL-15/IL-15Rα-Fc complex, in vitro, prior to administration to a subject. In other embodiments, IL-15 and IL-15Rα-Fc are synthesized or recombinantly expressed by different cells and subsequently isolated and simultaneously administered to a subject an IL-15/IL-15Rα-Fc complex in situ or in vivo. In some embodiments, IL-15 and IL-15Rα-Fc are synthesized or expressed together by the same cell, and the IL-15/IL-15Rα-Fc complex formed within the cell is isolated.

In certain aspects, host cells that recombinantly express the IL-15 and IL-15Rα-Fc polypeptides described herein are administered to a subject as part of a gene therapy protocol.

Compositions

Provided herein are compositions comprising the IL-15/IL-15Rα-Fc complexes of the present technology. The compositions include bulk drug compositions useful in the manufacture of pharmaceutical compositions (e.g., impure or non-sterile compositions) and pharmaceutical compositions (i.e., compositions that are suitable for administration to a subject or patient) which can be used in the preparation of unit dosage forms. The compositions (e.g., pharmaceutical compositions) comprise an effective amount of an IL-15/IL-15Rα-Fc complex of the present technology and a pharmaceutically acceptable carrier. In certain embodiments, the compositions (e.g., pharmaceutical compositions) comprise an effective amount of one or more IL-15/IL-15Rα-Fc complexes of the present technology and a pharmaceutically acceptable carrier. In some embodiments, the composition further comprises an additional therapeutic, e.g., anti-cancer agent, anti-viral agent, anti-inflammatory agent, adjuvant. Non-limiting examples of such therapeutics are described herein.

The term "carrier" refers to a diluent, adjuvant (e.g., Freund's adjuvant (complete and incomplete) or MF59C.1 adjuvant available from Chiron, Emeryville, Calif.), excipient, or vehicle with which the therapeutic is administered. Such pharmaceutical carriers can be sterile liquids, such as water and oils, including those of petroleum, animal, vegetable or synthetic origin, such as peanut oil, soybean oil, mineral oil, sesame oil and the like. In some embodiments, the carrier is water. Saline solutions and aqueous dextrose and glycerol solutions can also be employed as liquid carriers, particularly for injectable solutions. Suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like. The composition, if desired, can also contain wetting or emulsifying agents, or pH buffering agents. These compositions can take the form of solutions, suspensions, emulsion, tablets, pills, capsules, powders, sustained-release formulations and the like. Pharmaceutical compositions may be formulated in any conventional manner using one or more pharmaceutically acceptable carriers or excipients.

Generally, the components of the pharmaceutical compositions comprising IL-15/IL-15Rα-Fc complexes of the present technology are supplied either separately or mixed together in unit dosage form, for example, as a dry lyophilized powder or water free concentrate in a hermetically sealed container such as an ampoule or sachette indicating the quantity of active agent. Where the IL-15/IL-15Rα-Fc complex is to be administered by infusion, it can be dispensed with an infusion bottle containing sterile pharmaceutical grade water or saline (e.g., PBS). Where the IL-15/IL-15Rα-Fc complex is administered by injection, an ampoule of sterile water for injection or saline can be provided so that the ingredients may be mixed prior to administration.

In some embodiments, IL-15/IL-15Rα-Fc complexes of the present technology may be formulated for administration by any method known to one of skill in the art, including but not limited to, orally, intranasally, parenterally (intravenously, intramuscularly, intraperitoneally, or subcutaneously), rectally, intracranially, intrathecally, intratumorally, or topically. In certain embodiments, the IL-15/IL-15Rα-Fc complexes of the present technology are formulated for local or systemic parenteral administration. In other embodiments, the IL-15/IL-15Rα-Fc complexes of the present technology are formulated for subcutaneous or intravenous administration. In one embodiment, the IL-15/IL-15Rα-Fc complexes of the present technology are formulated in a pharmaceutically compatible solution.

The IL-15/IL-15Rα-Fc complexes of the present technology can be formulated for parenteral administration by injection, e.g., by bolus injection or continuous infusion. Formulations for injection may be presented in unit dosage form, e.g., in ampoules or in multi-dose containers, with an added preservative. The compositions may take such forms as suspensions, solutions or emulsions in oily or aqueous vehicles, and may contain formulatory agents such as suspending, stabilizing and/or dispersing agents. Alternatively, the active ingredient may be in powder form for constitution with a suitable vehicle, e.g., sterile pyrogen-free water, before use.

Uses of the IL-15/IL-15Rα-Fc Complexes of the Present Technology

In one aspect, provided herein are methods for enhancing IL-15-mediated immune function in a subject in need thereof, comprising administering to the subject an effective amount of an IL-15/IL-15Rα-Fc complex of the present technology or a multimer (e.g., a trimer) thereof. The IL-15/IL-15Rα-Fc complexes of the present technology or multimers (e.g., trimers) thereof bind to the βγ subunits of the IL-15 receptor, induce IL-15 signal transduction and enhance IL-15-mediated immune function.

In some embodiments, the methods described herein maintain plasma levels of IL-15 above basal levels for approximately 18 to 24 hours or approximately 24 to 36 hours, or approximately 36 to 48 hours following administration of the IL-15/IL-15Rα-Fc complexes of the present technology. Basal plasma levels of IL-15 are approximately 1 pg/ml in humans, approximately 8-10 pg/ml in monkeys (such as macaques), and approximately 12 pg/m in rodents (such as mice). Thus, in certain embodiments, the methods described herein maintain IL-15 plasma levels above approximately 1 pg/ml in humans, above approximately 8-10 pg/ml in monkeys (such macaques) and above 12 pg/ml in rodents (such as mice). Without wishing to be bound by any theory, the stability of the IL-15 plasma levels is believed to maximize lymphocyte growth and activation while minimizing any side effects associated with IL-15 administration.

In some embodiments, the methods described herein maintain plasma levels of IL-15 above basal levels for at least 18 hours, at least 20 hours, at least 22 hours, at least 24 hours, at least 28 hours, at least 30 hours, at least 32 hours, at least 34 hours, at least 36 hours, at least 38 hours, at least 40 hours, at least 42 hours, at least 44 hours, at least 46 hours, or at least 48 hours. In certain embodiments, the methods described herein maintain IL-15 plasma levels above basal levels for approximately 18 to 24 hours, approximately 22 to 24 hours, approximately 24 to 28 hours, approximately 24 to 30 hours, approximately 26 to 32 hours, approximately 28 to 32 hours, approximately 30 to 36 hours, approximately 32 to 38 hours, approximately 34 to 38 hours, approximately 36 to 42 hours, approximately 38 to 45 hours, approximately 38 hours, or approximately 40 to 48 hours. Techniques known to one skilled in the art can be utilized to measure IL-15 plasma levels, such as ELISA.

In a specific embodiment, the methods described herein maintain IL-15 plasma levels of about 1 pg/ml to 10,000 mg/ml (in certain embodiments, 5,000 pg/ml to 10,000 pg/ml, 1,000 pg/ml to 5,000 pg/ml, 1,000 pg/ml to 2,500 pg/ml, or 1,000 to 2,000 pg/ml, or 100 pg/ml to 1,000 pg/ml, 1 pg/ml to 1,000 pg/ml, or 100 pg/ml to 1,000 pg/ml) for at least 18 hours, at least 20 hours, at least 22 hours, at least 24 hours, at least 28 hours, at least 30 hours, at least 32 hours, at least 34 hours, at least 36 hours, at least 38 hours, at least 40 hours, at least 42 hours, at least 44 hours, at least 46 hours, or at least 48 hours. In another embodiment, the methods described herein maintain IL-15 plasma levels of about 1 pg/ml to 10,000 mg/ml (in certain embodiments, 5,000 pg/ml to 10,000 pg/ml, 1,000 pg/ml to 5,000 pg/ml, 1,000 pg/ml to 2,500 pg/ml, or 1,000 to 2,000 pg/ml, or 100 pg/ml to 1,000 pg/ml, 1 pg/ml to 1,000 pg/ml, or 100 pg/ml to 1,000 pg/ml) for approximately 18 to 24 hours, approximately 22 to 24 hours, approximately 24 to 28 hours, approximately 24 to 30 hours, approximately 26 to 32 hours, approximately 28 to 32 hours, approximately 30 to 36 hours, approximately 32 to 38 hours, approximately 34 to 38 hours, approximately 36 to 42 hours, approximately 38 to 45 hours, approximately 38 hours, or approximately 40 to 48 hours.

In another embodiment, the methods described herein maintain IL-15 plasma levels of at least 10 pg/ml, at least 20 pg/ml, at least 30 pg/ml, at least 40 pg/ml, at least 50 pg/ml, at least 60 pg/ml, at least 70 pg/ml, at least 80 pg/ml, at least 90 pg/ml, at least 100 pg/ml, at least 200 pg/ml, at least 300 pg/ml, at least 400 pg/ml, or at least 500 pg/ml for at least 18 hours, at least 20 hours, at least 22 hours, at least 24 hours, at least 28 hours, at least 30 hours, at least 32 hours, at least 34 hours, at least 36 hours, at least 38 hours, at least 40 hours, at least 42 hours, at least 44 hours, at least 46 hours, or at least 48 hours. In another embodiment, the methods described herein maintain IL-15 plasma levels of at least 600 pg/ml, at least 700 pg/ml, at least 800 pg/ml, at least 1,000 pg/ml, at least 1,200 pg/ml, at least 1,500 pg/ml, at least 1,750 pg/ml, at least 2,000 pg/ml, at least 5,000 pg/ml, at least 7,500 pg/ml, or at least 10,000 mg/ml for at least 18 hours, at least 20 hours, at least 22 hours, at least 24 hours, at least 28 hours, at least 30 hours, at least 32 hours, at least 34 hours, at least 36 hours, at least 38 hours, at least 40 hours, at least 42 hours, at least 44 hours, at least 46 hours, or at least 48 hours.

Additionally or alternatively, in some embodiments, an IL-15/IL-15Rα-Fc complex of the present technology enhances or induces immune function in a subject by at least 99%, at least 95%, at least 90%, at least 85%, at least 80%, at least 75%, at least 70%, at least 60%, at least 50%, at least 45%, at least 40%, at least 45%, at least 35%, at least 30%, at least 25%, at least 20%, or at least 10% relative to the immune function in a subject not administered the IL-15/IL-15Rα-Fc complex using assays well known in the art, e.g., ELISPOT, ELISA, and cell proliferation assays. In some embodiments, the immune function is cytokine release (e.g., interferon-gamma, IL-2, IL-5, IL-10, IL-12, or transforming growth factor (TGF)-beta). Additionally or alternatively, in some embodiments, the IL-15 mediated immune function is NK cell proliferation, which can be assayed, e.g., by flow cytometry to detect the number of cells expressing markers of NK cells (e.g., CD56). Additionally or alternatively, in some embodiments, the immune function enhanced by the IL-15/IL-15Rα-Fc complex of the present technology is antibody production (which can be assayed, e.g., by ELISA), or effector function, which can be assayed, e.g., by a cytotoxicity assay or other assays well known in the art. Additionally or alternatively, in some embodiments, the immune function enhanced by the IL-15/IL-15Rα-Fc complex of the present technology includes the proliferation/expansion of lymphocytes (e.g., increase in the number of lymphocytes), inhibition of apoptosis of lymphocytes, activation of dendritic cells (or antigen presenting cells), and/or antigen presentation.

Additionally or alternatively, in certain embodiments, an immune function enhanced by the IL-15/IL-15Rα-Fc complex of the present technology is proliferation/expansion in the number of or activation of $CD4^+$ T cells (e.g., Th1 and Th2 helper T cells), $CD8^+$ T cells (e.g., cytotoxic T lymphocytes, alpha/beta T cells, and gamma/delta T cells), B cells (e.g., plasma cells), memory T cells, memory B cells, dendritic cells (immature or mature), antigen presenting cells, macrophages, mast cells, natural killer T cells (NKT cells), tumor-resident T cells, $CD122^+$ T cells, and/or natural killer cells (NK cells). In some embodiments, the IL-15/IL-15Rα-Fc complex of the present technology enhances the proliferation/expansion or number of lymphocyte progenitors. In certain embodiments, an IL-15/IL-15Rα-Fc complex of the present technology increases the number of one or more of $CD4^+$ T cells (e.g., Th1 and Th2 helper T cells), $CD8^+$ T cells (e.g., cytotoxic T lymphocytes, alpha/beta T cells, gamma/delta T cells), B cells (e.g., plasma cells), memory T cells, memory B cells, dendritic cells (immature or mature), antigen presenting cells, macrophages, mast cells, natural killer T cells (NKT cells), tumor-resident T cells, CD122 T cells, and/or natural killer cells (NK cells) by approximately 1 fold, 2 fold, 3 fold, 4 fold, 5 fold, 6 fold, 7 fold, 8 fold, 9 fold, 10 fold, 20 fold, or more relative to a negative control (e.g., number of the respective cells observed in the absence of the IL-15/IL-15Rα-Fc complex).

The effect of one or more doses of an IL-15/IL-15Rα-Fc complex of the present technology on peripheral blood lymphocyte counts can be monitored/assessed using standard techniques known to one of skill in the art. Peripheral blood lymphocyte counts in a mammal can be determined by, e.g., obtaining a sample of peripheral blood from said mammal, separating the lymphocytes from other components of peripheral blood such as plasma using, e.g., Ficoll-Hypaque (Pharmacia) gradient centrifugation, and counting the lymphocytes using trypan blue. Peripheral blood T cell counts in mammal can be determined by, e.g., separating the lymphocytes from other components of peripheral blood such as plasma using, e.g., a use of Ficoll-Hypaque (Pharmacia) gradient centrifugation, labeling the T cells with an antibody directed to a T cell antigen such as CD3, CD4, and CD8 which is conjugated to FITC or phycoerythrin, and measuring the number of T cells by FACS. Further, the effect on a particular subset of T cells (e.g., $CD^{2+}$, $CD^{4+}$, $CD^{8+}$, $CD^{4+}RO^+$, $CD8^+RO$ $CD^+RA^+$ or $CD8^+RA^+$) or NK cells can be determined using standard techniques known to one of skill in the art such as FACS.

In another aspect, the present disclosure provides methods for promoting activation of antibody-dependent cell-mediated cytotoxicity (ADCC) in a subject in need thereof, comprising administering to the subject an effective amount of an IL-15/IL-15Rα-Fc complex of the present technology or a multimer (e.g., a trimer) thereof.

In one aspect, the present disclosure provides methods for promoting T cell cytotoxicity or NK cell cytotoxicity in a subject in need thereof, comprising administering to the subject an effective amount of an IL-15/IL-15Rα-Fc complex of the present technology or a multimer (e.g., a trimer) thereof.

In another aspect, the present disclosure provides methods for potentiating the therapeutic efficacy of antibody-mediated immunotherapy in a subject in need thereof, comprising administering to the subject an effective amount of an IL-15/IL-15Rα-Fc complex of the present technology or a multimer (e.g., a trimer) thereof, and an effective amount of a therapeutic antibody. In some embodiments, the IL-15/IL-15Rα-Fc complex or multimer, and the therapeutic antibody are administered sequentially, separately, or simultaneously. Additionally or alternatively, in some embodiments the therapeutic antibody binds to an antigen of a tumor target or an antigen of a pathogen. Examples of tumor targets include, but are not limited to GPA33, HER2/neu, GD2, MAGE-1, MAGE-3, BAGE, GAGE-1, GAGE-2, MUM-1, CDK4, N-acetylglucosaminyltransferase, p15, gp75, beta-catenin, ErbB2, cancer antigen 125 (CA-125), carcinoembryonic antigen (CEA), RAGE, MART (melanoma antigen), MUC-1, MUC-2, MUC-3, MUC-4, MUC-5ac, MUC-16, MUC-17, tyrosinase, Pmel 17 (gp100), GnT-V intron V sequence (N-acetylglucosaminyltransferase V intron V sequence), Prostate cancer psm, PRAME (melanoma antigen), β-catenin, EBNA (Epstein-Barr Virus nuclear antigen) 1-6, p53, lung resistance protein (LRP) Bcl-2, prostate specific antigen (PSA), Ki-67, CEACAM6, colon-specific antigen-p (CSAp), HLA-DR, CD40, CD74, CD138, EGFR, EGP-1, EGP-2, VEGF, PlGF, insulin-like growth factor (ILGF), tenascin, platelet-derived growth factor, IL-6, CD20, CD19, PSMA, CD33, CD123, MET, DLL4, Ang-2, HER3, IGF-1R, CD30, TAG-72, SPEAP, CD45, L1-CAM, Lewis Y ($Le^y$) antigen, E-cadherin, V-cadherin, and EpCAM.

In yet another aspect, the present disclosure provides methods for potentiating the cytotoxicity of an antibody-drug conjugate in a subject in need thereof, comprising administering to the subject an effective amount of an IL-15/IL-15Rα-Fc complex of the present technology or a multimer (e.g., a trimer) thereof, and an effective amount of an antibody-drug conjugate. In some embodiments, the IL-15/IL-15Rα-Fc complex or multimer, and the antibody-drug conjugate are administered sequentially, separately, or simultaneously. Additionally or alternatively, in some embodiments, the antibody-drug conjugate comprises an antibody conjugated to a DOTA chelating agent, a chemotherapeutic agent, a peptide, a polypeptide, a nucleic acid, an antibiotic, an inorganic or organic molecule, an antiviral agent, or any combination thereof. Additionally or alternatively, in some embodiments the antibody binds to an antigen of a tumor target or an antigen of a pathogen. Examples of tumor targets include, but are not limited to GPA33, HER2/neu, GD2, MAGE-1, MAGE-3, BAGE, GAGE-1, GAGE-2, MUM-1, CDK4, N-acetylglucosaminyltransferase, p15, gp75, beta-catenin, ErbB2, cancer antigen 125 (CA-125), carcinoembryonic antigen (CEA), RAGE, MART (melanoma antigen), MUC-1, MUC-2, MUC-3, MUC-4, MUC-5ac, MUC-16, MUC-17, tyrosinase, Pmel 17 (gp100), GnT-V intron V sequence (N-acetylglucosaminyltransferase V intron V sequence), Prostate cancer psm, PRAME (melanoma antigen), β-catenin, EBNA (Epstein-Barr Virus nuclear antigen) 1-6, p53, lung resistance protein (LRP) Bcl-2, prostate specific antigen (PSA), Ki-67, CEACAM6, colon-specific antigen-p (CSAp), HLA-DR, CD40, CD74, CD138, EGFR, EGP-1, EGP-2, VEGF, PlGF, insulin-like growth factor (ILGF), tenascin, platelet-derived growth factor, IL-6, CD20, CD19, PSMA, CD33, CD123, MET, DLL4, Ang-2, HER3, IGF-1R, CD30, TAG-72, SPEAP, CD45, L1-CAM, Lewis Y ($Le^y$) antigen, E-cadherin, V-cadherin, and EpCAM.

In another aspect, the present disclosure provides a method for propagating mammalian immune cells comprising contacting a population of mammalian immune cells with an effective amount of an IL-15/IL-15Rα-Fc complex of the present technology or a multimer (e.g., a trimer) thereof. The mammalian immune cells may be propagated in vivo, ex vivo, or in vitro. In some embodiments, the mammalian immune cells are CD4+ T cells, CD8+ T cells, B cells, memory T cells, memory B cells, dendritic cells, antigen presenting cells, macrophages, mast cells, natural killer T cells (NKT cells), tumor-resident T cells, CD122+ T cells, and/or natural killer cells (NK cells).

Additionally or alternatively, in some embodiments, the method further comprises contacting the population of mammalian immune cells with a cytokine (e.g., IL-1, IL-2, IL-3, IL-4, IL-5, IL-6, IL-7, IL-8, IL-10, IL-11, IL-12, GM-CSF, TNF-α, TNF-β, TGF-β, or interferon-γ). Additionally or alternatively, in certain embodiments, the method further comprises contacting the population of mammalian immune cells with an agent, such as phosphonates. Examples of phosphonates include, but are not limited to, 9-[2-(phosphonomethoxy)ethyl]adenine (PMEA; Adefovir), 9-(R)-[2-(phosphonomethoxy)propyl]adenine [(R)-PMPA; Tenofovir], 9-(S)-[2-(phosphonomethoxy)propyl]adenine; (S)-PMPA), 9-[2-(phosphonomethoxy)ethyl]-2,6-diaminopurine (PMEDAP), 9-(R)[2-(phosphonomethoxy)propyl]-2,6-diaminopurine (PMPDAP), and 9-[2-(phosphonomethoxy)ethyl]guanine (PMEG).

Cancer Treatment

In one aspect, the present disclosure provides a method for preventing or treating cancer in a subject in need thereof, comprising administering to the subject an effective amount of an IL-15/IL-15Rα-Fc complex of the present technology or a multimer (e.g., a trimer) thereof. In some embodiments, the subject is 0 to 6 months old, 6 to 12 months old, 1 to 5 years old, 5 to 10 years old, 10 to 15 years old, 15 to 20 years old, 20 to 25 years old, 25 to 30 years old, 30 to 35 years old, 35 to 40 years old, 40 to 45 years old, 45 to 50 years old, 50 to 55 years old, 55 to 60 years old, 60 to 65 years old, 65 to 70 years old, 70 to 75 years old, 75 to 80 years old, 80 to 85 years old, 85 to 90 years old, 90 to 95 years old or more than 95 years old. The subject may be a primate, such as a human, or another mammal, such as a pig, cow, horse, sheep, goat, dog, cat and rodent. In some embodiments, the subject is human. In some embodiments, the IL-15/IL-15Rα-Fc complex of the present technology, or a multimer (e.g., a trimer) thereof is administered to the subject to prevent the onset or reoccurrence of cancer in the subject.

Cancers that can be prevented, or treated in accordance with the methods described herein include, but are not limited to: leukemias lymphomas, multiple myelomas, sarcomas, brain tumors, breast cancer, adrenal cancer, thyroid cancer, pancreatic cancer, ocular cancer, pituitary cancer, vaginal cancers, cervical cancers, uterine cancer, ovarian cancer, vulvar cancer, esophageal cancer, gastrointestinal cancer, colon cancer, rectal cancer, liver cancer, gallbladder cancer, prostate cancer, lung cancer, testicular cancer, oral cancer, skin cancer, kidney cancer, bladder cancer, and prostate cancer. In certain embodiments, the cancer is melanoma, breast cancer, renal cancer, colon cancer, lung cancer, or prostate cancer. The cancer may be metastatic or benign. The IL-15/IL-15Rα-Fc complexes of the present technology can be used in the treatment of pre-malignant conditions as well as malignant cancers. Pre-malignant conditions include hyperplasia, metaplasia, and dysplasia. Treatment of malignant cancers includes the treatment of primary as well as metastatic tumors.

The effect of an IL-15/IL-15Rα-Fc complex disclosed herein or a multimer (e.g., a trimer) thereof on the proliferation of cancer cells can be detected by routine assays, such as by assays that measure the uptake of radiolabeled thymidine. Alternatively, cell viability can be measured by assays that measure lactate dehydrogenase (LDH), a stable cytosolic enzyme that is released upon cell lysis, or by the release of [$^{51}$Cr] upon cell lysis. In certain embodiments, necrosis is measured by the ability or inability of a cell to take up a dye such as neutral red, trypan blue, or ALAMAR™ blue (Page et al., 1993, Intl. J. of Oncology 3:473 476). In such an assay, the cells are incubated in media containing the dye, the cells are washed, and the remaining dye, reflecting cellular uptake of the dye, is measured spectrophotometrically. In another embodiment, the dye is sulforhodamine B (SRB), whose protein binding can be used as a measure of cytotoxicity (Skehan et al., 1990, J. Nat'l Cancer Inst. 82:1107 12). In yet another embodiment, a tetrazolium salt, such as MTT, is used in a quantitative colorimetric assay for mammalian cell survival and proliferation by detecting living, but not dead, cells (see, e.g., Mosmann, 1983, J. Immunol. Methods 65:55 63).

In other embodiments, apoptotic cells are measured in both the attached and "floating" compartments of the cultures. Both compartments are collected by removing the supernatant, trypsinizing the attached cells, and combining both preparations following a centrifugation wash step (10 minutes, 2000 rpm). The protocol for treating tumor cell cultures with sulindac and related compounds to obtain a significant amount of apoptosis has been described in the literature (see, e.g., Piazza et al., 1995, Cancer Research 55:3110 16). Features of this method include collecting both floating and attached cells, identification of the optimal treatment times and dose range for observing apoptosis, and identification of optimal cell culture conditions. In another embodiment, apoptosis is quantitated by measuring DNA fragmentation. Commercial photometric methods for the quantitative in vitro determination of DNA fragmentation are available. Examples of such assays, including TUNEL (which detects incorporation of labeled nucleotides in fragmented DNA) and ELISA-based assays, are described in Biochemica, 1999, no. 2, pp. 34 37 (Roche Molecular Biochemicals). In yet another embodiment, apoptosis can be observed morphologically.

Cancer cell lines on which such assays can be performed are well known to those of skill in the art. Apoptosis, necrosis and proliferation assays can also be performed on primary cells, e.g., a tissue explant.

In certain embodiments, the proliferation or viability of cancer cells contacted with an IL-15/IL-15Rα-Fc complex of the present technology or a multimer (e.g., a trimer) thereof (or a composition comprising an IL-15/IL-15Rα-Fc complex of the present technology or a multimer (e.g., a trimer) thereof) is inhibited or reduced by at least 2 fold, at least 2.5 fold, at least 3 fold, at least 4 fold, at least 5 fold, at least 7 fold, or at least 10 fold relative to the proliferation of the cancer cells when contacted with a negative control (e.g., placebo) as measured using assays well known in the art, e.g., cell proliferation assays using CSFE, BrdU, and $^{3}$H-Thymidine incorporation. In another embodiment, the proliferation of cancer cells contacted with an IL-15/IL-15Rα-Fc complex of the present technology or a multimer (e.g., a trimer) thereof (or a composition comprising an IL-15/IL-15Rα-Fc complex of the present technology or a multimer (e.g., a trimer) thereof) is inhibited or reduced by at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% relative to cancer cells contacted with a negative control (e.g., placebo) as measured using assays well known in the art, e.g., cell proliferation assays using CSFE, BrdU, and $^{3}$H-Thymidine incorporation, or those assays described above. In one aspect, the composition comprising an IL-15/IL-15Rα-Fc complex of the present technology or a multimer (e.g., a trimer) thereof further comprises cells (e.g., NK cells or cytotoxic T cells) that are responsive to IL-15 signaling and that can target and exert cytotoxic effects on the cancer cells.

Additionally or alternatively, in some embodiments, the administration of an IL-15/IL-15Rα-Fc complex of the present technology or a multimer (e.g., a trimer) thereof to a subject in accordance with the methods described herein achieves one or more of the following outcomes: (1) a reduction in the growth of a tumor or neoplasm; (2) a reduction in the formation of a tumor; (3) an eradication, removal, or control of primary, regional and/or metastatic cancer; (4) a reduction in metastatic spread; (5) a reduction in mortality; (6) an increase in survival rate; (7) an increase in length of survival; (8) an increase in remission; and (9) the maintenance in the size of the tumor so that it does not increase by more than 10%, or by more than 8%, or by more than 6%, or by more than 4%; or by more than 2%.

Additionally or alternatively, in some embodiments, the administration of an IL-15/IL-15Rα-Fc complex of the present technology or a multimer (e.g., a trimer) thereof (or a composition comprising an IL-15/IL-15Rα-Fc complex of the present technology or a multimer (e.g., a trimer) thereof) to a subject with cancer in accordance with the methods described herein inhibits or reduces the growth of a tumor by at least 2 fold, at least 2.5 fold, at least 3 fold, at least 4 fold, at least 5 fold, at least 7 fold, or at least 10 fold relative to the growth of a tumor in a subject with cancer administered a negative control (e.g., placebo) as measured using assays well known in the art. In another embodiment, the administration of an IL-15/IL-15Rα-Fc complex of the present technology or a multimer (e.g., a trimer) thereof (or a composition comprising an IL-15/IL-15Rα-Fc complex of the present technology or a multimer (e.g., a trimer) thereof) to a subject with cancer in accordance with the methods described herein inhibits or reduces the growth of a tumor by at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% relative to the growth of a tumor in a subject with cancer administered a negative control (e.g., placebo) as measured using assays well known in the art.

Additionally or alternatively, in some embodiments, the administration of an IL-15/IL-15Rα-Fc complex of the present technology or a multimer (e.g., a trimer) thereof (or a composition comprising an IL-15/IL-15Rα-Fc complex of the present technology or a multimer (e.g., a trimer) thereof) to a subject with cancer in accordance with the methods described herein reduces the size of a tumor by at least 2 fold, at least 2.5 fold, at least 3 fold, at least 4 fold, at least 5 fold, at least 7 fold, or at least 10 fold relative to the size of a tumor in a subject with cancer administered a negative control (e.g., placebo) as measured using assays well known in the art. In another embodiment, the administration of an IL-15/IL-15Rα-Fc complex of the present technology or a multimer (e.g., a trimer) thereof (or a composition comprising an IL-15/IL-15Rα-Fc complex of the present technology or a multimer (e.g., a trimer) thereof) to a subject with cancer reduces the size of a tumor by at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% relative to the size of a tumor in a subject with cancer administered a negative control (e.g., placebo) as measured using assays well known in the art.

In one aspect, the present disclosure provides a method for enhancing the immune function in a patient that has received or is receiving an anti-cancer therapy comprising administering to the patient an effective amount of an IL-15/IL-15Rα-Fc complex of the present technology or a multimer (e.g., a trimer) thereof. The patient may be diagnosed with or suffering from cancer, or may be at risk for or susceptible to developing cancer. In some embodiments, the patient is 0 to 6 months old, 6 to 12 months old, 1 to 5 years old, 5 to 10 years old, 10 to 15 years old, 15 to 20 years old, 20 to 25 years old, 25 to 30 years old, 30 to 35 years old, 35 to 40 years old, 40 to 45 years old, 45 to 50 years old, 50 to 55 years old, 55 to 60 years old, 60 to 65 years old, 65 to 70 years old, 70 to 75 years old, 75 to 80 years old, 80 to 85 years old, 85 to 90 years old, 90 to 95 years old or more than 95 years old. The patient may be a primate, such as a human, or another mammal, such as a pig, cow, horse, sheep, goat, dog, cat and rodent, in an immunocompromised state or immunosuppressed state or at risk for becoming immunocompromised or immunosuppressed. In some embodiments, the patient is human.

In some embodiments, the patient has a compromised immune system due to an anti-cancer therapy. The anti-cancer therapy may be chemotherapy, radiation therapy, or immunotherapy (e.g., an antibody drug conjugate). Additionally or alternatively, in some embodiments, an IL-15/IL-15Rα-Fc complex of the present technology or a multimer (e.g., a trimer) thereof can be administered before, during or after radiation therapy, chemotherapy or immunotherapy. In some embodiments of the methods disclosed herein, the radiation therapy comprises the use of x-rays, gamma rays and other sources of radiation to destroy the cancer cells. Additionally or alternatively, in some embodiments, the radiation therapy is administered as external beam radiation or teletherapy wherein the radiation is directed from a remote source. In certain embodiments of the methods disclosed herein, the radiation therapy is administered as internal therapy or brachytherapy wherein a radioactive source is placed inside the body close to cancer cells or a tumor mass.

In some embodiments, the patient is administered an IL-15/IL-15Rα-Fc complex of the present technology, or a multimer (e.g., a trimer) thereof before any adverse effects or intolerance to the anti-cancer therapy develops. In some embodiments, the patient is refractory to the anti-cancer therapy. As used herein, a patient with cancer, is "refractory" to a therapy when the cancer has not significantly been eradicated and/or the symptoms have not been significantly alleviated. The determination of whether a patient is refractory can be made either in vivo or in vitro by any method known in the art for assaying the effectiveness of a treatment, using art-accepted meanings of "refractory" in such a context. In various embodiments, a patient with cancer is refractory when a cancerous tumor has not decreased or has increased. In certain embodiments, the refractory patient is being treated with antibiotics, anti-cancer agents, or other biological therapy/immunotherapy. Among these refractory patients are those who are too young for conventional therapies, and patients with reoccurring viral infections despite management or treatment with existing therapies.

Additionally or alternatively, in some embodiments of the methods disclosed herein, the patient has not received a therapy prior to the administration of the IL-15/IL-15Rα-Fc complex of the present technology, or the multimer (e.g., a trimer) thereof. In some embodiments of the methods disclosed herein, the patient has received a therapy prior to administration of the IL-15/IL-15Rα-Fc complex of the present technology, or the multimer (e.g., a trimer) thereof. In other embodiments of the methods disclosed herein, the patient is refractory to a prior therapy or experienced adverse side effects to the prior therapy or the prior therapy was discontinued due to unacceptable levels of toxicity to the patient.

Treatment of Infection

In one aspect, the present disclosure provides a method for preventing or treating an infection in a subject in need thereof, comprising administering to the subject an effective amount of an IL-15/IL-15Rα-Fc complex of the present technology or a multimer (e.g., a trimer) thereof. In some embodiments, the subject is 0 to 6 months old, 6 to 12 months old, 1 to 5 years old, 5 to 10 years old, 10 to 15 years old, 15 to 20 years old, 20 to 25 years old, 25 to 30 years old, 30 to 35 years old, 35 to 40 years old, 40 to 45 years old, 45 to 50 years old, 50 to 55 years old, 55 to 60 years old, 60 to 65 years old, 65 to 70 years old, 70 to 75 years old, 75 to 80 years old, 80 to 85 years old, 85 to 90 years old, 90 to 95 years old or more than 95 years old. The subject may be a primate, such as a human, or another mammal, such as a pig, cow, horse, sheep, goat, dog, cat and rodent. In some embodiments, the subject is human. In some embodiments, the IL-15/IL-15Rα-Fc complex of the present technology, or a multimer (e.g., a trimer) thereof is administered to the subject to prevent the onset or reoccurrence of infection in the subject.

In certain embodiments, an IL-15/IL-15Rα-Fc complex of the present technology, or a multimer (e.g., a trimer) thereof is administered to a subject receiving or recovering from immunosuppressive therapy. In certain embodiments, an IL-15/IL-15Rα-Fc complex of the present technology, or a multimer (e.g., a trimer) thereof is administered to a subject that has or is at risk for AIDS, a viral infection, a fungal infection, or a bacterial infection.

Infectious diseases that can be treated, or prevented by IL-15/IL-15Rα-Fc complexes of the present technology or multimers (e.g., trimers) thereof are caused by pathogens including but not limited to bacteria, fungi, and viruses.

Examples of viral pathogens include, but are not limited to, those caused by hepatitis type A, hepatitis type B, hepatitis type C, influenza, varicella, adenovirus, herpes simplex type I (HSV-I), herpes simplex type II (HSV-II), rinderpest, rhinovirus, echovirus, rotavirus, respiratory syncytial virus, papilloma virus, papova virus, cytomegalovirus, echinovirus, arbovirus, huntavirus, coxsackie virus, mumps virus, measles virus, rubella virus, polio virus, small pox, Epstein Barr virus, human immunodeficiency virus type I (HIV-I), human immunodeficiency virus type II (HIV-II), and agents of viral diseases such as viral meningitis, encephalitis, dengue or small pox.

Examples of bacterial pathogens include, but are not limited to, those caused by *Escherichia coli, Klebsiella pneumoniae, Staphylococcus aureus, Enterococcus faecalis, Proteus vulgaris, Staphylococcus viridans, Pseudomonas aeruginosa, Mycobacteria rickettsia, Mycoplasma, Neisseria, S. pneumonia, Borrelia burgdorferi, Bacillus anthracis, Clostridium tetani, Streptococcus, Staphylococcus, Mycobacterium, Bordetella pertussis, Vibrio cholera, Corynebacterium diphtherias, Chlamydia, S. aureus* and *Legionella*.

Examples of fungal pathogens include, but are not limited to, those caused by *Candida albicans, Aspergillosis*, and yeast (e.g., *Saccharomyces cerevisiae*).

In certain embodiments of the methods disclosed herein, administering an IL-15/IL-15Rα-Fc complex of the present technology, or a multimer (e.g., a trimer) thereof to a subject infected with a pathogen in accordance with the methods described herein inhibits or reduces replication of the pathogen by at least 20% to 25%, at least 25% to 30%, at least 30% to 35%, at least 35% to 40%, at least 40% to 45%, at least 45% to 50%, at least 50% to 55%, at least 55% to 60%, at least 60% to 65%, at least 65% to 70%, at least 70% to 75%, at least 75% to 80%, or at least 85% relative to a negative control (e.g., placebo) as determined using an assay described herein or others known to one of skill in the art.

Additionally or alternatively, in some embodiments of the methods disclosed herein, administering an IL-15/IL-15Rα-Fc complex of the present technology, or a multimer (e.g., a trimer) thereof to a subject infected with a pathogen in accordance with the methods described herein inhibits or reduces replication of the pathogen by at least 1.5 fold, 2 fold, 2.5 fold, 3 fold, 4 fold, 5 fold, 8 fold, 10 fold, 15 fold, 20 fold, or 2 to 5 fold, 2 to 10 fold, 5 to 10 fold, or 5 to 20 fold relative to a negative control (e.g., placebo) as determined using an assay described herein or others known to one of skill in the art. In some embodiments of the methods disclosed herein, administering an IL-15/IL-15Rα-Fc complex of the present technology, or a multimer (e.g., a trimer) thereof to a subject infected with an infectious agent in accordance with the methods described herein inhibits or reduces replication of the pathogen by 1 log, 1.5 logs, 2 logs, 2.5 logs, 3 logs, 3.5 logs, 4 logs, 5 logs or more relative to a negative control (e.g., placebo) as determined using an assay described herein or others known to one of skill in the art.

Additionally or alternatively, in some embodiments of the methods disclosed herein, administering an IL-15/IL-15Rα-Fc complex of the present technology, or a multimer (e.g., a trimer) thereof to a subject infected with a pathogen in accordance with the methods described herein reduces the titer of the pathogen by at least 20% to 25%, at least 25% to 30%, at least 30% to 35%, at least 35% to 40%, at least 40% to 45%, at least 45% to 50%, at least 50% to 55%, at least 55% to 60%, at least 60% to 65%, at least 65% to 70%, at least 70% to 75%, at least 75% to 80%, or at least 85% relative to a negative control (e.g., placebo) as determined using an assay described herein or others known to one of skill in the art. Additionally or alternatively, in some embodiments of the methods disclosed herein, administering an IL-15/IL-15Rα-Fc complex of the present technology, or a multimer (e.g., a trimer) thereof to a subject infected with a pathogen in accordance with the methods described herein reduces the titer of the pathogen by at least 1.5 fold, 2 fold, 2.5 fold, 3 fold, 4 fold, 5 fold, 8 fold, 10 fold, 15 fold, 20 fold, or 2 to 5 fold, 2 to 10 fold, 5 to 10 fold, or 5 to 20 fold relative to a negative control (e.g., placebo) as determined using an assay described herein or others known to one of skill in the art. Additionally or alternatively, in some embodiments of the methods disclosed herein, administering an IL-15/IL-15Rα-Fc complex of the present technology, or a multimer (e.g., a trimer) thereof to a subject infected with a pathogen in accordance with the methods described herein reduces the titer of the pathogen by 1 log, 1.5 logs, 2 logs, 2.5 logs, 3 logs, 3.5 logs, 4 logs, 5 logs or more relative to a negative control (e.g., placebo) as determined using an assay described herein or others known to one of skill in the art.

In one aspect, the present disclosure provides a method for enhancing the immune function in a patient that has received or is receiving an anti-viral, anti-fungal, or anti-bacterial therapy comprising administering to the patient an effective amount of an IL-15/IL-15Rα-Fc complex of the present technology or a multimer (e.g., a trimer) thereof. The patient may be diagnosed with or suffering from an infection, or may be at risk for or susceptible to developing an infection. The infection may be a latent infection, an active infection, a chronic infection, a bacterial infection, a fungal infection, or a viral infection. In some embodiments, the patient is 0 to 6 months old, 6 to 12 months old, 1 to 5 years old, 5 to 10 years old, 10 to 15 years old, 15 to 20 years old, 20 to 25 years old, 25 to 30 years old, 30 to 35 years old, 35 to 40 years old, 40 to 45 years old, 45 to 50 years old, 50 to 55 years old, 55 to 60 years old, 60 to 65 years old, 65 to 70 years old, 70 to 75 years old, 75 to 80 years old, 80 to 85 years old, 85 to 90 years old, 90 to 95 years old or more than 95 years old. The patient may be a primate, such as a human, or another mammal, such as a pig, cow, horse, sheep, goat, dog, cat and rodent, in an immunocompromised state or immunosuppressed state or at risk for becoming immunocompromised or immunosuppressed. In some embodiments, the patient is human.

In some embodiments, the patient is administered an IL-15/IL-15Rα-Fc complex of the present technology, or a multimer (e.g., a trimer) thereof before any adverse effects or intolerance to an anti-bacterial, anti-fungal, or anti-viral therapy develops. In some embodiments, the patient is refractory to the anti-bacterial, anti-fungal, or anti-viral therapy. As used herein, a patient with an infection is "refractory" to a therapy when the infection has not significantly been eradicated and/or the symptoms have not been significantly alleviated. The determination of whether a patient is refractory can be made either in vivo or in vitro by any method known in the art for assaying the effectiveness of a treatment, using art-accepted meanings of "refractory" in such a context. In various embodiments, a patient with infection is refractory when replication of the infectious agent has not decreased or has increased. In certain embodiments, the refractory patient is being treated with antibiotics, antivirals, or other biological therapy/immunotherapy. Among these refractory patients are those who are too young for conventional therapies, and patients with reoccurring viral infections despite management or treatment with existing therapies.

Additionally or alternatively, in some embodiments of the methods disclosed herein, the patient has not received a therapy prior to the administration of the IL-15/IL-15Rα-Fc complex of the present technology, or the multimer (e.g., a trimer) thereof. In some embodiments of the methods disclosed herein, the patient has received a therapy prior to administration of the IL-15/IL-15Rα-Fc complex of the present technology, or the multimer (e.g., a trimer) thereof. In other embodiments of the methods disclosed herein, the patient is refractory to a prior therapy or experienced adverse side effects to the prior therapy or the prior therapy was discontinued due to unacceptable levels of toxicity to the patient.

In certain embodiments, an IL-15/IL-15Rα-Fc complex of the present technology, or a multimer (e.g., a trimer) thereof is administered to a patient receiving or recovering from immunosuppressive therapy. In some embodiments, an IL-15/IL-15Rα-Fc complex of the present technology, or a multimer (e.g., a trimer) thereof is administered to a patient that has or is at risk for AIDS, a viral infection, a fungal infection, or a bacterial infection, or has undergone surgery. In certain embodiments, an IL-15/IL-15Rα-Fc complex of the present technology, or a multimer (e.g., a trimer) thereof is administered to a patient that has cystic fibrosis, pulmonary fibrosis, or a disease which makes the patient susceptible to an infection. In some embodiments, an IL-15/IL-15Rα-Fc complex of the present technology, or a multimer (e.g., a trimer) thereof is administered to a patient that has or will receive a tissue transplant. In certain embodiments, an IL-15/IL-15Rα-Fc complex of the present technology, or a multimer (e.g., a trimer) thereof is administered to a patient that is pregnant or is susceptible to adverse reactions to conventional therapies.

Additionally or alternatively, in some embodiments, the enhanced immune function comprises increased production of antibodies to infected cells, to a pathogen, or to antigens of a pathogen. Additionally or alternatively, in some embodiments, the enhanced immune function comprises an increase in effector cell function, e.g., antibody-dependent cellular cytotoxicity (ADCC) against the pathogen and/or cells infected with a pathogen in the patient. Additionally or alternatively, in some embodiments, the enhanced immune function comprises an increase in effector cell function, e.g., cytotoxic cells or antibody-dependent cellular cytotoxicity (ADCC) against infected cells in the patient.

Additionally or alternatively, in some embodiments, the enhanced immune function comprises an increase in lymphocyte number, lymphocyte proliferation, and/or lymphocyte activity.

Immunodeficiencies & Lymphopenia

The terms "lymphopenia" or "lymphocytopenia" or "lymphocytic leucopenia" interchangeably refer to an abnormally small number of lymphocytes in the circulating blood or in peripheral circulation. Quantitatively, lymphopenia can be described by various cutoffs. In some embodiments, a patient is suffering from lymphopenia when their circulating blood total lymphocyte count falls below about 600/mm$^3$. In some embodiments, a patient suffering from lymphopenia has less than about 2000/μL total circulating lymphocytes at birth, less than about 4500/μL total circulating lymphocytes at about age 9 months, or less than about 1000/μL total circulating lymphocytes patients older than about 9 months.

Lymphocytopenia has a wide range of possible causes, including viral (e.g., HIV or hepatitis infection), bacterial (e.g., active tuberculosis infection), and fungal infections; chronic failure of the right ventricle of the heart, Hodgkin's disease and cancers of the lymphatic system, leukemia, a leak or rupture in the thoracic duct, side effects of prescription medications including anticancer agents, antiviral agents, and glucocorticoids, malnutrition resulting from diets that are low in protein, radiation therapy, uremia, autoimmune disorders, immune deficiency syndromes, high stress levels, and trauma. Lymphopenia may also be of unknown etiology (i.e., idiopathic lymphopenia). Peripheral circulation of all types of lymphocytes or subpopulations of lymphocytes (e.g., CD4$^+$ T cells) may be depleted or abnormally low in a patient suffering from lymphopenia. See, e.g., The Merck Manual, 18$^{th}$ Edition, 2006, Merck & Co.

In one aspect, the present disclosure provides a method for preventing or treating an immunodeficiency or lymphopenia in a subject in need thereof, comprising administering to the subject an effective amount of an IL-15/IL-15Rα-Fc complex of the present technology or a multimer (e.g., a trimer) thereof. In some embodiments, the subject is 0 to 6 months old, 6 to 12 months old, 1 to 5 years old, 5 to 10 years old, 10 to 15 years old, 15 to 20 years old, 20 to 25 years old, 25 to 30 years old, 30 to 35 years old, 35 to 40 years old, 40 to 45 years old, 45 to 50 years old, 50 to 55 years old, 55 to 60 years old, 60 to 65 years old, 65 to 70 years old, 70 to 75 years old, 75 to 80 years old, 80 to 85 years old, 85 to 90 years old, 90 to 95 years old or more than 95 years old. The subject may be a primate, such as a human, or another mammal, such as a pig, cow, horse, sheep, goat, dog, cat and rodent. In some embodiments, the subject is human. In some embodiments, the IL-15/IL-15Rα-Fc complex of the present technology, or a multimer (e.g., a trimer) thereof is administered to the subject to prevent the onset or reoccurrence of immunodeficiency or lymphopenia in the subject. In certain embodiments, an IL-15/IL-15Rα-Fc complex of the present technology, or a multimer (e.g., a trimer) thereof is administered to a subject that has been diagnosed as lymphopenic.

In some embodiments, the subject is administered an IL-15/IL-15Rα-Fc complex of the present technology, or a multimer (e.g., a trimer) thereof before any adverse effects or intolerance to a conventional therapy develops. In some embodiments, the subject is refractory to the conventional therapy. As used herein, a subject with an immunodeficiency or lymphopenia is "refractory" to a therapy when the immunodeficiency or lymphopenia has not significantly been eradicated and/or the symptoms have not been significantly alleviated. The determination of whether a subject is refractory can be made either in vivo or in vitro by any method known in the art for assaying the effectiveness of a treatment, using art-accepted meanings of "refractory" in such a context.

In certain embodiments, an IL-15/IL-15Rα-Fc complex of the present technology, or a multimer (e.g., a trimer) thereof is administered to a subject receiving or recovering from immunosuppressive therapy. In some embodiments, an IL-15/IL-15Rα-Fc complex of the present technology, or a multimer (e.g., a trimer) thereof is administered to a subject that has or is at risk for cancer, AIDS, a viral infection, a fungal infection, or a bacterial infection, or has undergone surgery, chemotherapy and/or radiation therapy. In some embodiments, an IL-15/IL-15Rα-Fc complex of the present technology, or a multimer (e.g., a trimer) thereof is administered to a subject that has or will receive a tissue transplant. In certain embodiments, an IL-15/IL-15Rα-Fc complex of the present technology, or a multimer (e.g., a trimer) thereof is administered to a subject that is pregnant or is susceptible to adverse reactions to conventional therapies.

Additionally or alternatively, in some embodiments of the methods disclosed herein, the subject has not received a therapy prior to the administration of the IL-15/IL-15Rα-Fc complex of the present technology, or the multimer (e.g., a trimer) thereof. In some embodiments of the methods disclosed herein, the subject has received a therapy prior to administration of the IL-15/IL-15Rα-Fc complex of the present technology, or the multimer (e.g., a trimer) thereof. In other embodiments of the methods disclosed herein, the subject is refractory to a prior therapy or experienced adverse side effects to the prior therapy or the prior therapy was discontinued due to unacceptable levels of toxicity to the subject.

Adoptive Cell Transfer

In one aspect, the present disclosure provides a method for enhancing IL-15-mediated immune function in a subject in need thereof, comprising administering to the subject recombinant host cells that express any of the IL-15 polypeptides disclosed herein (e.g., SEQ ID NOs: 1, 5, 17, 44, or 52) and any of the IL-15Rα-Fc polypeptides disclosed herein (e.g., SEQ ID NOs: 2, 6, 18, 33-35, 45-48, or 53). In some embodiments, the recombinant host cells are immune cells, such as an immune cells obtained or derived from the subject. In certain embodiments, the recombinant host cells are lymphocytes (e.g., T lymphocytes), monocytes, dendritic cells, or Natural Killer cells, such as T lymphocytes, monocytes, dendritic cells, or Natural Killer cells obtained or derived from the subject. In some embodiments, the recombinant host cells are peripheral blood mononuclear cells or tumor infiltrating lymphocytes, such as peripheral blood mononuclear cells or tumor infiltrating lymphocytes obtained or derived from the subject. In some embodiments, the recombinant host cells are generated by isolating native immune cells from a peripheral blood sample from the subject, culturing the native immune cells in cell culture medium, and engineering the native immune cells to recombinantly express any of the IL-15 polypeptides disclosed herein (e.g., SEQ ID NOs: 1, 5, 17, 44, or 52) and any of the IL-15Rα-Fc polypeptides disclosed herein (e.g., SEQ ID NOs: 2, 6, 18, 33-35, 45-48, or 53). In some embodiments, the recombinant host cells may be administered to the same subject from which the native immune cells are derived. In other embodiments, the recombinant host cells may be administered to a subject that is different from the subject from which the native immune cells are derived.

Also provided herein is a method for preventing, or treating a disorder in which enhancing IL-15-mediated immune function is beneficial (e.g., cancer, infection, immunodeficiencies, lymphopenia), comprising administering to a subject recombinant host cells that express any of the IL-15 polypeptides disclosed herein (e.g., SEQ ID NOs: 1, 5, 17, 44, or 52) and any of the IL-15Rα-Fc polypeptides disclosed herein (e.g., SEQ ID NOs: 2, 6, 18, 33-35, 45-48, or 53). In some embodiments, the recombinant host cells are immune cells, such as an immune cells obtained or derived from the subject. In certain embodiments, the recombinant host cells are lymphocytes (e.g., T lymphocytes), monocytes, dendritic cells, or Natural Killer cells, such as T lymphocytes, monocytes, dendritic cells, or Natural Killer cells obtained or derived from the subject. In some embodiments, the recombinant host cells are peripheral blood mononuclear cells or tumor infiltrating lymphocytes, such as peripheral blood mononuclear cells or tumor infiltrating lymphocytes obtained or derived from the subject. In some embodiments, the recombinant host cells are generated by isolating native immune cells from a peripheral blood sample from the subject, culturing the native immune cells in cell culture medium, and engineering the native immune cells to recombinantly express any of the IL-15 polypeptides disclosed herein (e.g., SEQ ID NOs: 1, 5, 17, 44, or 52) and any of the IL-15Rα-Fc polypeptides disclosed herein (e.g., SEQ ID NOs: 2, 6, 18, 33-35, 45-48, or 53). In some embodiments, the recombinant host cells may be administered to the same subject from which the native immune cells are derived. In other embodiments, the recombinant host cells may be administered to a subject that is different from the subject from which the native immune cells are derived.

In any of the foregoing embodiments of the methods disclosed herein, the recombinant host cells may be administered locally or systemically to a subject via any route known to one of skill in the art (e.g., parenteral administration, such as subcutaneous, intravenous, or intramuscular administration, or intratumoral administration). Additionally or alternatively, in some embodiments of the methods disclosed herein, the recombinant host cells are implanted or infused into a subject. The implant may include a porous, non-porous, or gelatinous material, including membranes, such as sialastic membranes, or fibers in addition to the host cells. Additionally or alternatively, in certain embodiments of the methods disclosed herein, the recombinant host cells are administered to a subject as part of a composition. Such a composition may comprise a polymer in addition to the recombinant host cells. In certain embodiments, a suitable dose of the recombinant host cells administered to the subject may be at least 100, 200, 300, 400, 500, 700, 1,000, 5,000, 10,000, 25,000, 50,000, 100,000, $1 \times 10^6$, $1 \times 10^7$, or $1\times10^8$ cells. In some embodiments, a suitable dose of the recombinant host cells administered to the subject may be between 100 to 10,000, 500 to 10,000, 1,000 to 5,000, 5,000 to 10,000, 5,000 to 20,000, 10,000 to 20,000, 25,000 to 50,000, 50,000 to 100,000, $1\times10^4$ to $1\times10^5$, $1\times10^5$ to $1\times10^6$, $1\times10^5$ to $1\times10^7$, $1\times10^6$ to $1\times10^8$ cells. The recombinant host cells may be administered 1, 2, 3, 4, 5, 6, 7, 8 or more times. The frequency and dose of the recombinant host cells administered to a subject will vary depending on several factors, including, e.g., the condition of the subject.

The effect of one or more doses of the recombinant host cells described herein on peripheral blood lymphocyte counts can be monitored/assessed using standard techniques known to one of skill in the art. Peripheral blood lymphocytes counts in a mammal can be determined by, e.g., obtaining a sample of peripheral blood from said mammal, separating the lymphocytes from other components of peripheral blood such as plasma using, e.g., Ficoll-Hypaque (Pharmacia) gradient centrifugation, and counting the lymphocytes using trypan blue. Peripheral blood T cell counts in mammal can be determined by, e.g., separating the lymphocytes from other components of peripheral blood such as plasma using, e.g., a use of Ficoll-Hypaque (Pharmacia) gradient centrifugation, labeling the T cells with an antibody directed to a T cell antigen such as CD3, CD4, and CD8 which is conjugated to FITC or phycoerythrin, and measuring the number of T cells by FACS. Further, the effect on a particular subset of T cells (e.g., $CD2^+$, $CD4^+$, $CD8^+$, $CD4^+RO^+$, $CD8^+RO^+$, $CD4^+RA^+$, or $CD8^+RA^+$) or NK cells can be determined using standard techniques known to one of skill in the art such as FACS.

Modes of Administration

Administration can be carried out by any suitable route, including orally, intranasally, parenterally (intravenously, intramuscularly, intraperitoneally, or subcutaneously), rectally, intracranially, intrathecally, or topically. Administration includes self-administration and the administration by another. It is also to be appreciated that the various modes of treatment of medical conditions as described are intended to mean "substantial", which includes total but also less than total treatment, and wherein some biologically or medically relevant result is achieved.

In some embodiments, the IL-15/IL-15Rα-Fc complexes of the present technology comprise pharmaceutical formulations which may be administered to subjects in need thereof in one or more doses. Dosage regimens can be adjusted to provide the desired response (e.g., a therapeutic response). The IL-15/IL-15Rα-Fc complexes of the present technology may optionally be administered as a single bolus to a subject in need thereof. Alternatively, the dosing regimen may comprise multiple administrations performed at various times after the appearance of tumors.

Typically, an effective amount of the IL-15/IL-15Rα-Fc complexes of the present technology, sufficient for achieving a therapeutic effect, ranges from about 0.000001 mg per kilogram body weight per day to about 10,000 mg per kilogram body weight per day. Typically, the dosage ranges are from about 0.0001 mg per kilogram body weight per day to about 100 mg per kilogram body weight per day. For administration of the IL-15/IL-15Rα-Fc complexes disclosed herein, the dosage ranges from about 0.0001 to 100 mg/kg, and more usually 0.01 to 5 mg/kg every week, every two weeks or every three weeks, of the subject's body weight. For example, dosages can be 1 mg/kg body weight or 10 mg/kg body weight every week, every two weeks or every three weeks or within the range of 1-10 mg/kg every week, every two weeks or every three weeks. In one embodiment, a single dosage of IL-15/IL-15Rα-Fc complex ranges from 0.1-10,000 micrograms per kg body weight. In one embodiment, IL-15/IL-15Rα-Fc complex concentrations in a carrier range from 0.2 to 2000 micrograms per delivered milliliter. An exemplary treatment regime entails administration once per every two weeks or once a month or once every 3 to 6 months. IL-15/IL-15Rα-Fc complexes may be administered on multiple occasions. Intervals between single dosages can be hourly, daily, weekly, monthly or yearly. Intervals can also be irregular as indicated by measuring blood levels of the IL-15/IL-15Rα-Fc complex in the subject. In some methods, dosage is adjusted to achieve a serum IL-15/IL-15Rα-Fc complex concentration in the subject of from about 75 µg/mL to about 125 µg/mL, 100 µg/mL to about 150 µg/mL, from about 125 µg/mL to about 175 µg/mL, or from about 150 µg/mL to about 200 µg/mL. Alternatively, the IL-15/IL-15Rα-Fc complexes of the present technology can be administered as a sustained release formulation, in which case less frequent administration is required. Dosage and frequency vary depending on the half-life of the IL-15/IL-15Rα-Fc complexes in the subject. The dosage and frequency of administration can vary depending on whether the treatment is prophylactic or therapeutic. In prophylactic applications, a relatively low dosage is administered at relatively infrequent intervals over a long period of time. In therapeutic applications, a relatively high dosage at relatively short intervals is sometimes required until progression of the disease is reduced or terminated, or until the subject shows partial or complete amelioration of symptoms of disease. Thereafter, the patient can be administered a prophylactic regime.

Combination Therapy

Other therapies that can be sequentially, separately or simultaneously administered with an IL-15/IL-15Rα-Fc complex of the present technology for the prevention, or treatment of a disease that is affected by IL-15 function/signaling, e.g., cancer, infectious disease, lymphopenia, and immunodeficiency include, but are not limited to, small molecules, synthetic drugs, peptides (including cyclic peptides), polypeptides, proteins, nucleic acids (e.g., DNA and RNA nucleotides including, but not limited to, antisense nucleotide sequences, triple helices, and RNAi), antibodies, synthetic or natural inorganic molecules, mimetic agents, and synthetic or natural organic molecules. In some embodiments, the IL-15/IL-15Rα-Fc complexes of the present technology may be used in combination with additional therapeutic agents such as immunomodulatory agents (e.g., interferon), anti-inflammatory agents (e.g., adrenocorticoids, corticosteroids (e.g., beclomethasone, budesonide, flunisolide, fluticasone, triamcinolone, methylprednisolone, prednisolone, prednisone, hydrocortisone), glucocorticoids, steroids, and non-steroidal anti-inflammatory drugs (e.g., aspirin, ibuprofen, diclofenac, and COX-2 inhibitors), pain relievers, leukotriene antagonists (e.g., montelukast, methyl xanthines, zafirlukast, and zileuton), beta2-agonists (e.g., albuterol, biterol, fenoterol, isoetharine, metaproterenol, pirbuterol, salbutamol, terbutalin formoterol, salmeterol, and salbutamol terbutaline), anticholinergic agents (e.g., ipratropium bromide and oxitropium bromide), sulphasalazine, penicillamine, dapsone, antihistamines, anti-malarial agents (e.g., hydroxychloroquine), anti-viral agents (e.g., nucleoside analogs (e.g., zidovudine, acyclovir, gancyclovir, vidarabine, idoxuridine, trifluridine, and ribavirin), foscarnet, amantadine, rimantadine, saquinavir, indinavir, ritonavir, and AZT) and antibiotics (e.g., dactinomycin (formerly actinomycin), bleomycin, erythromycin, penicillin, mithramycin, and anthramycin (AMC)).

Anti-Cancer Agents. Non-limiting examples of one or more other therapies that can be sequentially, separately or simultaneously administered with an IL-15/IL-15Rα-Fc complex of the present technology include immunomodulatory agents such as chemotherapeutic agents and non-chemotherapeutic immunomodulatory agents as well as anti-hormonal agents. Non-limiting examples of chemotherapeutic agents include methotrexate, cyclosporin A, leflunomide, cisplatin, ifosfamide, taxanes such as taxol and paclitaxel, topoisomerase I inhibitors (e.g., CPT-11, topotecan, 9-AC, and GG-211), gemcitabine, vinorelbine, oxaliplatin, 5-fluorouracil (5-FU), leucovorin, temodal, cytochalasin B, gramicidin D, emetine, mitomycin, etoposide, tenoposide, vincristine, vinblastine, colchicine, doxorubicin, daunorubicin, dihydroxy anthracene dione, mitoxantrone, mithramycin, actinomycin D, 1-dehydrotestosterone, glucocorticoids, procaine, tetracaine, lidocaine, propranolol, and puromycin homologs, and cytoxan. Examples of non-chemotherapeutic immunomodulatory agents include, but are not limited to, anti-T cell receptor antibodies (e.g., anti-CD4 antibodies (e.g., cM-T412 (Boeringer), IDEC-CE9.1® (IDEC and SKB), mAB 4162W94, Orthoclone and OKTcdr4a (Janssen-Cilag)), anti-CD3 antibodies (e.g., Nuvion (Product Design Labs), OKT3 (Johnson & Johnson), or Rituxan (IDEC)), anti-CD5 antibodies (e.g., an anti-CD5 ricin-linked immunoconjugate), anti-CD7 antibodies (e.g., CHH-380 (Novartis)), anti-CD8 antibodies, anti-CD40 ligand monoclonal antibodies (e.g., IDEC-131 (IDEC)), anti-CD52 antibodies (e.g., CAMPATH 1H (Ilex)), anti-CD2 antibodies (e.g., MEDI-507 (MedImmune, Inc., International Publication Nos. WO 02/098370 and WO 02/069904), anti-CD11a antibodies (e.g., Xanelim (Genentech)), and anti-B7 antibodies (e.g., IDEC-114) (IDEC)); anti-cytokine receptor antibodies (e.g., anti-IFN receptor antibodies, anti-IL-2 receptor antibodies (e.g., Zenapax (Protein Design Labs)), anti-IL-4 receptor antibodies, anti-IL-6 receptor antibodies, anti-IL-10 receptor antibodies, and anti-IL-12 receptor antibodies), anti-cytokine antibodies (e.g., anti-IFN antibodies, anti-TNF-α antibodies, anti-IL-1β antibodies, anti-IL-6 antibodies, anti-IL-8 antibodies (e.g., ABX-IL-8 (Abgenix)), anti-IL-12 antibodies and anti-IL-23 antibodies)); CTLA4-immunoglobulin; LFA-3TIP (Biogen, International Publication No. WO 93/08656 and U.S. Pat. No. 6,162,432); soluble cytokine receptors (e.g., the extracellular domain of a TNF-α receptor or a fragment thereof, the extracellular domain of an IL-1β receptor or a fragment thereof, and the extracellular domain of an IL-6 receptor or a fragment thereof); cytokines or fragments thereof (e.g., interleukin (IL)-2, IL-3, IL-4, IL-5, IL-6, IL-7, IL-8, IL-9, IL-10, IL-11, IL-12, IL-23, TNF-α, TNF-β, interferon (IFN)-α, IFN-β, IFN-γ, and GM-CSF); and anti-cytokine antibodies (e.g., anti-IL-2 antibodies, anti-IL-4 antibodies, anti-IL-6 antibodies, anti-IL-10 antibodies, anti-IL-12 antibodies, anti-IL-15 antibodies, anti-TNF-α antibodies, and anti-IFN-γ antibodies), and antibodies that immunospecifically bind to tumor-associated antigens (e.g., Herceptin®). In certain embodiments, an immunomodulatory agent is an immunomodulatory agent other than a chemotherapeutic agent. In other embodiments an immunomodulatory agent is an immunomodulatory agent other than a cytokine or hematopoietic factor such as IL-1, IL-2, IL-4, IL-12, TNF, IFN-α, IFN-β, IFN-γ, M-CSF, G-CSF, IL-3 or erythropoietin. In other embodiments, an immunomodulatory agent is an agent other than a chemotherapeutic agent and a cytokine or hematopoietic factor.

Non-limiting examples of anti-cancer agents that can be sequentially, separately or simultaneously administered with an IL-15/IL-15Rα-Fc complex of the present technology include, but are not limited to: acivicin; aclarubicin; acodazole hydrochloride; acronine; adozelesin; aldesleukin; altretamine; ambomycin; ametantrone acetate; aminoglutethimide; amsacrine; anastrozole; anthramycin; asparaginase; asperlin; azacitidine; azetepa; azotomycin; batimastat; benzodepa; bicalutamide; bisantrene hydrochloride; bisnafide dimesylate; bizelesin; bleomycin sulfate; brequinar sodium; bropirimine; busulfan; cactinomycin; calusterone; caracemide; carbetimer; carboplatin; carmustine; carubicin hydrochloride; carzelesin; cedefingol; chlorambucil; cirolemycin; cisplatin; cladribine; crisnatol mesylate; cyclophosphamide; cytarabine; dacarbazine; dactinomycin; daunorubicin hydrochloride; decitabine; dexormaplatin; dezaguanine; dezaguanine mesylate; diaziquone; docetaxel; doxorubicin; doxorubicin hydrochloride; droloxifene; droloxifene citrate; dromostanolone propionate; duazomycin; edatrexate; eflornithine hydrochloride; elsamitrucin; enloplatin; enpromate; epipropidine; epirubicin hydrochloride; erbulozole; esorubicin hydrochloride; estramustine; estramustine phosphate sodium; etanidazole; etoposide; etoposide phosphate; etoprine; fadrozole hydrochloride; fazarabine; fenretinide; floxuridine; fludarabine phosphate; fluorouracil; flurocitabine; fosquidone; fostriecin sodium; gemcitabine; gemcitabine hydrochloride; hydroxyurea; idarubicin hydrochloride; ifosfamide; ilmofosine; interleukin II (including recombinant interleukin II, or rIL2), interferon alpha-2a; interferon alpha-2b; interferon alpha-n1; interferon alpha-n3; interferon beta-Ia; interferon gamma-Ib; iproplatin; irinotecan hydrochloride; lanreotide acetate; letrozole; leuprolide acetate; liarozole hydrochloride; lometrexol sodium; lomustine; losoxantrone hydrochloride; masoprocol; maytansine; mechlorethamine hydrochloride; megestrol acetate; melengestrol acetate; melphalan; menogaril; mercaptopurine; methotrexate; methotrexate sodium; metoprine; meturedepa; mitindomide; mitocarcin; mitocromin; mitogillin; mitomalcin; mitomycin; mitosper; mitotane; mitoxantrone hydrochloride; mycophenolic acid; nocodazole; nogalamycin; ormaplatin; oxisuran; paclitaxel; pegaspargase; peliomycin; pentamustine; peplomycin sulfate; perfosfamide; pipobroman; piposulfan; piroxantrone hydrochloride; plicamycin; plomestane; porfimer sodium; porfiromycin; prednimustine; procarbazine hydrochloride; puromycin; puromycin hydrochloride; pyrazofurin; riboprine; rogletimide; safingol; safingol hydrochloride; semustine; simtrazene; sparfosate sodium; sparsomycin; spirogermanium hydrochloride; spiromustine; spiroplatin; streptonigrin; streptozocin; sulofenur; tallysomycin; tecogalan sodium; tegafur; teloxantrone hydrochloride; temoporfin; teniposide; teroxirone; testolactone; thiamiprine; thioguanine; thiotepa; tiazofurin; tirapazamine; toremifene citrate; trestolone acetate; triciribine phosphate; trimetrexate; trimetrexate glucuronate; triptorelin; tubulozole hydrochloride; uracil mustard; uredepa; vapreotide; verteporfin; vinblastine sulfate; vincristine sulfate; vindesine; vindesine sulfate; vinepidine sulfate; vinglycinate sulfate; vinleurosine sulfate; vinorelbine tartrate; vinrosidine sulfate; vinzolidine sulfate; vorozole; zeniplatin; zinostatin; zorubicin hydrochloride. Other anti-cancer drugs that can be sequentially, separately or simultaneously administered with an IL-15/IL-15Rα-Fc complex of the present technology include, but are not limited to: 20-epi-1,25 dihydroxyvitamin D3; 5-ethynyluracil; abiraterone; aclarubicin; acylfulvene; adecypenol; adozelesin; aldesleukin; ALL-TK antagonists; altretamine; ambamustine; amidox; amifostine;

aminolevulinic acid; amrubicin; amsacrine; anagrelide; anastrozole; andrographolide; angiogenesis inhibitors; antagonist D; antagonist G; antarelix; anti-dorsalizing morphogenetic protein-1; antiandrogen, prostatic carcinoma; antiestrogen; antineoplaston; antisense oligonucleotides; aphidicolin glycinate; apoptosis gene modulators; apoptosis regulators; apurinic acid; ara-CDP-DL-PTBA; arginine deaminase; asulacrine; atamestane; atrimustine; axinastatin 1; axinastatin 2; axinastatin 3; azasetron; azatoxin; azatyrosine; baccatin III derivatives; balanol; batimastat; BCR/ABL antagonists; benzochlorins; benzoylstaurosporine; beta lactam derivatives; beta-alethine; betaclamycin B; betulinic acid; bFGF inhibitor; bicalutamide; bisantrene; bisaziridinylspermine; bisnafide; bistratene A; bizelesin; breflate; bropirimine; budotitane; buthionine sulfoximine; calcipotriol; calphostin C; camptothecin derivatives; canarypox IL-2; capecitabine; carboxamide-amino-triazole; carboxyamidotriazole; CaRest M3; CARN 700; cartilage derived inhibitor; carzelesin; casein kinase inhibitors (ICOS); castanospermine; cecropin B; cetrorelix; chlorins; chloroquinoxaline sulfonamide; cicaprost; cis-porphyrin; cladribine; clomifene analogues; clotrimazole; collismycin A; collismycin B; combretastatin A4; combretastatin analogue; conagenin; crambescidin 816; crisnatol; cryptophycin 8; cryptophycin A derivatives; curacin A; cyclopentanthraquinones; cycloplatam; cypemycin; cytarabine ocfosfate; cytolytic factor; cytostatin; dacliximab; decitabine; dehydrodidemnin B; deslorelin; dexamethasone; dexifosfamide; dexrazoxane; dexverapamil; diaziquone; didemnin B; didox; diethylnorspermine; dihydro-5-azacytidine; 9-dihydrotaxol; dioxamycin; diphenyl spiromustine; docetaxel; docosanol; dolasetron; doxifluridine; droloxifene; dronabinol; duocarmycin SA; ebselen; ecomustine; edelfosine; edrecolomab; eflornithine; elemene; emitefur; epirubicin; episteride; estramustine analogue; estrogen agonists; estrogen antagonists; etanidazole; etoposide phosphate; exemestane; fadrozole; fazarabine; fenretinide; filgrastim; finasteride; flavopiridol; flezelastine; fluasterone; fludarabine; fluorodaunorunicin hydrochloride; forfenimex; formestane; fostriecin; fotemustine; gadolinium texaphyrin; gallium nitrate; galocitabine; ganirelix; gelatinase inhibitors; gemcitabine; glutathione inhibitors; hepsulfam; heregulin; hexamethylene bisacetamide; hypericin; ibandronic acid; idarubicin; idoxifene; idramantone; ilmofosine; ilomastat; imidazoacridones; imiquimod; immunostimulant peptides; insulin-like growth factor-1 receptor inhibitor; interferon agonists; interferons; interleukins; iobenguane; iododoxorubicin; ipomeanol, 4-; iroplact; irsogladine; isobengazole; isohomohalicondrin B; itasetron; jasplakinolide; kahalalide F; lamellarin-N triacetate; lanreotide; leinamycin; lenograstim; lentinan sulfate; leptolstatin; letrozole; leukemia inhibiting factor; leukocyte alpha interferon; leuprolide+estrogen+progesterone; leuprorelin; levamisole; liarozole; linear polyamine analogue; lipophilic disaccharide peptide; lipophilic platinum compounds; lissoclinamide 7; lobaplatin; lombricine; lometrexol; lonidamine; losoxantrone; HMG-CoA reductase inhibitor (such as but not limited to, Lovastatin, Pravastatin, Fluvastatin, Statin, Simvastatin, and Atorvastatin); loxoribine; lurtotecan; lutetium texaphyrin; lysofylline; lytic peptides; maitansine; mannostatin A; marimastat; masoprocol; maspin; matrilysin inhibitors; matrix metalloproteinase inhibitors; menogaril; merbarone; meterelin; methioninase; metoclopramide; MIF inhibitor; mifepristone; miltefosine; mirimostim; mismatched double stranded RNA; mitoguazone; mitolactol; mitomycin analogues; mitonafide; mitotoxin; fibroblast growth factor-saporin; mitoxantrone; mofarotene; molgramostim; monoclonal antibody, human chorionic gonadotrophin; monophosphoryl lipid A+myobacterium cell wall sk; mopidamol; multiple drug resistance gene inhibitor; multiple tumor suppressor 1-based therapy; mustard anticancer agent; mycaperoxide B; mycobacterial cell wall extract; myriaporone; N-acetyldinaline; N-substituted benzamides; nafarelin; nagrestip; naloxone+pentazocine; napavin; naphterpin; nartograstim; nedaplatin; nemorubicin; neridronic acid; neutral endopeptidase; nilutamide; nisamycin; nitric oxide modulators; nitroxide antioxidant; nitrullyn; O6-benzylguanine; octreotide; okicenone; oligonucleotides; onapristone; ondansetron; ondansetron; oracin; oral cytokine inducer; ormaplatin; osaterone; oxaliplatin; oxaunomycin; paclitaxel; paclitaxel analogues; paclitaxel derivatives; palauamine; palmitoylrhizoxin; pamidronic acid; panaxytriol; panomifene; parabactin; pazelliptine; pegaspargase; peldesine; pentosan polysulfate sodium; pentostatin; pentrozole; perflubron; perfosfamide; perillyl alcohol; phenazinomycin; phenylacetate; phosphatase inhibitors; picibanil; pilocarpine hydrochloride; pirarubicin; piritrexim; placetin A; placetin B; plasminogen activator inhibitor; platinum complex; platinum compounds; platinum-triamine complex; porfimer sodium; porfiromycin; prednisone; propyl bis-acridone; prostaglandin J2; proteasome inhibitors; protein A-based immune modulator; protein kinase C inhibitor; protein kinase C inhibitors, microalgal; protein tyrosine phosphatase inhibitors; purine nucleoside phosphorylase inhibitors; purpurins; pyrazoloacridine; pyridoxylated hemoglobin polyoxyethylene conjugate; RAF antagonists; raltitrexed; ramosetron; RAS farnesyl protein transferase inhibitors; RAS inhibitors; RAS-GAP inhibitor; retelliptine demethylated; rhenium Re 186 etidronate; rhizoxin; ribozymes; RII retinamide; rogletimide; rohitukine; romurtide; roquinimex; rubiginone B1; ruboxyl; safingol; saintopin; SarCNU; sarcophytol A; sargramostim; Sdi 1 mimetics; semustine; senescence derived inhibitor 1; signal transduction inhibitors; signal transduction modulators; single chain antigen binding protein; sizofiran; sobuzoxane; sodium borocaptate; sodium phenylacetate; solverol; somatomedin binding protein; sonermin; sparfosic acid; spicamycin D; spiromustine; splenopentin; spongistatin 1; squalamine; stem cell inhibitor; stem-cell division inhibitors; stipiamide; stromelysin inhibitors; sulfinosine; superactive vasoactive intestinal peptide antagonist; suradista; suramin; swainsonine; synthetic glycosaminoglycans; tallimustine; tamoxifen methiodide; tauromustine; tazarotene; tecogalan sodium; tegafur; tellurapyrylium; telomerase inhibitors; temoporfin; temozolomide; teniposide; tetrachlorodecaoxide; tetrazomine; thaliblastine; thiocoraline; thrombopoietin; thrombopoietin mimetic; thymalfasin; thymopoietin receptor agonist; thymotrinan; thyroid stimulating hormone; tin ethyl etiopurpurin; tirapazamine; titanocene bichloride; topsentin; toremifene; totipotent stem cell factor; translation inhibitors; tretinoin; triacetyluridine; triciribine; trimetrexate; triptorelin; tropisetron; turosteride; tyrosine kinase inhibitors; tyrphostins; UBC inhibitors; ubenimex; urogenital sinus-derived growth inhibitory factor; urokinase receptor antagonists; vapreotide; variolin B; erythrocyte gene therapy; velaresol; veramine; verdins; verteporfin; vinorelbine; vinxaltine; Vitaxin®; vorozole; zanoterone; zeniplatin; zilascorb; and zinostatin stimalamer.

Non-limiting examples of anti-hormonal agents are anti-hormonal agents that act to regulate or inhibit hormone action on tumors, such as anti-estrogens and selective estrogen receptor modulators (SERMs), including, for example, tamoxifen (including NOLVADEX® tamoxifen), raloxifene, droloxifene, 4-hydroxytamoxifen, trioxifene, keoxifene, LY 117018, onapristone, and FARESTON toremifene; aromatase inhibitors that inhibit the enzyme aromatase, which regulates estrogen production in the adrenal glands, such as, for example, 4(5)-imidazoles, aminoglutethimide, MEGASE® megestrol acetate, AROMASIN® V exemestane, formestanie, fadrozole, RIVISOR® vorozole, FEMARA® letrozole, and ARIMIDEX® D anastrozole; and anti-androgens such as flutamide, nilutamide, bicalutamide, leuprolide, and goserelin; as well as troxacitabine (a 1,3-dioxolane nucleoside cytosine analog); antisense oligonucleotides, particularly those which inhibit expression of genes in signaling pathways implicated in aberrant cell proliferation, such as, for example, PKC-alpha, Raf and H-Ras; ribozymes such as a VEGF expression inhibitor (e.g., ANGIOZYME® ribozyme) and a HER2 expression inhibitor; vaccines such as gene therapy vaccines, for example, ALLOVECTIN® vaccine, LEUVECTIN® vaccine, and VAXID® vaccine; PROLEUKIN® rIL-2; LURTOTECAN® topoisomerase 1 inhibitor; ABARELX® rmRH; Vinorelbine and Esperamicins (see U.S. Pat. No. 4,675,187), and pharmaceutically acceptable salts, acids or derivatives of any of the above.

In one embodiment, the one or more additional cancer therapies include, but are not limited to cytokines/growth factors, e.g., interleukin (IL) 1, IL-2, IL-3, IL-4, IL-5, IL-6, IL-7, IL-8, IL-10, IL-11, IL-12, TNF-α, TNF-β, TGF-β, GM-CSF, and interferon-γ. In one embodiment, the one or more additional cancer therapies include, but are not limited to receptors, antibodies, or other binding agents that bind to cytokines/growth factors, e.g., interleukin (IL) 1, IL-2, IL-3, IL-4, IL-5, IL-6, IL-7, IL-8, IL-10, IL-11, IL-12, TNF-α, TNF-β, TGF-β, GM-CSF, interferon-α, interferon-β, and interferon-γ. In some embodiments, the one or more additional cancer therapies include, but are not limited to, cells recombinantly expressing a therapeutic protein (or polypeptides), e.g., a cytokine, a growth factor, a chemokine, or a fragment or derivative thereof. In a particular embodiment, the one or more additional cancer therapies include, but are not limited to, cells recombinantly expressing IL-12, IL-6, GM-CSF, interferon-α, interferon-β, interferon-γ or TNF-α. In certain embodiments, such therapies are administered prior to, concurrently with, or after administration of an IL-15/IL-15Rα-Fc complex of the present technology, wherein the IL-15/IL-15Rα-Fc complex of the present technology is administered in accordance with the methods described herein.

Antiviral Agents. Antiviral agents that can be sequentially, separately or simultaneously administered with an IL-15/IL-15Rα-Fc complex of the present technology include, but are not limited to, non-nucleoside reverse transcriptase inhibitors, nucleoside reverse transcriptase inhibitors, protease inhibitors, and fusion inhibitors. In some embodiments, the antiviral agent is selected from the group consisting of amantadine, oseltamivir phosphate, rimantadine, and zanamivir. In certain embodiments, the antiviral agent is a non-nucleoside reverse transcriptase inhibitor selected from the group consisting of delavirdine, efavirenz, and nevirapine. In another embodiment, the antiviral agent is a nucleoside reverse transcriptase inhibitor selected from the group consisting of abacavir, didanosine, emtricitabine, emtricitabine, lamivudine, stavudine, tenofovir DF, zalcitabine, and zidovudine. In another embodiment, the antiviral agent is a protease inhibitor selected from the group consisting of amprenavir, atazanavir, fosamprenav, indinavir, lopinavir, nelfinavir, ritonavir, and saquinavir. In another embodiment, the antiviral agent is a fusion inhibitor such as enfuvirtide.

Additional, non-limiting examples of antiviral agents that can be sequentially, separately or simultaneously administered with an IL-15/IL-15Rα-Fc complex of the present technology include the following: rifampicin, nucleoside reverse transcriptase inhibitors (e.g., AZT, ddI, ddC, 3TC, d4T), non-nucleoside reverse transcriptase inhibitors (e.g., delavirdine efavirenz, nevirapine), protease inhibitors (e.g., aprenavir, indinavir, ritonavir, and saquinavir), idoxuridine, cidofovir, acyclovir, ganciclovir, zanamivir, amantadine, and palivizumab. Other examples of anti-viral agents include but are not limited to acemannan; acyclovir; acyclovir sodium; adefovir; alovudine; alvircept sudotox; amantadine hydrochloride; aranotin; arildone; atevirdine mesylate; avridine; cidofovir; cipamfylline; cytarabine hydrochloride; delavirdine mesylate; desciclovir; didanosine; disoxaril; edoxudine; enviradene; enviroxime; famciclovir; famotine hydrochloride; fiacitabine; fialuridine; fosarilate; foscamet sodium; fosfonet sodium; ganciclovir; ganciclovir sodium; idoxuridine; kethoxal; lamivudine; lobucavir; memotine hydrochloride; methisazone; nevirapine; oseltamivir phosphate; penciclovir; pirodavir; ribavirin; rimantadine hydrochloride; saquinavir mesylate; somantadine hydrochloride; sorivudine; statolon; stavudine; tilorone hydrochloride; trifluridine; valacyclovir hydrochloride; vidarabine; vidarabine phosphate; vidarabine sodium phosphate; viroxime; zalcitabine; zanamivir (RELENZA™); zidovudine; and zinviroxime.

Antifungal agents. Antifungal agents that can be sequentially, separately or simultaneously administered with an IL-15/IL-15Rα-Fc complex of the present technology include, but are not limited to, terbinafine, amphotericin, Flucytosine, azoles (e.g., Fluconazole®, Itraconazole®, Ketoconazole®, Miconazole®, Clortrimazole®, Voriconazole®, Isavuconazole®, Posaconazole®, Econazole®, Rovuconazole®, etc.), polyenes (e.g., natamycin, lucensomycin, nystatin, amphotericin B, etc.), echinocandins (e.g., Cancidas®), pradimicins (e.g., beanomicins, nikkomycins, sordarins, allylamines, etc.) and derivatives and analogs thereof. In some embodiments, antibiotics are sequentially, separately or simultaneously administered with an IL-15/IL-15Rα-Fc complex of the present technology to prevent and/or treat a fungal infection.

Antibacterial Agents. Antibacterial agents, including antibiotics, that can be sequentially, separately or simultaneously administered with an IL-15/IL-15Rα-Fc complex of the present technology include, but are not limited to, aminoglycoside antibiotics, glycopeptides, amphenicol antibiotics, ansamycin antibiotics, cephalosporins, cephamycins oxazolidinones, penicillins, quinolones, streptogramins, tetracyclins, and analogs thereof. In some embodiments, antibiotics are sequentially, separately or simultaneously administered with an IL-15/IL-15Rα-Fc complex of the present technology to prevent and/or treat a bacterial infection.

In some embodiments, an IL-15/IL-15Rα-Fc complex of the present technology may be used in combination with other protein synthesis inhibitors, including but not limited to, streptomycin, neomycin, erythromycin, carbomycin, and spiramycin. In certain embodiments, the antibacterial agent is selected from the group consisting of ampicillin, amoxicillin, ciprofloxacin, gentamycin, kanamycin, neomycin, penicillin G, streptomycin, sulfanilamide, and vancomycin. In other embodiments, the antibacterial agent is selected from the group consisting of azithromycin, cefonicid, cefotetan, cephalothin, cephamycin, chlortetracycline, clarithromycin, clindamycin, cycloserine, dalfopristin, doxycycline, erythromycin, linezolid, mupirocin, oxytetracycline, quinupristin, rifampin, spectinomycin, and trimethoprim.

Additional, non-limiting examples of antibacterial agents that can be sequentially, separately or simultaneously administered with an IL-15/IL-15Rα-Fc complex of the present technology include the following: aminoglycoside antibiotics (e.g., apramycin, arbekacin, bambermycins, butirosin, dibekacin, neomycin, neomycin, undecyclenate, netilmicin, paromomycin, ribostamycin, sisomicin, and spectinomycin), amphenicol antibiotics (e.g., azidamfenicol, chloramphenicol, florfenicol, and thiamphenicol), ansamycin antibiotics (e.g., rifamide and rifampin), carbacephems (e.g., loracarbef), carbapenems biapenem and imipenem), cephalosporins (e.g., cefaclor, cefadroxil, cefamandole, cefatrizine, cefazedone, cefozopran, cefpimizole, cefpiramide, and cefpirome), cephamycins (e.g., cefbuperazone, cefmetazole, and cefminox), folic acid analogs (e.g., trimethoprim), glycopeptides (e.g., vancomycin), lincosamides (e.g., clindamycin, and lincomycin), macrolides (e.g., azithromycin, carbomycin, clarithomycin, dirithromycin, erythromycin, and erythromycin acistrate), monobactams (e.g., aztreonam, carumonam, and tigemonam), nitrofurans (e.g., furaltadone, and furazolium chloride), oxacephems (e.g., flomoxef, and moxalactam), oxazolidinones (e.g., linezolid), penicillins (e.g., amdinocillin, amdinocillin pivoxil, amoxicillin, bacampicillin, benzylpenicillinic acid, benzylpenicillin sodium, epicillin, fenbenicillin, floxacillin, penamecillin, penethamate hydriodide, penicillin o benethamine, penicillin 0, penicillin V, penicillin V benzathine, penicillin V hydrabamine, penimepicycline, and phencihicillin potassium), quinolones and analogs thereof (e.g., cinoxacin, ciprofloxacin, clinafloxacin, flumequine, grepagloxacin, levofloxacin, and moxifloxacin), streptogramins (e.g., quinupristin and dalfopristin), sulfonamides (e.g., acetyl sulfamethoxypyrazine, benzylsulfamide, noprylsulfamide, phthalylsulfacetamide, sulfachrysoidine, and sulfacytine), sulfones (e.g., diathymosulfone, glucosulfone sodium, and solasulfone), and tetracyclines (e.g., apicycline, chlortetracycline, clomocycline, and demeclocycline). Additional examples include cycloserine, mupirocin, tuberin amphomycin, bacitracin, capreomycin, colistin, enduracidin, enviomycin, and 2,4 diaminopyrimidines (e.g., brodimoprim).

Assays for Testing the Function of the IL-15/IL-15Rα-Fc Complexes of the Present Technology The activity of an IL-15/IL-15Rα-Fc complex disclosed herein can be assayed with an IL-15 sensitive cell line, e.g., CTLL-2 cells, a mouse cytotoxic T lymphoma cell line (ATCC Accession No. TIB-214) or TF1-β cells. See, e.g., International Publication No. WO 05/085282.

To assess the activity of the IL-15/IL-15Rα-Fc complexes described herein, proliferation of CTLL-2 or TF1-β cells cultured in the presence or absence of one or more IL-15/IL-15Rα-Fc complexes of the present technology can be assessed by $^3$H-thymidine incorporation assays well known in the art and described in International Publication No. WO 05/085282.

In one aspect, the IL-15/IL-15Rα-Fc complex of the present technology increases an immune response that can be, e.g., an antibody response (humoral response) or a cellular immune response, e.g., cytokine secretion (e.g., interferon-gamma), helper activity or cellular cytotoxicity. In some embodiments, the increased immune response is increased cytokine secretion, antibody production, effector function, T cell proliferation, and/or NK cell proliferation. Various assays to measure such activities are well known in the art, and exemplary descriptions of such assays are provided below.

For example, enzyme-linked immunosorbent assays (ELISA) are well known in the art and are described, e.g., in Section 2.1 of Current Protocols in Immunology, Coligan et al. (eds.), John Wiley and Sons, Inc. 1997. ELISA can be used, e.g., to assay the amount or concentration of IL-15 or IL-15Rα polypeptide.

In another method, the "tetramer staining" assay (Altman et al., 1996, *Science* 274: 94-96) may be used to identify antigen-specific T cells and to assess how IL-15/IL-15Rα-Fc complexes of the present technology modulate (e.g., enhance or suppress) antigen-specific T cell responses. For example, an WIC molecule containing a specific peptide antigen, such as a tumor-specific antigen, is multimerized to make soluble peptide tetramers and labeled, for example, by complexing to streptavidin. The WIC-peptide antigen complex is then mixed with a population of T cells obtained from a subject administered with an immunogenic composition alone or in combination with an IL-15/IL-15Rα-Fc complex of the present technology. Biotin is then used to stain T cells which express the tumor-specific antigen of interest.

Furthermore, using the mixed lymphocyte target culture assay, the cytotoxicity of T cells can be tested in a $^{51}$Cr-release assay as described, e.g., in Palladino et al., 1987, *Cancer Res.* 47:5074-5079. Briefly, the mixed lymphocyte culture is added to a target cell suspension to give different effector:target (E:T) ratios (usually 1:1 to 40:1). The target cells are pre-labeled by incubating $1\times10^6$ target cells in culture medium containing 500 µCi of $^{51}$Cr per ml for one hour at 37° C. The cells are washed three times following labeling. Each assay point (E:T ratio) is performed in triplicate and the appropriate controls incorporated to measure spontaneous $^{51}$Cr release (no lymphocytes added to assay) and 100% release (cells lysed with detergent). After incubating the cell mixtures for 4 hours, the cells are pelleted by centrifugation at 200×g for 5 minutes. The amount of $^{51}$Cr released into the supernatant is measured by a gamma counter. The percent cytotoxicity may be measured as cpm in the test sample minus spontaneously released cpm divided by the total detergent released cpm minus spontaneously released cpm.

In some embodiments, an ELISPOT assay can be used to measure cytokine release in vitro by T cells after administration of an effective amount of an IL-15/IL-15Rα-Fc complex of the present technology to a subject. Cytokine release is detected by antibodies which are specific for a particular cytokine, e.g., interleukin-2, or interferon-γ (see, e.g., Scheibenbogen et al., 1997, *Int. J. Cancer* 71:932-936). The assay is carried out in a microtitre plate which has been pre-coated with an antibody specific for a cytokine of interest which captures the cytokine secreted by T cells. After incubation of T cells for 24-48 hours in the coated wells, the T cells are removed and replaced with a second labeled antibody that recognizes a different epitope on the cytokine. After extensive washing to remove unbound antibody, an enzyme substrate which produces a colored reaction product is added to the plate. The number of cytokine-producing cells is counted under a microscope.

In some aspects, the immune response induced or enhanced by an IL-15/IL-15Rα-Fc complex of the present technology is enhanced or increased by at least 2 fold, 3 fold, 4 fold, 5 fold, 6 fold, 7 fold, 8 fold, 9 fold, 10 fold, 11 fold, or 12 fold relative to an immune response elicited by a negative control as determined by any known assay in the art. In certain embodiments, the immune response induced by the IL-15/IL-15Rα-Fc complex of the present technology is enhanced by at least 0.5-2 times, at least 2-5 times, at least 5-10 times, at least 10-50 times, at least 50-100 times, at least 100-200 times, at least 200-300 times, at least 300-400 times or at least 400-500 times relative to the immune response induced by a negative control as assayed by any known method in the art. In specific embodiments, the assay used to assess immune response measures the level of antibody production, cytokine production, or cellular cytoxicity, and such assays are well known in the art. In some embodiments, the assay used to measure the immune response is an enzyme-linked immunosorbent assay (ELISA) that determines antibody or cytokine levels, an ELISPOT assay that determines cytokine release, or a $^{51}$Cr release assay that determines cellular cytotoxicity.

In some embodiments, the IL-15/IL-15Rα-Fc complex of the present technology induces or enhances an immune response in a subject that is measured by antibody titer in the serum of the subject, and the antibody titer is at least 0.2 to 5 times, 5 to 20 times, 10 to 30 times, 20 to 50 times, 50 to 200 times, 100 to 500, 200 to 1000 times, or 500 to 2,000 times higher as compared to the antibody titer in the serum of a subject administered a negative control. In certain embodiments, the mean serum antibody titer against an antigen in the subject administered the IL-15/IL-15Rα-Fc complex of the present technology is increased by at least 0.5-2 times, at least 2-5 times, at least 5-10 times, at least 10-50 times, at least 50-100 times, at least 100-200 times, at least 200-300 times, at least 300-400 times or at least 400-500 times relative to the mean serum antibody titer in the subject administered a negative control as determined by methods well known in the art.

In other embodiments, provided herein are methods of administering IL-15/IL-15Rα-Fc complexes of the present technology to induce or enhance the level of cytokine production or secretion, e.g., interferon-γ, (that may be 0.5 to 500 times higher) as compared to the level of cytokine production or secretion in a negative control sample. In some embodiments, the IL-15/IL-15Rα-Fc complex of the present technology induces or enhances an immune response that is measured by increased cytokine release, and the cytokine concentration is at least 0.2 to 5 times, 5 to 20 times, 10 to 30 times, 20 to 50 times, 50 to 200 times, 100 to 500, 200 to 1000 times, or 500 to 2,000 times higher as compared to the cytokine concentration of a negative control. In some embodiments, the mean serum cytokine concentration of samples obtained from a subject administered the IL-15/IL-15Rα-Fc complex of the present technology is increased by at least 0.5-2 times, at least 2-5 times, at least 5-10 times, at least 10-50 times, at least 50-100 times, at least 100-200 times, at least 200-300 times, at least 300-400 times or at least 400-500 times relative to the mean serum cytokine concentration of samples obtained from a subject administered a negative control as determined by methods well known in the art. In some embodiments, the negative control can be samples from the subject prior to administration of the IL-15/IL-15Rα-Fc complex of the present technology.

In some embodiments, the IL-15/IL-15Rα-Fc complex of the present technology induces or enhances NK cell proliferation in a subject that by at least 0.2 to 5 times, 5 to 20 times, 10 to 30 times, 20 to 50 times, 50 to 200 times, 100 to 500, 200 to 1000 times, or 500 to 2,000 times higher relative to NK cell proliferation in a negative control. In certain embodiments, the IL-15/IL-15Rα-Fc complex of the present technology induces or enhances T cell proliferation in a subject that by at least 0.2 to 5 times, 5 to 20 times, 10 to 30 times, 20 to 50 times, 50 to 200 times, 100 to 500, 200 to 1000 times, or 500 to 2,000 times higher relative to T cell proliferation in a negative control as determined by methods well known in the art, e.g., flow cytometry, CSFE staining, $^3$H-thymidine incorporation.

The increase in antibody (humoral) or cellular immune response induced by an effective amount of the IL-15/IL-15Rα-Fc complex of the present technology can be assessed using various methods well known in the art.

Kits

The present disclosure provides kits comprising at least one IL-15/IL-15Rα-Fc complex of the present technology. Optionally, the above described components of the kits of the present technology are packed in suitable containers and labeled for treatment of a disease or condition in which enhancing IL-15-mediated function is beneficial (such as cancer, infectious diseases, immunodeficiencies and leukopenias). The above-mentioned components may be stored in unit or multi-dose containers, for example, sealed ampoules, vials, bottles, syringes, and test tubes, as an aqueous, preferably sterile, solution or as a lyophilized, preferably sterile, formulation for reconstitution. The kit may further comprise a second container which holds a diluent suitable for diluting the pharmaceutical composition towards a higher volume. Suitable diluents include, but are not limited to, the pharmaceutically acceptable excipient of the pharmaceutical composition and a saline solution. Furthermore, the kit may comprise instructions for diluting the pharmaceutical composition and/or instructions for administering the pharmaceutical composition, whether diluted or not. The containers may be formed from a variety of materials such as glass or plastic and may have a sterile access port (for example, the container may be an intravenous solution bag or a vial having a stopper which may be pierced by a hypodermic injection needle). The kit may further comprise more containers comprising a pharmaceutically acceptable buffer, such as phosphate-buffered saline, Ringer's solution and dextrose solution. It may further include other materials desirable from a commercial and user standpoint, including other buffers, diluents, filters, needles, syringes, culture medium for one or more of the suitable hosts. The kits may optionally include instructions customarily included in commercial packages of therapeutic products, that contain information about, for example, the indications, usage, dosage, manufacture, administration, contraindications and/or warnings concerning the use of such therapeutic products.

EXAMPLES

The present technology is further illustrated by the following Examples, which should not be construed as limiting in any way.

Example 1: Materials and Methods

Cell lines. Human neuroblastoma cell line IMR32 and mouse lymphoblast cell line CTLL-2 were purchased from ATCC (Manassas VA). Human melanoma cell line M14 was obtained from University of California, Los Angeles, and murine melanoma cell line B78/D14 from Dr. Kenneth Lloyd, MSKCC. All cells were authenticated by short tandem repeat profiling using PowerPlex 1.2 System (Promega, Madison WI), and periodically tested for *Mycoplasma* using a commercial kit (Lonza Group, Basel Switzerland). The luciferase-labeled tumor cell lines IMR32-Luc and M14-Luc were generated by retroviral infection with a SFG-GFLuc vector.

Cloning, Expression, Purification and Characterization of IL-15/IL-15Rα-Fc Complexes. Full length ectodomain of IL-15Rα (aa1-175) was fused to the CH2-CH3 of human IgG1 Fc region (represented by SEQ ID NO: 2). Wild type (WT) IL-15 (represented by SEQ ID NO: 1 or SEQ ID NO: 9), and N72D mutant IL-15 (MUT) (represented by SEQ ID NO: 5 or SEQ ID NO: 13) (to enhance affinity for IL-15(3-γc) in complex with either Sushi domain of IL-15Rα (SU, aa1-66 of IL-15Rα)-Fc fusion polypeptide (see FIG. 27-FIG. 28; SEQ ID NO: 10 or SEQ ID NO: 14) or an IL-15Rα-Fc fusion polypeptide including the full length extracellular domain of IL-15Rα (IL-15Rα-Fc) (SEQ ID NO: 2 or SEQ ID NO: 6) were made for comparison. N72D-DM complex refers to N72D mutant IL-15 (represented by SEQ ID NO: 17) in complex with mutant IL-15Rα-Fc (represented by SEQ ID NO: 18), which includes three glycosylation mutations in Fc domain to enhance CD16 FcR affinity.

These genes were synthesized by Genscript (Piscataway, NJ) with appropriate flanking restriction enzyme sites, and were subcloned into a single two-segment mammalian expression vector, which was used to transfect CHO-S cells (Invitrogen, Carlsbad CA) for stable production of protein complexes and selection of high producers. $1 \times 10^6$ cells were transfected with 2.5 μg of linearized plasmid DNA by Nucleofection (Lonza Group, Basel Switzerland) and then recovered in CD OptiCHO media supplemented with 8 mM L-glutamine (Invitrogen, Carlsbad CA) for two days at 37° C. in 6-well culture plate. Stable pools were selected first with 500 μg/ml hygromycin for approximately two weeks, single clones were then selected out with limited dilution.

IL-15/IL-15Rα-Fc complex titer was determined by ELISA, where plates were coated with anti-human IL-15 polyclonal goat IgG (R&D Systems, Minneapolis, MN) to capture the complex, and then detected with secondary goat anti-human IgG (Fc specific) (SouthernBiotech, Birmingham, AL). High expression clones with strong binding signals were selected for further subcloning. All complexes were purified using Protein A affinity chromatography, with protein yields of 0.3-1.2 g/L. All complexes were >90% monomers by HPLC. Following filtration through Q-membrane, step filter and viral filter, the HPLC of the purified FL complex showed a major peak (size consistent with a trimer of IL-15Rα-IL-15, see Examples). By ELISA and HPLC, these proteins were stable to freeze and thaw cycles and remained intact for ≥2 weeks at 4° C., at pH 4.2, pH 8.2 and pH 9, but not in PBS.

A high producer CHO cell line that secretes IL-15/IL-15Rα-Fc complexes was made in CHO-S (Invitrogen, Carlsbad, CA) selected in GS medium. High secretor clones were picked using the Clonepix FL system (Genetix, England). The production line has a stable secretion of ~300 mg/L of protein, and pass all tests as required by the FDA (FIG. 24). IL-15/IL-15Rα-Fc complex was purified by protein A, acid treated at pH4.0 to inactivate virus, filtered through Q membrane, a step filter and a viral filter.

Biochemical characterization of IL15/IL15Rα-Fc complexes. Ten micrograms of the protein were analyzed by SDS-PAGE under reducing conditions using 4-15% Tris-Glycine Ready Gel System (Bio-Rad, Hercules, CA). Invitrogen SeeBlue Plus2 Pre-Stained Standard (Carlsbad CA), or Life Technologies BenchMark Unstained Protein Ladder was used as the protein molecular weight (MW) marker. After electrophoresis, the gel was stained using Coomassie G-250 (GelCode Blue Stain Reagent; Pierce Biotechnology Inc., Rockford, IL). The size and purity of complexes was also evaluated by size-exclusion high-performance liquid chromatography (SE-HPLC). Approximately 20 μg of protein was injected into a TSK-GEL G4000SWXL 7.8 mm×30 cm, 8 μm column (TOSOH Bioscience, Tokyo, Japan) with 0.4 M $NaClO_4$, 0.05 M $NaH_2PO_4$, pH 6.0 buffer at flow rate of 0.5 mL/min, and UV detection at 280 nm. Ten microliters of gel-filtration standard (Sigma-Aldrich, St. Louis, MO) was analyzed in parallel for MW markers.

In vitro cell proliferation assays. For cell proliferation, mouse lymphoblast CTLL-2 cells (15,000 cells/well) plated using RPMI-1640 supplemented with 10% FBS in a 96 well plate were incubated with IL15 complexes at the specified concentration for 72 hrs at 37° C. Cell proliferation was determined using the cell counting WST-8 kit (Dojindo Molecular Technologies, Rockville, MD) following the manufacturer's instructions and using the formula: % survival rate=(Sample−Background)/(Negative control−Background).

Cytotoxicity Assays ($^{51}$chromium release assay). Cell cytotoxicity was performed by standard 4-hour $^{51}$Cr release assay, and $EC_{50}$ was calculated using SigmaPlot software. Effector PBMC cells were purified from buffy coats purchased from the New York Blood Center. PBMCs were cultured in vitro in medium either without (Medium) or with soluble IL15 or different IL15/IL15Rα complexes. After 72 hrs of culture, the PBMCs were harvested, re-adjusted in numbers and tested for cytotoxicity against M14 human melanoma cells either in the absence or presence of different antibodies.

ADCC assays were performed using fresh PBMC, PMN or NK92MI cells stably transfected with the human CD16A-158V Fc receptors, and effector to target ratio was kept at 25:1. Activated T cells (ATC) were first purified from human PBMC using Pan T cell isolation kit, and then activated and expanded for approximately 14 days with CD3/CD28 Dynabeads (Invitrogen, Carlsbad CA) according to the manufacturer's protocol.

In vivo therapy experiments. All animal procedures were performed in compliance with Institutional Animal Care and Use Committee (IACUC) guidelines. For in vivo therapy studies, BALB-Rag2$^{-/-}$IL-2R-γc-KO (DKO) mice (from Taconic (Rensselaer, NY) as CIEA BRG mice) or C57BL/6 mice (Jackson Laboratory, Bar Harbor ME) were used. Effector PBMC cells and ATCs were prepared as described above. Prior to every experimental procedure, PBMCs and ATCs were analyzed by FACS for their percentage of CD3-, CD4-, CD8- and CD56-positive cells to ensure consistency. Treatment schedules and doses of IL15 complexes, antibodies and effector cells are detailed in the Figures and Results described herein. s.c. xenografts were created with tumor cells suspended in Matrigel (Corning Corp, Tewksbury MA) and implanted in the flank of mice. Tumor size was measured using 1) hand-held TM900 scanner (Pieira, Brussels, BE), 2) Calipers, or 3) Bioluminescence. Bioluminescence imaging was conducted using the Xenogen In Vivo Imaging System (IVIS) 200 (Caliper Life Sciences, Waltham, MA). Briefly, mice were injected i.v. with 0.1 mL solution of D-luciferin (Gold Biotechnology, St. Louis, MO; 30 mg/mL stock in PBS). Images were collected 1 to 2 minutes after injection using the following parameters: a 10- to 60-second exposure time, medium binning, and an 8 f/stop. Bioluminescence image analysis was performed using Living Image 2.6 (Caliper Life Sciences, Waltham, MA).

In vivo lymphocyte expansion studies. The lymphocyte expansion studies were conducted in healthy C57BL/6 mice injected s.c. with 5 μg WT-FL, or molar equivalent of MUT-SU (as positive control) weekly for two consecutive weeks. Peripheral blood samples were collected 5 days after each dose, and CBC and FACS analysis were performed.

Absolute cell count was calculated by multiplying the white blood cell count from CBC and percentage of positive cells from FACS.

Pharmacokinetics studies. Blood was collected retro-orbitally from DKO mice at time 0.5, 1, 2, 4, 8, 12, 24, 48 and 72 hr after an injection of 50 µg of WT-IL-15/IL-15Rα-Fc or equimolar amount of other complexes subcutaneously, and the concentrations of IL15 complexes in mouse sera were quantified by ELISA. Pharmacokinetic analysis was carried out by non-compartmental analysis of the serum concentration-time data using WinNonlin software program (Pharsight Corp., Mountain View, CA).

Figure 31:
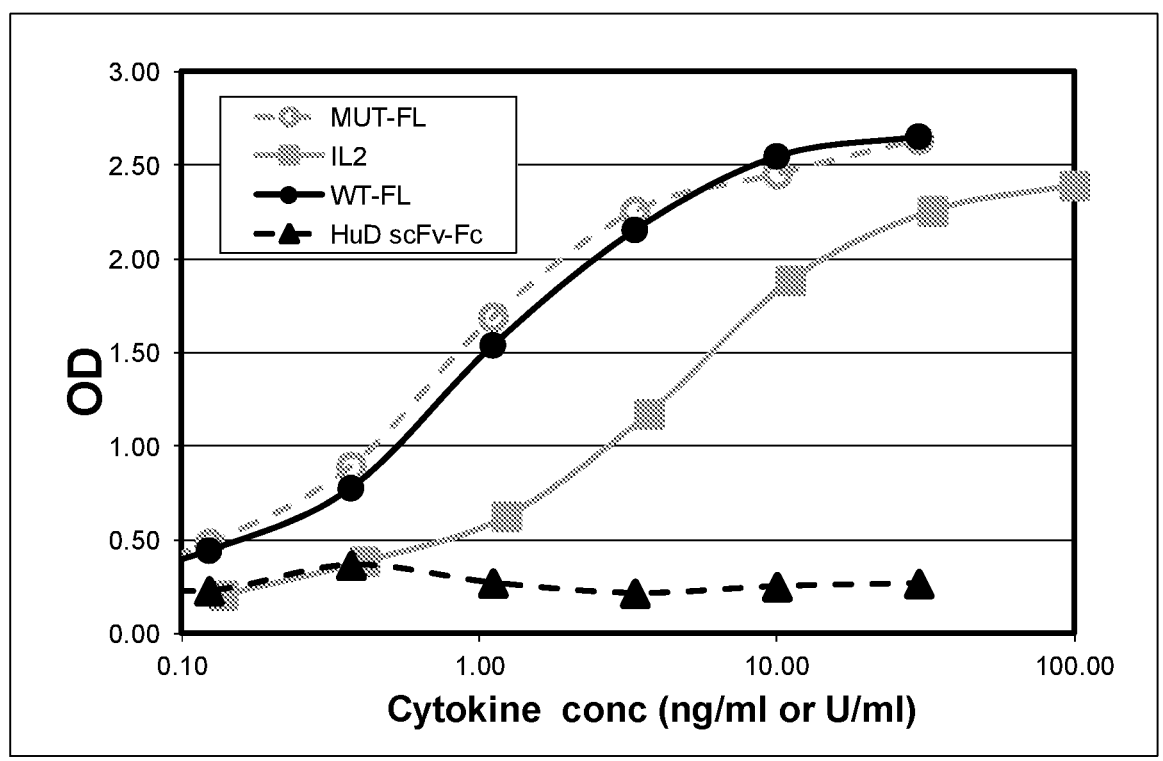
FIG. 31 shows the proliferation of NK92 cells in the presence of IL15/IL15Rα-Fc complexes disclosed herein.

Example 2: IL-15/IL-15Rα-Fc Complexes of the Present Technology Stimulate Immune Cells In Vitro In vitro bioassay for IL-15/IL-15Rα-Fc complexes. After incubating with either HuD scFv-Fc (a negative control scFv against neuronal antigen HuD), IL2 (positive control), or IL-15/IL-15Rα-Fc complex for three days, NK92 cell proliferation was measured using WST-8 cell proliferation assay kits (Dojindo Molecular Technologies, Rockville, MD). Both WT and N72D IL-15/IL-15Rα-Fc complexes were able to stimulate NK92 expansion in a dose-dependent manner (ng/ml) similar to IL2 (U/ml) (FIG. 31).

Figure 5:
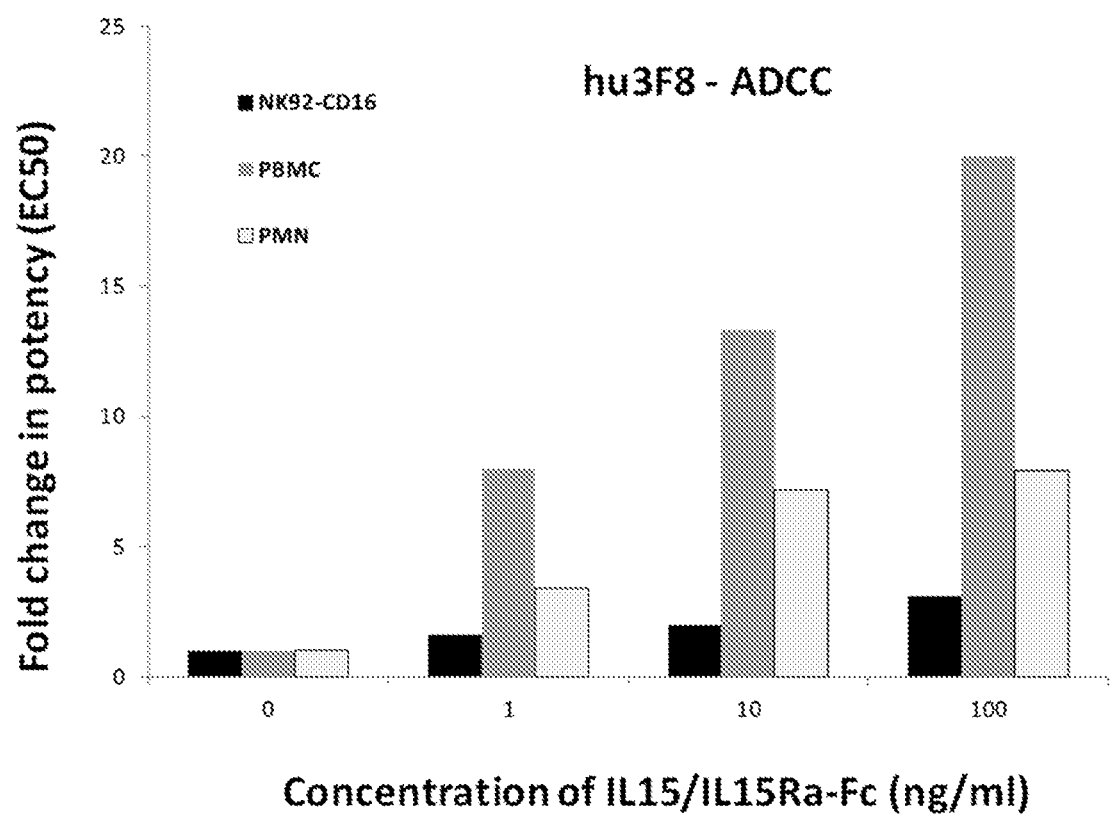
FIG. 5 shows ADCC activation by the IL-15/IL-15Rα-Fc complexes of the present technology. PBMC or PMN or NK92-CD16 effectors were mixed with LAN1 (neuroblastoma) targets at an E:T ratio of 25:1 in a $^{51}$Cr release assay at increasing concentrations of humanized anti-GD2 antibody hu3F8, at each depicted concentration of IL-15/IL-15Rα-Fc complex. Based on the $EC_{50}$, the relative increase in killer potency was calculated, and plotted as a function of IL-15/IL-15Rα-Fc (ng/ml).
Figure 6:
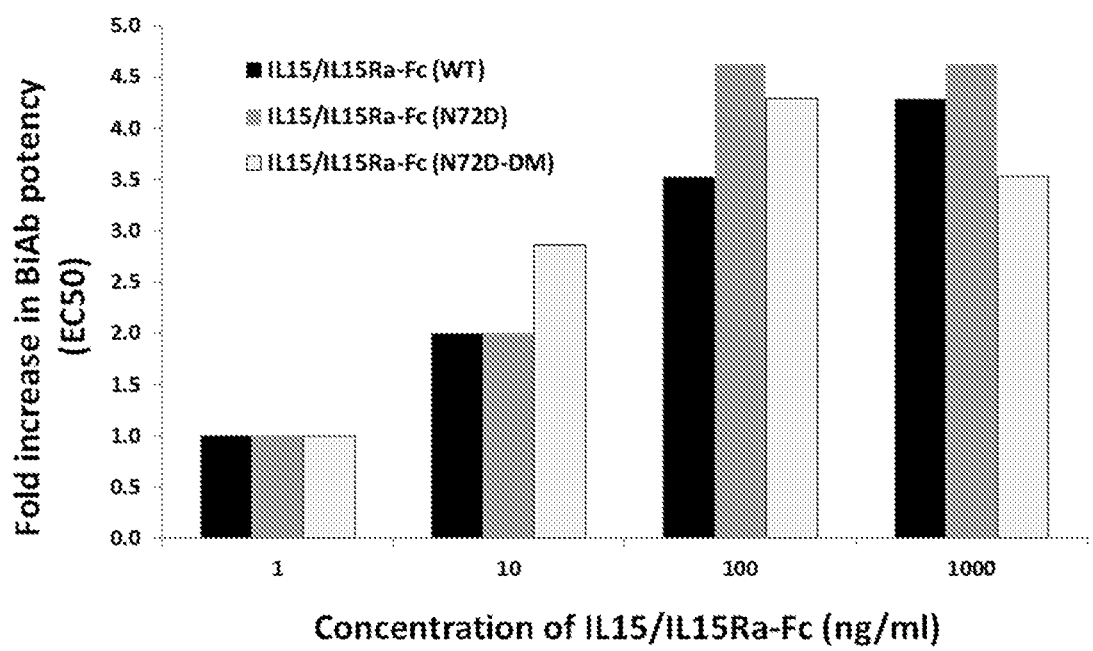
FIG. 6 shows ATC tumor cytotoxicity in the presence of hu3F8-huOKT3 bispecific antibody. T lymphocytes cultured in the presence of anti-CD3/anti-CD28 beads for 14 days (ATC) were mixed with IMR32 tumor targets at E:T ratio of 10:1 in a $^{51}$Cr release assay at increasing concentrations of bispecific hu3F8-huOKT3 antibody, at each depicted concentration of IL-15/IL-15Rα-Fc complex. Based on the $EC_{50}$, the relative increase in killer potency was calculated, and plotted as a function of IL-15/IL-15Rα-Fc complex (ng/ml).

In vitro stimulation of peripheral blood mononuclear cell (PBMC)-mediated antibody-dependent cellular cytotoxicity (ADCC) and polyclonal T cell mediated cytotoxicity Using IMR32 or LAN-1 (neuroblastoma) as targets, PBMC and polymorphonuclear neutrophils (PMN) as effectors, at E:T ratio of 25:1, hu3F8 (humanized anti-GD2 antibody naxitamab) was titrated in log-fold dilutions from 0.1 µg/ml down to 0.00001 µg/ml. IL-15/IL-15Rα-Fc complex was added from 1 ng/ml to 100 ng/ml final concentration, and specific release was measured by $^{51}$Cr release (FIG. 5). With activated T cells (ATC) (day 14 of in vitro culture of normal T cells in αCD3/αCD28) from normal volunteers as effectors (E:T=10:1), an anti-GD2/CD3 bispecific antibody [BsAb] (hu3F8-huOKT3) was added instead of hu3F8. Activation by IL-15/IL-15Rα-Fc complex (1 to 1000 ng/ml) was tested by $^{51}$Cr release assay (FIG. 6).

Figure 7:
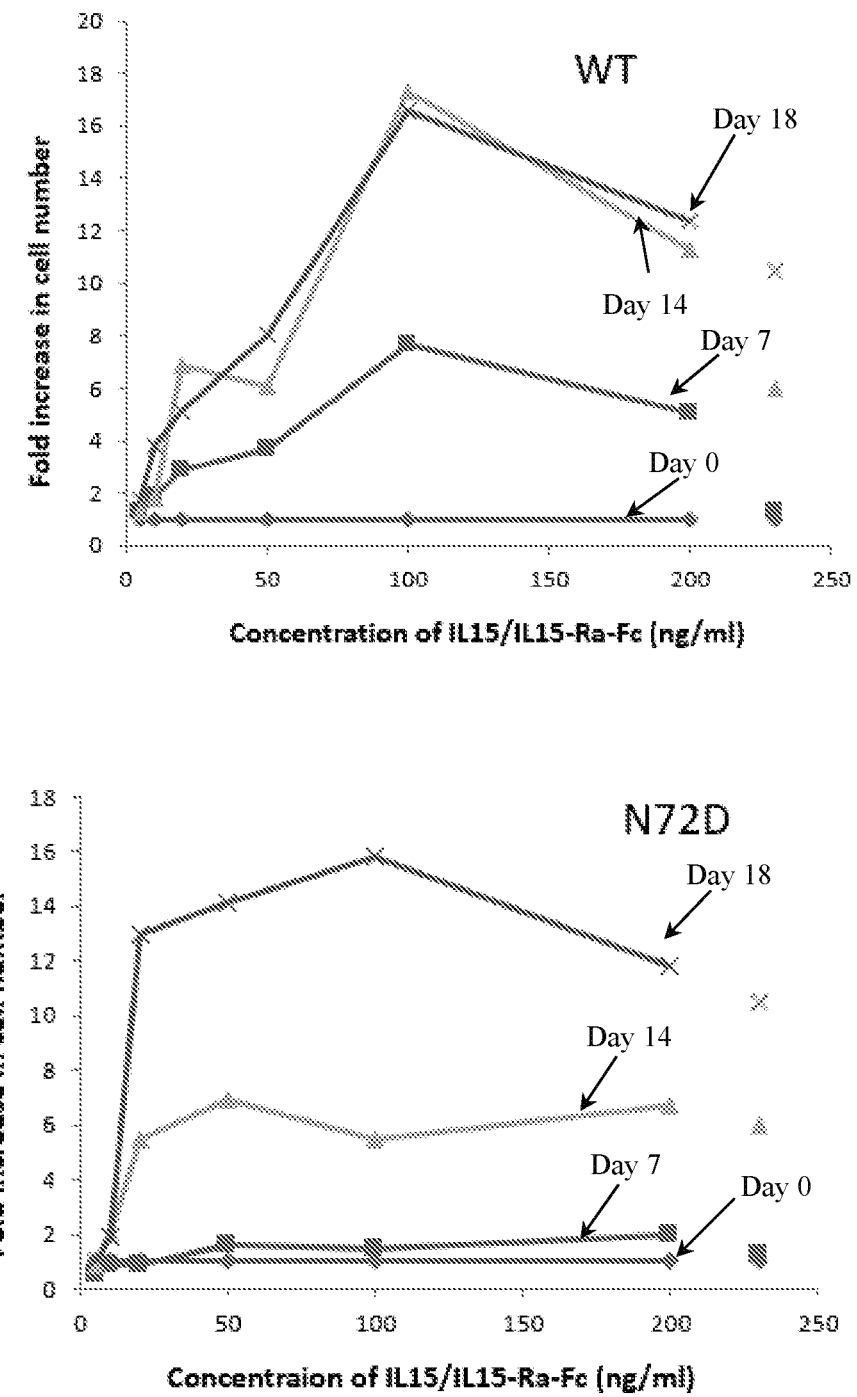
Figure 8A:
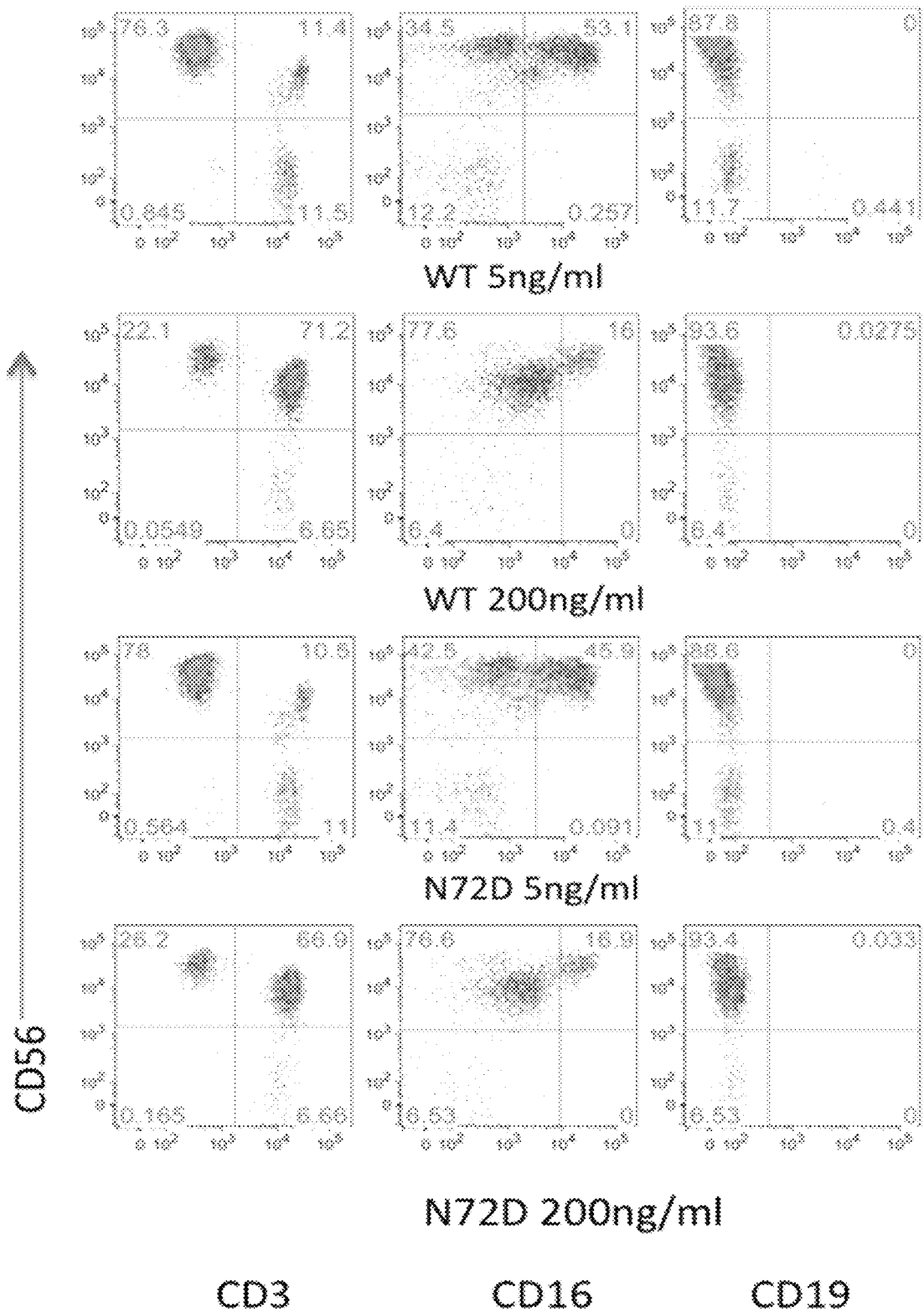
FIGS. 8A-8B show the phenotype of NK cells that were expanded using the IL-15/IL-15Rα-Fc complexes of the present technology.
Figure 8B:
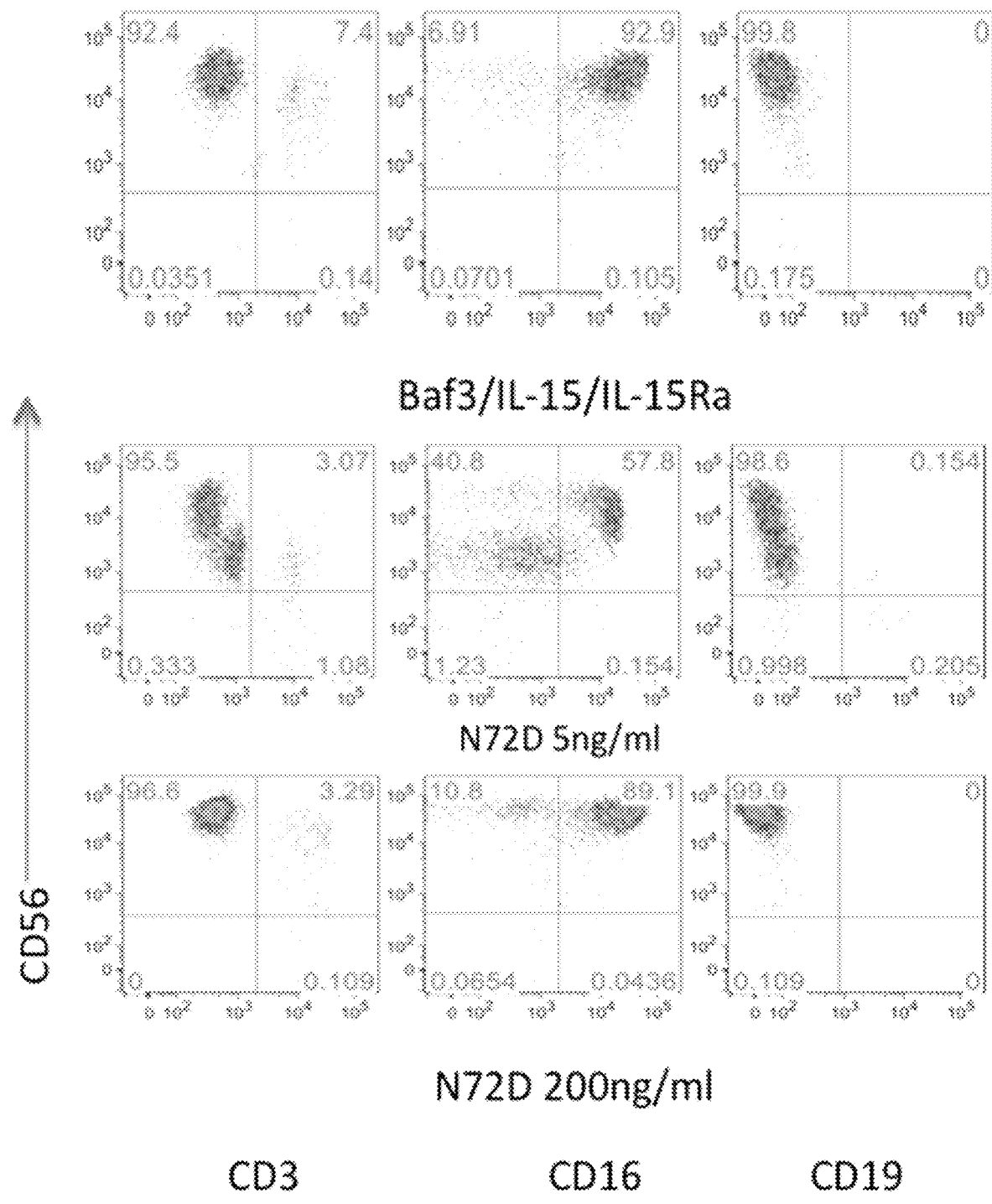

In vitro stimulation of NK cells. CD3$^-$CD56$^+$ NK cells (1-2×10$^6$) were cultured with either IL-15/IL-15Rα-Fc (WT) or IL-15/IL-15Rα-Fc mutant (N72D) complexes at concentrations of 5, 10, 20, 50, 100, and 200 ng/ml. Medium with IL-15/IL-15Rα-Fc complexes was refreshed twice a week. For comparison, NK cells were co-cultured at a 2:1 ratio with a Baf3 cell line expressing membrane bound IL-15/IL-15Rα (Baf3/IL-15/IL-15Rα). NK proliferation, phenotype, and function were assayed. All 3 conditions resulted in significant NK expansion after 18 days (FIG. 7). An 18-day culture of a PBMC:NK mixture with increasing doses of WT or N72D IL-15/IL-15Rα-Fc complexes led to preferential growth of CD3$^+$CD56$^+$ NKT/Cytokine-induced killer (CIK) cells. In a separate experiment, culture of purified NK cells with Baf3 or increasing doses of N72D IL-15/IL-15Rα-Fc complex confirmed the emergence of NKT/CIK cells (FIGS. 8A-8B). NK cells expanded after 18 days with WT IL-15/IL-15Rα-Fc complex had more robust CD107 and IFN-γ response to the target K562 myelogenous leukemia cells compared to resting NK cells or NK cells expanded with Baf3/IL-15/IL-15Rα. NK response increased further with higher doses of the WT IL-15/IL-15Rα-Fc complex. NK cells expanded with higher doses of the N72D IL-15/IL-15Rα-Fc complex demonstrated moderately higher CD107 response, but minimal IFN-γ response to the target K562 cells (FIG. 9).

In vitro stimulation of T cells. IL-15 is important for the development and homeostatic proliferation of CD8 memory T cells, specifically CD44$^{hi}$ central memory (TCM) CD8$^+$ T cells, which are ideal for adoptive T cell immunotherapy. The effect of IL-15/IL-15Rα complexes was studied using CMVpp65 viral antigen model. Soluble IL-15/IL-15Rα-Fc complex was directly compared to IL-15/IL-15Rα complexes transpresented on a murine pro-B cell line Baf-3 and soluble IL-2. Baf-3 was previously transduced to co-express IL-15 and IL-15Rα (Baf-3 IL-15/IL-15Rα). Human T cells from HLA A0201[+] donors were sensitized against CMVpp65 using artificial antigen presenting cells (APCs). These APCs are NIH3T3 transduced to co-express HLA A*0201 and β2-microglobulin, CD80, LFA-3, ICAM-1, and CMVpp65 (A2-AAPC) (Hasan et al., *J Immunol* 183:2837-50 (2009). CMVpp65-epitope specific T cells were quantified by tetramer analysis at 0, 7, 14, 21 and 28 days after in-vitro sensitization, using HLA A*0201-NLVPMVATV (SEQ ID NO: 21) MHC-peptide tetramers. HLA A2402-QYDPVAALF (SEQ ID NO: 22) and HLA B0702 TPRVTGGGAM (SEQ ID NO: 23) peptide-MHC tetramers were used as controls.

Figure 10:
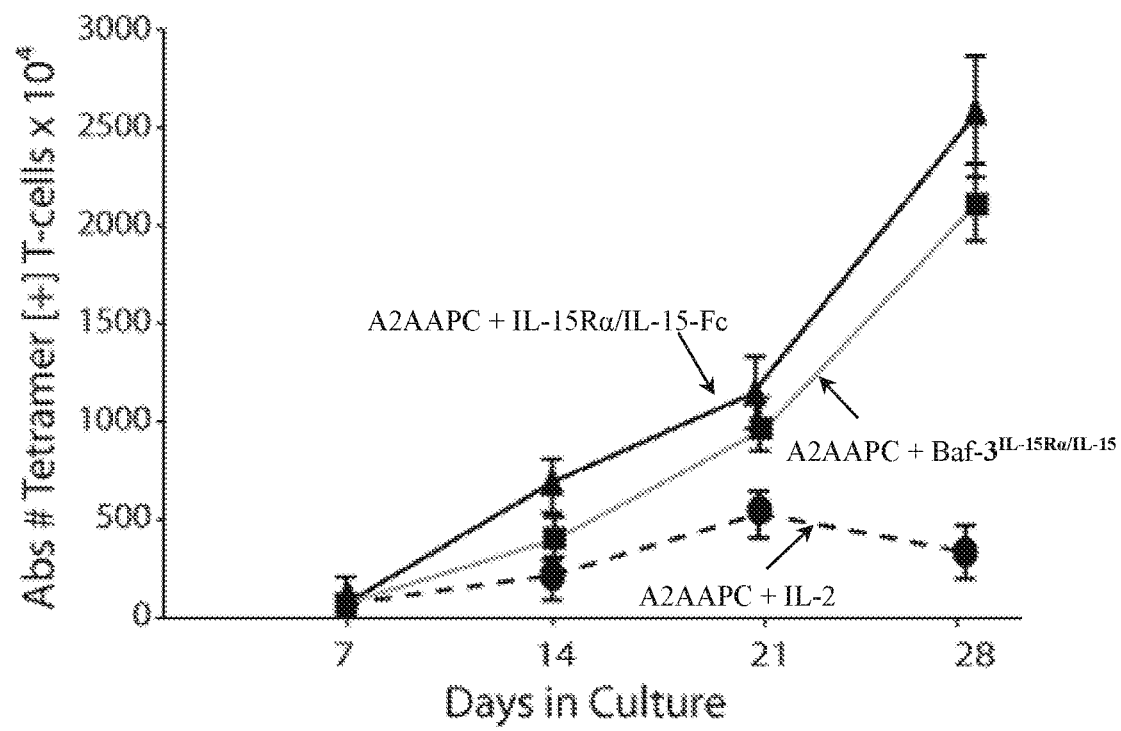
FIG. 10 shows IL-15/IL-15Rα-Fc complexes of the present technology support continued enrichment of antigen-specific tetramer (+) T cells in vitro. A significantly greater enrichment and higher yields of CMVpp65 specific tetramer (+) T cells was detected in the presence of IL-15/IL-15Rα complexes, presented as Baf-3 IL-15/IL-15Rα or as soluble IL-15/IL-15Rα-Fc complex, in comparison to soluble IL-2 alone.
Figure 11A:
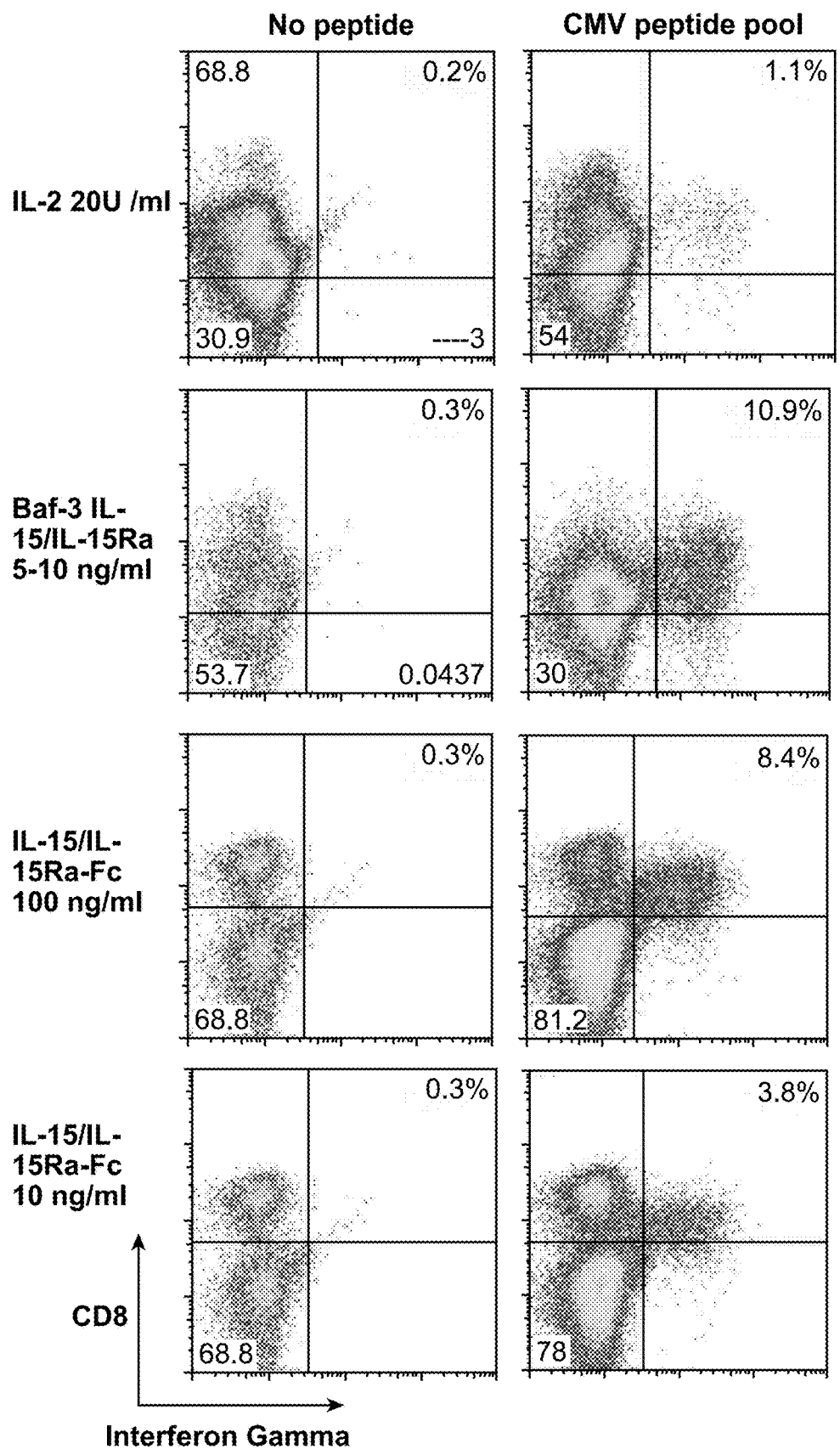
FIGS. 11A-11B show the expansion of antigen-specific CD8(+) T cells using the IL-15/IL-15Rα-Fc complexes of the present technology. Both soluble IL-15/IL-15Rα-Fc complex and membrane bound IL-15/IL-15Rα on Baf3 supported expansion of high avidity CMVpp65-specific CD8(+) T cells.
Figure 11B:
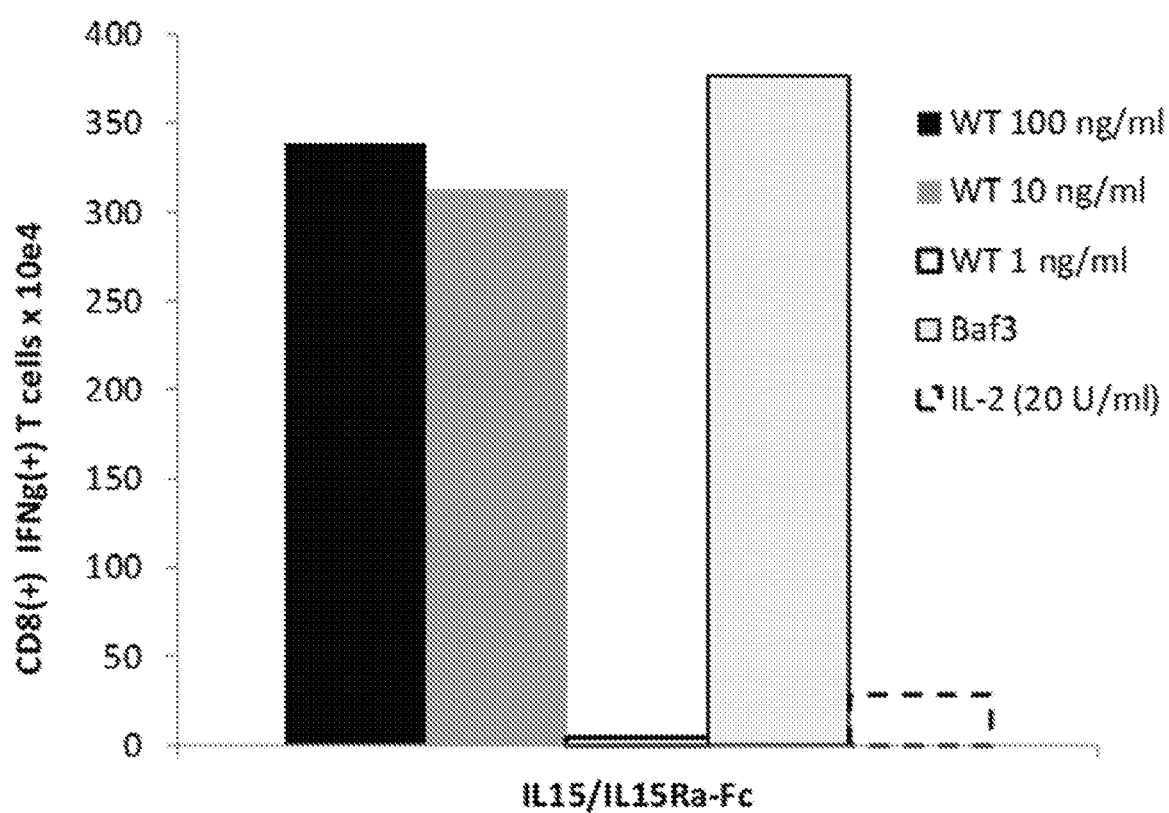
Figure 12:
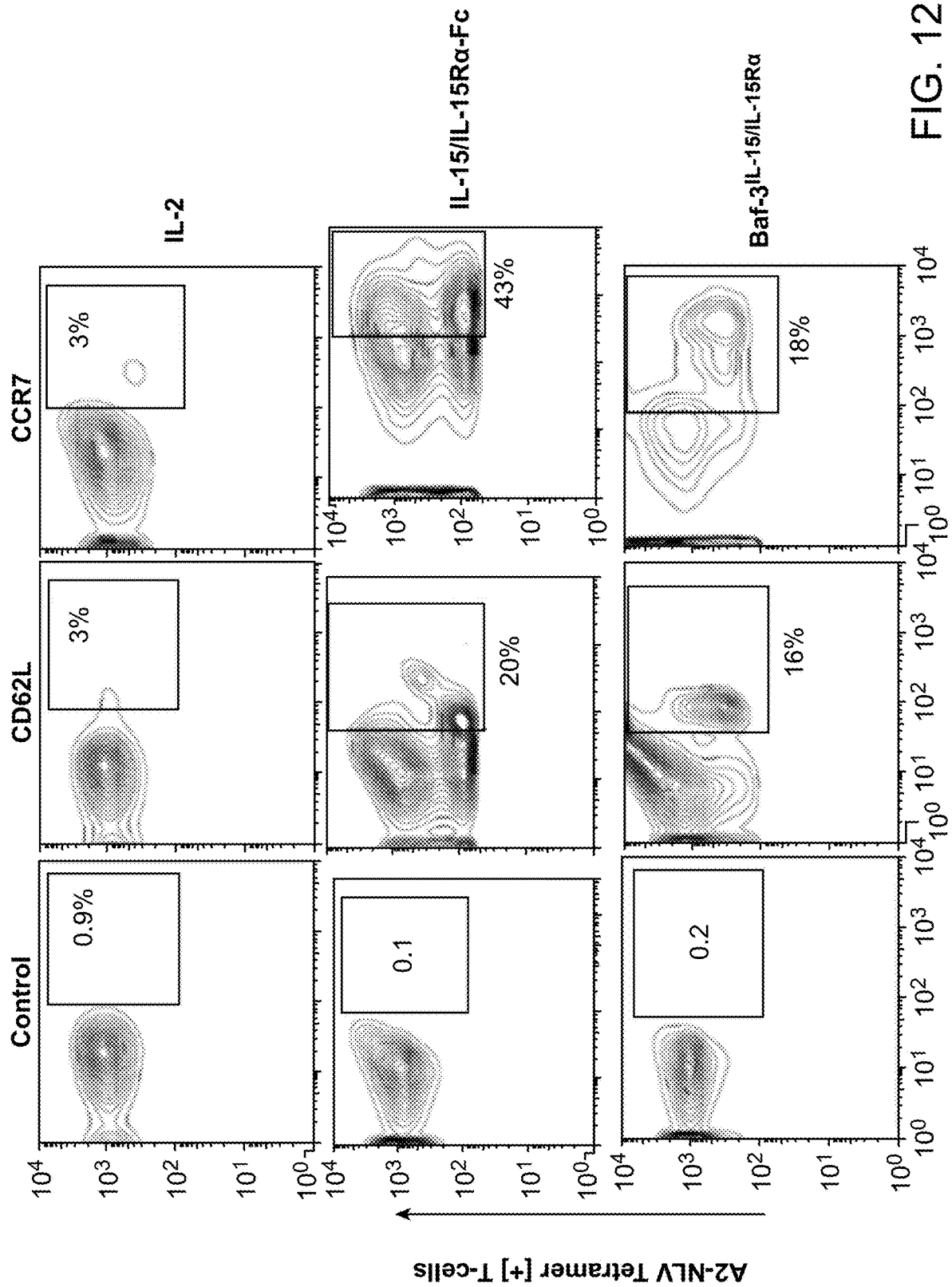
FIG. 12 shows the sustained expansion of CD62L (+), CCR7(+) antigen-specific T cells using the IL-15/IL-15Rα-Fc complexes of the present technology. Both soluble IL-15/IL-15Rα-Fc complex and membrane bound IL-15/IL-15Rα on Baf3 supported expansion of high avidity CMVpp65-specific CD8(+) T cells, sustaining the growth of CD62L (+) and CCR7(+) TCM.
Figure 13A:
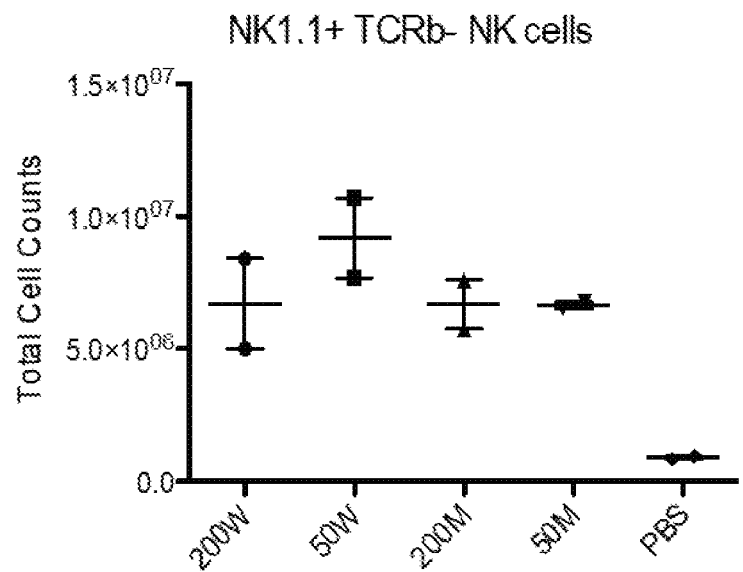
FIGS. 13A-13F show lymphocyte expansion in immunocompetent mice using the IL-15/IL-15Rα-Fc complexes of the present technology. C57BL/6 mice were treated intravenously (IV) with 200 µg wild-type (200W), 50 µg wild-type (50W), 200 µg N72D mutant (200M), or 50 µg mutant (50M) IL-15/IL-15Rα-Fc complexes, or PBS as a negative control (n=2 per treatment group). On day 4 PT mice were sacrificed and absolute numbers of lymphocytes were quantified in the spleen, liver, and mesenteric and popliteal lymph nodes. Plots are representative of results obtained in the spleen of sacrificed mice. Injection of IL-15/IL-15Rα-Fc complex in mice increased absolute numbers of lymphocyte population 4 days post treatment (PT). Natural Killer (NK cell), CD8+ T cell, NKT cell and γδ T cell absolute numbers were markedly increased in mice receiving IL-15/IL-15Rα-Fc wild-type or mutant complex when compared to the PBS control. Similar results were obtained in all organs examined.
Figure 13B:
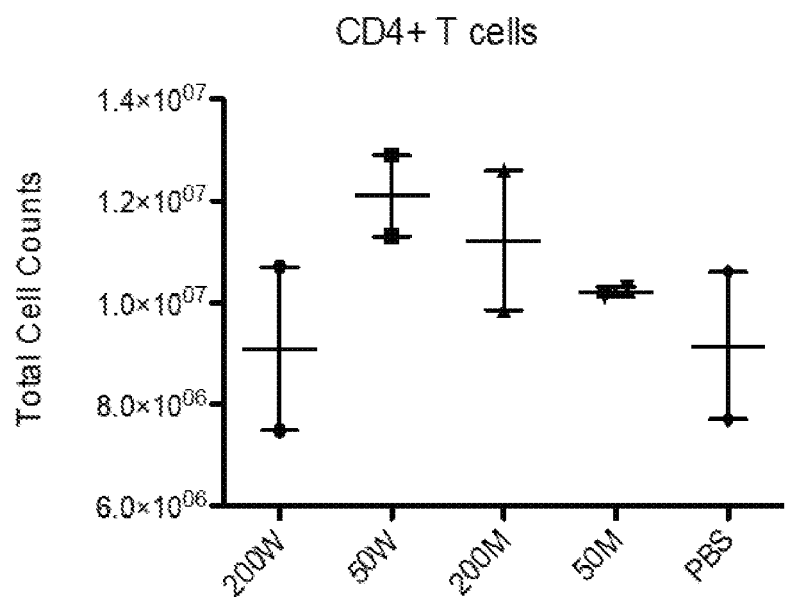
Figure 13C:
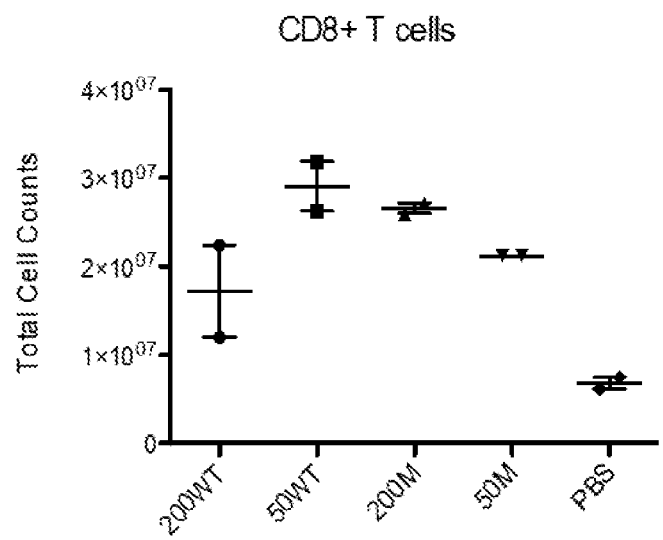
Figure 13D:
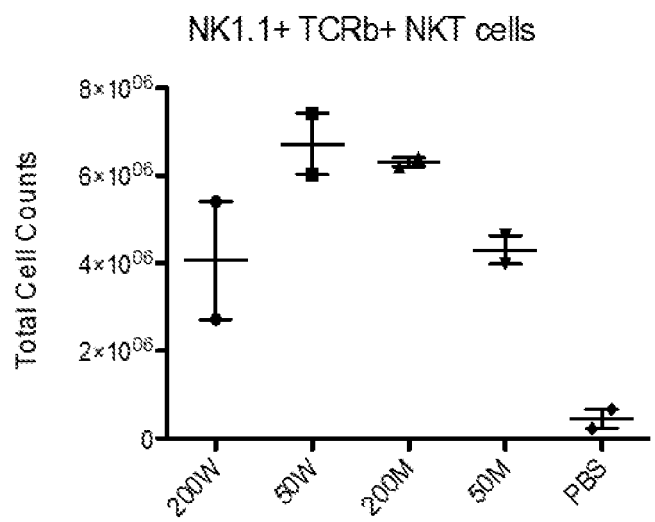
Figure 13E:
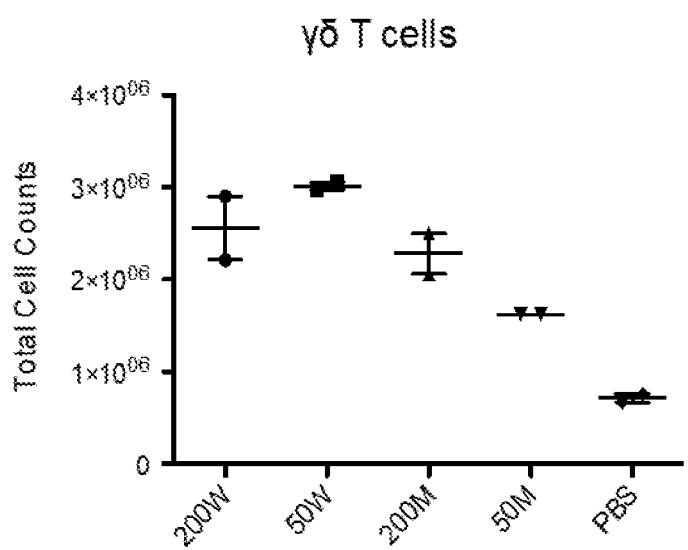
Figure 13F:
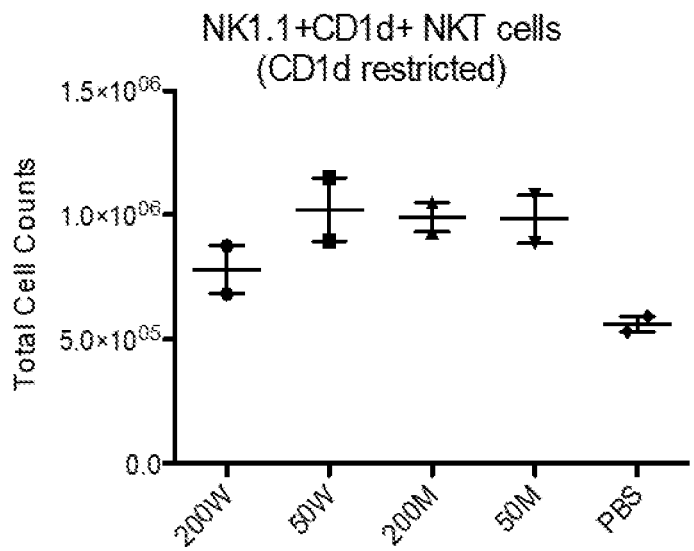

Among the CD8$^+$ and Tetramer$^+$ T cells, these CD45RA($^-$)CD62L($^+$) or CCR7($^+$) [TCM] or CD45RA($^-$)CD62L($^-$) or CCR7($^-$) [TEM] were quantified by FACS. T cell responses to the peptide sequence NLVPMVATV (SEQ ID NO: 21) (NLV) within CMV pp65(+) were measured by cytoplasmic IFNγ, following restimulation with autologous peptide loaded APCs (Waldrop et al., *J Clin Invest* 99:1739-50 (1997); Koehne et al., *Blood* 99:1730-40 (2002)). A significantly greater enrichment and higher yields of CMVpp65 specific tetramer(+) T cells were detected in the presence of IL-15/IL-15Rα complexes, presented as Baf-3 IL-15/IL-15Rα or as soluble IL-15/IL-15Rα-Fc complexes, in comparison to soluble IL-2 alone (FIG. 10). Both soluble IL-15/IL-15Rα-Fc complexes and membrane bound IL-15/IL-15Rα on Baf3 support expansion of high avidity CMVpp65-specific CD8(+) T cells (FIGS. 11A-11B), sustaining the growth of CD62L$^{(+)}$ and CCR7($^+$) TCM over 28 days (FIG. 12).

These results demonstrate that the IL-15/IL-15Rα-Fc complexes of the present technology are useful in methods for promoting activation of antibody-dependent cell-mediated cytotoxicity (ADCC) as well as methods for promoting T cell cytotoxicity or NK cell cytotoxicity in a subject in need thereof. Accordingly, the IL-15/IL-15Rα-Fc complexes of the present technology are useful in methods for enhancing IL-15-mediated immune function in a subject in need thereof (e.g., subjects suffering from cancer, infection, an immunodeficiency or lymphopenia or subjects that have received or are receiving an anti-cancer therapy, an antiviral, anti-fungal, or anti-bacterial therapy).

Figure 14A:
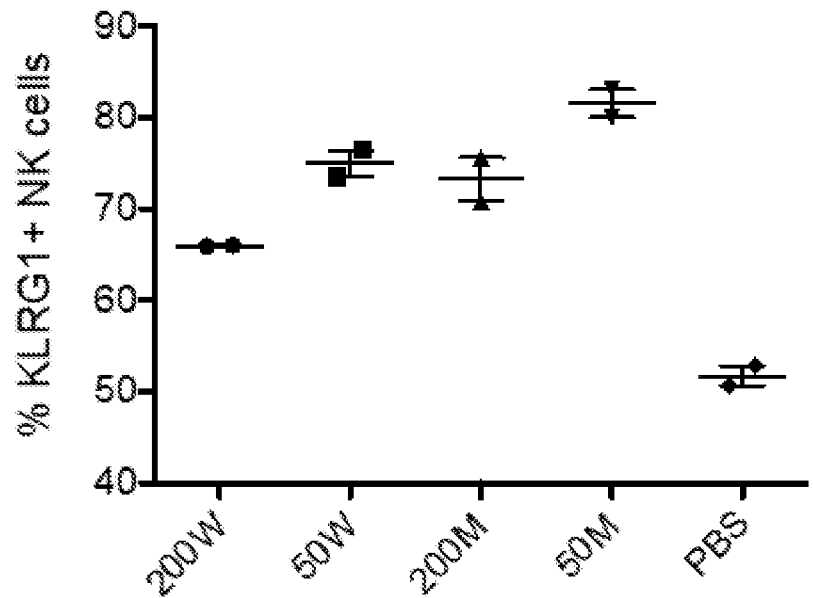
FIGS. 14A-14B show activated NK phenotype in immunocompetent mice after treatment with the IL-15/IL-15Rα-Fc complexes of the present technology. NK cells exhibited an activated phenotype following injection of IL-15/IL-15Rα-Fc complexes of the present technology. Plots depict percentages of KLRG1+NK cells and mean fluorescence intensity (MFI) of CD69. Upregulation of KLRG1 (Killer cell Lectin-like Receptor subfamily G, member 1) and CD69 surface proteins are associated with lymphocyte activation and maturation. Plots are representative of blood. Similar results were obtained in spleen, liver, and lymph nodes. C57BL/6 mice were treated i.v. with 200 μg wild-type (200W), 50 μg wild-type (50W), 200 μg N72D mutant (200M), 50 μg mutant (50M) IL-15/IL-15Rα-Fc complex, or PBS (n=2 per treatment group).
Figure 14B:
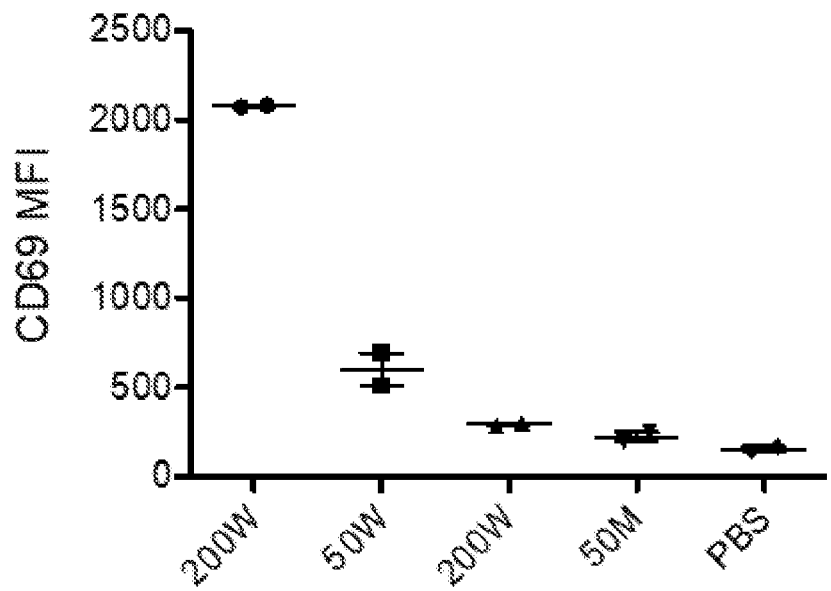

Example 3: IL-15/IL-15Rα-Fc Complexes of the Present Technology Stimulate Immune Cells In Vivo In vivo activation of NK Elevated natural killer cell activation and function were documented following iv IL-15/IL-15Rα-Fc treatment in C57BL/6 mice. C57BL/6 mice were treated iv with 200 µg WT IL-15/IL-15Rα-Fc complex (200W), 50 µg WT IL-15/IL-15Rα-Fc complex (50W), 200 µg N72D mutant IL-15/IL-15Rα-Fc complex (200M), or 50 µg mutant IL-15/IL-15Rα-Fc complex (50M), or PBS as a negative control. On day 4 mice were sacrificed and absolute numbers of lymphocytes were quantified in the spleen, liver, and mesenteric and popliteal lymph nodes. Plots in FIGS. 13A-13F are representative results obtained from spleen of sacrificed mice. Natural Killer (NK cell), CD8$^+$ T cell, NKT cell and γδ T cell absolute numbers were markedly increased in mice receiving IL-15/IL-15Rα-Fc WT or mutant complex when compared to the PBS control. Similar results were obtained in all organs examined. NK cells exhibited an activated phenotype following injection of IL-15/IL-15Rα-Fc complex. FIGS. 14A-14B depict percentages of KLRG1$^+$ NK cells and mean fluorescence intensity (MFI) of CD69. The upregulation of KLRG1 (Killer cell Lectin-like Receptor subfamily G, member 1) and CD69 surface proteins is associated with lymphocyte activation and maturation in blood; similar results were obtained in spleen, liver, and lymph nodes. Increased NK cell cytotoxicity was observed following treatment with IL-15/IL-15Rα-Fc complex. Varying numbers of splenic NK cells (effector, E) from mice treated iv with 200 μg WT IL-15/IL-15Rα-Fc complex (200W), 50 μg WT IL-15/IL-15Rα-Fc complex (50W), 200 μg N72D mutant IL-15/IL-15Rα-Fc complex (200M), 50 μg mutant IL-15/IL-15Rα-Fc complex (50M), or PBS were incubated with Yac-1 or Ba/F3 target cells (targets, T) labeled with $^{51}$Cr. NK cells derived from mice receiving 200 μg or 50 μg wild-type IL-15/IL-15Rα-Fc complex exhibited increased cytotoxicity against both Yac-1 and Ba/F3 targets (FIGS. 15A-15B). NK cells from mice receiving N72D IL-15/IL-15Rα-Fc complex did not show enhanced killing over the PBS control. Percentage of killing was calculated based on release of $^{51}$Cr into supernatant by lysed target cells.

Figure 16:
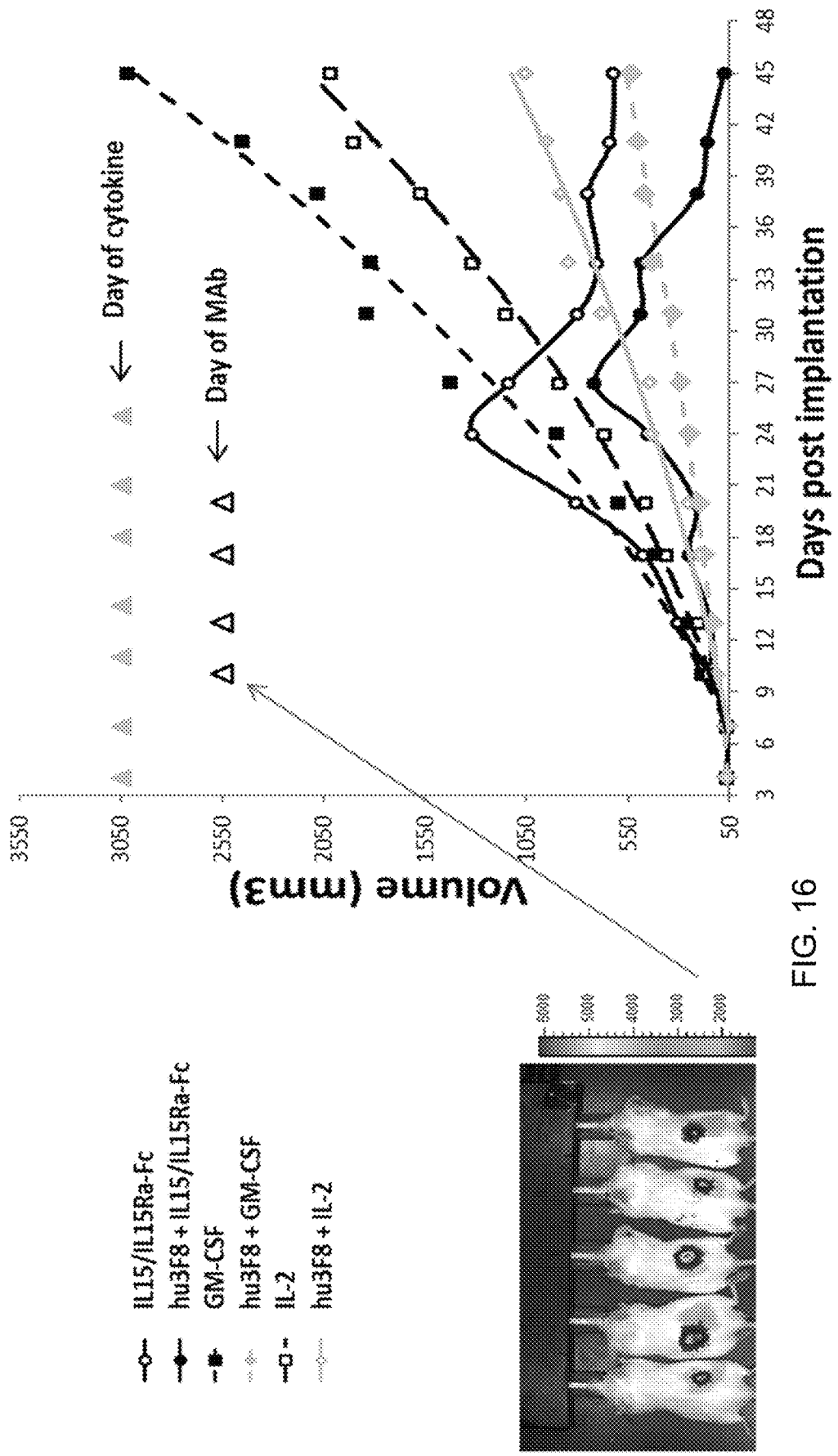
FIG. 16 shows enhanced PBMC cytotoxicity against neuroblastoma in mouse xenograft model using the IL-15/IL-15Rα-Fc complexes of the present technology in the presence or absence of hu3F8. $5 \times 10^6$ human neuroblastoma (NB) IMR32 cells mixed with $5 \times 10^6$ normal PBMCs were implanted sc until tumors were established as determined by luciferase bioluminescence (Day 10, FIG. 16) and by caliper measurements. 20 μg of hu3F8 (anti-GD2) iv 2×/wk×2 wks started on day 10 after tumor implantation, with sc cytokine 2×/wk×3 wks (GM-CSF 1 μg/dose, IL-2 2000 U/dose, IL-15/IL-15Rα-Fc complex 100 μg/dose) commencing on day 4.
Figure 17:
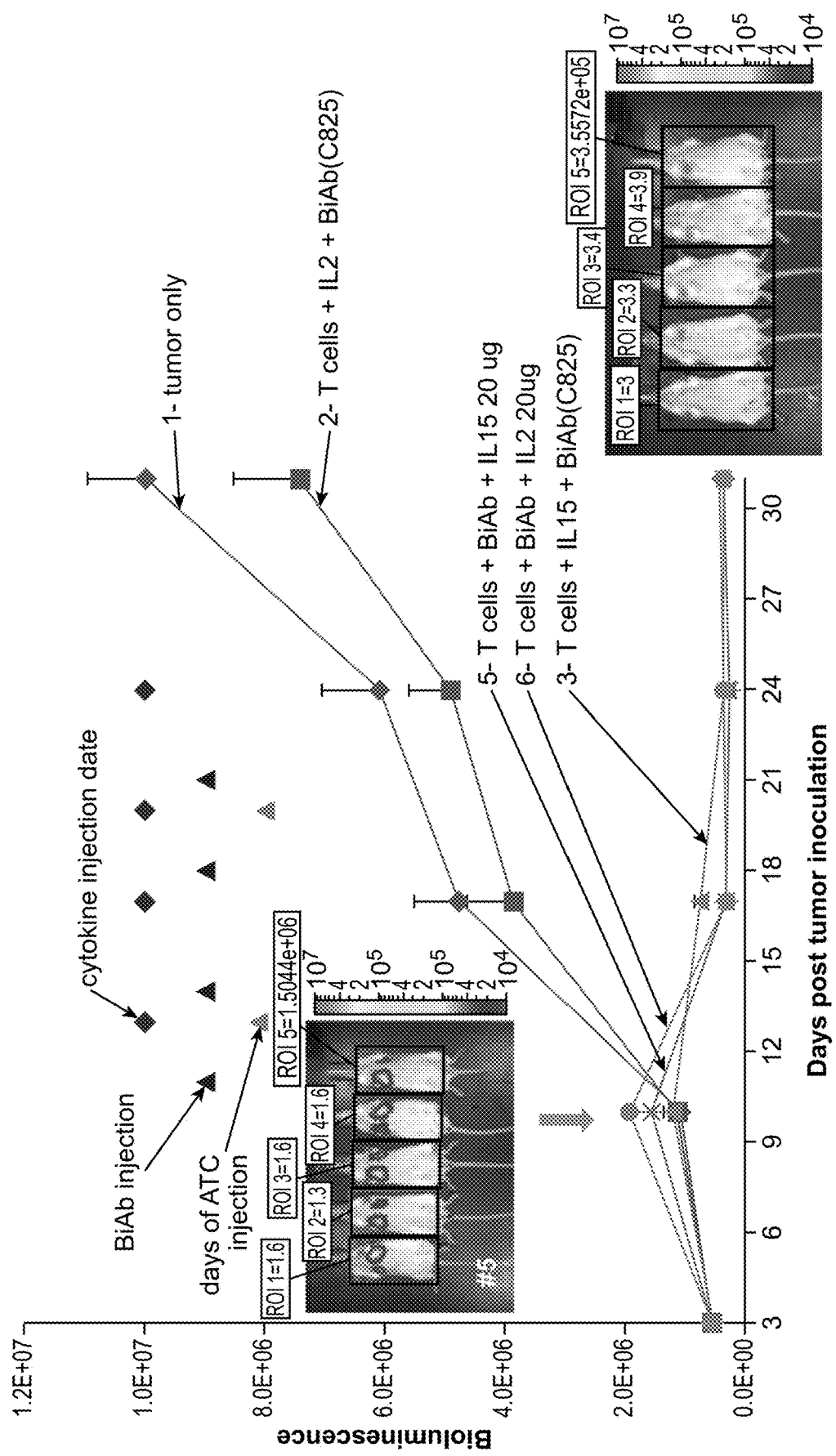
FIG. 17 shows enhanced T cell cytotoxicity against melanoma in mouse xenograft model using the IL-15/IL-15Rα-Fc complexes of the present technology in the presence or absence of hu3F8-huOKT3 bispecific antibody. $10^6$ human melanoma (M14) cells were implanted iv until tumors were established as determined by luciferase bioluminescence. 20 μg of hu3F8-huOKT3 (BiAb) iv 2×/wk×2 wks started on day 11 after tumor implantation, with sc cytokine 2×/wk×2 wks (GM-CSF 1 μg/dose, IL-2 2000 U/dose, IL-15/IL-15Rα-Fc complex 100 μg/dose) starting on day 13, and $5 \times 10^6$ ATC iv 1×/wk×2 wks starting on day 13. BiAb-C825 is a control antibody for the BiAb hu3F8-huOKT3.

In vivo tumor therapy by ADCC and T cells. BALBcA-RAG2KO-IL-2RγKO (DKO) mice (derived from colony of Dr. Mamoru Ito, Kawasaki, Japan; Koo et al., *Expert Rev Vaccines* 8:113-20 (2009); Andrade et al., *Arthritis Rheum* 63:2764-73 (2011)) with 5 mice per group were engrafted (1) subcutaneously (sc) with 5×10$^6$ human neuroblastoma (NB) IMR32 mixed with 5×10$^6$ PBMC, or (2) intravenously (iv) with 10$^6$ BRAF mutated M14 melanoma, both tumor lines carrying luciferase reporters. Treatment commenced when tumors became established by bioluminescence. For sc model (FIG. 16), mice received 20 of hu3F8 (anti-GD2) iv 2×/wk for 2 wks, as well as sc saline or sc cytokine 2×/wk for 3 wks (GM-CSF 1 μg/dose, IL-2 2000 U/dose, IL-15/IL-15Rα-Fc complex 100 μg/dose). For iv model (FIG. 17), mice received 20 μg of hu3F8-huOKT3 iv 2×/wk for 3 wks, and 10$^6$ ATC iv qw×3 wks, as well iv IL-15/IL-15Rα-Fc complex. The anti-tumor effect of IL-15/IL-15Rα-Fc complex was evident even without BsAb or with control BsAb.

These results demonstrate that the IL-15/IL-15Rα-Fc complexes of the present technology are useful in methods for promoting activation of antibody-dependent cell-mediated cytotoxicity (ADCC) as well as methods for promoting T cell cytotoxicity or NK cell cytotoxicity in a subject in need thereof. Accordingly, the IL-15/IL-15Rα-Fc complexes of the present technology are useful in methods for enhancing IL-15-mediated immune function in a subject in need thereof (e.g., subjects suffering from cancer, infection, an immunodeficiency or lymphopenia or subjects that have received or are receiving an anti-cancer therapy, an antiviral, anti-fungal, or anti-bacterial therapy).

Figure 18A:
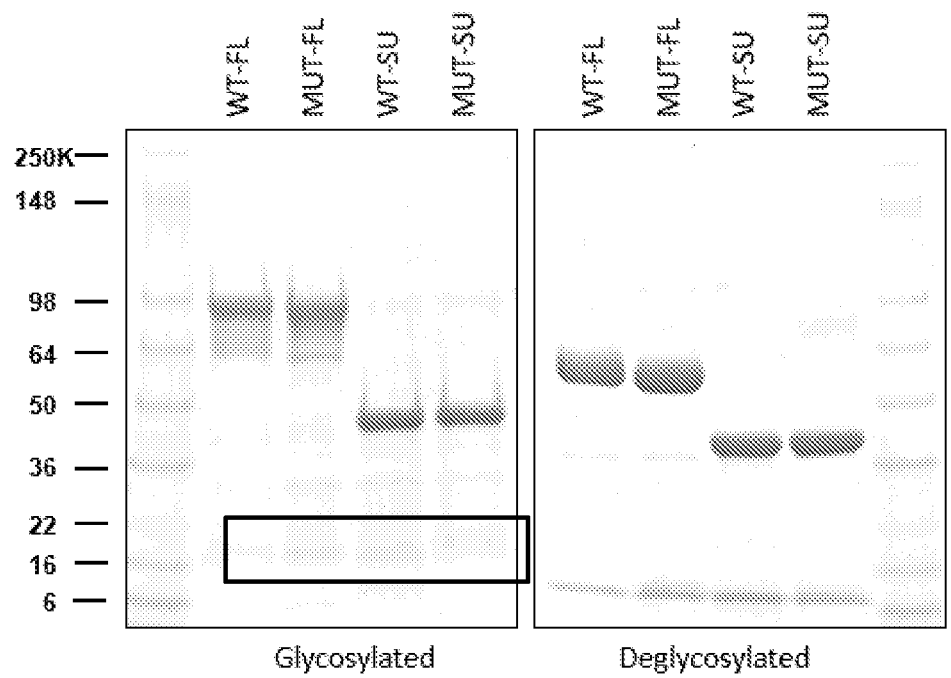
FIGS. 18A-18F show the biochemical characterization of IL-15/IL-15Rα-Fc complexes of the present technology.

Example 4: In Vitro Characterization of IL-15/IL-15Rα-Fc Complexes of the Present Technology Determination of biochemical purity of IL-15/IL-15Rα-Fc complex by SDS-PAGE, and HPLC. To determine the molecular size and biochemical purity of the IL15/IL15Rα-Fc complexes, SDS-PAGE and SEC-HPLC were performed. Under reducing conditions, WT IL-15/IL-15Rα-Fc and MUT IL-15/IL-15Rα-Fc complexes gave rise to two major bands on Tris-glycine SDS-PAGE: ~60-90 KDa IL-15Rα-Fc and ~16 KDa IL-15 (FIG. 18A). The broad diffuse bands of IL-15Rα-Fc were probably due to the heterogeneity of glycosylation of full length IL-15Rα ectodomain in mammalian cells, which collapsed to a basal size single band (~60 KDa) after deglycosylation treatment (which removes sugar side chains) (FIG. 18A). The IL-15 bands appeared diffuse as well presumably due to glycosylation, but became sharp (~13 KDa) after deglycosylation treatment (FIG. 18A). As a comparison, WT-SU and MUT-SU complexes only gave rise to two major non-diffused bands due to their lower carbohydrate content, which did not affect migration position significantly after deglycosylation treatment (FIG. 18A).

To estimate the molecular size of the WT IL-15/IL-15Rα-Fc complex more precisely, a BenchMark Unstained Protein Ladder was used for SDS-PAGE. As shown in FIG. 18C, under reduced conditions, the WT IL-15/IL-15Rα-Fc complex separated into monomers of around 100 KDa total (~85 KDa for IL-15Rα-Fc+16 KDa for IL-15); under non-reduced conditions (where the disulfide bonds between Fc remained intact), the WT IL-15/IL-15Rα-Fc complex separated into dimers of around 200 KDa total (~170 KDa for dimeric IL-15Rα-Fc+2×16 KDa for monomeric IL-15). FIG. 18D shows the HPLC results of the 6 standard MW marker mixed together. Each MW marker was also run separately to confirm the position, except for the 150 and 66 KDa markers which did not separate in the mixture.

Figure 18B:
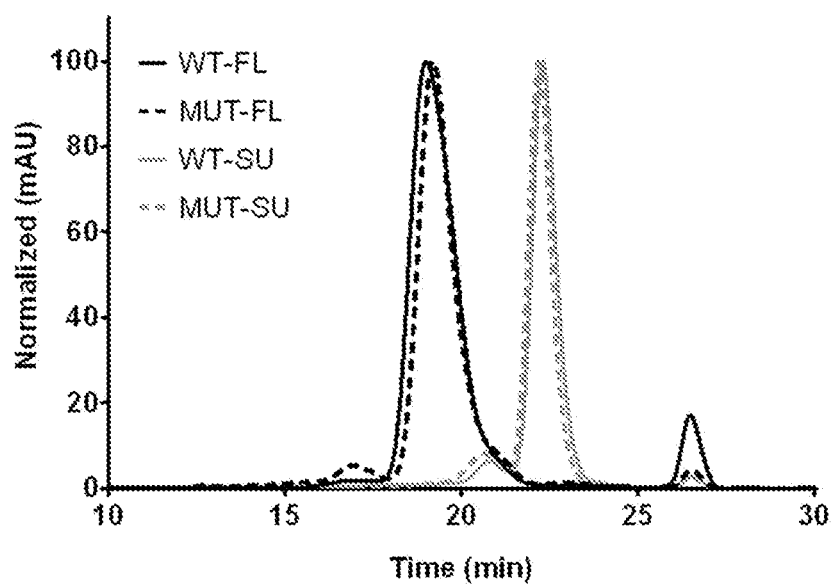
Figure 18C:
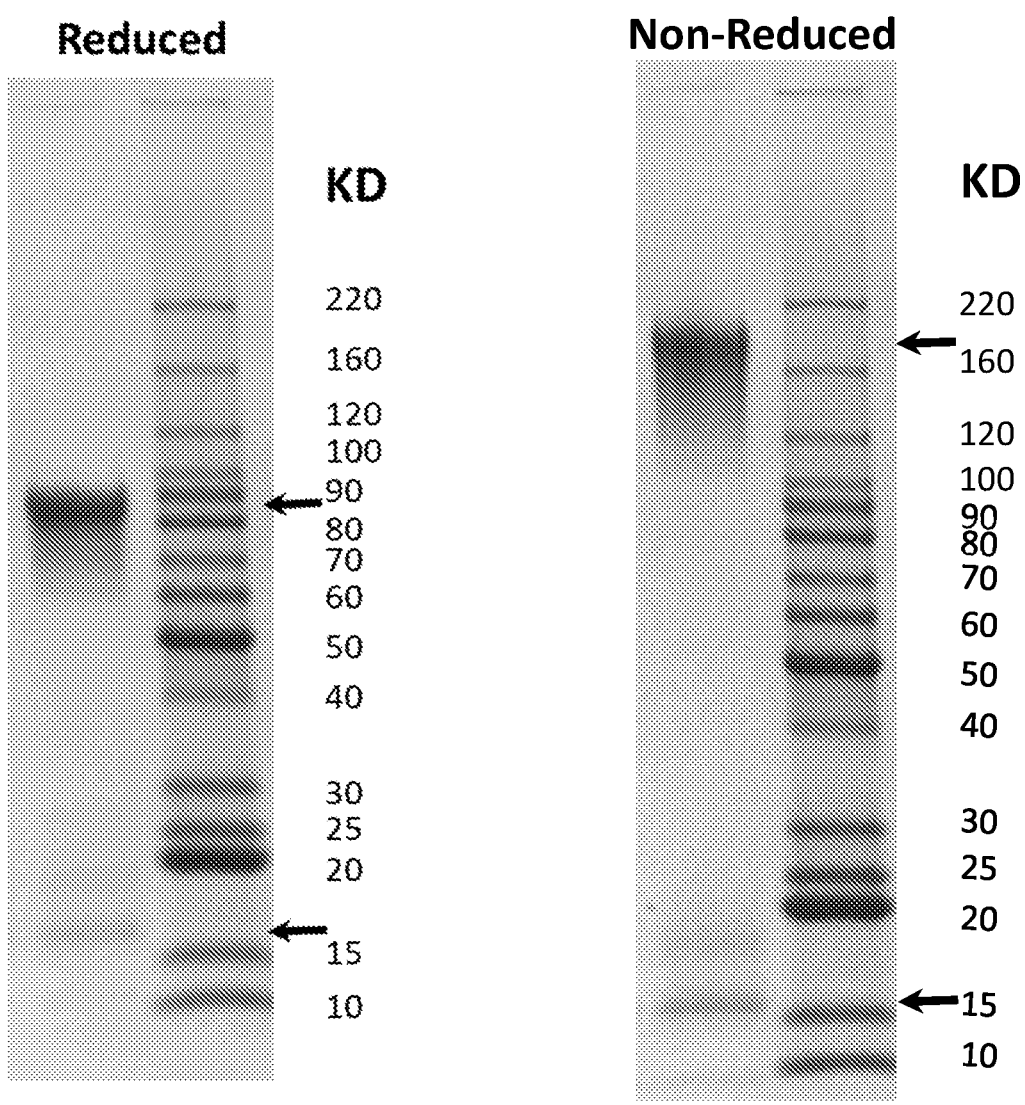
Figure 18D:
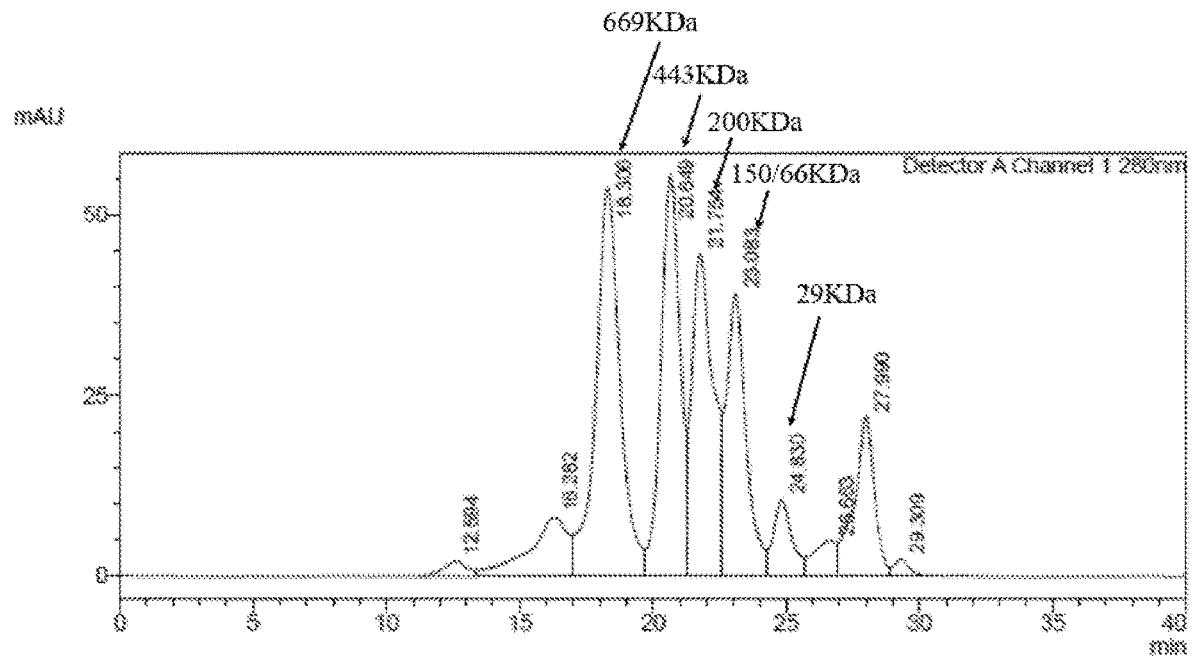
Figure 18E:
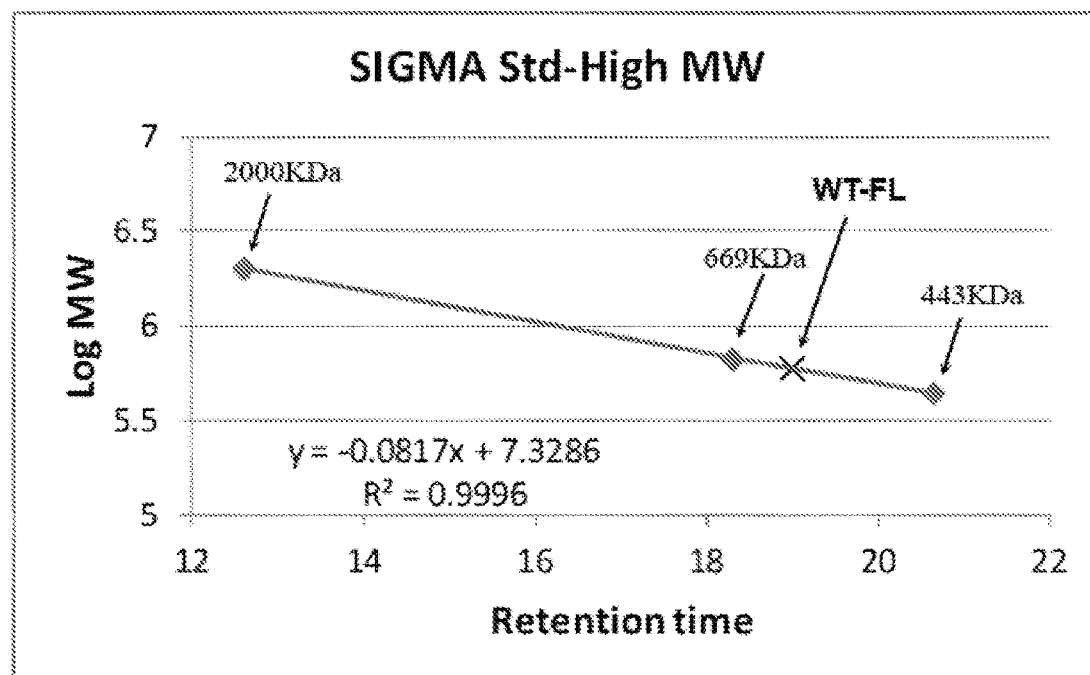
Figure 18F:
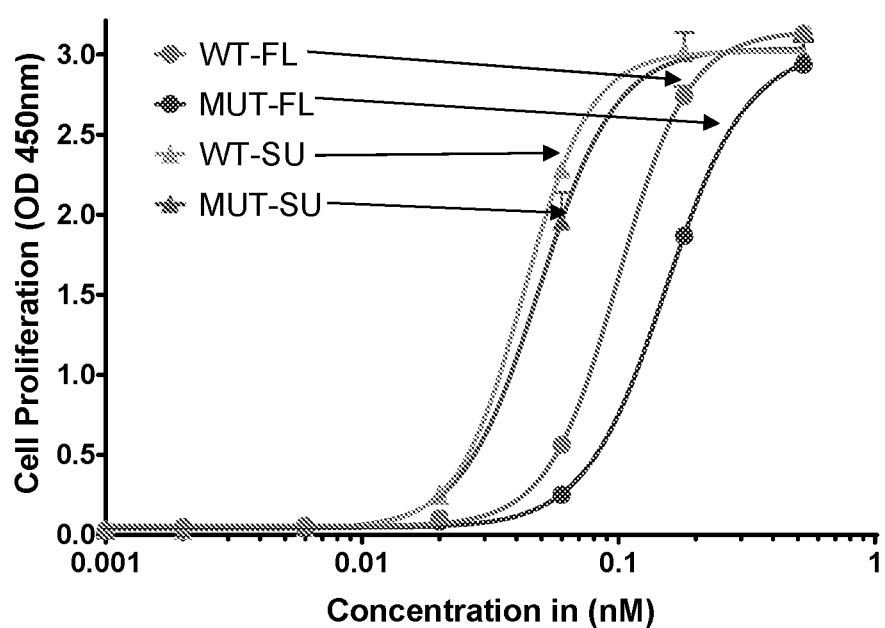
Figure 29:
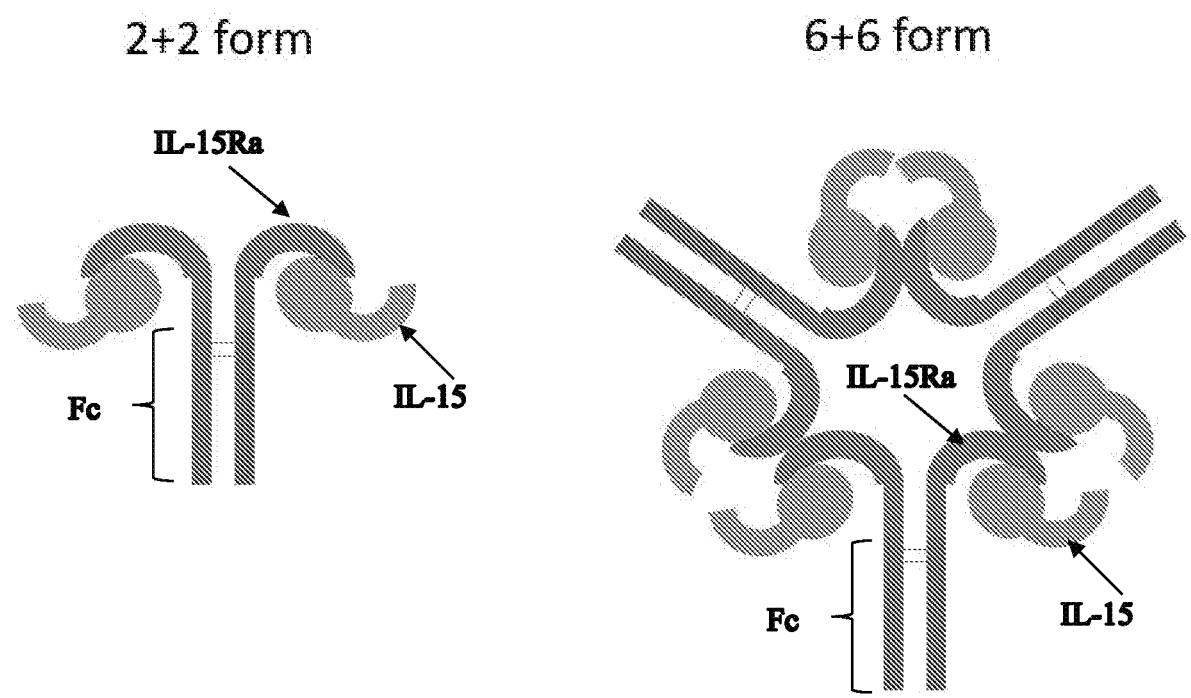
FIG. 29 shows a schematic of the (2+2) and (6+6) forms of the IL-15/IL-15Rα-Fc complexes disclosed herein.
Figure 30:
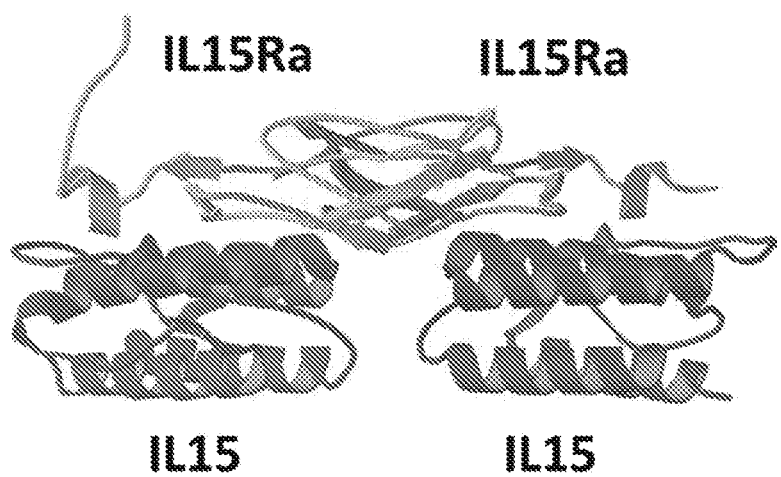
FIG. 30 shows the crystal structure of IL15-IL15Rα complex. See Chirifu et al, Nature Immunology 8:1001-1007 (2007).

HPLC of purified IL-15/IL-15Rα-Fc complex showed a major peak around 600 KDa, with some minor aggregates removable by gel filtration (FIG. 18B). The peak also appeared wide, consistent with the heterogeneous glycosylation. The size of 600 KDa of the IL15 complex (19.0 minutes) was calculated based on the fitted curve derived from the top three high MW standard marker (including 2000 KDa marker not shown in FIG. 18D, since it interferes with the migration of other markers) that was run separately (FIG. 18E), which fitted well for the high MW species like WT-FL complex. The peak also appeared wide, consistent with the heterogeneous glycosylation. Since the WT IL-15/IL-15Rα-Fc dimer has a size of about 200 KDa from SDS-PAGE, the ~600 KDa size corresponded to three dimeric IL-15/IL-15Rα-Fc complexes, suggesting that the stable IL-15/IL-15Rα-Fc complex was actually hexameric (FIG. 29). These observations were consistent with the crystal structure results described in Chirifu et al, Nature Immunology 8:1001-1007 (2007), which showed the crystals contained two copies of the IL-15/IL-15Rα complex (aa1-102, including sushi domain and adjacent linker region) forming a rod-like dimer, and the contact was between the two IL-15Rα molecules (FIG. 30). As a comparison, WT-SU and MUT-SU complex only formed stable dimeric Fc fusion complexes as expected (~120 KDa, FIGS. 18B and 18D), suggesting protein segments of the ectodomain other than sushi domain might contribute to the formation of the stable hexamer. These constructs remain stable by SDS-PAGE and HPLC after multiple freeze and thaw cycles, and accelerated stability test. The biological activity of these complexes was evaluated with cell proliferation assays using mouse lymphoblast cell line CTLL-2. After incubating with the IL-15/IL-15Rα-Fc complexes for three days, CTLL-2 cell proliferation was measured using WST-8 kit. Interestingly, although all four complexes were able to promote the growth of CTLL-2 cells in a dose-dependent manner, SU-based complexes were more potent than full length (FL) IL-15/IL-15Rα-Fc complexes (FIG. 18F).

Accordingly, the IL-15/IL-15Rα-Fc complexes of the present technology are useful in methods for enhancing IL-15-mediated immune function in a subject in need thereof (e.g., subjects suffering from cancer, infection, an immunodeficiency or lymphopenia or subjects that have received or are receiving an anti-cancer therapy, an anti-viral, anti-fungal, or anti-bacterial therapy).

Figure 19A:
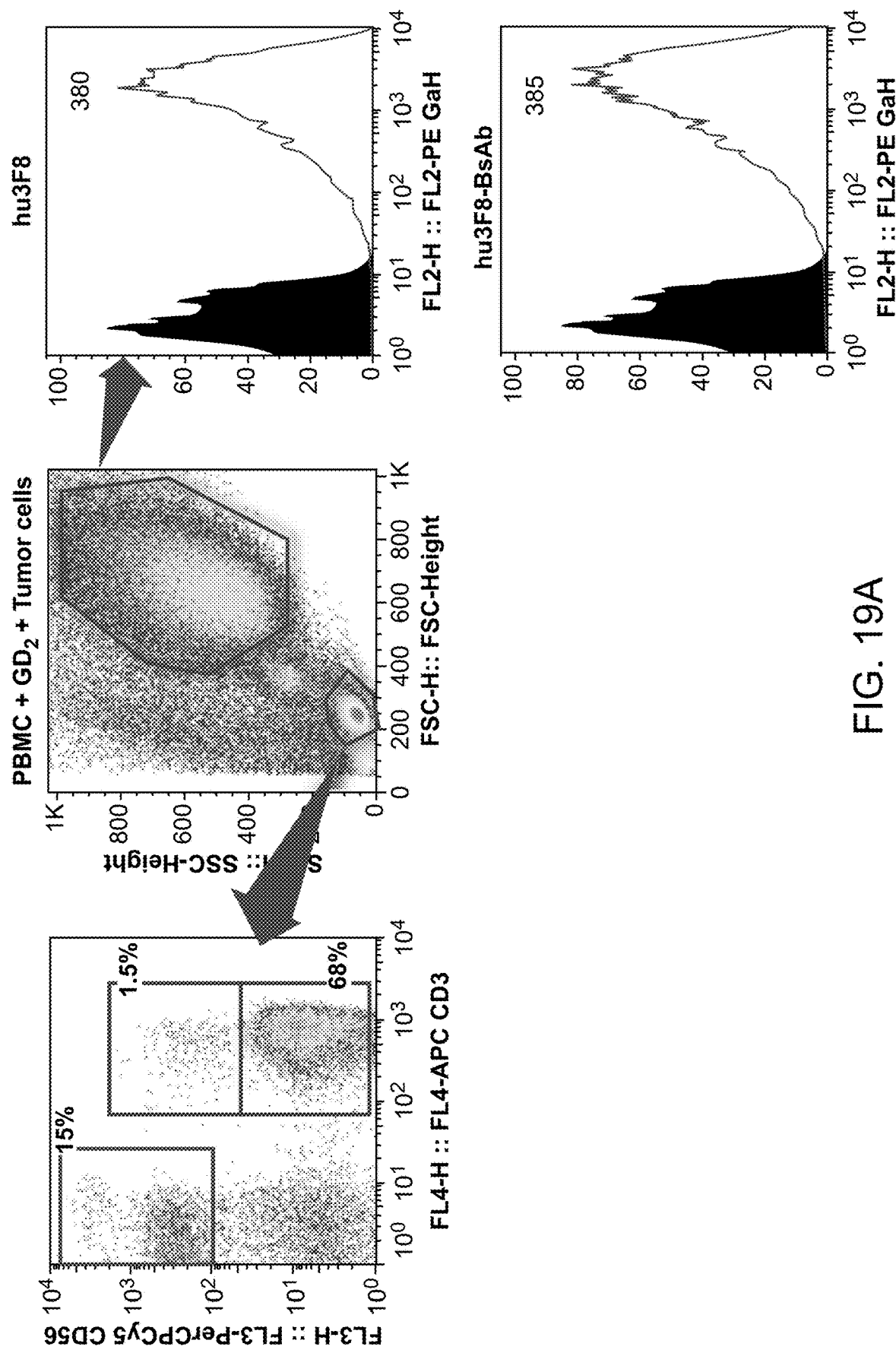
FIGS. 19A-19D show binding of hu3F8 and hu3F8-BsAb to IL-15-stimulated lymphocyte subsets.
Figure 19B:
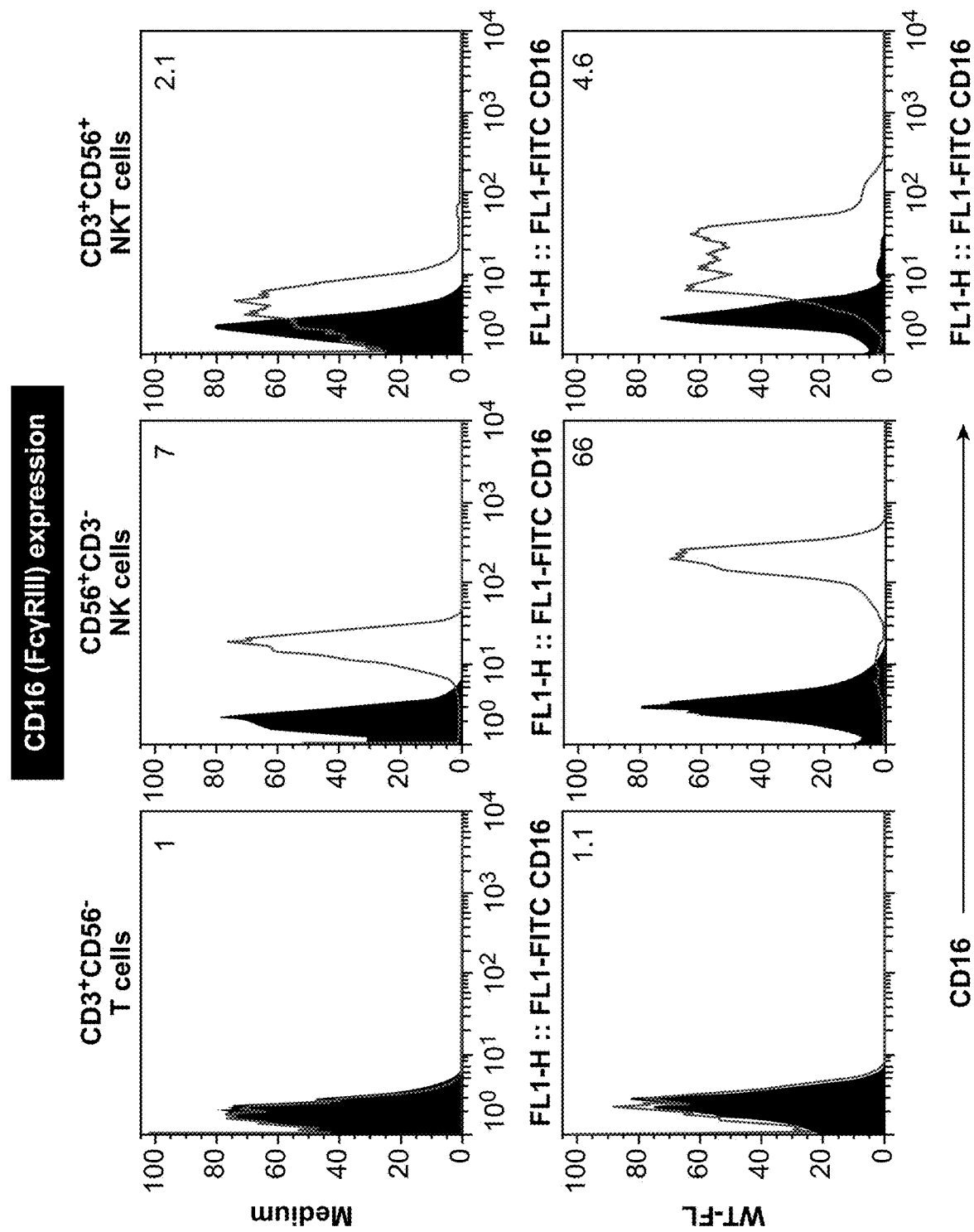
Figure 19C:
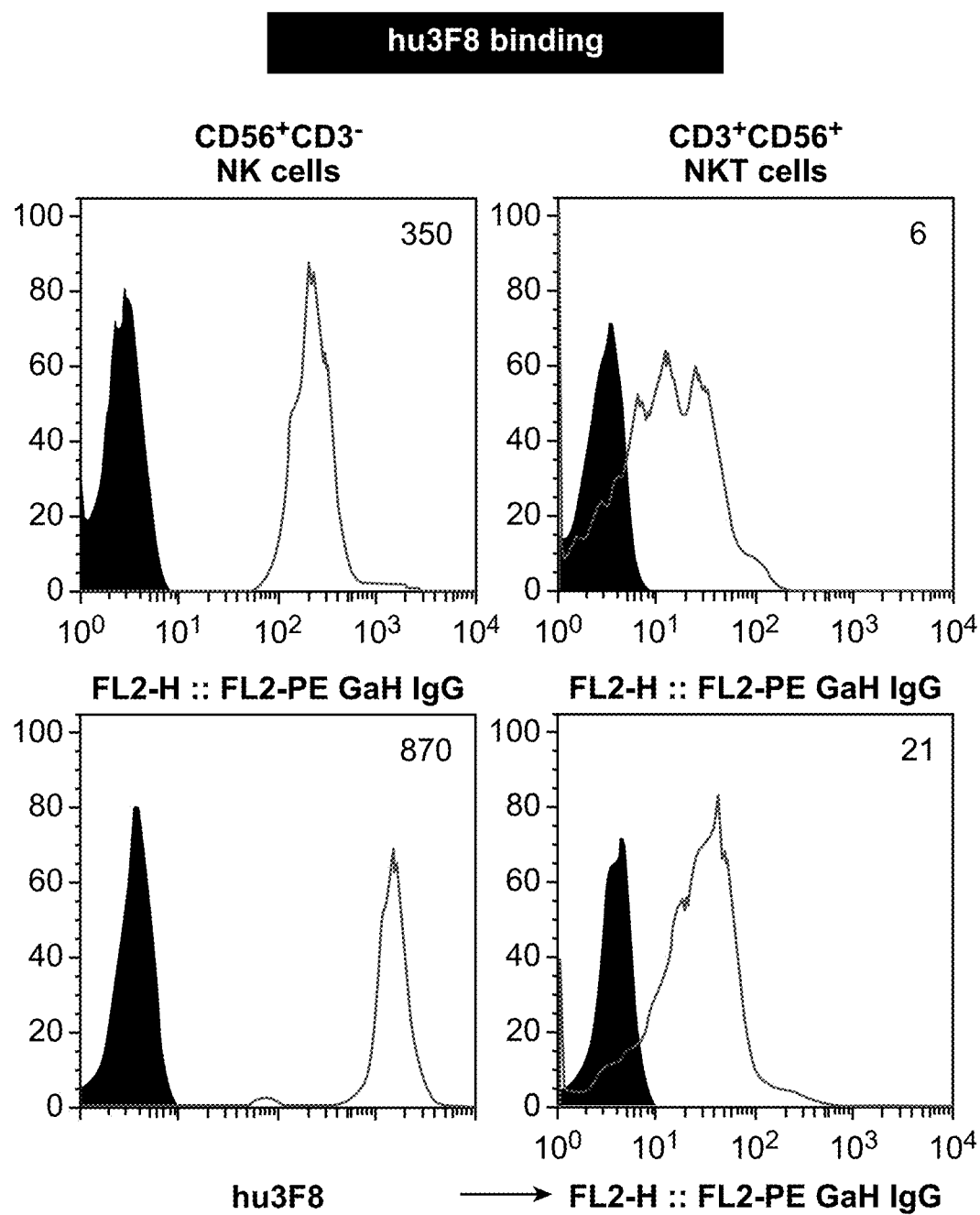
Figure 19D:
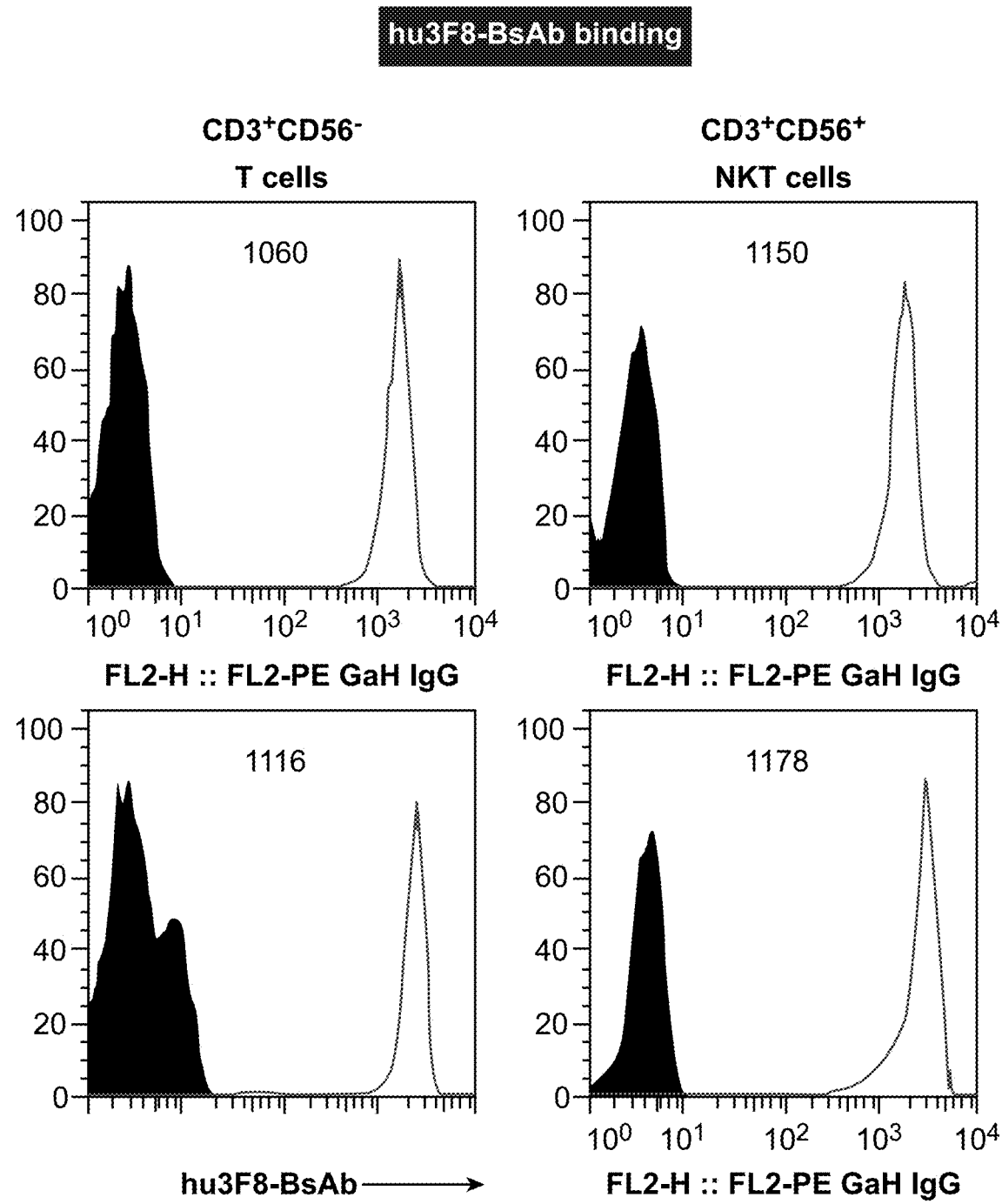

Example 5: Binding of hu3F8 and hu3F8-BsAb to IL-15/IL-15Rα-Fc Complex-stimulated Lymphocyte Subsets When PBMCs from healthy donors and GD2(+) M14 tumor cells were mixed together, the immunophenotypic appearance of $CD3^+CD56^-$ T cells, $CD3^-CD56^+$ NK cells and $CD3^+CD56^+$ NKT cells was clearly defined by FACS analysis (FIG. 19A, left panel), and hu3F8-IgG1 (wild-type Fc) and hu3F8-BsAb (Fc-silenced by N297A+K322A) binding equally well to tumor cells (FIG. 19A, right panel). CD16 expression on NK cells and NKT cells was increased when PBMCs cultured for 72 hrs in complete RPMI1640 medium with WT-IL-15/IL-15Rα-Fc complex (FIG. 19B), which resulted in the increased binding of hu3F8 via FcγRIII to these CD16-expressing cells (FIG. 19C). On the other hand, binding of hu3F8-BsAb via CD3 to CD3-expressing T cells and NKT cells remained high regardless of whether PBMCs were cultured with WT-IL-15/IL-15Rα-Fc complex (FIG. 19D). In summary, hu3F8 could engage CD16-expressing NK and NKT cells while hu3F8-BsAb engaged CD3-expressing T cells and NKT cells.

These results demonstrate that the IL-15/IL-15Rα-Fc complexes of the present technology are useful in methods for promoting NK cell cytotoxicity in a subject in need thereof. Accordingly, the IL-15/IL-15Rα-Fc complexes of the present technology are useful in methods for enhancing IL-15-mediated immune function in a subject in need thereof (e.g., subjects suffering from cancer, infection, an immunodeficiency or lymphopenia or subjects that have received or are receiving an anti-cancer therapy, an anti-viral, anti-fungal, or anti-bacterial therapy).

Figure 20A:
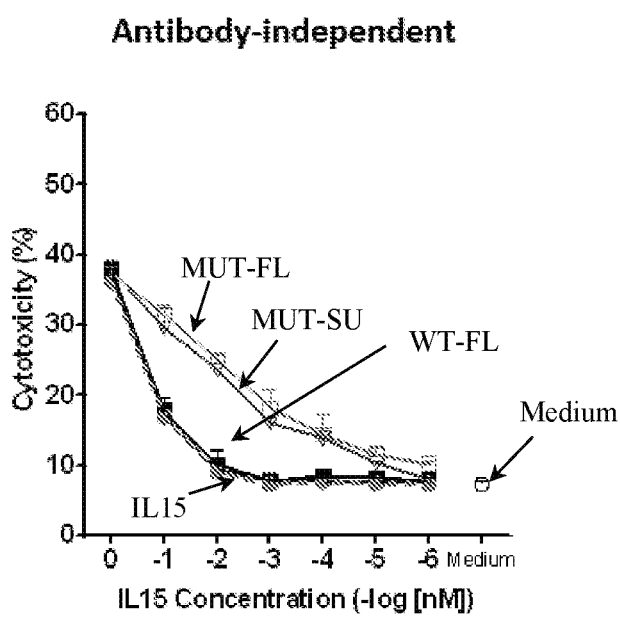
FIGS. 20A-20C show the cytotoxicity of IL-15-stimulated PBMCs. PBMCs from a healthy donor were cultured in vitro in medium either without (Medium) or with soluble IL-15 or different IL-15/IL-15Rα complexes. After 72 hr of culture, the PBMCs were harvested, re-adjusted in numbers and tested in an in vitro cytotoxicity ($^{51}$Cr-release) assay against M14 human melanoma cells either in the absence or presence of different antibodies. Results are presented as percentage of tumor cell lysis (Mean+SEM).

Example 6: Stimulation of PBMCs with IL15/IL15Rα-Fc Complex Augmented In Vitro Tumor Cytotoxicity To test if in vitro stimulation of human PBMCs with soluble IL-15 or IL-15/IL-15Rα-Fc complexes results in augmented cytotoxicity, PBMCs were cultured for 72 hrs in complete RPMI1640 medium with or without different amounts of soluble IL-15, or IL-15/IL-15Rα-Fc complexes. The lymphocytes were then tested in $^{51}$Cr-release cytotoxicity assays against GD2(+) human melanoma cell line M14. As shown in FIG. 20A, PBMCs stimulated with the highest concentration (1 nM) of IL-15 or IL-15/IL-15Rα-Fc complexes were equally potent in activating lymphocytes to mediate M14 tumor lysis; however, at lower concentrations, there was a significant enhancement in lymphocyte activation by mutant complexes versus wild-type complexes, irrespective of IL-15/IL-15Rα-Fc platform described herein or the SU platform. Without wishing to be bound by theory, it is believed that improved binding of mutant IL-15 to $IL2R\beta\gamma_c$ should result in stronger signaling, making PBMC derived T- and NK cells more cytolytic. The absence of significant difference between soluble IL-15 versus WT-IL-15/IL-15Rα-Fc or WT-SU complexes could be explained by the presence of native IL-15Rα on accessory cells (non-T, non-NK) within the PBMC population (FIG. 19A) that can present IL-15 to T- and NK cells.

Figure 20B:
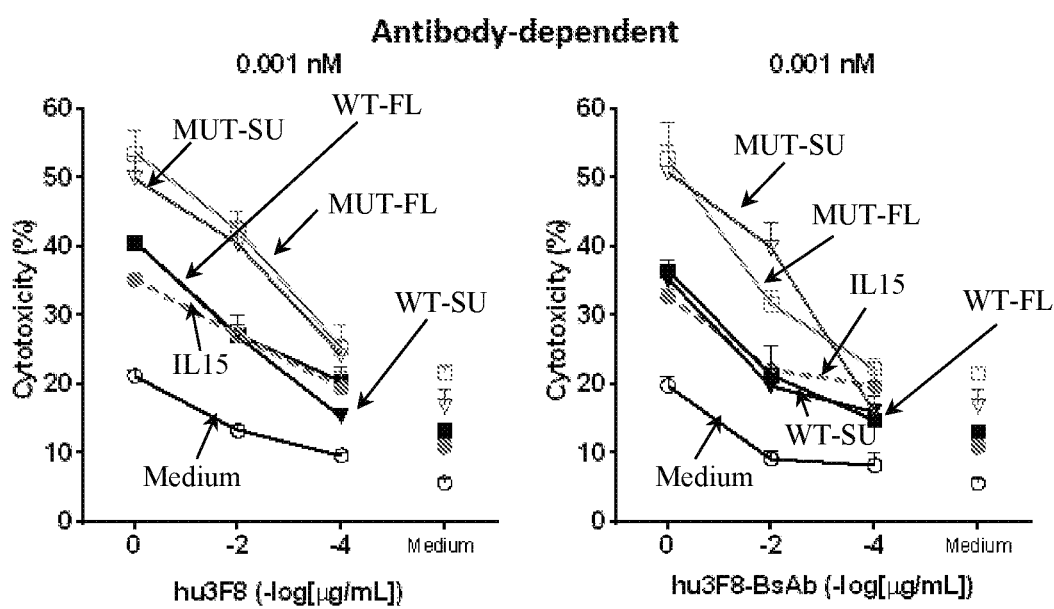
Figure 20C:
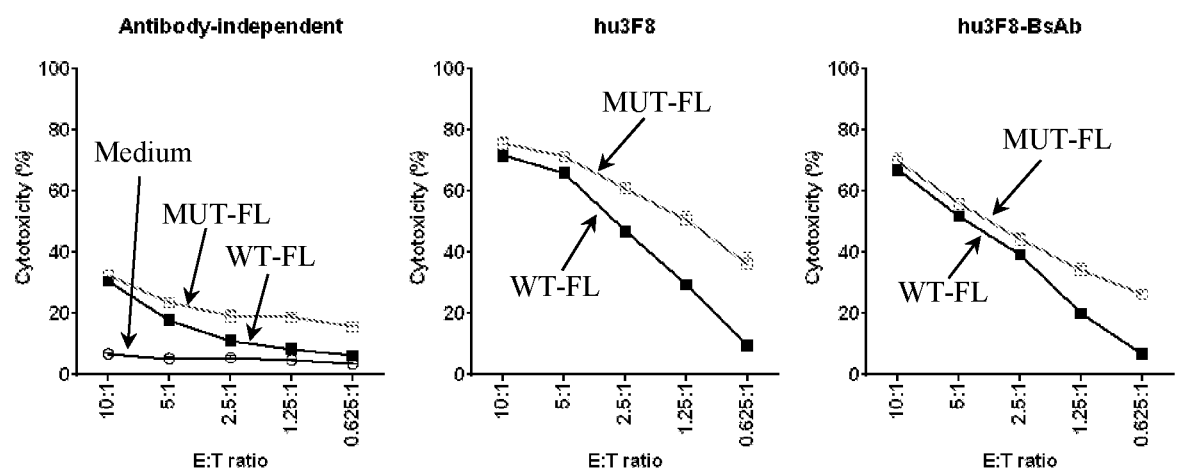

Next the ability of IL-15-stimulated PBMCs to potentiate ADCC in the presence of hu3F8 or antibody-dependent T cell-mediated cytotoxicity (ADTC) in the presence hu3F8-BsAb was tested. As shown in FIG. 20B, the basal cytotoxicity by IL-15-stimulated PBMCs (FIG. 20A) was greatly augmented in the presence of anti-tumor antibodies, and this effect was antibody concentration-dependent, especially when IL-15 and SU or IL-15/IL-15Rα-Fc complexes were used at low concentrations (0.001 nM). And, as already observed in FIG. 20A, there was a greater activation by MUT complexes compared to WT complexes or soluble IL-15. Furthermore, there was no substantial difference between the IL-15/IL-15Rα-Fc and SU platform. Besides titrating down the IL-15 or antibody concentration, titration of E:T ratio was also tested. Likewise, MUT IL-15/IL-15Rα-Fc complex stimulated cytotoxicity in PBMCs to a greater extent than WT IL-15/IL-15Rα-Fc complex (FIG. 20C), regardless of whether it was in the absence of antibodies, in the presence of hu3F8, or hu3F8-BsAb. These observations were reproduced when other PBMC donors were used (data not shown). FIGS. 5-6 and 20 show the in vitro cytotoxicity of human PBMC±hu3F8 or ATC±hu3F8-huOKT3 on GD2(+) and GD2(−) NB targets at decreasing ng/ml doses of IL-15/IL-15Rα-Fc complex, compared to IL2. In summary, MUT IL-15/IL-15Rα-Fc complexes were better immunostimulants than WT IL-15/IL-15Rα-Fc complexes in vitro.

These results demonstrate that the IL-15/IL-15Rα-Fc complexes of the present technology are useful in methods for treating cancer in a subject in need thereof. Accordingly, the IL-15/IL-15Rα-Fc complexes of the present technology are useful in methods for enhancing IL-15-mediated immune function in a subject in need thereof (e.g., subjects suffering from cancer, infection, an immunodeficiency or lymphopenia or subjects that have received or are receiving an anti-cancer therapy, an anti-viral, anti-fungal, or anti-bacterial therapy).

Example 7: Immunophenotypic Changes of PBMCs Induced by WT-IL-15/IL-15Rα-Fc Versus MUT-IL-15/IL-15Rα-Fc Complexes of the Present Technology In the next series of experiments, the phenotypic changes and functional status of T cells and NK cells following immunostimulation with WT-IL-15/IL-15Rα-Fc vs. MUT-IL-15/IL-15Rα-Fc complexes for 24-168 hrs were compared.

Figure 21A:
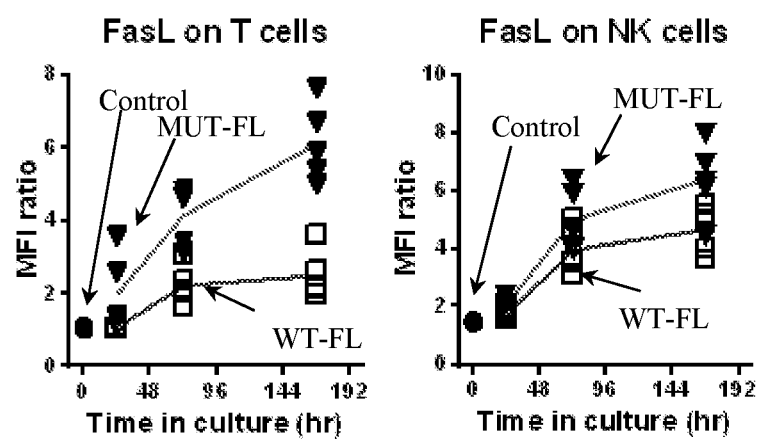
FIGS. 21A-21F show the immunophenotype of IL-15-stimulated PBMCs. PBMCs from healthy donors (n=5) were cultured in vitro in medium without (Control) or with 1 nM WT-IL-15/IL-15Rα-Fc or MUT-IL-15/IL-15Rα-Fc complex. At 24, 72 and 168 hrs, cells were tested by flow cytometry for expression of different surrogate markers. Analysis was based on gating on T cells (CD3+CD56− lymphocytes) or NK cells (CD3-CD56+ lymphocytes). Results are presented as geo-MFI ratio of the antigen of interest, individual for each donor. Lines represent Mean (n=5) of those 5 individual values.
Figure 21B:
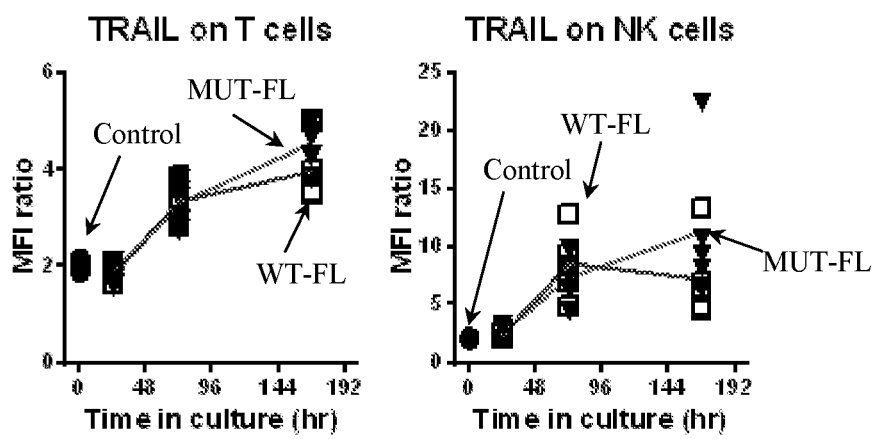

(1) FasL and TRAIL, the ligands involved in cell-contact dependent killing, for both T- and NK cells. As shown in FIGS. 21A and 21B, immunostimulation via $IL2R\beta\gamma_c$ resulted in time-dependent upregulation of both FasL and TRAIL on both T and NK cells; however, the difference between WT-IL-15/IL-15Rα-Fc vs. MUT-IL-15/IL-15Rα-Fc complexes was observed only for FasL but not for TRAIL.

Figure 21C:
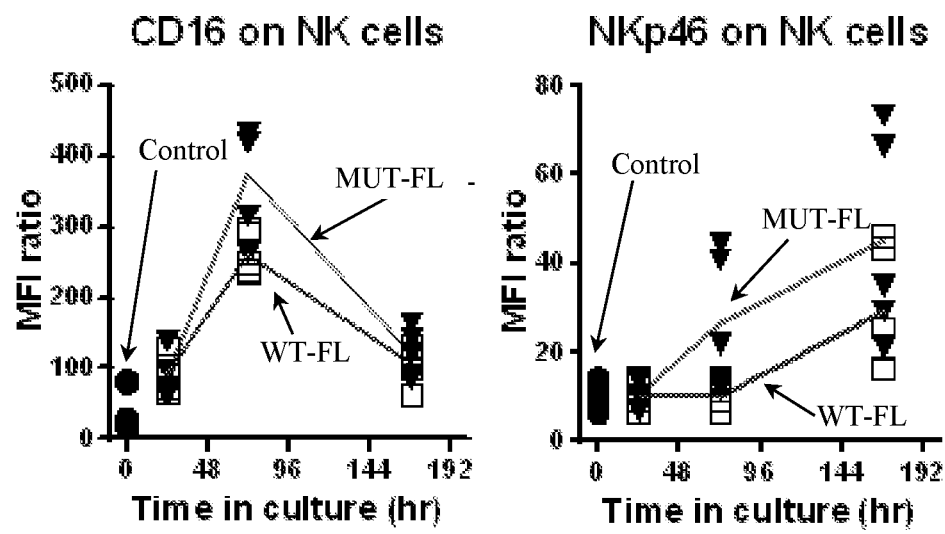
Figure 21D:
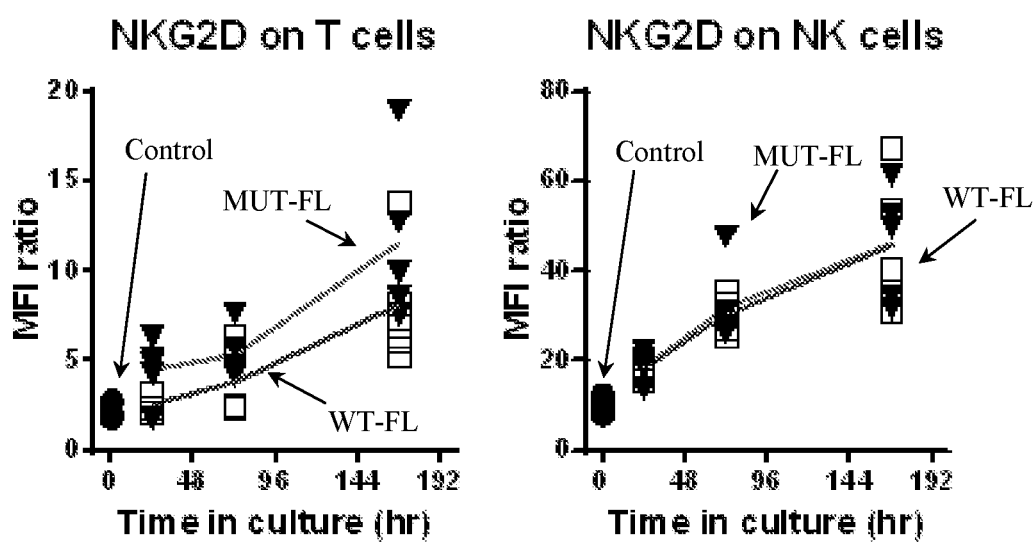

(2) CD16 and NKp46 (stimulatory receptors on NK cells) and NKG2D (stimulatory receptors on both NK- and T cells). As shown in FIGS. 21C and 21D, NKp46 and NKG2D also became upregulated in response to IL15/IL15Rα complexes (stimulation via IL2Rβγc); however, differential response to WT-IL-15/IL-15Rα-Fc vs. MUT-IL- 15/IL-15Rα-Fc complexes was seen only for NKp46 on NK cells and NKG2D on T cells, but not for NKG2D on NK cells. Consistent with previous reports, CD16 (FcγRIII) expression initially increased (with maximal levels seen at 72 hr of in vitro stimulation via IL2Rβγc, and more upregulation with MUT-IL-15/IL-15Rα-Fc complex), and then decayed as previously reported in Romee et al., *Blood* 131:2515-2527 (2018); nevertheless, CD16 expression remained higher than baseline. This phenomenon was documented with PBMCs from all donors.

(3) KIR2DL1, KIR3DL1, KIR2DL2-L3 and NKG2A, the inhibitory receptors, on NK cells. The immunostimulation via IL2Rβγ$_c$ did not result in appreciable change in all these KIR receptors, even after extended (up to 168 hr) immunostimulation (data not shown). Interestingly, KIR3DL1 was previously shown to have strongest negative impact in neuroblastoma patients receiving immunotherapy (Venstrom et al., *Clin Cancer Res* 15:7330-4 (2009).

Figure 21E:
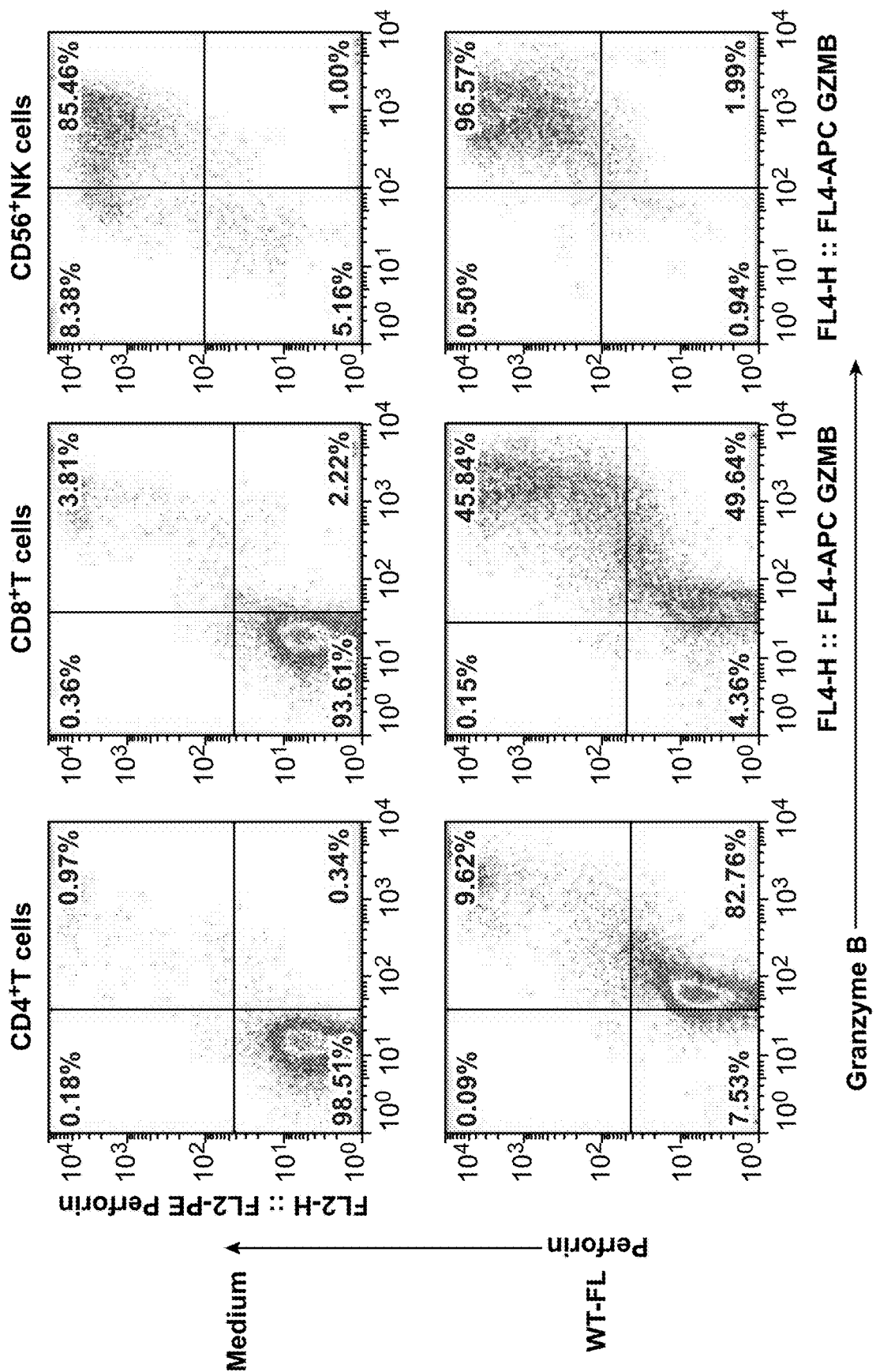
Figure 21F:
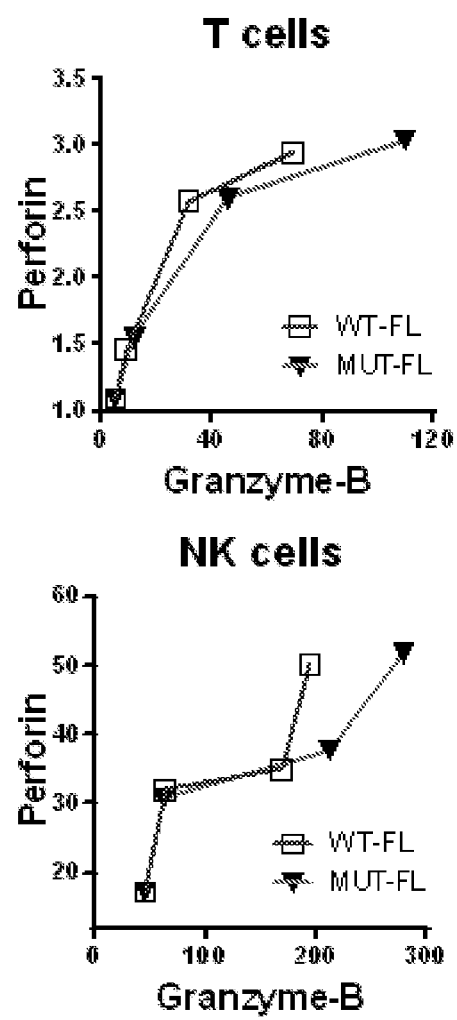

Since cell-mediated killing by T cells and NK cells is at least partially dependent on perforin and granzyme-B release from cytotoxic granules, their intracellular expression following stimulation via IL2Rβγ$_c$ was assessed. As shown in FIGS. 21E and 21F, whereas naïve T cells had significant upregulation mainly in granzyme-B following stimulation with IL-15/IL-15Rα-Fc complexes, naïve NK cells had high amounts of both perforin and granzyme-B at baseline, which became significantly upregulated following stimulation with IL-15/IL-15Rα-Fc complexes.

These results demonstrate that following stimulation via IL2Rβγ$_c$, both T- and NK cells became activated when measured by surrogate markers such as stimulatory receptors, cytotoxic proteins both intra-cytoplasmically and on the cell surface. Some of these changes were more pronounced following stimulation with MUT-IL-15/IL-15Rα-Fc vs. WT-IL-15/IL-15Rα-Fc complexes, while other changes were nearly identical.

Accordingly, the IL-15/IL-15Rα-Fc complexes of the present technology are useful in methods for enhancing IL-15-mediated immune function in a subject in need thereof (e.g., subjects suffering from cancer, infection, an immunodeficiency or lymphopenia or subjects that have received or are receiving an anti-cancer therapy, an anti-viral, anti-fungal, or anti-bacterial therapy).

Example 8: In Vivo Characterization of IL-15/IL-15Rα-Fc Complexes of the Present Technology In three separate humanized DKO (BALB-Rag2'IL-2R-γc-KO) immuno-deficient mouse models of human GD2(+) neuroblastoma and melanoma cell line xenografts, as well as C57BL/6 immuno-competent mouse model, s.c. or i.v. WT-IL-15/IL-15Rα-Fc complex was able to potentiate either i.v. hu3F8-IgG1-mediated or i.v. hu3F8-BsAb-mediated anti-tumor activity.

Figure 22A:
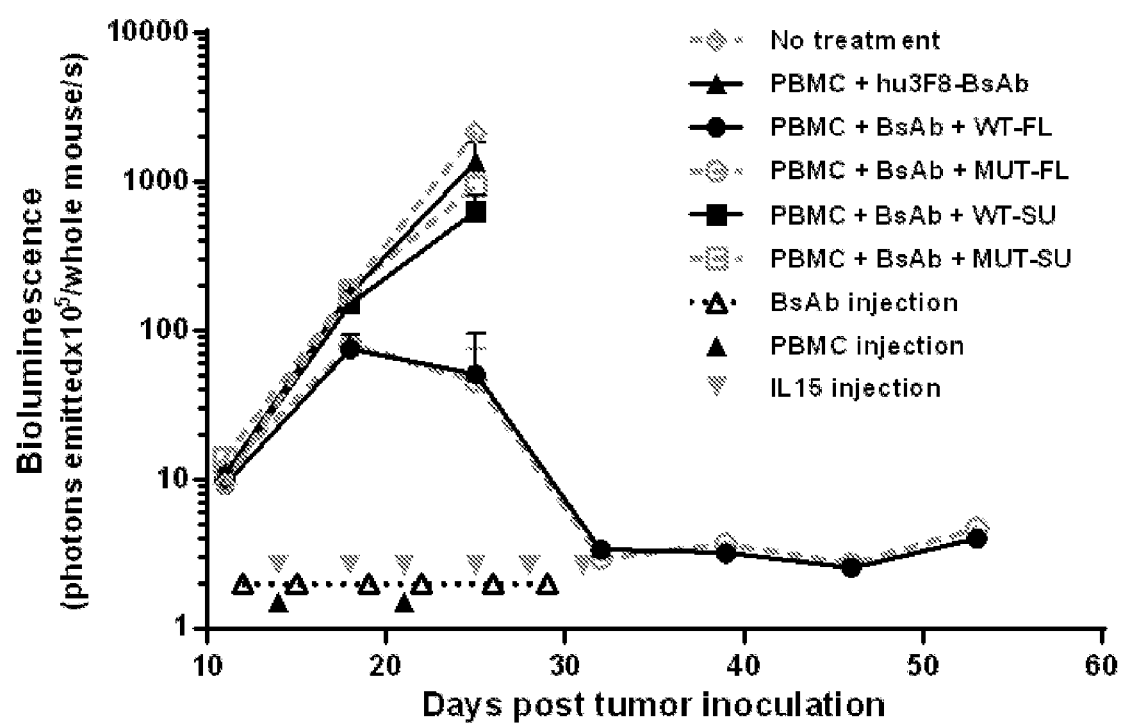
FIGS. 22A-22E show that the WT-IL-15/IL-15Rα-Fc complex of the present technology potentiates anti-tumor effects of antibody immunotherapy against tumor cell line xenografts. Treatment schedules were marked on the figures, and doses of IL-15 complexes, antibodies and effector cells were detailed in the Results. Data shown as mean+SEM (n=5).
Figure 22B:
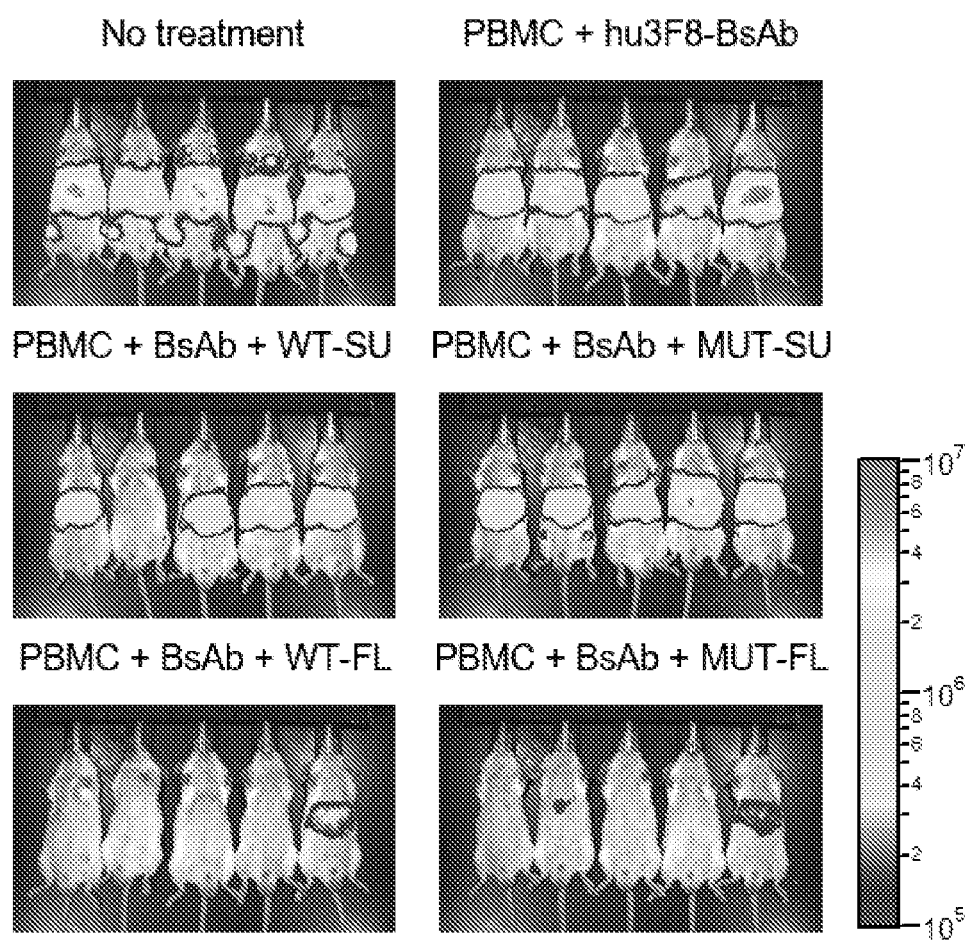

1) iv IMR32 neuroblastoma tumor cells plus iv effector PBMC cells. 0.5×10$^6$ IMR-32-Luc cells were inoculated intravenously into DKO mice to mimic metastatic model. When tumor presence was confirmed by bioluminescence, mice were treated with low dose of hu3F8-BsAb started on day 12 (10 µg iv, 2×/wk×3 wks), plus PBMC cells started on day 14 (5×10$^6$ iv, q wk×2 wks) and sc IL-15 complexes started on day 14 (10 µg of IL-15/IL-15Rα-Fc complexes or molar equivalent of SU complexes, 2×/wk×3 wks). Tumor luciferin bioluminescence signal was recorded and quantified weekly. Whereas low dose of hu3F8-BsAb alone, or in combination with SU complexes only had a marginal effect on tumor growth, combination of hu3F8-BsAb with either WT-IL-15/IL-15Rα-Fc or MUT-IL-15/IL-15Rα-Fc complexes were able to eradicate tumor growth completely (FIGS. 22A and 22B).

Figure 22C:
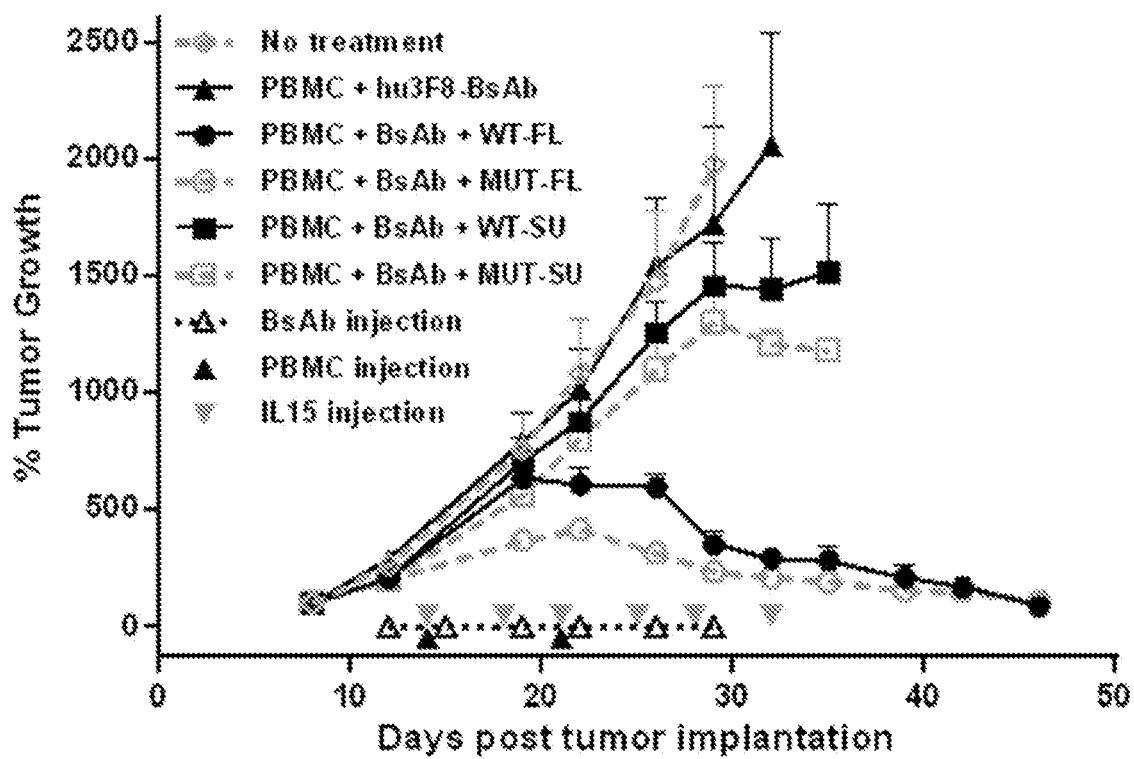

2) sc M14 melanoma tumor cells plus iv PBMC cells. 4×10$^6$M14-Luc cells were implanted subcutaneously into DKO mice. After tumors were established, mice were treated with low dose of hu3F8-BsAb started on day 12 (10-20 µg iv, 2×/wk×3 wks), plus PBMC cells started on day 14 (5×10$^6$ iv, q wk×2 wks) and sc IL-15 complexes started on day 14 (10 µg of IL-15/IL-15Rα-Fc complexes or molar equivalent of SU complexes, 2×/wk×3 wks). Tumor size was measured by calipers twice per week. Whereas low doses of hu3F8-BsAb in combination with SU complexes mildly suppressed tumor growth, combination of hu3F8-BsAb with either WT-IL-15/IL-15Rα-Fc or MUT-IL-15/IL-15Rα-Fc complexes were able to eradicate tumor growth completely (FIG. 22C).

Figure 22D:
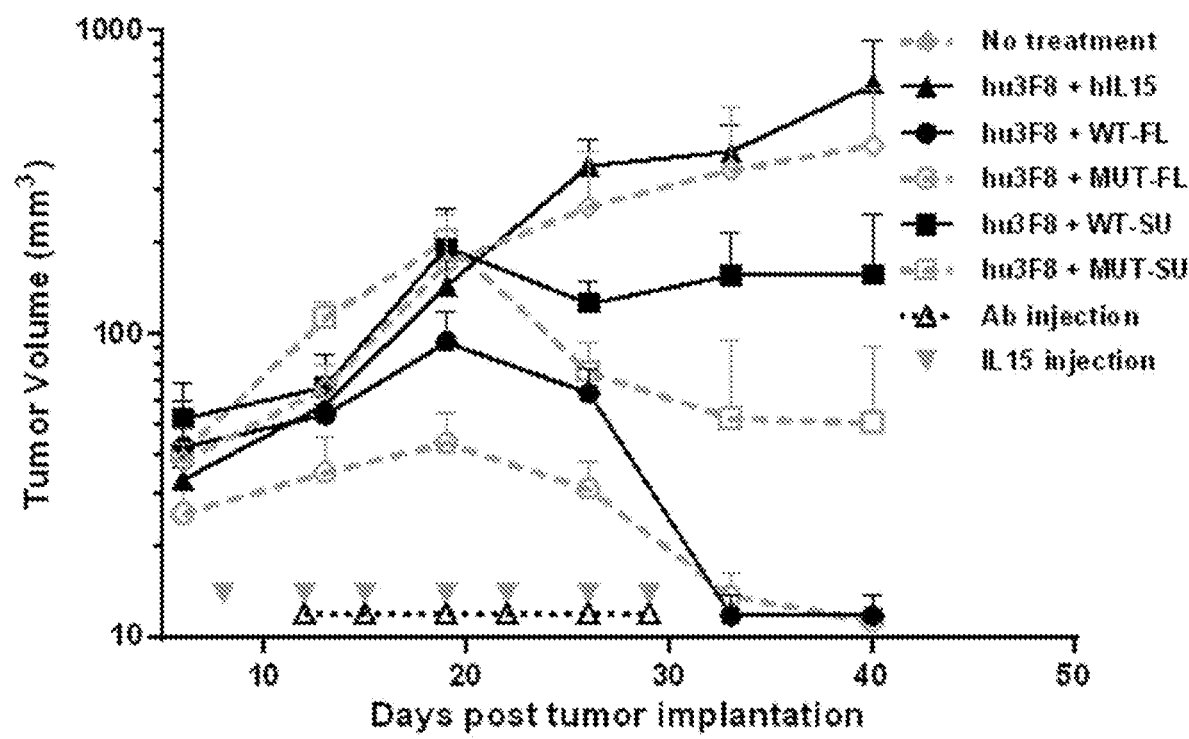

3) sc IMR32 tumor cells plus sc PBMC cells (1:1 mixing). IMR32-Luc cells were mixed with fresh PBMCs (1:1, 5×10$^6$ each) and implanted subcutaneously into DKO mice. After tumors were established, mice were treated with hu3F8-IgG1 started on day 12 (50 µg iv, 2×/wk×3 wks), plus iv IL-15 complexes started on day 8 (10 µg of IL-15/IL-15Rα-Fc complexes, or molar equivalent of SU complexes or hIL-15, 2×/wk for total 7 doses). Both WT-IL-15/IL-15Rα-Fc and MUT-IL-15/IL-15Rα-Fc complexes in combination with hu3F8-IgG1 were able to suppress tumor growth significantly, and to a greater extent than either SU complexes or monomeric recombinant hIL-15 (FIG. 22D).

Figure 22E:
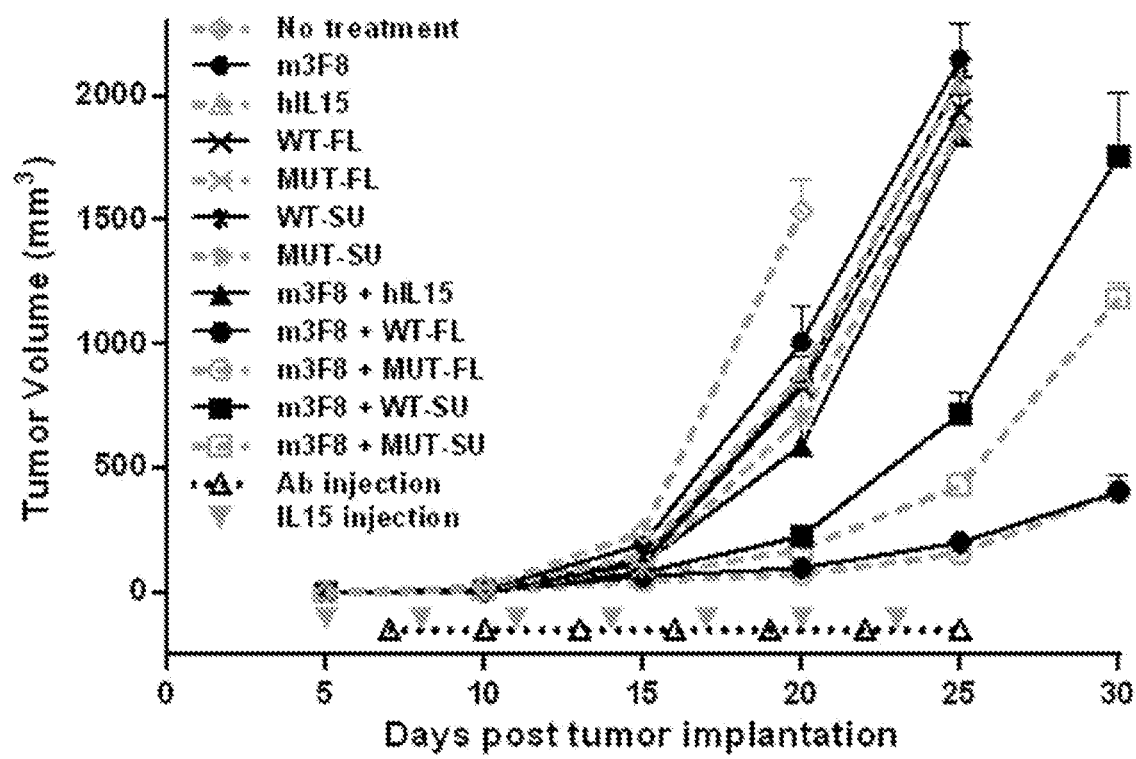

4) C57BL/6 mice grafted with sc GD2(+) murine melanoma B78/D14 cells. 1×10$^5$ B78/D14 cells were implanted subcutaneously into C57BL/6 mice. Mice were treated with m3F8-IgG3 started on day 7 (50 µg iv, 2×/wk for total 7 doses), plus sc IL-15 complexes started on day 5 (2 µg of IL-15/IL-15Rα-Fc complexes, or molar equivalent of SU complexes or hIL-15, 2×/wk for total 7 doses). When combined with m3F8, both WT-IL-15/IL-15Rα-Fc and MUT-IL-15/IL-15Rα-Fc complexes were able to suppress tumor growth significantly, and to a greater extent than either SU complexes or monomeric recombinant hIL-15 (FIG. 22E).

These results demonstrate that IL-15/IL-15Rα-Fc complexes of the present technology show superior therapeutic efficacy in vivo compared to SU complexes. Thus, strong in vitro potency of an agent might not translate directly into in vivo efficacy when the effect of the agent requires the cooperation of multiple cell types. While MUT-SU complex was indeed better than WT-SU complex in vivo as previously reported, the difference between MUT-IL-15/IL-15Rα-Fc and WT-IL-15/IL-15Rα-Fc complexes was not as remarkable.

These results demonstrate that the IL-15/IL-15Rα-Fc complexes of the present technology are useful in methods for potentiating the therapeutic efficacy of antibody-mediated immunotherapy in a subject in need thereof as well as methods for treating cancer in a subject in need thereof. Accordingly, the IL-15/IL-15Rα-Fc complexes of the present technology are useful in methods for enhancing IL-15-mediated immune function in a subject in need thereof (e.g., subjects suffering from cancer, infection, an immunodeficiency or lymphopenia or subjects that have received or are receiving an anti-cancer therapy, an anti-viral, anti-fungal, or anti-bacterial therapy).

Example 9: WT-IL-15/IL-15Rα-Fc Complexes of the Present Technology Promote In Vivo Lymphocyte Expansion The effect of the IL-15/IL-15Rα-Fc complexes of the present technology on lymphocyte expansion was assessed in healthy C57BL/6 mice injected s.c. with 5 μg WT-IL-15/IL-15Rα-Fc complexes, or molar equivalent of MUT-SU (as positive control) weekly for two consecutive weeks. Peripheral blood samples were collected 5 days after each dose, and CBC and FACS analysis were performed. Absolute cell count was calculated by multiplying the white blood cell count from CBC and percentage of positive cells from FACS.

Figure 23A:
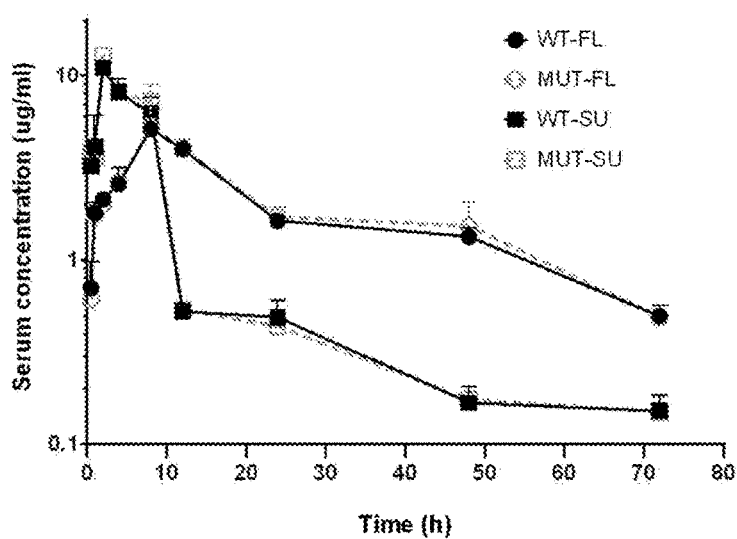
Figure 23B:
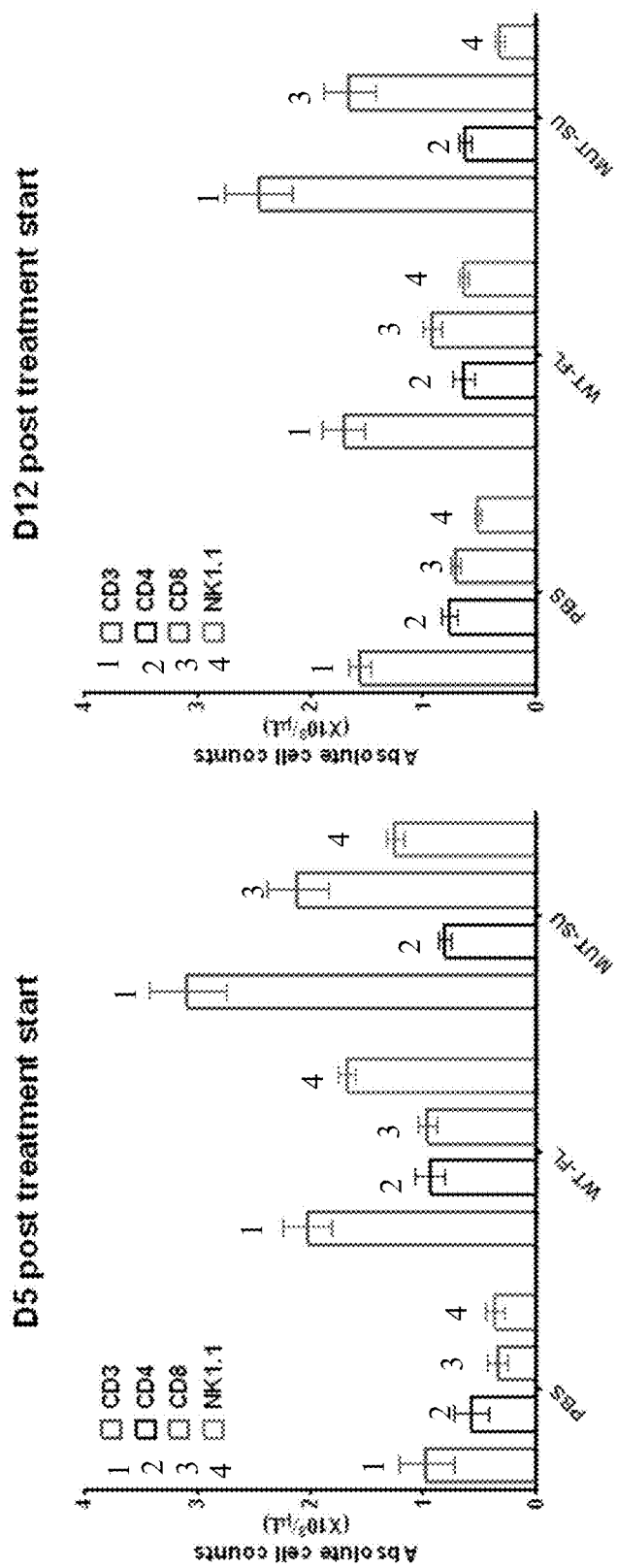
FIG. 23B: Lymphocyte expansion in healthy C57BL/6 mice. Absolute cell count was calculated by multiplying the white blood cell count from complete blood count (CBC) and percentage of positive cells from FACS. Mean±SEM (n=5).

As shown in FIG. 23B, WT-IL-15/IL-15Rα-Fc complex promoted both CD3+ T cell (mainly CD8+ T cells) and NK1.1+NK cell expansion after each dose. Whereas NK cell expansion appeared more than MUT-SU complex, T cell expansion was less than MUT-SU complex. This was consistent with the in vitro CTLL-2 cell proliferation results (FIG. 18F). These differential effects on lymphocyte expansion in vivo are noteworthy/clinically relevant since NK cell expansion could enhance the efficacy of IgG-based immunotherapy, whereas too much T cell expansion and activation could result in T cell exhaustion, and thus lead to detrimental effects on T cell engaging BsAb immunotherapy.

Accordingly, the IL-15/IL-15Rα-Fc complexes of the present technology are useful in methods for promoting in vivo lymphocyte expansion in a subject in need thereof.

Example 10: Pharmacokinetics of IL-15/IL-15Rα-Fc Complexes of the Present Technology Because the in vitro data provided herein demonstrates equivalence between the IL-15/IL-15Rα-Fc complexes described herein and SU platforms, irrespective of WT-IL-15 or MUT-IL-15, the superior in vivo efficacy of the IL-15/IL-15Rα-Fc complexes compared to SU complexes was unexpected. In order to understand these findings, pharmacokinetics studies of all four complexes in mice was performed (FIG. 23A).

50 μg of IL-15/IL-15Rα-Fc complexes or molar equivalent SU complexes were injected subcutaneously into DKO mice, and the concentrations of IL-15 complexes in mouse sera were quantified by ELISA. Pharmacokinetics analysis was carried out by simple noncompartmental method since there is no optimal fitting model for s.c. injection in the WinNonlin software. As shown in FIG. 23A, when compared to SU complexes, although IL-15/IL-15Rα-Fc complexes had lower peak serum levels ($C_{max}$), they had significantly longer serum half-life ($T_{1/2}$), higher area under the curve (AUC), and longer mean residence time (MRT). Since the in vivo effects of IL15 is not immediate, the effect of a delayed clearance of IL15 complex beyond 8 hours after s.c. administration could be further amplified, beyond what was expected based on AUC differences between IL-15/IL-15Rα-Fc complexes (~110 hr. pg/mL) and SU-complexes (~30 hr·μg/mL). Furthermore, there was no statistically significant difference between complexes containing either WT-IL-15/IL-15Rα-Fc or MUT-IL-15/IL-15Rα-Fc. Similar results were obtained after subcutaneous administration of the IL-15 complexes in C57BL/6 mice (data not shown). Taken together, the superior therapeutic efficacy of the IL-15/IL-15Rα-Fc complexes of the present technology may be attributed at least in part to its favorable pharmacokinetic profile.

The absence of mitogenic potential of IL-15/IL-15Rα-Fc complexes on a panel of 30 human solid tumor cell lines was confirmed (NB, melanoma, sarcoma, SCLC, CRC, brain tumor, leukemia and lymphoma) (FIG. 25). A formal GLP toxicology study of the WT-IL-15/IL-15Rα-Fc complexes disclosed herein confirmed the lack of biochemical and pathological toxicities of these constructs at clinically relevant dosages (data not shown).

Accordingly, the IL-15/IL-15Rα-Fc complexes of the present technology are useful in methods for enhancing IL-15-mediated immune function in a subject in need thereof (e.g., subjects suffering from cancer, infection, an immunodeficiency or lymphopenia or subjects that have received or are receiving an anti-cancer therapy, an anti-viral, anti-fungal, or anti-bacterial therapy).

Example 11: Further Characterization of IL-15/IL-15Rα-Fc Complexes of the Present Technology The stability at pH 4 (ideal pH based on molecular dynamics calculations of the complex) after multiple freeze and thaw cycles during storage from 1-18 months at −20° C. and −80° C., will be confirmed using HPLC, ELISA, NK92 proliferation, and in vitro cytotoxicity (NK, NK-ADCC, ATC).

General (acute and chronic) toxicities in both male and female mice BALB/c mice will be evaluated following iv bolus of IL-15/IL-15Rα-Fc complex, at 100× safety factor for the low (=0.2 mg/dose) and >1600× safety factor for the high dose (3.2 mg/dose), as planned for human trials. Clinical observations including body weights 5 days/wk will be recorded, plus hematology, clinical chemistry, and necropsies 24 hours and 2-4 weeks after last IL-15/IL-15Rα-Fc complex injection (FIG. 26). Blood clearance of $^{131}$I-labeled IL-15/IL-15Rα-Fc complex over 7 days will be studied in immunocompetent C57Bl/6 mice and SCID mice treated with hu3F8 and mouse IgG1.

All the experimental procedures for canine/rhesus complexes will be similar to those used for the human counterparts (see Examples 1-11). Using canine as an example, the coding sequences for canine IL15-WT/IL15Rα-Fc constructs will be subcloned into a single two-segment mammalian expression vector, and produced in CHO-S cells as described in Example 1. The complexes will be purified using Protein A affinity chromatography, and the molecular size and biochemical purity of the complexes will be monitored by SDS-PAGE and SEC-HPLC. The complexes will be assayed for in vitro canine T cell and NK cell expansion using canine PBMCs isolated from fresh dog whole blood, and phenotypic profiles (CD3, CD4, CD8, CD56, etc) will be assessed by FACS analysis. The complexes will be assayed for augmented in vitro tumor cytotoxicity (ADCC or ADTC) in $^{51}$Cr-release cytotoxicity assays, using canine PBMC as effector cells against tumor specific antigens (GD2, HER2, etc) on a panel of canine tumor cell lines (e.g., D-17, DSN, DSDH, DAN, OSCA-8, DOCL1, OSAC-40). The effect of the complexes on in vivo lymphocyte expansion will be assessed in healthy dogs injected s.c. with the complexes, and pharmacokinetics studies of the complexes in dogs will also be performed. Finally, the effects of the canine complexes on in vivo anti-tumor effects of antibody immunotherapy (NK+antibodies, or T cells+BsAb) against canine tumor cell line xenografts will be performed using DKO immuno-deficient mouse models.

EQUIVALENTS

The present technology is not to be limited in terms of the particular embodiments described in this application, which are intended as single illustrations of individual aspects of the present technology. Many modifications and variations of this present technology can be made without departing from its spirit and scope, as will be apparent to those skilled in the art. Functionally equivalent methods and apparatuses within the scope of the present technology, in addition to those enumerated herein, will be apparent to those skilled in the art from the foregoing descriptions. Such modifications and variations are intended to fall within the scope of the present technology. It is to be understood that this present technology is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

All patents, patent applications, provisional applications, and publications referred to or cited herein are incorporated by reference in their entirety, including all figures and tables, to the extent they are not inconsistent with the explicit teachings of this specification.

The invention claimed is:

1. An IL-15/IL-15Rα-Fc complex or a multimer thereof, wherein the complex comprises a first polypeptide chain, a second polypeptide chain, a third polypeptide chain and a fourth polypeptide chain, wherein
   (i) the first and second polypeptide chains are non-covalently bonded to one another, the second and third polypeptide chains are covalently bonded to one another, and the third and fourth polypeptide chain are non-covalently bonded to one another, and
   (ii) each of the second and third polypeptide chains comprise the IL-15Rα amino acid sequence of SEQ ID NO: 39 and an Fc domain amino acid sequence of an immunoglobulin molecule, wherein the Fc domain amino acid sequence is linked to the C-terminus of the IL-15Rα amino acid sequence, and
   (iii) the first and fourth polypeptide chains comprise an IL-15 polypeptide that binds to the second and third polypeptide chains, respectively,
   optionally wherein the multimer is a trimer.

2. The IL-15/IL-15Rα-Fc complex or multimer of claim 1, wherein each of the first and fourth polypeptide chains independently comprise the amino acid sequence of any one of SEQ ID NOs: 38, 44, 49, or 52 and/or wherein the second and third polypeptide chains independently comprise the amino acid sequence of any one of SEQ ID NOs: 45-48, or 53.

3. An IL-15/IL-15Rα-Fc complex or a multimer thereof, wherein the complex comprises a first polypeptide chain, a second polypeptide chain, a third polypeptide chain and a fourth polypeptide chain,
   wherein the first and second polypeptide chains are non-covalently bonded to one another, the second and third polypeptide chains are covalently bonded to one another, and the third and fourth polypeptide chain are non-covalently bonded to one another,
   wherein each of the first and fourth polypeptide chains comprise the amino acid sequence of any one of SEQ ID NOs: 1, 5, 44, or 52; and
   wherein each of the second and third polypeptide chains independently comprise the amino acid sequence of any one of SEQ ID NOs: 2, 18, 33, 34, 35, 45-48, or 53,
   optionally wherein the multimer is a trimer.

4. The IL-15/IL-15Rα-Fc complex or multimer of claim 3, wherein
   the first and fourth polypeptide chains comprise the amino acid sequence of SEQ ID NO: 1 and the second and third polypeptide chains comprise the amino acid sequence of SEQ ID NO: 2; or
   the first and fourth polypeptide chains comprise the amino acid sequence of SEQ ID NO: 5 and the second and third polypeptide chains comprise the amino acid sequence of SEQ ID NO:2; or
   the first and fourth polypeptide chains comprise the amino acid sequence of SEQ ID NO: 5 and the second and third polypeptide chains comprise the amino acid sequence of SEQ ID NO: 18; or
   the first and fourth polypeptide chains comprise the amino acid sequence of any one of SEQ ID NOs: 1 or 5 and the second and third polypeptide chains comprise the amino acid sequence of any one of SEQ ID NOs: 33-35; or
   the first and fourth polypeptide chains comprise the amino acid sequence of SEQ ID NO: 44 and the second and third polypeptide chains comprise the amino acid sequence of any one of SEQ ID NOs: 45-48; or
   the first and fourth polypeptide chains comprise the amino acid sequence of SEQ ID NO: 52 and the second and third polypeptide chains comprise the amino acid sequence of SEQ ID NO: 53.

5. A kit comprising the IL-15/IL-15Rα-Fc complex or multimer of claim 1 and instructions for use.

6. An IL-15/IL-15Rα-Fc complex or a multimer thereof, wherein the complex comprises a first polypeptide chain, a second polypeptide chain, a third polypeptide chain and a fourth polypeptide chain, wherein
   (i) the first and second polypeptide chains are non-covalently bonded to one another, the second and third polypeptide chains are covalently bonded to one another, and the third and fourth polypeptide chain are non-covalently bonded to one another,
   (ii) each of the first and fourth polypeptide chains comprise the amino acid sequence of any one of SEQ ID NOs: 1, 5, 44, or 52; and
   (iii) each of the second and third polypeptide chains independently comprise the amino acid sequence of:
   position 17 to position 424 of SEQ ID NO: 2;
   position 17 to position 424 of SEQ ID NO: 18;
   position 17 to position 425 of SEQ ID NO: 33;
   position 17 to position 476 of SEQ ID NO: 34;
   position 17 to position 426 of SEQ ID NO: 35;
   position 20 to position 455 of SEQ ID NO: 45;
   position 20 to position 451 of SEQ ID NO: 46;
   position 20 to position 453 of SEQ ID NO: 47;
   position 20 to position 451 of SEQ ID NO: 48; or
   position 20 to position 434 of SEQ ID NO: 53,
   optionally wherein the multimer is a trimer.

7. The IL-15/IL-15Rα-Fc complex or multimer of claim 1, wherein the second and third polypeptide chains comprise one or more modifications selected from the group consisting of
   (i) O-glycosylation on Thr2 of the amino acid sequence of SEQ ID NO: 39;
   (ii) O-glycosylation on Thr105 of the amino acid sequence of SEQ ID NO: 39;

(iii) O-glycosylation on Thr174 of the amino acid sequence of SEQ ID NO: 39;

(iv) O-glycosylation on Ser176 of the amino acid sequence of SEQ ID NO: 39; and (v) O-glycosylated on Ser178 of the amino acid sequence of SEQ ID NO: 39.

8. A method for enhancing IL-15-mediated immune function in a subject in need thereof, comprising administering to the subject an effective amount of the IL-15/IL-15Rα-Fc complex or multimer of claim 6, optionally wherein the enhanced IL-15-mediated immune function comprises one or more of antibody production, proliferation/expansion of lymphocytes, inhibition of apoptosis of lymphocytes, activation of dendritic cells (or antigen presenting cells), proliferation/expansion in the number of or activation of CD4+ T cells, CD8+ T cells, B cells, memory T cells, memory B cells, dendritic cells, antigen presenting cells, macrophages, mast cells, natural killer T cells (NKT cells), tumor-resident T cells, CD122+ T cells, and/or natural killer (NK cells), and/or antigen presentation.

9. A method for promoting T cell cytotoxicity or NK cell cytotoxicity, in a subject in need thereof, comprising administering to the subject an effective amount of the IL-15/IL-15Rα-Fc complex or multimer of claim 6.

10. A method for potentiating the therapeutic efficacy of anti-tumor antibody-mediated immunotherapy in a subject in need thereof, comprising administering to the subject an effective amount of the IL-15/IL-15Rα-Fc complex or multimer of claim 6, and an effective amount of a therapeutic antibody against a tumor target, wherein the therapeutic antibody is an immunoglobulin.

11. A method for preventing or treating cancer in a subject in need thereof, comprising administering to the subject an effective amount of the IL-15/IL-15Rα-Fc complex or multimer of claim 6, optionally wherein
the cancer is selected from the group consisting of leukemias lymphomas, multiple myelomas, sarcomas, brain tumors, breast cancer, adrenal cancer, thyroid cancer, pancreatic cancer, ocular cancer, pituitary cancer, vaginal cancers, cervical cancers, uterine cancer, ovarian cancer, vulvar cancer, esophageal cancer, gastrointestinal cancer, colon cancer, rectal cancer, liver cancer, gallbladder cancer, prostate cancer, lung cancer, testicular cancer, oral cancer, skin cancer, kidney cancer, bladder cancer, and prostate cancer, or the method further comprises sequentially, separately or simultaneously administering one or more additional anticancer agents.

12. A method for enhancing an IL-15-mediated immune function in a patient that has received or is receiving an anti-cancer therapy comprising administering to the patient an effective amount of the IL-15/IL-15Rα-Fc complex or multimer of claim 6, wherein enhancing the IL-15-mediated immune function comprises proliferation/expansion in the number of or activation of CD4+ T cells, CD8+ T cells, B cells, memory T cells, memory B cells, dendritic cells, antigen presenting cells, macrophages, mast cells, natural killer T cells (NKT cells), tumor-resident T cells, CD122+ T cells, and/or natural killer cells (NK cells), optionally wherein the patient has a compromised immune system due to an anti-cancer therapy selected from the group consisting of chemotherapy, radiation therapy, and immunotherapy.

13. A method for enhancing an IL-15-mediated immune function in a patient that has received or is receiving an anti-viral, anti-fungal, or anti-bacterial therapy comprising administering to the patient an effective amount of the IL-15/IL-15Rα-Fc complex or multimer of claim 6, wherein enhancing the IL-15-mediated immune function comprises proliferation/expansion in the number of or activation of CD4+ T cells, CDS+ T cells, B cells, memory T cells, memory B cells, dendritic cells, antigen presenting cells, macrophages, mast cells, natural killer T cells (NKT cells), tumor-resident T cells, CD122+ T cells, and/or natural killer cells (NK cells).

14. A method for treating lymphopenia in a subject in need thereof, comprising administering to the subject an effective amount of the IL-15/IL-15Rα-Fc complex or multimer of claim 6.

15. A method for propagating mammalian immune cells comprising contacting a population of mammalian immune cells with an effective amount of the IL-I 5/IL-15Rα-Fc complex or multimer of claim 6 ex vivo or in vitro, optionally wherein the mammalian immune cells are selected from the group consisting of CD4+ T cells, CD8+ T cells, B cells, memory T cells, memory B cells, dendritic cells, antigen presenting cells, macrophages, mast cells, natural killer T cells (NKT cells), tumor-resident T cells, CD122+ T cells, and natural killer cells (NK cells).

16. The method of claim 15, further comprising
contacting the population of mammalian immune cells with a cytokine, optionally wherein the cytokine is IL-1, IL-2, IL-3, IL-4, IL-5, IL-6, IL-7, IL-8, IL-10, IL-11, IL-12, GM-CSF, TNF-α, TNF-β, TGF-β, or interferon-γ, or contacting the population of mammalian immune cells with an agent, optionally wherein the agent is a phosphophonate selected from the group consisting of 9-[2-(phosphonomethoxy)ethyl]adenine (PMEA; Adefovir), 9-(R)-[2-(phosphonomethoxy)propyl]adenine [(R)-PMPA; Tenofovir], 9-(S)-[2-(phosphonomethoxy)propyl]adenine; (S)-PMPA), 9-[2-(phosphonomethoxy) ethyl]-2,6-diaminopurine (PMEDAP), 9-(R)-[2-(phosphonomethoxy)propyl]-2,6-diaminopurine (PMPDAP), and 9-[2-(phosphonomethoxy)ethyl]guanine (PMEG).

* * * * *

SEQUENCE LISTING

```
<160> NUMBER OF SEQ ID NOS: 53

<210> SEQ ID NO 1
<211> LENGTH: 130
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 1

Met Gly Trp Ser Cys Ile Ile Leu Phe Leu Val Ala Thr Ala Thr Gly
1               5                   10                  15

Asn Trp Val Asn Val Ile Ser Asp Leu Lys Lys Ile Glu Asp Leu Ile
            20                  25                  30

Gln Ser Met His Ile Asp Ala Thr Leu Tyr Thr Glu Ser Asp Val His
        35                  40                  45

Pro Ser Cys Lys Val Thr Ala Met Lys Cys Phe Leu Leu Glu Leu Gln
    50                  55                  60

Val Ile Ser Leu Glu Ser Gly Asp Ala Ser Ile His Asp Thr Val Glu
65                  70                  75                  80

Asn Leu Ile Ile Leu Ala Asn Asn Ser Leu Ser Ser Asn Gly Asn Val
                85                  90                  95

Thr Glu Ser Gly Cys Lys Glu Cys Glu Glu Leu Glu Glu Lys Asn Ile
            100                 105                 110

Lys Glu Phe Leu Gln Ser Phe Val His Ile Val Gln Met Phe Ile Asn
        115                 120                 125

Thr Ser
    130

<210> SEQ ID NO 2
<211> LENGTH: 424
<212> TYPE: PRT
<213> ORGANISM: Artificial Sequence
<220> FEATURE:
```

<223> OTHER INFORMATION: Description of Artificial Sequence: Synthetic
      polypeptide

<400> SEQUENCE: 2

```
Met Gly Trp Ser Cys Ile Ile Leu Phe Leu Val Ala Thr Ala Thr Gly
1               5                   10                  15

Ile Thr Cys Pro Pro Met Ser Val Glu His Ala Asp Ile Trp Val
                20                  25                  30

Lys Ser Tyr Ser Leu Tyr Ser Arg Glu Arg Tyr Ile Cys Asn Ser Gly
                35                  40                  45

Phe Lys Arg Lys Ala Gly Thr Ser Ser Leu Thr Glu Cys Val Leu Asn
    50                  55                  60

Lys Ala Thr Asn Val Ala His Trp Thr Thr Pro Ser Leu Lys Cys Ile
65                  70                  75                  80

Arg Asp Pro Ala Leu Val His Gln Arg Pro Ala Pro Ser Thr Val
                85                  90                  95

Thr Thr Ala Gly Val Thr Pro Gln Pro Glu Ser Leu Ser Pro Ser Gly
                100                 105                 110

Lys Glu Pro Ala Ala Ser Ser Pro Ser Ser Asn Asn Thr Ala Ala Thr
                115                 120                 125

Thr Ala Ala Ile Val Pro Gly Ser Gln Leu Met Pro Ser Lys Ser Pro
        130                 135                 140

Ser Thr Gly Thr Thr Glu Ile Ser Ser His Glu Ser Ser His Gly Thr
145                 150                 155                 160

Pro Ser Gln Thr Thr Ala Lys Asn Trp Glu Leu Thr Ala Ser Ala Ser
                165                 170                 175

His Gln Pro Pro Gly Val Tyr Pro Gln Gly His Ser Asp Thr Thr Ala
                180                 185                 190

Ser Thr Lys Gly Pro Asp Lys Thr His Thr Cys Pro Pro Cys Pro Ala
                195                 200                 205

Pro Glu Leu Leu Gly Gly Pro Ser Val Phe Leu Phe Pro Pro Lys Pro
        210                 215                 220

Lys Asp Thr Leu Met Ile Ser Arg Thr Pro Glu Val Thr Cys Val Val
225                 230                 235                 240

Val Asp Val Ser His Glu Asp Pro Glu Val Lys Phe Asn Trp Tyr Val
                245                 250                 255

Asp Gly Val Glu Val His Asn Ala Lys Thr Lys Pro Arg Glu Glu Gln
                260                 265                 270

Tyr Asn Ser Thr Tyr Arg Val Val Ser Val Leu Thr Val Leu His Gln
                275                 280                 285

Asp Trp Leu Asn Gly Lys Glu Tyr Lys Cys Lys Val Ser Asn Lys Ala
        290                 295                 300

Leu Pro Ala Pro Ile Glu Lys Thr Ile Ser Lys Ala Lys Gly Gln Pro
305                 310                 315                 320

Arg Glu Pro Gln Val Tyr Thr Leu Pro Pro Ser Arg Asp Glu Leu Thr
                325                 330                 335

Lys Asn Gln Val Ser Leu Thr Cys Leu Val Lys Gly Phe Tyr Pro Ser
                340                 345                 350

Asp Ile Ala Val Glu Trp Glu Ser Asn Gly Gln Pro Glu Asn Asn Tyr
                355                 360                 365

Lys Thr Thr Pro Pro Val Leu Asp Ser Asp Gly Ser Phe Phe Leu Tyr
        370                 375                 380

Ser Lys Leu Thr Val Asp Lys Ser Arg Trp Gln Gln Gly Asn Val Phe
385                 390                 395                 400
```

Ser Cys Ser Val Met His Glu Ala Leu His Asn His Tyr Thr Gln Lys
            405                 410                 415

Ser Leu Ser Leu Ser Pro Gly Lys
            420

<210> SEQ ID NO 3
<211> LENGTH: 393
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 3
atgggctggt cctgcatcat cctgtttctg gtggctaccg ccaccggcaa ctgggtcaac     60
gtgatctccg aacctgaagaa gatcgaggac ctgatccagt ccatgcacat cgacgccacc    120
ctgtacaccg agtccgacgt gcaccccctcc tgcaaagtga ccgccatgaa gtgctttctg    180
ctggaactgc aagtgatctc cctggaatcc ggcgacgcct ccatccacga caccgtggaa    240
aatctgatca tcctggccaa caactccctg tcctccaacg gcaacgtgac cgagagcggc    300
tgcaaagagt gcgaggaact ggaagagaag aacatcaaag agtttctgca gtccttcgtg    360
cacatcgtgc agatgttcat caacaccagc tag                                 393

<210> SEQ ID NO 4
<211> LENGTH: 1275
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 4
atgggctggt cctgcatcat cctgtttctg gtggccacag ccaccggcat cacctgtcct     60
ccacccatgt ctgtggaaca cgccgacatc tgggtcaagt cctactccct gtactccaga    120
gagcggtaca tctgcaactc cggcttcaag cggaaggccg gcacctctag cctgaccgag    180
tgcgtgctga acaaggccac caacgtggcc cactggacca cccatccct gaagtgcatc     240 agggaccctg ccctggtgca tcagaggcct gctcctccat ccaccgtgac cacagctggc    300
gtgacccctc agcctgagtc cctgagccct tccggcaaag agccagccgc ctcctcccct    360
tcctctaaca ataccgccgc taccaccgcc gccatcgtgc ctggatctca gctgatgccc    420
tccaagtccc cttccaccgg aaccaccgag atctccagcc acgagtcctc tcacggcacc    480
ccttctcaga ccaccgccaa gaactgggag ctgaccgcct ctgcctctca ccagcctcca    540
ggcgtgtacc ctcagggcca ctctgacacc accgcctcta caaagggccc agacaaaact    600
cacacatgcc caccgtgccc agcacctgaa ctcctggggg gaccgtcagt cttcctcttc    660 ccccccaaaac ccaaggacac cctcatgatc tcccggaccc ctgaggtcac atgcgtggtg    720
gtggacgtga gccacgaaga ccctgaggtc aagttcaact ggtacgtgga cggcgtggag    780
gtgcataatg ccaagacaaa gccgcgggag gagcagtaca acagcacgta ccgtgtggtc    840
agcgtcctca ccgtcctgca ccaggactgg ctgaatggca aggagtacaa gtgcaaggtc    900
tccaacaaag ccctcccagc ccccatcgag aaaaccatct ccaaagccaa agggcagccc    960
cgagaaccac aggtgtacac cctgcccca tcccgggatg agctgaccaa gaaccaggtc    1020
agcctgacct gcctggtcaa aggcttctat cccagcgaca tcgccgtgga gtgggagagc    1080

```
aatgggcagc cggagaacaa ctacaagacc acgcctcccg tgctggactc cgacggctcc    1140
ttcttcctct acagcaagct caccgtggac aagagcaggt ggcagcaggg gaacgtcttc    1200
tcatgctccg tgatgcatga ggctctgcac aaccactaca cgcagaagag cctctccctg    1260
tctccgggta aatga                                                     1275
```

<210> SEQ ID NO 5
<211> LENGTH: 130
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 5

```
Met Gly Trp Ser Cys Ile Ile Leu Phe Leu Val Ala Thr Ala Thr Gly
1               5                   10                  15

Asn Trp Val Asn Val Ile Ser Asp Leu Lys Lys Ile Glu Asp Leu Ile
            20                  25                  30

Gln Ser Met His Ile Asp Ala Thr Leu Tyr Thr Glu Ser Asp Val His
        35                  40                  45

Pro Ser Cys Lys Val Thr Ala Met Lys Cys Phe Leu Leu Glu Leu Gln
    50                  55                  60

Val Ile Ser Leu Glu Ser Gly Asp Ala Ser Ile His Asp Thr Val Glu
65                  70                  75                  80

Asn Leu Ile Ile Leu Ala Asn Asp Ser Leu Ser Ser Asn Gly Asn Val
                85                  90                  95

Thr Glu Ser Gly Cys Lys Glu Cys Glu Glu Leu Glu Glu Lys Asn Ile
            100                 105                 110

Lys Glu Phe Leu Gln Ser Phe Val His Ile Val Gln Met Phe Ile Asn
        115                 120                 125

Thr Ser
    130
```

<210> SEQ ID NO 6
<211> LENGTH: 424
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 6

```
Met Gly Trp Ser Cys Ile Ile Leu Phe Leu Val Ala Thr Ala Thr Gly
1               5                   10                  15

Ile Thr Cys Pro Pro Pro Met Ser Val Glu His Ala Asp Ile Trp Val
            20                  25                  30

Lys Ser Tyr Ser Leu Tyr Ser Arg Glu Arg Tyr Ile Cys Asn Ser Gly
        35                  40                  45

Phe Lys Arg Lys Ala Gly Thr Ser Ser Leu Thr Glu Cys Val Leu Asn
    50                  55                  60

Lys Ala Thr Asn Val Ala His Trp Thr Thr Pro Ser Leu Lys Cys Ile
65                  70                  75                  80

Arg Asp Pro Ala Leu Val His Gln Arg Pro Ala Pro Pro Ser Thr Val
                85                  90                  95

Thr Thr Ala Gly Val Thr Pro Gln Pro Glu Ser Leu Ser Pro Ser Gly
            100                 105                 110

Lys Glu Pro Ala Ala Ser Ser Pro Ser Ser Asn Asn Thr Ala Ala Thr
```

```
            115                 120                 125
Thr Ala Ala Ile Val Pro Gly Ser Gln Leu Met Pro Ser Lys Ser Pro
            130                 135                 140
Ser Thr Gly Thr Thr Glu Ile Ser Ser His Glu Ser Ser His Gly Thr
145                 150                 155                 160
Pro Ser Gln Thr Thr Ala Lys Asn Trp Glu Leu Thr Ala Ser Ala Ser
                165                 170                 175
His Gln Pro Pro Gly Val Tyr Pro Gln Gly His Ser Asp Thr Thr Ala
            180                 185                 190
Ser Thr Lys Gly Pro Asp Lys Thr His Thr Cys Pro Pro Cys Pro Ala
            195                 200                 205
Pro Glu Leu Leu Gly Gly Pro Ser Val Phe Leu Phe Pro Pro Lys Pro
210                 215                 220
Lys Asp Thr Leu Met Ile Ser Arg Thr Pro Glu Val Thr Cys Val Val
225                 230                 235                 240
Val Asp Val Ser His Glu Asp Pro Glu Val Lys Phe Asn Trp Tyr Val
                245                 250                 255
Asp Gly Val Glu Val His Asn Ala Lys Thr Lys Pro Arg Glu Glu Gln
            260                 265                 270
Tyr Asn Ser Thr Tyr Arg Val Val Ser Val Leu Thr Val Leu His Gln
                275                 280                 285
Asp Trp Leu Asn Gly Lys Glu Tyr Lys Cys Lys Val Ser Asn Lys Ala
            290                 295                 300
Leu Pro Ala Pro Ile Glu Lys Thr Ile Ser Lys Ala Lys Gly Gln Pro
305                 310                 315                 320
Arg Glu Pro Gln Val Tyr Thr Leu Pro Pro Ser Arg Asp Glu Leu Thr
                325                 330                 335
Lys Asn Gln Val Ser Leu Thr Cys Leu Val Lys Gly Phe Tyr Pro Ser
                340                 345                 350
Asp Ile Ala Val Glu Trp Glu Ser Asn Gly Gln Pro Glu Asn Asn Tyr
            355                 360                 365
Lys Thr Thr Pro Pro Val Leu Asp Ser Asp Gly Ser Phe Phe Leu Tyr
370                 375                 380
Ser Lys Leu Thr Val Asp Lys Ser Arg Trp Gln Gln Gly Asn Val Phe
385                 390                 395                 400
Ser Cys Ser Val Met His Glu Ala Leu His Asn His Tyr Thr Gln Lys
                405                 410                 415
Ser Leu Ser Leu Ser Pro Gly Lys
            420

<210> SEQ ID NO 7
<211> LENGTH: 393
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 7
atgggctggt cctgcatcat cctgtttctg gtggccaccg ccaccggcaa ctgggtcaac      60
gtgatctccg acctgaagaa gatcgaggac ctgatccagt ccatgcacat cgacgccacc     120
ctgtacaccg agtccgacgt gcacccctcc tgcaaagtga ccgccatgaa gtgctttctg     180
ctggaactgc aagtgatctc cctggaatcc ggcgacgcct ccatccacga caccgtggaa     240
aatctgatca tcctggccaa cgactccctg tcctccaacg gcaacgtgac cgagagcggc     300
```

```
tgcaaagagt gcgaggaact ggaagagaag aacatcaaag agtttctgca gtccttcgtg    360
cacatcgtgc agatgttcat caacaccagc tag                                 393
```

<210> SEQ ID NO 8
<211> LENGTH: 1275
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 8

```
atgggctggt cctgcatcat cctgtttctg gtggctaccg ccaccggcat cacctgtcct     60
ccacccatgt ctgtggaaca cgccgacatc tgggtcaagt cctactccct gtactccaga   120
gagcggtaca tctgcaactc cggcttcaag cggaaggccg gcacctctag cctgaccgag   180
tgcgtgctga acaaggccac caacgtggcc cactggacca ccccatccct gaagtgcatc   240
agggaccctg ccctggtgca tcagaggcct gctcctccat ccaccgtgac cacagctggc   300 gtgaccectc agcctgagtc cctgagccct tccggcaaag agccagccgc ctcctcccct   360
tcctctaaca taccgccgc taccaccgcc gccatcgtgc ctggatctca gctgatgccc   420
tccaagtccc cttccaccgg aaccaccgag atctccagcc acgagtcctc tcacggcacc   480
ccttctcaga ccaccgccaa gaactgggag ctgaccgcct tgcctctca ccagcctcca   540 ggcgtgtacc ctcagggcca ctctgacacc accgcctcta caagggccc agacaaaact   600 cacacatgcc caccgtgccc agcacctgaa ctcctggggg gaccgtcagt cttcctcttc   660
cccccaaaac ccaaggacac cctcatgatc tcccggaccc ctgaggtcac atgcgtggtg   720
gtggacgtga gccacgaaga ccctgaggtc aagttcaact ggtacgtgga cggcgtggag   780
gtgcataatg ccaagacaaa gccgcgggag gagcagtaca acagcacgta ccgtgtggtc   840
agcgtcctca ccgtcctgca ccaggactgg ctgaatggca aggagtacaa gtgcaaggtc   900
tccaacaaag ccctcccagc ccccatcgag aaaaccatct ccaaagccaa agggcagccc   960
cgagaaccac aggtgtacac cctgccccca tcccgggatg agctgaccaa gaaccaggtc  1020
agcctgacct gcctggtcaa aggcttctat cccagcgaca tcgccgtgga gtgggagagc  1080
aatgggcagc cggagaacaa ctacaagacc acgcctcccg tgctggactc cgacggctcc  1140
ttcttcctct acagcaagct caccgtggac aagagcaggt ggcagcaggg gaacgtcttc  1200
tcatgctccg tgatgcatga ggctctgcac aaccactaca cgcagaagag cctctccctg  1260
tctccgggta aatga                                                   1275
```

<210> SEQ ID NO 9
<211> LENGTH: 130
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 9

Met Gly Trp Ser Cys Ile Ile Leu Phe Leu Val Ala Thr Ala Thr Gly
1               5                   10                  15

Asn Trp Val Asn Val Ile Ser Asp Leu Lys Lys Ile Glu Asp Leu Ile
            20                  25                  30

Gln Ser Met His Ile Asp Ala Thr Leu Tyr Thr Glu Ser Asp Val His
        35                  40                  45

```
Pro Ser Cys Lys Val Thr Ala Met Lys Cys Phe Leu Leu Glu Leu Gln
    50                  55                  60

Val Ile Ser Leu Glu Ser Gly Asp Ala Ser Ile His Asp Thr Val Glu
65                  70                  75                  80

Asn Leu Ile Ile Leu Ala Asn Asn Ser Leu Ser Ser Asn Gly Asn Val
                85                  90                  95

Thr Glu Ser Gly Cys Lys Glu Cys Glu Glu Leu Glu Glu Lys Asn Ile
            100                 105                 110

Lys Glu Phe Leu Gln Ser Phe Val His Ile Val Gln Met Phe Ile Asn
        115                 120                 125

Thr Ser
    130

<210> SEQ ID NO 10
<211> LENGTH: 313
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 10

Met Gly Trp Ser Cys Ile Ile Leu Phe Leu Val Ala Thr Ala Thr Gly
1               5                   10                  15

Ile Thr Cys Pro Pro Met Ser Val Glu His Ala Asp Ile Trp Val
            20                  25                  30

Lys Ser Tyr Ser Leu Tyr Ser Arg Glu Arg Tyr Ile Cys Asn Ser Gly
            35                  40                  45

Phe Lys Arg Lys Ala Gly Thr Ser Ser Leu Thr Glu Cys Val Leu Asn
    50                  55                  60

Lys Ala Thr Asn Val Ala His Trp Thr Thr Pro Ser Leu Lys Cys Ile
65                  70                  75                  80

Arg Glu Pro Lys Ser Cys Asp Lys Thr His Thr Cys Pro Pro Cys Pro
                85                  90                  95

Ala Pro Glu Leu Leu Gly Gly Pro Ser Val Phe Leu Phe Pro Pro Lys
            100                 105                 110

Pro Lys Asp Thr Leu Met Ile Ser Arg Thr Pro Glu Val Thr Cys Val
        115                 120                 125

Val Val Asp Val Ser His Glu Asp Pro Glu Val Lys Phe Asn Trp Tyr
130                 135                 140

Val Asp Gly Val Glu Val His Asn Ala Lys Thr Lys Pro Arg Glu Glu
145                 150                 155                 160

Gln Tyr Asn Ser Thr Tyr Arg Val Val Ser Val Leu Thr Val Leu His
                165                 170                 175

Gln Asp Trp Leu Asn Gly Lys Glu Tyr Lys Cys Lys Val Ser Asn Lys
            180                 185                 190

Ala Leu Pro Ala Pro Ile Glu Lys Thr Ile Ser Lys Ala Lys Gly Gln
        195                 200                 205

Pro Arg Glu Pro Gln Val Tyr Thr Leu Pro Pro Ser Arg Asp Glu Leu
    210                 215                 220

Thr Lys Asn Gln Val Ser Leu Thr Cys Leu Val Lys Gly Phe Tyr Pro
225                 230                 235                 240

Ser Asp Ile Ala Val Glu Trp Glu Ser Asn Gly Gln Pro Glu Asn Asn
                245                 250                 255

Tyr Lys Thr Thr Pro Pro Val Leu Asp Ser Asp Gly Ser Phe Phe Leu
```

```
                260             265             270
Tyr Ser Lys Leu Thr Val Asp Lys Ser Arg Trp Gln Gln Gly Asn Val
                    275             280             285
Phe Ser Cys Ser Val Met His Glu Ala Leu His Asn His Tyr Thr Gln
            290             295             300
Lys Ser Leu Ser Leu Ser Pro Gly Lys
305                 310

<210> SEQ ID NO 11
<211> LENGTH: 393
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 11
atgggctggt cctgcatcat cctgtttctg gtggctaccg ccaccggcaa ctgggtcaac      60
gtgatctccg acctgaagaa gatcgaggac ctgatccagt ccatgcacat cgacgccacc     120
ctgtacaccg agtccgacgt gcacccctcc tgcaaagtga ccgccatgaa gtgctttctg     180
ctggaactgc aagtgatctc cctggaatcc ggcgacgcct ccatccacga caccgtggaa     240
aatctgatca tcctggccaa caactccctg tcctccaacg gcaacgtgac cgagagcggc     300
tgcaaagagt gcgaggaact ggaagagaag aacatcaaag agtttctgca gtccttcgtg     360
cacatcgtgc agatgttcat caacaccagc tag                                  393

<210> SEQ ID NO 12
<211> LENGTH: 942
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 12
atgggctggt cctgcatcat cctgtttctg gtggctaccg ccaccggcat cacctgtcct      60
ccacccatgt ctgtggaaca cgccgacatc tgggtcaagt cctactccct gtactccaga     120
gagcggtaca tctgcaactc cggcttcaag cggaaggccg gcacctctag cctgaccgag     180
tgcgtgctga caaggccac caacgtggcc cactggacca ccccatccct gaagtgcatc     240
agagagccca gtcctgcga caagacccac acctgtcccc cttgtcctgc ccctgaactg     300
ctgggcggac cttccgtgtt cctgttcccc ccaaagccca ggacaccct gatgatctcc     360 cggacccccg aagtgacctg cgtggtggtg gatgtgtccc acgaggaccc agaagtgaag     420
ttcaattggt acgtggacgg cgtggaagtg cacaacgcca agaccaagcc cagagaggaa     480
cagtacaact ccacctaccg ggtggtgtcc gtgctgaccg tgctgcacca ggattggctg     540
aacggcaaag agtacaagtg caaggtgtcc aacaaggccc tgcctgcccc catcgaaaag     600
accatctcca aggccaaggg ccagccccgg aacccccagg tgtacacact gccccctagc     660
agggacgagc tgaccaagaa ccaggtgtcc ctgacctgtc tcgtgaaggg cttctacccc     720
tccgatatcg ccgtggaatg ggagtccaac ggccagcctg agaacaacta caagaccacc     780 cccctgtgc tggactccga cggctcattc ttcctgtaca gcaagctgac agtggacaag     840
tcccggtggc agcagggcaa cgtgttctcc tgctccgtga tgcacgaggc cctgcacaac     900
cactacacac agaagtccct gtccctgagc ccggcaaat ga                         942
```

<210> SEQ ID NO 13
<211> LENGTH: 130
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 13

Met Gly Trp Ser Cys Ile Ile Leu Phe Leu Val Ala Thr Ala Thr Gly
1               5                   10                  15

Asn Trp Val Asn Val Ile Ser Asp Leu Lys Lys Ile Glu Asp Leu Ile
            20                  25                  30

Gln Ser Met His Ile Asp Ala Thr Leu Tyr Thr Glu Ser Asp Val His
        35                  40                  45

Pro Ser Cys Lys Val Thr Ala Met Lys Cys Phe Leu Leu Glu Leu Gln
    50                  55                  60

Val Ile Ser Leu Glu Ser Gly Asp Ala Ser Ile His Asp Thr Val Glu
65                  70                  75                  80

Asn Leu Ile Ile Leu Ala Asn Asp Ser Leu Ser Ser Asn Gly Asn Val
                85                  90                  95

Thr Glu Ser Gly Cys Lys Glu Cys Glu Glu Leu Glu Glu Lys Asn Ile
            100                 105                 110

Lys Glu Phe Leu Gln Ser Phe Val His Ile Val Gln Met Phe Ile Asn
        115                 120                 125

Thr Ser
    130

<210> SEQ ID NO 14
<211> LENGTH: 313
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 14

Met Gly Trp Ser Cys Ile Ile Leu Phe Leu Val Ala Thr Ala Thr Gly
1               5                   10                  15

Ile Thr Cys Pro Pro Pro Met Ser Val Glu His Ala Asp Ile Trp Val
            20                  25                  30

Lys Ser Tyr Ser Leu Tyr Ser Arg Glu Arg Tyr Ile Cys Asn Ser Gly
        35                  40                  45

Phe Lys Arg Lys Ala Gly Thr Ser Ser Leu Thr Glu Cys Val Leu Asn
    50                  55                  60

Lys Ala Thr Asn Val Ala His Trp Thr Thr Pro Ser Leu Lys Cys Ile
65                  70                  75                  80

Arg Glu Pro Lys Ser Cys Asp Lys Thr His Thr Cys Pro Pro Cys Pro
                85                  90                  95

Ala Pro Glu Leu Leu Gly Gly Pro Ser Val Phe Leu Phe Pro Pro Lys
            100                 105                 110

Pro Lys Asp Thr Leu Met Ile Ser Arg Thr Pro Glu Val Thr Cys Val
        115                 120                 125

Val Val Asp Val Ser His Glu Asp Pro Glu Val Lys Phe Asn Trp Tyr
    130                 135                 140

Val Asp Gly Val Glu Val His Asn Ala Lys Thr Lys Pro Arg Glu Glu
145                 150                 155                 160

Gln Tyr Asn Ser Thr Tyr Arg Val Val Ser Val Leu Thr Val Leu His
165                 170                 175

Gln Asp Trp Leu Asn Gly Lys Glu Tyr Lys Cys Lys Val Ser Asn Lys
        180                 185                 190

Ala Leu Pro Ala Pro Ile Glu Lys Thr Ile Ser Lys Ala Lys Gly Gln
            195                 200                 205

Pro Arg Glu Pro Gln Val Tyr Thr Leu Pro Pro Ser Arg Asp Glu Leu
    210                 215                 220

Thr Lys Asn Gln Val Ser Leu Thr Cys Leu Val Lys Gly Phe Tyr Pro
225                 230                 235                 240

Ser Asp Ile Ala Val Glu Trp Glu Ser Asn Gly Gln Pro Glu Asn Asn
                245                 250                 255

Tyr Lys Thr Thr Pro Pro Val Leu Asp Ser Asp Gly Ser Phe Phe Leu
            260                 265                 270

Tyr Ser Lys Leu Thr Val Asp Lys Ser Arg Trp Gln Gln Gly Asn Val
        275                 280                 285

Phe Ser Cys Ser Val Met His Glu Ala Leu His Asn His Tyr Thr Gln
    290                 295                 300

Lys Ser Leu Ser Leu Ser Pro Gly Lys
305                 310

<210> SEQ ID NO 15
<211> LENGTH: 393
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 15
atgggctggt cctgcatcat cctgtttctg gtggctaccg ccaccggcaa ctgggtcaac    60
gtgatctccg acctgaagaa gatcgaggac ctgatccagt ccatgcacat cgacgccacc   120
ctgtacaccg agtccgacgt gcacccctcc tgcaaagtga ccgccatgaa gtgctttctg   180
ctggaactgc aagtgatctc cctggaatcc ggcgacgcct ccatccacga caccgtggaa   240
aatctgatca tcctggccaa cgactccctg tcctccaacg gcaacgtgac cgagagcggc   300
tgcaaagagt gcgaggaact ggaagagaag aacatcaaag agtttctgca gtccttcgtg   360
cacatcgtgc agatgttcat caacaccagc tag                                393

<210> SEQ ID NO 16
<211> LENGTH: 942
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 16
atgggctggt cctgcatcat cctgtttctg gtggctaccg ccaccggcat cacctgtcct    60
ccacccatgt ctgtggaaca cgccgacatc tgggtcaagt cctactccct gtactccaga   120
gagcggtaca tctgcaactc cggcttcaag cggaaggccg gcacctctag cctgaccgag   180
tgcgtgctga acaaggccac caacgtggcc cactggacca cccatccct gaagtgcatc   240 agagagccca gtcctgcga caagaccac acctgtcccc ttgtcctgc cctgaactg   300 ctgggcggac cttccgtgtt cctgttcccc ccaaagccca aggacaccct gatgatctcc   360
cggacccccg aagtgacctg cgtggtggtg gatgtgtccc acgaggaccc agaagtgaag   420

```
ttcaattggt acgtggacgg cgtggaagtg cacaacgcca agaccaagcc cagagaggaa    480
cagtacaact ccacctaccg ggtggtgtcc gtgctgaccg tgctgcacca ggattggctg    540
aacggcaaag agtacaagtg caaggtgtcc aacaaggccc tgcctgcccc catcgaaaag    600
accatctcca aggccaaggg ccagcccggg aacccaggg tgtacacact gcccctagc     660 agggacgagc tgaccaagaa ccaggtgtcc ctgacctgtc tcgtgaaggg cttctacccc    720
tccgatatcg ccgtggaatg ggagtccaac ggccagcctg agaacaacta caagaccacc    780 cccctgtgc tggactccga cggctcattc ttcctgtaca gcaagctgac agtggacaag     840
tcccggtggc agcagggcaa cgtgttctcc tgctccgtga tgcacgaggc cctgcacaac    900
cactacacac agaagtccct gtccctgagc cccggcaaat ga                       942
```

<210> SEQ ID NO 17
<211> LENGTH: 130
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 17

Met Gly Trp Ser Cys Ile Ile Leu Phe Leu Val Ala Thr Ala Thr Gly
1               5                   10                  15

Asn Trp Val Asn Val Ile Ser Asp Leu Lys Lys Ile Glu Asp Leu Ile
            20                  25                  30

Gln Ser Met His Ile Asp Ala Thr Leu Tyr Thr Glu Ser Asp Val His
        35                  40                  45

Pro Ser Cys Lys Val Thr Ala Met Lys Cys Phe Leu Leu Glu Leu Gln
    50                  55                  60

Val Ile Ser Leu Glu Ser Gly Asp Ala Ser Ile His Asp Thr Val Glu
65                  70                  75                  80

Asn Leu Ile Ile Leu Ala Asn Asp Ser Leu Ser Ser Asn Gly Asn Val
                85                  90                  95

Thr Glu Ser Gly Cys Lys Glu Cys Glu Glu Leu Glu Glu Lys Asn Ile
            100                 105                 110

Lys Glu Phe Leu Gln Ser Phe Val His Ile Val Gln Met Phe Ile Asn
        115                 120                 125

Thr Ser
    130

<210> SEQ ID NO 18
<211> LENGTH: 424
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 18

Met Gly Trp Ser Cys Ile Ile Leu Phe Leu Val Ala Thr Ala Thr Gly
1               5                   10                  15

Ile Thr Cys Pro Pro Pro Met Ser Val Glu His Ala Asp Ile Trp Val
            20                  25                  30

Lys Ser Tyr Ser Leu Tyr Ser Arg Glu Arg Tyr Ile Cys Asn Ser Gly
        35                  40                  45

Phe Lys Arg Lys Ala Gly Thr Ser Ser Leu Thr Glu Cys Val Leu Asn
    50                  55                  60

Lys Ala Thr Asn Val Ala His Trp Thr Thr Pro Ser Leu Lys Cys Ile
65                  70                  75                  80

Arg Asp Pro Ala Leu Val His Gln Arg Pro Ala Pro Ser Thr Val
                85                  90                  95

Thr Thr Ala Gly Val Thr Pro Gln Pro Glu Ser Leu Ser Pro Ser Gly
            100                 105                 110

Lys Glu Pro Ala Ala Ser Ser Pro Ser Ser Asn Asn Thr Ala Ala Thr
                115                 120                 125

Thr Ala Ala Ile Val Pro Gly Ser Gln Leu Met Pro Ser Lys Ser Pro
130                 135                 140

Ser Thr Gly Thr Thr Glu Ile Ser Ser His Glu Ser Ser His Gly Thr
145                 150                 155                 160

Pro Ser Gln Thr Thr Ala Lys Asn Trp Glu Leu Thr Ala Ser Ala Ser
                165                 170                 175

His Gln Pro Pro Gly Val Tyr Pro Gln Gly His Ser Asp Thr Thr Ala
            180                 185                 190

Ser Thr Lys Gly Pro Asp Lys Thr His Thr Cys Pro Pro Cys Pro Ala
                195                 200                 205

Pro Glu Leu Leu Gly Gly Pro Asp Val Phe Leu Phe Pro Pro Lys Pro
210                 215                 220

Lys Asp Thr Leu Met Ile Ser Arg Thr Pro Glu Val Thr Cys Val Val
225                 230                 235                 240

Val Asp Val Ser His Glu Asp Pro Glu Val Lys Phe Asn Trp Tyr Val
                245                 250                 255

Asp Gly Val Glu Val His Asn Ala Lys Thr Lys Pro Arg Glu Glu Gln
            260                 265                 270

Tyr Asn Ser Thr Tyr Arg Val Val Ser Val Leu Thr Val Leu His Gln
            275                 280                 285

Asp Trp Leu Asn Gly Lys Glu Tyr Lys Cys Lys Val Ser Asn Lys Ala
290                 295                 300

Leu Pro Leu Pro Glu Glu Lys Thr Ile Ser Lys Ala Lys Gly Gln Pro
305                 310                 315                 320

Arg Glu Pro Gln Val Tyr Thr Leu Pro Pro Ser Arg Asp Glu Leu Thr
                325                 330                 335

Lys Asn Gln Val Ser Leu Thr Cys Leu Val Lys Gly Phe Tyr Pro Ser
            340                 345                 350

Asp Ile Ala Val Glu Trp Glu Ser Asn Gly Gln Pro Glu Asn Asn Tyr
            355                 360                 365

Lys Thr Thr Pro Pro Val Leu Asp Ser Asp Gly Ser Phe Phe Leu Tyr
            370                 375                 380

Ser Lys Leu Thr Val Asp Lys Ser Arg Trp Gln Gln Gly Asn Val Phe
385                 390                 395                 400

Ser Cys Ser Val Met His Glu Ala Leu His Asn His Tyr Thr Gln Lys
                405                 410                 415

Ser Leu Ser Leu Ser Pro Gly Lys
            420

<210> SEQ ID NO 19
<211> LENGTH: 393
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 19

```
atgggctggt cctgcatcat cctgtttctg gtggccaccg ccaccggcaa ctgggtcaac    60
gtgatctccg acctgaagaa gatcgaggac ctgatccagt ccatgcacat cgacgccacc   120
ctgtacaccg agtccgacgt gcacccctcc tgcaaagtga ccgccatgaa gtgctttctg   180
ctggaactgc aagtgatctc cctggaatcc ggcgacgcct ccatccacga caccgtggaa   240
aatctgatca tcctggccaa cgactccctg tcctccaacg gcaacgtgac cgagagcggc   300
tgcaaagagt gcgaggaact ggaagagaag aacatcaaag agtttctgca gtccttcgtg   360
cacatcgtgc agatgttcat caacaccagc tag                                393
```

<210> SEQ ID NO 20
<211> LENGTH: 1298
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 20

```
atgggctggt cctgcatcat cctgtttctg gtggctaccg ccaccggcat cacctgtcct    60
ccacccatgt ctgtggaaca cgccgacatc tgggtcaagt cctactccct gtactccaga   120
gagcggtaca tctgcaactc cggcttcaag cggaaggccg gcacctctag cctgaccgag   180
tgcgtgctga acaaggccac caacgtggcc cactggacca ccccatccct gaagtgcatc   240
agggaccctg ccctggtgca tcagaggcct gctcctccat ccaccgtgac cacagctggc   300
gtgacccctc agcctgagtc cctgagccct tccggcaaag agccagccgc ctcctccccct  360
tcctctaaca ataccgccgc taccaccgcc gccatcgtgc ctggatctca gctgatgccc   420
tccaagtccc cttccaccgg aaccaccgag atctccagcc acgagtcctc tcacggcacc   480
ccttctcaga ccaccgccaa gaactgggag ctgaccgcct ctgcctctca ccagcctcca   540
ggcgtgtacc ctcagggcca ctctgacacc accgcctcta caaagggccc agacaaaact   600
cacacatgcc caccgtgccc agcacctgaa ctcctggggg gaccggacgt cttcctcttc   660
cccccaaaac ccaaggacac cctcatgatc tcccggaccc ctgaggtcac atgcgtggtg   720
gtggacgtga gccacgaaga ccctgaggtc aagttcaact ggtacgtgga cggcgtggag   780
gtgcataatg ccaagacaaa gccgcgggag gagcagtaca acagcacgta ccgtgtggtc   840
agcgtcctca ccgtcctgca ccaggactgg ctgaatggca aggagtacaa gtgcaaggtc   900
tccaacaaag ccctcccact ccccgaggag aaaaccatct ccaaagccaa agggcagccc   960
cgagaaccac aggtgtacac cctgccccca tcccgggatg agctgaccaa gaaccaggtc  1020
agcctgacct gcctggtcaa aggcttctat cccagcgaca tcgccgtgga gtgggagagc  1080
aatgggcagc cggagaacaa ctacaagacc acgcctcccg tgctggactc cgacggctcc  1140
ttcttcctct acagcaagct caccgtggac aagagcaggt ggcagcaggg gaacgtcttc  1200
tcatgctccg tgatgcatga ggctctgcac aaccactaca cgcagaagag cctctccctg  1260
tctccgggta aatgagtgcg acggccggca agggatcc                          1298
```

<210> SEQ ID NO 21
<211> LENGTH: 9
<212> TYPE: PRT
<213> ORGANISM: Human cytomegalovirus

<400> SEQUENCE: 21

Asn Leu Val Pro Met Val Ala Thr Val
1               5

<210> SEQ ID NO 22
<211> LENGTH: 9
<212> TYPE: PRT
<213> ORGANISM: Human cytomegalovirus

<400> SEQUENCE: 22

Gln Tyr Asp Pro Val Ala Ala Leu Phe
1               5

<210> SEQ ID NO 23
<211> LENGTH: 10
<212> TYPE: PRT
<213> ORGANISM: Human cytomegalovirus

<400> SEQUENCE: 23

Thr Pro Arg Val Thr Gly Gly Gly Ala Met
1               5                   10

<210> SEQ ID NO 24
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 24

Ala Ser Thr Lys Gly Pro
1               5

<210> SEQ ID NO 25
<211> LENGTH: 114
<212> TYPE: PRT
<213> ORGANISM: Homo sapiens

<400> SEQUENCE: 25

Asn Trp Val Asn Val Ile Ser Asp Leu Lys Lys Ile Glu Asp Leu Ile
1               5                   10                  15

Gln Ser Met His Ile Asp Ala Thr Leu Tyr Thr Glu Ser Asp Val His
                20                  25                  30

Pro Ser Cys Lys Val Thr Ala Met Lys Cys Phe Leu Leu Glu Leu Gln
            35                  40                  45

Val Ile Ser Leu Glu Ser Gly Asp Ala Ser Ile His Asp Thr Val Glu
        50                  55                  60

Asn Leu Ile Ile Leu Ala Asn Asn Ser Leu Ser Ser Asn Gly Asn Val
65                  70                  75                  80

Thr Glu Ser Gly Cys Lys Glu Cys Glu Glu Leu Glu Glu Lys Asn Ile
                85                  90                  95

Lys Glu Phe Leu Gln Ser Phe Val His Ile Val Gln Met Phe Ile Asn
            100                 105                 110

Thr Ser

<210> SEQ ID NO 26
<211> LENGTH: 114
<212> TYPE: PRT
<213> ORGANISM: Artificial Sequence
<220> FEATURE:
<223> OTHER INFORMATION: Description of Artificial Sequence: Synthetic
      polypeptide -continued

<400> SEQUENCE: 26

Asn Trp Val Asn Val Ile Ser Asp Leu Lys Lys Ile Glu Asp Leu Ile
1               5                   10                  15

Gln Ser Met His Ile Asp Ala Thr Leu Tyr Thr Glu Ser Asp Val His
            20                  25                  30

Pro Ser Cys Lys Val Thr Ala Met Lys Cys Phe Leu Leu Glu Leu Gln
        35                  40                  45

Val Ile Ser Leu Glu Ser Gly Asp Ala Ser Ile His Asp Thr Val Glu
    50                  55                  60

Asn Leu Ile Ile Leu Ala Asn Asp Ser Leu Ser Ser Asn Gly Asn Val
65                  70                  75                  80

Thr Glu Ser Gly Cys Lys Glu Cys Glu Glu Leu Glu Glu Lys Asn Ile
                85                  90                  95

Lys Glu Phe Leu Gln Ser Phe Val His Ile Val Gln Met Phe Ile Asn
            100                 105                 110

Thr Ser

<210> SEQ ID NO 27
<211> LENGTH: 175
<212> TYPE: PRT
<213> ORGANISM: Homo sapiens

<400> SEQUENCE: 27

Ile Thr Cys Pro Pro Pro Met Ser Val Glu His Ala Asp Ile Trp Val
1               5                   10                  15

Lys Ser Tyr Ser Leu Tyr Ser Arg Glu Arg Tyr Ile Cys Asn Ser Gly
            20                  25                  30

Phe Lys Arg Lys Ala Gly Thr Ser Ser Leu Thr Glu Cys Val Leu Asn
        35                  40                  45

Lys Ala Thr Asn Val Ala His Trp Thr Thr Pro Ser Leu Lys Cys Ile
    50                  55                  60

Arg Asp Pro Ala Leu Val His Gln Arg Pro Ala Pro Pro Ser Thr Val
65                  70                  75                  80

Thr Thr Ala Gly Val Thr Pro Gln Pro Glu Ser Leu Ser Pro Ser Gly
                85                  90                  95

Lys Glu Pro Ala Ala Ser Ser Pro Ser Ser Asn Asn Thr Ala Ala Thr
            100                 105                 110

Thr Ala Ala Ile Val Pro Gly Ser Gln Leu Met Pro Ser Lys Ser Pro
        115                 120                 125

Ser Thr Gly Thr Thr Glu Ile Ser Ser His Glu Ser Ser His Gly Thr
    130                 135                 140

Pro Ser Gln Thr Thr Ala Lys Asn Trp Glu Leu Thr Ala Ser Ala Ser
145                 150                 155                 160

His Gln Pro Pro Gly Val Tyr Pro Gln Gly His Ser Asp Thr Thr
                165                 170                 175

<210> SEQ ID NO 28
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 28

Met Gly Trp Ser Cys Ile Ile Leu Phe Leu Val Ala Thr Ala Thr Gly
1               5                   10                  15

<210> SEQ ID NO 29
<211> LENGTH: 227
<212> TYPE: PRT
<213> ORGANISM: Homo sapiens

<400> SEQUENCE: 29

```
Asp Lys Thr His Thr Cys Pro Pro Cys Pro Ala Pro Glu Leu Leu Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Ser Arg Asp Glu Leu Thr Lys Asn Gln Val Ser
    130                 135                 140

Leu Thr Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Lys
225
```

<210> SEQ ID NO 30
<211> LENGTH: 228
<212> TYPE: PRT
<213> ORGANISM: Homo sapiens

<400> SEQUENCE: 30

```
Glu Arg Lys Cys Cys Val Glu Cys Pro Pro Cys Pro Ala Pro Pro Val
1               5                   10                  15

Ala Gly Pro Ser Val Phe Leu Phe Pro Pro Lys Pro Lys Asp Thr Leu
            20                  25                  30

Met Ile Ser Arg Thr Pro Glu Val Thr Cys Val Val Val Asp Val Ser
        35                  40                  45

His Glu Asp Pro Glu Val Gln Phe Asn Trp Tyr Val Asp Gly Val Glu
    50                  55                  60

Val His Asn Ala Lys Thr Lys Pro Arg Glu Glu Gln Phe Asn Ser Thr
65                  70                  75                  80

Phe Arg Val Val Ser Val Leu Thr Val Val His Gln Asp Trp Leu Asn
                85                  90                  95
```

```
Gly Lys Glu Tyr Lys Cys Lys Val Ser Asn Lys Gly Leu Pro Ala Pro
                100                 105                 110

Ile Glu Lys Thr Ile Ser Lys Thr Lys Gly Gln Pro Arg Glu Pro Gln
            115                 120                 125

Val Tyr Thr Leu Pro Pro Ser Arg Glu Glu Met Thr Lys Asn Gln Val
    130                 135                 140

Ser Leu Thr Cys Leu Val Lys Gly Phe Tyr Pro Ser Asp Ile Ser Val
145                 150                 155                 160

Glu Trp Glu Ser Asn Gly Gln Pro Glu Asn Asn Tyr Lys Thr Thr Pro
                165                 170                 175

Pro Met Leu Asp Ser Asp Gly Ser Phe Phe Leu Tyr Ser Lys Leu Thr
            180                 185                 190

Val Asp Lys Ser Arg Trp Gln Gln Gly Asn Val Phe Ser Cys Ser Val
    195                 200                 205

Met His Glu Ala Leu His Asn His Tyr Thr Gln Lys Ser Leu Ser Leu
            210                 215                 220

Ser Pro Gly Lys
225

<210> SEQ ID NO 31
<211> LENGTH: 279
<212> TYPE: PRT
<213> ORGANISM: Homo sapiens

<400> SEQUENCE: 31

Glu Leu Lys Thr Pro Leu Gly Asp Thr Thr His Thr Cys Pro Arg Cys
1               5                   10                  15

Pro Glu Pro Lys Ser Cys Asp Thr Pro Pro Cys Pro Arg Cys Pro
            20                  25                  30

Glu Pro Lys Ser Cys Asp Thr Pro Pro Cys Pro Arg Cys Pro Glu
                35                  40                  45

Pro Lys Ser Cys Asp Thr Pro Pro Cys Pro Arg Cys Pro Ala Pro
        50                  55                  60

Glu Leu Leu Gly Gly Pro Ser Val Phe Leu Phe Pro Pro Lys Pro Lys
65                  70                  75                  80

Asp Thr Leu Met Ile Ser Arg Thr Pro Glu Val Thr Cys Val Val Val
                85                  90                  95

Asp Val Ser His Glu Asp Pro Glu Val Gln Phe Lys Trp Tyr Val Asp
            100                 105                 110

Gly Val Glu Val His Asn Ala Lys Thr Lys Pro Arg Glu Glu Gln Tyr
        115                 120                 125

Asn Ser Thr Phe Arg Val Val Ser Val Leu Thr Val Leu His Gln Asp
    130                 135                 140

Trp Leu Asn Gly Lys Glu Tyr Lys Cys Lys Val Ser Asn Lys Ala Leu
145                 150                 155                 160

Pro Ala Pro Ile Glu Lys Thr Ile Ser Lys Thr Lys Gly Gln Pro Arg
                165                 170                 175

Glu Pro Gln Val Tyr Thr Leu Pro Pro Ser Arg Glu Glu Met Thr Lys
            180                 185                 190

Asn Gln Val Ser Leu Thr Cys Leu Val Lys Gly Phe Tyr Pro Ser Asp
        195                 200                 205

Ile Ala Val Glu Trp Glu Ser Ser Gly Gln Pro Glu Asn Asn Tyr Asn
    210                 215                 220

Thr Thr Pro Pro Met Leu Asp Ser Asp Gly Ser Phe Phe Leu Tyr Ser
```

```
                    225                 230                 235                 240
Lys Leu Thr Val Asp Lys Ser Arg Trp Gln Gln Gly Asn Ile Phe Ser
                        245                 250                 255
Cys Ser Val Met His Glu Ala Leu His Asn Arg Phe Thr Gln Lys Ser
                260                 265                 270
Leu Ser Leu Ser Pro Gly Lys
                275
```

<210> SEQ ID NO 32
<211> LENGTH: 229
<212> TYPE: PRT
<213> ORGANISM: Homo sapiens

<400> SEQUENCE: 32

```
Glu Ser Lys Tyr Gly Pro Pro Cys Pro Ser Cys Pro Ala Pro Glu Phe
1               5                   10                  15
Leu Gly Gly Pro Ser Val Phe Leu Phe Pro Pro Lys Pro Lys Asp Thr
                20                  25                  30
Leu Met Ile Ser Arg Thr Pro Glu Val Thr Cys Val Val Val Asp Val
                35                  40                  45
Ser Gln Glu Asp Pro Glu Val Gln Phe Asn Trp Tyr Val Asp Gly Val
            50                  55                  60
Glu Val His Asn Ala Lys Thr Lys Pro Arg Glu Glu Gln Phe Asn Ser
65                  70                  75                  80
Thr Tyr Arg Val Val Ser Val Leu Thr Val Leu His Gln Asp Trp Leu
                85                  90                  95
Asn Gly Lys Glu Tyr Lys Cys Lys Val Ser Asn Lys Gly Leu Pro Ser
                100                 105                 110
Ser Ile Glu Lys Thr Ile Ser Lys Ala Lys Gly Gln Pro Arg Glu Pro
                115                 120                 125
Gln Val Tyr Thr Leu Pro Pro Ser Gln Glu Glu Met Thr Lys Asn Gln
            130                 135                 140
Val Ser Leu Thr Cys Leu Val Lys Gly Phe Tyr Pro Ser Asp Ile Ala
145                 150                 155                 160
Val Glu Trp Glu Ser Asn Gly Gln Pro Glu Asn Asn Tyr Lys Thr Thr
                165                 170                 175
Pro Pro Val Leu Asp Ser Asp Gly Ser Phe Phe Leu Tyr Ser Arg Leu
                180                 185                 190
Thr Val Asp Lys Ser Arg Trp Gln Glu Gly Asn Val Phe Ser Cys Ser
                195                 200                 205
Val Met His Glu Ala Leu His Asn His Tyr Thr Gln Lys Ser Leu Ser
            210                 215                 220
Leu Ser Leu Gly Lys
225
```

<210> SEQ ID NO 33
<211> LENGTH: 425
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

```
Met Gly Trp Ser Cys Ile Ile Leu Phe Leu Val Ala Thr Ala Thr Gly
1               5                   10                  15

Ile Thr Cys Pro Pro Pro Met Ser Val Glu His Ala Asp Ile Trp Val
```

```
            20                  25                  30
Lys Ser Tyr Ser Leu Tyr Ser Arg Glu Arg Tyr Ile Cys Asn Ser Gly
            35                  40                  45
Phe Lys Arg Lys Ala Gly Thr Ser Ser Leu Thr Glu Cys Val Leu Asn
            50                  55                  60
Lys Ala Thr Asn Val Ala His Trp Thr Thr Pro Ser Leu Lys Cys Ile
 65                  70                  75                  80
Arg Asp Pro Ala Leu Val His Gln Arg Pro Ala Pro Pro Ser Thr Val
                    85                  90                  95
Thr Thr Ala Gly Val Thr Pro Gln Pro Glu Ser Leu Ser Pro Ser Gly
                   100                 105                 110
Lys Glu Pro Ala Ala Ser Ser Pro Ser Ser Asn Asn Thr Ala Ala Thr
                   115                 120                 125
Thr Ala Ala Ile Val Pro Gly Ser Gln Leu Met Pro Ser Lys Ser Pro
                   130                 135                 140
Ser Thr Gly Thr Thr Glu Ile Ser Ser His Glu Ser Ser His Gly Thr
145                 150                 155                 160
Pro Ser Gln Thr Thr Ala Lys Asn Trp Glu Leu Thr Ala Ser Ala Ser
                   165                 170                 175
His Gln Pro Pro Gly Val Tyr Pro Gln Gly His Ser Asp Thr Thr Ala
                   180                 185                 190
Ser Thr Lys Gly Pro Glu Arg Lys Cys Cys Val Glu Cys Pro Pro Cys
                   195                 200                 205
Pro Ala Pro Pro Val Ala Gly Pro Ser Val Phe Leu Phe Pro Pro Lys
                   210                 215                 220
Pro Lys Asp Thr Leu Met Ile Ser Arg Thr Pro Glu Val Thr Cys Val
225                 230                 235                 240
Val Val Asp Val Ser His Glu Asp Pro Glu Val Gln Phe Asn Trp Tyr
                   245                 250                 255
Val Asp Gly Val Glu Val His Asn Ala Lys Thr Lys Pro Arg Glu Glu
                   260                 265                 270
Gln Phe Asn Ser Thr Phe Arg Val Val Ser Val Leu Thr Val Val His
                   275                 280                 285
Gln Asp Trp Leu Asn Gly Lys Glu Tyr Lys Cys Lys Val Ser Asn Lys
                   290                 295                 300
Gly Leu Pro Ala Pro Ile Glu Lys Thr Ile Ser Lys Thr Lys Gly Gln
305                 310                 315                 320
Pro Arg Glu Pro Gln Val Tyr Thr Leu Pro Pro Ser Arg Glu Glu Met
                   325                 330                 335
Thr Lys Asn Gln Val Ser Leu Thr Cys Leu Val Lys Gly Phe Tyr Pro
                   340                 345                 350
Ser Asp Ile Ser Val Glu Trp Glu Ser Asn Gly Gln Pro Glu Asn Asn
                   355                 360                 365
Tyr Lys Thr Thr Pro Pro Met Leu Asp Ser Asp Gly Ser Phe Phe Leu
                   370                 375                 380
Tyr Ser Lys Leu Thr Val Asp Lys Ser Arg Trp Gln Gln Gly Asn Val
385                 390                 395                 400
Phe Ser Cys Ser Val Met His Glu Ala Leu His Asn His Tyr Thr Gln
                   405                 410                 415
Lys Ser Leu Ser Leu Ser Pro Gly Lys
                   420                 425

<210> SEQ ID NO 34
```

```
<211> LENGTH: 476
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 34

Met Gly Trp Ser Cys Ile Ile Leu Phe Leu Val Ala Thr Ala Thr Gly
1               5                   10                  15

Ile Thr Cys Pro Pro Met Ser Val Glu His Ala Asp Ile Trp Val
                20                  25                  30

Lys Ser Tyr Ser Leu Tyr Ser Arg Glu Arg Tyr Ile Cys Asn Ser Gly
            35                  40                  45

Phe Lys Arg Lys Ala Gly Thr Ser Ser Leu Thr Glu Cys Val Leu Asn
50                  55                  60

Lys Ala Thr Asn Val Ala His Trp Thr Thr Pro Ser Leu Lys Cys Ile
65                  70                  75                  80

Arg Asp Pro Ala Leu Val His Gln Arg Pro Ala Pro Pro Ser Thr Val
                85                  90                  95

Thr Thr Ala Gly Val Thr Pro Gln Pro Glu Ser Leu Ser Pro Ser Gly
            100                 105                 110

Lys Glu Pro Ala Ala Ser Ser Pro Ser Ser Asn Asn Thr Ala Ala Thr
        115                 120                 125

Thr Ala Ala Ile Val Pro Gly Ser Gln Leu Met Pro Ser Lys Ser Pro
130                 135                 140

Ser Thr Gly Thr Thr Glu Ile Ser Ser His Glu Ser Ser His Gly Thr
145                 150                 155                 160

Pro Ser Gln Thr Thr Ala Lys Asn Trp Glu Leu Thr Ala Ser Ala Ser
                165                 170                 175

His Gln Pro Pro Gly Val Tyr Pro Gln Gly His Ser Asp Thr Thr Ala
            180                 185                 190

Ser Thr Lys Gly Pro Glu Leu Lys Thr Pro Leu Gly Asp Thr Thr His
        195                 200                 205

Thr Cys Pro Arg Cys Pro Glu Pro Lys Ser Cys Asp Thr Pro Pro Pro
210                 215                 220

Cys Pro Arg Cys Pro Glu Pro Lys Ser Cys Asp Thr Pro Pro Pro Cys
225                 230                 235                 240

Pro Arg Cys Pro Glu Pro Lys Ser Cys Asp Thr Pro Pro Pro Cys Pro
                245                 250                 255

Arg Cys Pro Ala Pro Glu Leu Leu Gly Gly Pro Ser Val Phe Leu Phe
            260                 265                 270

Pro Pro Lys Pro Lys Asp Thr Leu Met Ile Ser Arg Thr Pro Glu Val
        275                 280                 285

Thr Cys Val Val Val Asp Val Ser His Glu Asp Pro Glu Val Gln Phe
290                 295                 300

Lys Trp Tyr Val Asp Gly Val Glu Val His Asn Ala Lys Thr Lys Pro
305                 310                 315                 320

Arg Glu Glu Gln Tyr Asn Ser Thr Phe Arg Val Val Ser Val Leu Thr
                325                 330                 335

Val Leu His Gln Asp Trp Leu Asn Gly Lys Glu Tyr Lys Cys Lys Val
            340                 345                 350

Ser Asn Lys Ala Leu Pro Ala Pro Ile Glu Lys Thr Ile Ser Lys Thr
        355                 360                 365

Lys Gly Gln Pro Arg Glu Pro Gln Val Tyr Thr Leu Pro Pro Ser Arg
```

```
                    370                 375                 380
Glu Glu Met Thr Lys Asn Gln Val Ser Leu Thr Cys Leu Val Lys Gly
385                 390                 395                 400

Phe Tyr Pro Ser Asp Ile Ala Val Glu Trp Glu Ser Ser Gly Gln Pro
                405                 410                 415

Glu Asn Asn Tyr Asn Thr Thr Pro Pro Met Leu Asp Ser Asp Gly Ser
                420                 425                 430

Phe Phe Leu Tyr Ser Lys Leu Thr Val Asp Lys Ser Arg Trp Gln Gln
            435                 440                 445

Gly Asn Ile Phe Ser Cys Ser Val Met His Glu Ala Leu His Asn Arg
        450                 455                 460

Phe Thr Gln Lys Ser Leu Ser Leu Ser Pro Gly Lys
465                 470                 475

<210> SEQ ID NO 35
<211> LENGTH: 426
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 35

Met Gly Trp Ser Cys Ile Ile Leu Phe Leu Val Ala Thr Ala Thr Gly
1               5                   10                  15

Ile Thr Cys Pro Pro Pro Met Ser Val Glu His Ala Asp Ile Trp Val
            20                  25                  30

Lys Ser Tyr Ser Leu Tyr Ser Arg Glu Arg Tyr Ile Cys Asn Ser Gly
        35                  40                  45

Phe Lys Arg Lys Ala Gly Thr Ser Ser Leu Thr Glu Cys Val Leu Asn
    50                  55                  60

Lys Ala Thr Asn Val Ala His Trp Thr Thr Pro Ser Leu Lys Cys Ile
65                  70                  75                  80

Arg Asp Pro Ala Leu Val His Gln Arg Pro Ala Pro Pro Ser Thr Val
                85                  90                  95

Thr Thr Ala Gly Val Thr Pro Gln Pro Glu Ser Leu Ser Pro Ser Gly
            100                 105                 110

Lys Glu Pro Ala Ala Ser Ser Pro Ser Ser Asn Asn Thr Ala Ala Thr
        115                 120                 125

Thr Ala Ala Ile Val Pro Gly Ser Gln Leu Met Pro Ser Lys Ser Pro
    130                 135                 140

Ser Thr Gly Thr Thr Glu Ile Ser Ser His Glu Ser Ser His Gly Thr
145                 150                 155                 160

Pro Ser Gln Thr Thr Ala Lys Asn Trp Glu Leu Thr Ala Ser Ala Ser
                165                 170                 175

His Gln Pro Pro Gly Val Tyr Pro Gln Gly His Ser Asp Thr Thr Ala
            180                 185                 190

Ser Thr Lys Gly Pro Glu Ser Lys Tyr Gly Pro Pro Cys Pro Ser Cys
        195                 200                 205

Pro Ala Pro Glu Phe Leu Gly Gly Pro Ser Val Phe Leu Phe Pro Pro
    210                 215                 220

Lys Pro Lys Asp Thr Leu Met Ile Ser Arg Thr Pro Glu Val Thr Cys
225                 230                 235                 240

Val Val Val Asp Val Ser Gln Glu Asp Pro Glu Val Gln Phe Asn Trp
                245                 250                 255
```

```
Tyr Val Asp Gly Val Glu Val His Asn Ala Lys Thr Lys Pro Arg Glu
            260                 265                 270

Glu Gln Phe Asn Ser Thr Tyr Arg Val Ser Val Leu Thr Val Leu
        275                 280                 285

His Gln Asp Trp Leu Asn Gly Lys Glu Tyr Lys Cys Lys Val Ser Asn
    290                 295                 300

Lys Gly Leu Pro Ser Ser Ile Glu Lys Thr Ile Ser Lys Ala Lys Gly
305                 310                 315                 320

Gln Pro Arg Glu Pro Gln Val Tyr Thr Leu Pro Pro Ser Gln Glu Glu
                325                 330                 335

Met Thr Lys Asn Gln Val Ser Leu Thr Cys Leu Val Lys Gly Phe Tyr
            340                 345                 350

Pro Ser Asp Ile Ala Val Glu Trp Glu Ser Asn Gly Gln Pro Glu Asn
        355                 360                 365

Asn Tyr Lys Thr Thr Pro Pro Val Leu Asp Ser Asp Gly Ser Phe Phe
    370                 375                 380

Leu Tyr Ser Arg Leu Thr Val Asp Lys Ser Arg Trp Gln Glu Gly Asn
385                 390                 395                 400

Val Phe Ser Cys Ser Val Met His Glu Ala Leu His Asn His Tyr Thr
                405                 410                 415

Gln Lys Ser Leu Ser Leu Ser Leu Gly Lys
            420                 425

<210> SEQ ID NO 36
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 36

Ala Ser Thr Thr Ala Pro
1               5

<210> SEQ ID NO 37
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 37

Met Gly Trp Ser Cys Ile Ile Leu Phe Leu Val Ala Thr Ala Thr Gly
1               5                   10                  15

Val His Ser

<210> SEQ ID NO 38
<211> LENGTH: 114
<212> TYPE: PRT
<213> ORGANISM: Canis lupus

<400> SEQUENCE: 38

Asn Trp Gln Asp Val Ile Leu Asp Leu Glu Lys Ile Asp Asn Leu Ile
1               5                   10                  15

Gln Ser Ile His Met Asp Thr Thr Leu Tyr Thr Glu Ser Asp Val His
            20                  25                  30

Pro Ser Cys Lys Val Thr Ala Met Lys Cys Phe Leu Leu Glu Leu Gly
        35                  40                  45
```

```
Val Ile Ser Leu Glu Ser Gly Ser His Pro Ile Lys Glu Ala Val Glu
 50                  55                  60

Asn Leu Ile Ile Leu Ala Asn Ser Asp Leu Ser Ser Lys Gly Asn Ile
 65                  70                  75                  80

Thr Glu Thr Gly Cys Lys Glu Cys Glu Leu Glu Gly Lys Ser Ile
                 85                  90                  95

Lys Glu Phe Leu Gln Ser Phe Val His Ile Val Gln Met Phe Ile Asn
                100                 105                 110

Ser Ser
```

<210> SEQ ID NO 39
<211> LENGTH: 193
<212> TYPE: PRT
<213> ORGANISM: Canis lupus

<400> SEQUENCE: 39

```
Ile Thr Cys Pro Pro Pro Thr Ser Val Lys His Ala Asp Ile Gln Val
  1               5                  10                  15

Lys Ser Tyr Ser Val Ser Ser Lys Glu Arg Tyr Thr Cys Asn Ser Gly
                 20                  25                  30

Phe Lys Arg Lys Ala Gly Thr Ser Ser Leu Thr Glu Cys Val Leu Asn
                 35                  40                  45

Lys Thr Thr Asn Thr Ala His Trp Thr Ile Pro Ser Leu Lys Cys Ile
 50                  55                  60

Ile Met Lys His Ser Ser Phe His Pro Gln Ala His Lys Cys His Val
 65                  70                  75                  80

Val Ile Leu Ser Pro Gly Asp Pro Ser Leu Thr His Leu Arg Pro Ser
                 85                  90                  95

Ser Ser Asp Val Pro Ala Gly Val Thr Pro Glu Pro Glu Ser Thr Ser
                100                 105                 110

Leu Ser Gly Lys Glu Pro Thr Phe Thr Ser Lys Ser Asp Thr Lys Val
                115                 120                 125

Ala Thr Lys Pro Thr Ile Val Pro Gly Ser Arg Pro Met Pro Ser Lys
130                 135                 140

Pro Pro Ala Thr Gly Thr Thr Gly Leu Ile Ser Asn Glu Pro Ser Ser
145                 150                 155                 160

Gln Ala Pro Ser Gln Thr Thr Ala Lys Ala Leu Glu His Thr Pro Ser
                165                 170                 175

Ala Ser Gln Glu Thr Pro Gly Thr Tyr Ser Tyr Asn Ser Gly Ala Val
                180                 185                 190

Thr
```

<210> SEQ ID NO 40
<211> LENGTH: 237
<212> TYPE: PRT
<213> ORGANISM: Canis lupus

<400> SEQUENCE: 40

```
Pro Lys Arg Glu Asn Gly Arg Val Pro Arg Pro Pro Asp Cys Pro Lys
  1               5                  10                  15

Cys Pro Ala Pro Glu Met Leu Gly Gly Pro Ser Val Phe Ile Phe Pro
                 20                  25                  30

Pro Lys Pro Lys Asp Thr Leu Leu Ile Ala Arg Thr Pro Glu Val Thr
                 35                  40                  45

Cys Val Val Val Asp Leu Asp Pro Glu Asp Pro Glu Val Gln Ile Ser
```

```
            50                  55                  60
Trp Phe Val Asp Gly Lys Gln Met Gln Thr Ala Lys Thr Gln Pro Arg
 65                  70                  75                  80

Glu Glu Gln Phe Asn Gly Thr Tyr Arg Val Val Ser Val Leu Pro Ile
                 85                  90                  95

Gly His Gln Asp Trp Leu Lys Gly Lys Gln Phe Thr Cys Lys Val Asn
            100                 105                 110

Asn Lys Ala Leu Pro Ser Pro Ile Glu Arg Thr Ile Ser Lys Ala Arg
        115                 120                 125

Gly Gln Ala His Gln Pro Ser Val Tyr Val Leu Pro Pro Ser Arg Glu
    130                 135                 140

Glu Leu Ser Lys Asn Thr Val Ser Leu Thr Cys Leu Ile Lys Asp Phe
145                 150                 155                 160

Phe Pro Pro Asp Ile Asp Val Glu Trp Gln Ser Asn Gly Gln Gln Glu
                165                 170                 175

Pro Glu Ser Lys Tyr Arg Thr Thr Pro Pro Gln Leu Asp Glu Asp Gly
            180                 185                 190

Ser Tyr Phe Leu Tyr Ser Lys Leu Ser Val Asp Lys Ser Arg Trp Gln
        195                 200                 205

Arg Gly Asp Thr Phe Ile Cys Ala Val Met His Glu Ala Leu His Asn
    210                 215                 220

His Tyr Thr Gln Glu Ser Leu Ser His Ser Pro Gly Lys
225                 230                 235

<210> SEQ ID NO 41
<211> LENGTH: 233
<212> TYPE: PRT
<213> ORGANISM: Canis lupus

<400> SEQUENCE: 41

Phe Asn Glu Cys Arg Cys Thr Asp Thr Pro Pro Cys Pro Val Pro Glu
 1               5                  10                  15

Pro Leu Gly Gly Pro Ser Val Leu Ile Phe Pro Pro Lys Pro Lys Asp
                20                  25                  30

Ile Leu Arg Ile Thr Arg Thr Pro Glu Val Thr Cys Val Val Leu Asp
            35                  40                  45

Leu Gly Arg Glu Asp Pro Glu Val Gln Ile Ser Trp Phe Val Asp Gly
        50                  55                  60

Lys Glu Val His Thr Ala Lys Thr Gln Ser Arg Glu Gln Gln Phe Asn
 65                  70                  75                  80

Gly Thr Tyr Arg Val Val Ser Val Leu Pro Ile Glu His Gln Asp Trp
                 85                  90                  95

Leu Thr Gly Lys Glu Phe Lys Cys Arg Val Asn His Ile Asp Leu Pro
            100                 105                 110

Ser Pro Ile Glu Arg Thr Ile Ser Lys Ala Arg Gly Arg Ala His Lys
        115                 120                 125

Pro Ser Val Tyr Val Leu Pro Pro Ser Pro Lys Glu Leu Ser Ser Ser
    130                 135                 140

Asp Thr Val Ser Ile Thr Cys Leu Ile Lys Asp Phe Tyr Pro Pro Asp
145                 150                 155                 160

Ile Asp Val Glu Trp Gln Ser Asn Gly Gln Gln Pro Glu Arg Lys
                165                 170                 175

His Arg Met Thr Pro Pro Gln Leu Asp Glu Asp Gly Ser Tyr Phe Leu
            180                 185                 190
```

```
Tyr Ser Lys Leu Ser Val Asp Lys Ser Arg Trp Gln Gln Gly Asp Pro
            195                 200                 205

Phe Thr Cys Ala Val Met His Glu Thr Leu Gln Asn His Tyr Thr Asp
    210                 215                 220

Leu Ser Leu Ser His Ser Pro Gly Lys
225                 230
```

<210> SEQ ID NO 42
<211> LENGTH: 235
<212> TYPE: PRT
<213> ORGANISM: Canis lupus

<400> SEQUENCE: 42

```
Ala Lys Glu Cys Glu Cys Lys Cys Asn Cys Asn Asn Cys Pro Cys Pro
1               5                   10                  15

Gly Cys Gly Leu Leu Gly Gly Pro Ser Val Phe Ile Phe Pro Pro Lys
            20                  25                  30

Pro Lys Asp Ile Leu Val Thr Ala Arg Thr Pro Thr Val Thr Cys Val
        35                  40                  45

Val Val Asp Leu Asp Pro Glu Asn Pro Glu Val Gln Ile Ser Trp Phe
50                  55                  60

Val Asp Ser Lys Gln Val Gln Thr Ala Asn Thr Gln Pro Arg Glu Glu
65                  70                  75                  80

Gln Ser Asn Gly Thr Tyr Arg Val Val Ser Val Leu Pro Ile Gly His
                85                  90                  95

Gln Asp Trp Leu Ser Gly Lys Gln Phe Lys Cys Lys Val Asn Asn Lys
            100                 105                 110

Ala Leu Pro Ser Pro Ile Glu Glu Ile Ile Ser Lys Thr Pro Gly Gln
        115                 120                 125

Ala His Gln Pro Asn Val Tyr Val Leu Pro Pro Ser Arg Asp Glu Met
    130                 135                 140

Ser Lys Asn Thr Val Thr Leu Thr Cys Leu Val Lys Asp Phe Phe Pro
145                 150                 155                 160

Pro Glu Ile Asp Val Glu Trp Gln Ser Asn Gly Gln Gln Glu Pro Glu
                165                 170                 175

Ser Lys Tyr Arg Met Thr Pro Pro Gln Leu Asp Glu Asp Gly Ser Tyr
            180                 185                 190

Phe Leu Tyr Ser Lys Leu Ser Val Asp Lys Ser Arg Trp Gln Arg Gly
        195                 200                 205

Asp Thr Phe Ile Cys Ala Val Met His Glu Ala Leu His Asn His Tyr
    210                 215                 220

Thr Gln Ile Ser Leu Ser His Ser Pro Gly Lys
225                 230                 235
```

<210> SEQ ID NO 43
<211> LENGTH: 233
<212> TYPE: PRT
<213> ORGANISM: Canis lupus

<400> SEQUENCE: 43

```
Pro Lys Glu Ser Thr Cys Lys Cys Ile Ser Pro Cys Pro Val Pro Glu
1               5                   10                  15

Ser Leu Gly Gly Pro Ser Val Phe Ile Phe Pro Pro Lys Pro Lys Asp
            20                  25                  30

Ile Leu Arg Ile Thr Arg Thr Pro Glu Ile Thr Cys Val Val Leu Asp
        35                  40                  45
```

```
Leu Gly Arg Glu Asp Pro Glu Val Gln Ile Ser Trp Phe Val Asp Gly
 50                  55                  60

Lys Glu Val His Thr Ala Lys Thr Gln Pro Arg Glu Gln Gln Phe Asn
 65                  70                  75                  80

Ser Thr Tyr Arg Val Val Ser Val Leu Pro Ile Glu His Gln Asp Trp
                 85                  90                  95

Leu Thr Gly Lys Glu Phe Lys Cys Arg Val Asn His Ile Gly Leu Pro
            100                 105                 110

Ser Pro Ile Glu Arg Thr Ile Ser Lys Ala Arg Gly Gln Ala His Gln
        115                 120                 125

Pro Ser Val Tyr Val Leu Pro Pro Ser Pro Lys Glu Leu Ser Ser Ser
130                 135                 140

Asp Thr Val Thr Leu Thr Cys Leu Ile Lys Asp Phe Phe Pro Pro Glu
145                 150                 155                 160

Ile Asp Val Glu Trp Gln Ser Asn Gly Gln Pro Glu Pro Glu Ser Lys
                165                 170                 175

Tyr His Thr Thr Ala Pro Gln Leu Asp Glu Asp Gly Ser Tyr Phe Leu
            180                 185                 190

Tyr Ser Lys Leu Ser Val Asp Lys Ser Arg Trp Gln Gln Gly Asp Thr
        195                 200                 205

Phe Thr Cys Ala Val Met His Glu Ala Leu Gln Asn His Tyr Thr Asp
210                 215                 220

Leu Ser Leu Ser His Ser Pro Gly Lys
225                 230

<210> SEQ ID NO 44
<211> LENGTH: 133
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 44

Met Gly Trp Ser Cys Ile Ile Leu Phe Leu Val Ala Thr Ala Thr Gly
 1                5                  10                  15

Val His Ser Asn Trp Gln Asp Val Ile Leu Asp Leu Glu Lys Ile Asp
                 20                  25                  30

Asn Leu Ile Gln Ser Ile His Met Asp Thr Thr Leu Tyr Thr Glu Ser
             35                  40                  45

Asp Val His Pro Ser Cys Lys Val Thr Ala Met Lys Cys Phe Leu Leu
         50                  55                  60

Glu Leu Gly Val Ile Ser Leu Glu Ser Gly Ser His Pro Ile Lys Glu
 65                  70                  75                  80

Ala Val Glu Asn Leu Ile Ile Leu Ala Asn Ser Asp Leu Ser Ser Lys
                 85                  90                  95

Gly Asn Ile Thr Glu Thr Gly Cys Lys Glu Cys Glu Glu Leu Glu Glu
            100                 105                 110

Lys Ser Ile Lys Glu Phe Leu Gln Ser Phe Val His Ile Val Gln Met
        115                 120                 125

Phe Ile Asn Ser Ser
        130

<210> SEQ ID NO 45
<211> LENGTH: 455
<212> TYPE: PRT
<213> ORGANISM: Artificial Sequence
```

<220> FEATURE:
<223> OTHER INFORMATION: Description of Artificial Sequence: Synthetic
      polypeptide

<400> SEQUENCE: 45

Met Gly Trp Ser Cys Ile Ile Leu Phe Leu Val Ala Thr Ala Thr Gly
1               5                   10                  15

Val His Ser Ile Thr Cys Pro Pro Thr Ser Val Lys His Ala Asp
            20                  25                  30

Ile Gln Val Lys Ser Tyr Ser Ser Lys Glu Arg Tyr Thr Cys
            35                  40                  45

Asn Ser Gly Phe Lys Arg Lys Ala Gly Thr Ser Ser Leu Thr Glu Cys
50                  55                  60

Val Leu Asn Lys Thr Thr Asn Thr Ala His Trp Thr Ile Pro Ser Leu
65                  70                  75                  80

Lys Cys Ile Ile Met Lys His Ser Ser Phe His Pro Gln Ala His Lys
                85                  90                  95

Cys His Val Val Ile Leu Ser Pro Gly Asp Pro Ser Leu Thr His Leu
            100                 105                 110

Arg Pro Ser Ser Ser Asp Val Pro Ala Gly Val Thr Pro Glu Pro Glu
            115                 120                 125

Ser Thr Ser Leu Ser Gly Lys Glu Pro Thr Phe Thr Ser Lys Ser Asp
            130                 135                 140

Thr Lys Val Ala Thr Lys Pro Thr Ile Val Pro Gly Ser Arg Pro Met
145                 150                 155                 160

Pro Ser Lys Pro Pro Ala Thr Gly Thr Thr Gly Leu Ile Ser Asn Glu
                165                 170                 175

Pro Ser Ser Gln Ala Pro Ser Gln Thr Thr Ala Lys Ala Leu Glu His
            180                 185                 190

Thr Pro Ser Ala Ser Gln Glu Thr Pro Gly Thr Tyr Ser Tyr Asn Ser
            195                 200                 205

Gly Ala Val Thr Ala Ser Thr Thr Ala Pro Pro Lys Arg Glu Asn Gly
            210                 215                 220

Arg Val Pro Arg Pro Pro Asp Cys Pro Lys Cys Pro Ala Pro Glu Met
225                 230                 235                 240

Leu Gly Gly Pro Ser Val Phe Ile Phe Pro Pro Lys Pro Lys Asp Thr
                245                 250                 255

Leu Leu Ile Ala Arg Thr Pro Glu Val Thr Cys Val Val Asp Leu
            260                 265                 270

Asp Pro Glu Asp Pro Glu Val Gln Ile Ser Trp Phe Val Asp Gly Lys
            275                 280                 285

Gln Met Gln Thr Ala Lys Thr Gln Pro Arg Glu Glu Gln Phe Asn Gly
290                 295                 300

Thr Tyr Arg Val Val Ser Val Leu Pro Ile Gly His Gln Asp Trp Leu
305                 310                 315                 320

Lys Gly Lys Gln Phe Thr Cys Lys Val Asn Asn Lys Ala Leu Pro Ser
                325                 330                 335

Pro Ile Glu Arg Thr Ile Ser Lys Ala Arg Gly Gln Ala His Gln Pro
            340                 345                 350

Ser Val Tyr Val Leu Pro Pro Ser Arg Glu Glu Leu Ser Lys Asn Thr
            355                 360                 365

Val Ser Leu Thr Cys Leu Ile Lys Asp Phe Phe Pro Pro Asp Ile Asp
370                 375                 380

Val Glu Trp Gln Ser Asn Gly Gln Gln Glu Pro Glu Ser Lys Tyr Arg

```
                385                 390                 395                 400
Thr Thr Pro Pro Gln Leu Asp Glu Asp Gly Ser Tyr Phe Leu Tyr Ser
                405                 410                 415

Lys Leu Ser Val Asp Lys Ser Arg Trp Gln Arg Gly Asp Thr Phe Ile
                420                 425                 430

Cys Ala Val Met His Glu Ala Leu His Asn His Tyr Thr Gln Glu Ser
                435                 440                 445

Leu Ser His Ser Pro Gly Lys
                450                 455

<210> SEQ ID NO 46
<211> LENGTH: 451
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 46

Met Gly Trp Ser Cys Ile Ile Leu Phe Leu Val Ala Thr Ala Thr Gly
1               5                   10                  15

Val His Ser Ile Thr Cys Pro Pro Pro Thr Ser Val Lys His Ala Asp
                20                  25                  30

Ile Gln Val Lys Ser Tyr Ser Val Ser Ser Lys Glu Arg Tyr Thr Cys
            35                  40                  45

Asn Ser Gly Phe Lys Arg Lys Ala Gly Thr Ser Ser Leu Thr Glu Cys
        50                  55                  60

Val Leu Asn Lys Thr Thr Asn Thr Ala His Trp Thr Ile Pro Ser Leu
65                  70                  75                  80

Lys Cys Ile Ile Met Lys His Ser Ser Phe His Pro Gln Ala His Lys
                85                  90                  95

Cys His Val Val Ile Leu Ser Pro Gly Asp Pro Ser Leu Thr His Leu
            100                 105                 110

Arg Pro Ser Ser Ser Asp Val Pro Ala Gly Val Thr Pro Glu Pro Glu
        115                 120                 125

Ser Thr Ser Leu Ser Gly Lys Glu Pro Thr Phe Thr Ser Lys Ser Asp
    130                 135                 140

Thr Lys Val Ala Thr Lys Pro Thr Ile Val Pro Gly Ser Arg Pro Met
145                 150                 155                 160

Pro Ser Lys Pro Pro Ala Thr Gly Thr Thr Gly Leu Ile Ser Asn Glu
                165                 170                 175

Pro Ser Ser Gln Ala Pro Ser Gln Thr Thr Ala Lys Ala Leu Glu His
            180                 185                 190

Thr Pro Ser Ala Ser Gln Glu Thr Pro Gly Thr Tyr Ser Tyr Asn Ser
        195                 200                 205

Gly Ala Val Thr Ala Ser Thr Thr Ala Pro Phe Asn Glu Cys Arg Cys
    210                 215                 220

Thr Asp Thr Pro Pro Cys Pro Val Pro Glu Pro Leu Gly Gly Pro Ser
225                 230                 235                 240

Val Leu Ile Phe Pro Pro Lys Pro Lys Asp Ile Leu Arg Ile Thr Arg
                245                 250                 255

Thr Pro Glu Val Thr Cys Val Val Leu Asp Leu Gly Arg Glu Asp Pro
            260                 265                 270

Glu Val Gln Ile Ser Trp Phe Val Asp Gly Lys Glu Val His Thr Ala
        275                 280                 285
```

```
Lys Thr Gln Ser Arg Glu Gln Gln Phe Asn Gly Thr Tyr Arg Val Val
    290                 295                 300

Ser Val Leu Pro Ile Glu His Gln Asp Trp Leu Thr Gly Lys Glu Phe
305                 310                 315                 320

Lys Cys Arg Val Asn His Ile Asp Leu Pro Ser Pro Ile Glu Arg Thr
                325                 330                 335

Ile Ser Lys Ala Arg Gly Arg Ala His Lys Pro Ser Val Tyr Val Leu
            340                 345                 350

Pro Pro Ser Pro Lys Glu Leu Ser Ser Asp Thr Val Ser Ile Thr
        355                 360                 365

Cys Leu Ile Lys Asp Phe Tyr Pro Pro Asp Ile Asp Val Glu Trp Gln
370                 375                 380

Ser Asn Gly Gln Gln Glu Pro Glu Arg Lys His Arg Met Thr Pro Pro
385                 390                 395                 400

Gln Leu Asp Glu Asp Gly Ser Tyr Phe Leu Tyr Ser Lys Leu Ser Val
                405                 410                 415

Asp Lys Ser Arg Trp Gln Gln Gly Asp Pro Phe Thr Cys Ala Val Met
            420                 425                 430

His Glu Thr Leu Gln Asn His Tyr Thr Asp Leu Ser Leu Ser His Ser
        435                 440                 445

Pro Gly Lys
    450

<210> SEQ ID NO 47
<211> LENGTH: 453
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 47

Met Gly Trp Ser Cys Ile Ile Leu Phe Leu Val Ala Thr Ala Thr Gly
1               5                   10                  15

Val His Ser Ile Thr Cys Pro Pro Thr Ser Val Lys His Ala Asp
            20                  25                  30

Ile Gln Val Lys Ser Tyr Ser Val Ser Ser Lys Glu Arg Tyr Thr Cys
        35                  40                  45

Asn Ser Gly Phe Lys Arg Lys Ala Gly Thr Ser Ser Leu Thr Glu Cys
    50                  55                  60

Val Leu Asn Lys Thr Thr Asn Thr Ala His Trp Thr Ile Pro Ser Leu
65                  70                  75                  80

Lys Cys Ile Ile Met Lys His Ser Ser Phe His Pro Gln Ala His Lys
                85                  90                  95

Cys His Val Val Ile Leu Ser Pro Gly Asp Pro Ser Leu Thr His Leu
            100                 105                 110

Arg Pro Ser Ser Ser Asp Val Pro Ala Gly Val Thr Pro Glu Pro Glu
        115                 120                 125

Ser Thr Ser Leu Ser Gly Lys Glu Pro Thr Phe Thr Ser Lys Ser Asp
    130                 135                 140

Thr Lys Val Ala Thr Lys Pro Thr Ile Val Pro Gly Ser Arg Pro Met
145                 150                 155                 160

Pro Ser Lys Pro Pro Ala Thr Gly Thr Thr Gly Leu Ile Ser Asn Glu
                165                 170                 175

Pro Ser Ser Gln Ala Pro Ser Gln Thr Thr Ala Lys Ala Leu Glu His
            180                 185                 190
```

Thr Pro Ser Ala Ser Gln Glu Thr Pro Gly Thr Tyr Ser Tyr Asn Ser
        195                 200                 205

Gly Ala Val Thr Ala Ser Thr Thr Ala Pro Ala Lys Glu Cys Glu Cys
    210                 215                 220

Lys Cys Asn Cys Asn Asn Cys Pro Cys Pro Gly Cys Gly Leu Leu Gly
225                 230                 235                 240

Gly Pro Ser Val Phe Ile Phe Pro Pro Lys Pro Lys Asp Ile Leu Val
                245                 250                 255

Thr Ala Arg Thr Pro Thr Val Thr Cys Val Val Asp Leu Asp Pro
            260                 265                 270

Glu Asn Pro Glu Val Gln Ile Ser Trp Phe Val Asp Ser Lys Gln Val
            275                 280                 285

Gln Thr Ala Asn Thr Gln Pro Arg Glu Glu Gln Ser Asn Gly Thr Tyr
        290                 295                 300

Arg Val Val Ser Val Leu Pro Ile Gly His Gln Asp Trp Leu Ser Gly
305                 310                 315                 320

Lys Gln Phe Lys Cys Lys Val Asn Asn Lys Ala Leu Pro Ser Pro Ile
                325                 330                 335

Glu Glu Ile Ile Ser Lys Thr Pro Gly Gln Ala His Gln Pro Asn Val
            340                 345                 350

Tyr Val Leu Pro Pro Ser Arg Asp Glu Met Ser Lys Asn Thr Val Thr
        355                 360                 365

Leu Thr Cys Leu Val Lys Asp Phe Phe Pro Pro Glu Ile Asp Val Glu
    370                 375                 380

Trp Gln Ser Asn Gly Gln Gln Glu Pro Glu Ser Lys Tyr Arg Met Thr
385                 390                 395                 400

Pro Pro Gln Leu Asp Glu Asp Gly Ser Tyr Phe Leu Tyr Ser Lys Leu
                405                 410                 415

Ser Val Asp Lys Ser Arg Trp Gln Arg Gly Asp Thr Phe Ile Cys Ala
            420                 425                 430

Val Met His Glu Ala Leu His Asn His Tyr Thr Gln Ile Ser Leu Ser
        435                 440                 445

His Ser Pro Gly Lys
    450

<210> SEQ ID NO 48
<211> LENGTH: 451
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 48

Met Gly Trp Ser Cys Ile Ile Leu Phe Leu Val Ala Thr Ala Thr Gly
1               5                   10                  15

Val His Ser Ile Thr Cys Pro Pro Thr Ser Val Lys His Ala Asp
                20                  25                  30

Ile Gln Val Lys Ser Tyr Ser Val Ser Ser Lys Glu Arg Tyr Thr Cys
            35                  40                  45

Asn Ser Gly Phe Lys Arg Lys Ala Gly Thr Ser Ser Leu Thr Glu Cys
        50                  55                  60

Val Leu Asn Lys Thr Thr Asn Thr Ala His Trp Thr Ile Pro Ser Leu
65                  70                  75                  80

Lys Cys Ile Ile Met Lys His Ser Ser Phe His Pro Gln Ala His Lys

```
                85                  90                  95
Cys His Val Val Ile Leu Ser Pro Gly Asp Pro Ser Leu Thr His Leu
            100                 105                 110

Arg Pro Ser Ser Ser Asp Val Pro Ala Gly Val Thr Pro Glu Pro Glu
            115                 120                 125

Ser Thr Ser Leu Ser Gly Lys Glu Pro Thr Phe Thr Ser Lys Ser Asp
        130                 135                 140

Thr Lys Val Ala Thr Lys Pro Thr Ile Val Pro Gly Ser Arg Pro Met
145                 150                 155                 160

Pro Ser Lys Pro Pro Ala Thr Gly Thr Thr Gly Leu Ile Ser Asn Glu
                165                 170                 175

Pro Ser Ser Gln Ala Pro Ser Gln Thr Thr Ala Lys Ala Leu Glu His
            180                 185                 190

Thr Pro Ser Ala Ser Gln Glu Thr Pro Gly Thr Tyr Ser Tyr Asn Ser
            195                 200                 205

Gly Ala Val Thr Ala Ser Thr Thr Ala Pro Pro Lys Glu Ser Thr Cys
        210                 215                 220

Lys Cys Ile Ser Pro Cys Pro Val Pro Glu Ser Leu Gly Gly Pro Ser
225                 230                 235                 240

Val Phe Ile Phe Pro Pro Lys Pro Lys Asp Ile Leu Arg Ile Thr Arg
                245                 250                 255

Thr Pro Glu Ile Thr Cys Val Val Leu Asp Leu Gly Arg Glu Asp Pro
            260                 265                 270

Glu Val Gln Ile Ser Trp Phe Val Asp Gly Lys Glu Val His Thr Ala
            275                 280                 285

Lys Thr Gln Pro Arg Glu Gln Gln Phe Asn Ser Thr Tyr Arg Val Val
290                 295                 300

Ser Val Leu Pro Ile Glu His Gln Asp Trp Leu Thr Gly Lys Glu Phe
305                 310                 315                 320

Lys Cys Arg Val Asn His Ile Gly Leu Pro Ser Pro Ile Glu Arg Thr
                325                 330                 335

Ile Ser Lys Ala Arg Gly Gln Ala His Gln Pro Ser Val Tyr Val Leu
            340                 345                 350

Pro Pro Ser Pro Lys Glu Leu Ser Ser Ser Asp Thr Val Thr Leu Thr
            355                 360                 365

Cys Leu Ile Lys Asp Phe Phe Pro Pro Glu Ile Asp Val Glu Trp Gln
370                 375                 380

Ser Asn Gly Gln Pro Glu Pro Glu Ser Lys Tyr His Thr Thr Ala Pro
385                 390                 395                 400

Gln Leu Asp Glu Asp Gly Ser Tyr Phe Leu Tyr Ser Lys Leu Ser Val
                405                 410                 415

Asp Lys Ser Arg Trp Gln Gln Gly Asp Thr Phe Thr Cys Ala Val Met
            420                 425                 430

His Glu Ala Leu Gln Asn His Tyr Thr Asp Leu Ser Leu Ser His Ser
            435                 440                 445

Pro Gly Lys
450

<210> SEQ ID NO 49
<211> LENGTH: 114
<212> TYPE: PRT
<213> ORGANISM: Macaca mulatta

<400> SEQUENCE: 49
```

```
Asn Trp Val Asn Val Ile Ser Asp Leu Lys Ile Glu Asp Leu Ile
1               5                   10                  15

Gln Ser Met His Ile Asp Ala Thr Leu Tyr Thr Glu Ser Asp Val His
            20                  25                  30

Pro Ser Cys Lys Val Thr Ala Met Lys Cys Phe Leu Leu Glu Leu Gln
        35                  40                  45

Val Ile Ser His Glu Ser Gly Asp Thr Asp Ile His Asp Thr Val Glu
    50                  55                  60

Asn Leu Ile Ile Leu Ala Asn Asn Ile Leu Ser Ser Asn Gly Asn Ile
65                  70                  75                  80

Thr Glu Ser Gly Cys Lys Glu Cys Glu Glu Leu Glu Glu Lys Asn Ile
                85                  90                  95

Lys Glu Phe Leu Gln Ser Phe Val His Ile Val Gln Met Phe Ile Asn
            100                 105                 110

Thr Ser
```

<210> SEQ ID NO 50
<211> LENGTH: 174
<212> TYPE: PRT
<213> ORGANISM: Macaca mulatta

<400> SEQUENCE: 50

```
Ile Thr Cys Pro Pro Pro Val Ser Val Glu His Ala Asp Ile Arg Val
1               5                   10                  15

Lys Ser Tyr Ser Leu Tyr Ser Arg Glu Arg Tyr Ile Cys Asn Ser Gly
            20                  25                  30

Phe Lys Arg Lys Ala Gly Thr Ser Leu Thr Glu Cys Val Leu Asn
        35                  40                  45

Lys Ala Thr Asn Ile Ala His Trp Thr Thr Pro Ser Leu Lys Cys Ile
    50                  55                  60

Arg Asp Pro Leu Leu Ala Arg Gln Arg Pro Ala Leu Pro Phe Thr Val
65                  70                  75                  80

Thr Thr Ala Gly Val Thr Pro Gln Pro Glu Ser Leu Ser Pro Ser Gly
                85                  90                  95

Lys Glu Pro Ala Ala Ser Ser Pro Ser Ser Asn Thr Thr Ala Ala Thr
            100                 105                 110

Thr Ala Ala Ile Val Pro Ser Ser Arg Leu Met Pro Ser Thr Ser Ser
        115                 120                 125

Ser Thr Gly Thr Thr Glu Ile Gly Ser His Glu Ser Ser His Gly Pro
    130                 135                 140

Ser Gln Thr Thr Ala Lys Thr Trp Glu Leu Thr Ala Ser Ala Ser His
145                 150                 155                 160

Gln Pro Pro Gly Val Tyr Pro Gln Gly His Ser Asp Thr Thr
                165                 170
```

<210> SEQ ID NO 51
<211> LENGTH: 235
<212> TYPE: PRT
<213> ORGANISM: Macaca mulatta

<400> SEQUENCE: 51

```
Glu Ile Lys Thr Cys Gly Gly Gly Ser Lys Pro Pro Thr Cys Pro Pro
1               5                   10                  15

Cys Pro Ala Pro Glu Leu Leu Gly Gly Pro Ser Val Phe Leu Phe Pro
            20                  25                  30

Pro Lys Pro Lys Asp Thr Leu Met Ile Ser Arg Thr Pro Glu Val Thr
```

```
                35                  40                  45
        Cys Val Val Asp Val Ser Gln Glu Asp Pro Asp Val Lys Phe Asn
            50                  55                  60

Trp Tyr Val Asn Gly Ala Glu Val His His Ala Gln Thr Lys Pro Arg
        65                  70                  75                  80

Glu Thr Gln Tyr Asn Ser Thr Tyr Arg Val Val Ser Val Leu Thr Val
                        85                  90                  95

Thr His Gln Asp Trp Leu Asn Gly Lys Glu Tyr Thr Cys Lys Val Ser
                    100                 105                 110

Asn Lys Ala Leu Pro Ala Pro Ile Gln Lys Thr Ile Ser Lys Asp Lys
                115                 120                 125

Gly Gln Pro Arg Glu Pro Gln Val Tyr Thr Leu Pro Pro Ser Arg Glu
        130                 135                 140

Glu Leu Thr Lys Asn Gln Val Ser Leu Thr Cys Leu Val Lys Gly Phe
        145                 150                 155                 160

Tyr Pro Ser Asp Ile Val Val Glu Trp Glu Ser Ser Gly Gln Pro Glu
                        165                 170                 175

Asn Thr Tyr Lys Thr Thr Pro Pro Val Leu Asp Ser Asp Gly Ser Tyr
                    180                 185                 190

Phe Leu Tyr Ser Lys Leu Thr Val Asp Lys Ser Arg Trp Gln Gln Gly
                195                 200                 205

Asn Val Phe Ser Cys Ser Val Met His Glu Ala Leu His Asn His Tyr
            210                 215                 220

Thr Gln Lys Ser Leu Ser Leu Ser Pro Gly Lys
        225                 230                 235

<210> SEQ ID NO 52
<211> LENGTH: 133
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 52

Met Gly Trp Ser Cys Ile Ile Leu Phe Leu Val Ala Thr Ala Thr Gly
1               5                   10                  15

Val His Ser Asn Trp Val Asn Val Ile Ser Asp Leu Lys Lys Ile Glu
            20                  25                  30

Asp Leu Ile Gln Ser Met His Ile Asp Ala Thr Leu Tyr Thr Glu Ser
        35                  40                  45

Asp Val His Pro Ser Cys Lys Val Thr Ala Met Lys Cys Phe Leu Leu
    50                  55                  60

Glu Leu Gln Val Ile Ser His Glu Ser Gly Asp Thr Asp Ile His Asp
65                  70                  75                  80

Thr Val Glu Asn Leu Ile Ile Leu Ala Asn Asn Ile Leu Ser Ser Asn
                85                  90                  95

Gly Asn Ile Thr Glu Ser Gly Cys Lys Glu Cys Glu Glu Leu Glu Glu
            100                 105                 110

Lys Asn Ile Lys Glu Phe Leu Gln Ser Phe Val His Ile Val Gln Met
        115                 120                 125

Phe Ile Asn Thr Ser
    130

<210> SEQ ID NO 53
<211> LENGTH: 434
```

<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 53

```
Met Gly Trp Ser Cys Ile Ile Leu Phe Leu Val Ala Thr Ala Thr Gly
1               5                   10                  15

Val His Ser Ile Thr Cys Pro Pro Val Ser Val Glu His Ala Asp
            20                  25                  30

Ile Arg Val Lys Ser Tyr Ser Leu Tyr Ser Arg Glu Arg Tyr Ile Cys
        35                  40                  45

Asn Ser Gly Phe Lys Arg Lys Ala Gly Thr Ser Ser Leu Thr Glu Cys
    50                  55                  60

Val Leu Asn Lys Ala Thr Asn Ile Ala His Trp Thr Thr Pro Ser Leu
65                  70                  75                  80

Lys Cys Ile Arg Asp Pro Leu Leu Ala Arg Gln Arg Pro Ala Leu Pro
                85                  90                  95

Phe Thr Val Thr Thr Ala Gly Val Thr Pro Gln Pro Glu Ser Leu Ser
            100                 105                 110

Pro Ser Gly Lys Glu Pro Ala Ala Ser Ser Pro Ser Ser Asn Thr Thr
        115                 120                 125

Ala Ala Thr Thr Ala Ala Ile Val Pro Ser Ser Arg Leu Met Pro Ser
    130                 135                 140

Thr Ser Ser Ser Thr Gly Thr Thr Glu Ile Gly Ser His Glu Ser Ser
145                 150                 155                 160

His Gly Pro Ser Gln Thr Thr Ala Lys Thr Trp Glu Leu Thr Ala Ser
                165                 170                 175

Ala Ser His Gln Pro Pro Gly Val Tyr Pro Gln Gly His Ser Asp Thr
            180                 185                 190

Thr Ala Ser Thr Lys Gly Pro Glu Ile Lys Thr Cys Gly Gly Gly Ser
        195                 200                 205

Lys Pro Pro Thr Cys Pro Pro Cys Pro Ala Pro Glu Leu Leu Gly Gly
    210                 215                 220

Pro Ser Val Phe Leu Phe Pro Pro Lys Pro Lys Asp Thr Leu Met Ile
225                 230                 235                 240

Ser Arg Thr Pro Glu Val Thr Cys Val Val Val Asp Val Ser Gln Glu
                245                 250                 255

Asp Pro Asp Val Lys Phe Asn Trp Tyr Val Asn Gly Ala Glu Val His
            260                 265                 270

His Ala Gln Thr Lys Pro Arg Glu Thr Gln Tyr Asn Ser Thr Tyr Arg
        275                 280                 285

Val Val Ser Val Leu Thr Val Thr His Gln Asp Trp Leu Asn Gly Lys
    290                 295                 300

Glu Tyr Thr Cys Lys Val Ser Asn Lys Ala Leu Pro Ala Pro Ile Gln
305                 310                 315                 320

Lys Thr Ile Ser Lys Asp Lys Gly Gln Pro Arg Glu Pro Gln Val Tyr
                325                 330                 335

Thr Leu Pro Pro Ser Arg Glu Glu Leu Thr Lys Asn Gln Val Ser Leu
            340                 345                 350

Thr Cys Leu Val Lys Gly Phe Tyr Pro Ser Asp Ile Val Val Glu Trp
        355                 360                 365

Glu Ser Ser Gly Gln Pro Glu Asn Thr Tyr Lys Thr Thr Pro Pro Val
    370                 375                 380
```

```
Leu Asp Ser Asp Gly Ser Tyr Phe Leu Tyr Ser Lys Leu Thr Val Asp
385                 390                 395                 400

Lys Ser Arg Trp Gln Gln Gly Asn Val Phe Ser Cys Ser Val Met His
            405                 410                 415

Glu Ala Leu His Asn His Tyr Thr Gln Lys Ser Leu Ser Leu Ser Pro
            420                 425                 430

Gly Lys
```